(12) United States Patent
Lew et al.

(10) Patent No.: US 11,994,470 B2
(45) Date of Patent: May 28, 2024

(54) PIXEL-WISE POINT SPREAD FUNCTION ENGINEERING SYSTEMS AND METHODS

(71) Applicant: Washington University, St. Louis, MO (US)

(72) Inventors: Matthew Lew, St. Louis, MO (US); Tingting Wu, St. Louis, MO (US)

(73) Assignee: Washington University, St. Louis, MO (US)

( * ) Notice: Subject to any disclaimer, the term of this patent is extended or adjusted under 35 U.S.C. 154(b) by 43 days.

(21) Appl. No.: 17/880,648

(22) Filed: Aug. 4, 2022

(65) Prior Publication Data

US 2023/0048370 A1 Feb. 16, 2023

Related U.S. Application Data

(60) Provisional application No. 63/228,868, filed on Aug. 3, 2021.

(51) Int. Cl.
*G01N 21/64* (2006.01)

(52) U.S. Cl.
CPC ..... *G01N 21/6458* (2013.01); *G01N 21/6428* (2013.01); *G01N 21/6445* (2013.01); *G01N 2021/6439* (2013.01)

(58) Field of Classification Search
None
See application file for complete search history.

(56) References Cited

U.S. PATENT DOCUMENTS

| 8,334,514 B2* | 12/2012 | Larkin | G01N 15/1429 250/336.1 |
|---|---|---|---|
| 2018/0307132 A1* | 10/2018 | Zhang | G02B 21/361 |
| 2019/0356902 A1* | 11/2019 | Shechtman | G02B 21/0032 |
| 2022/0020115 A1* | 1/2022 | Zhang | G06N 3/045 |

* cited by examiner

*Primary Examiner* — Eileen M Adams

(57) ABSTRACT

Systems, devices, and methods for producing an optimized phase mask for use in a single-molecule orientation localization microscopy (SMOLM) imaging system are disclosed.

18 Claims, 103 Drawing Sheets

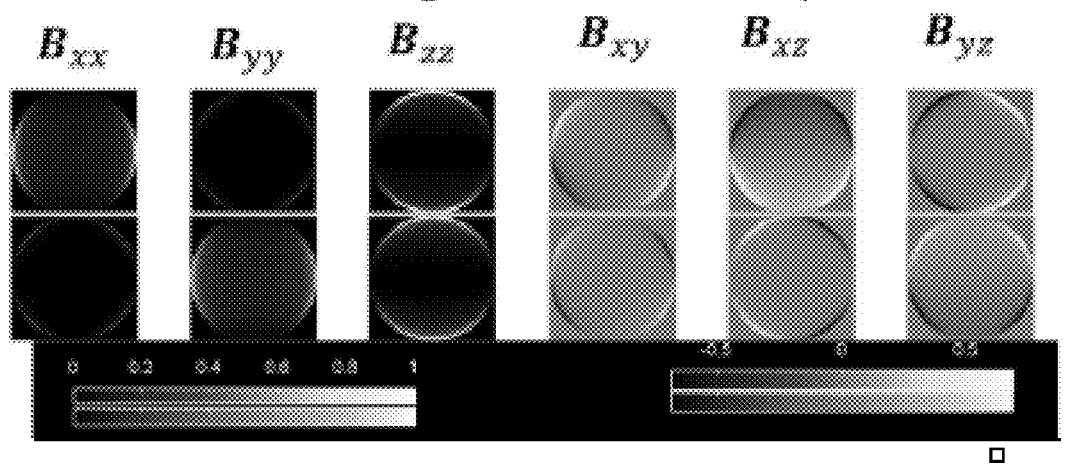
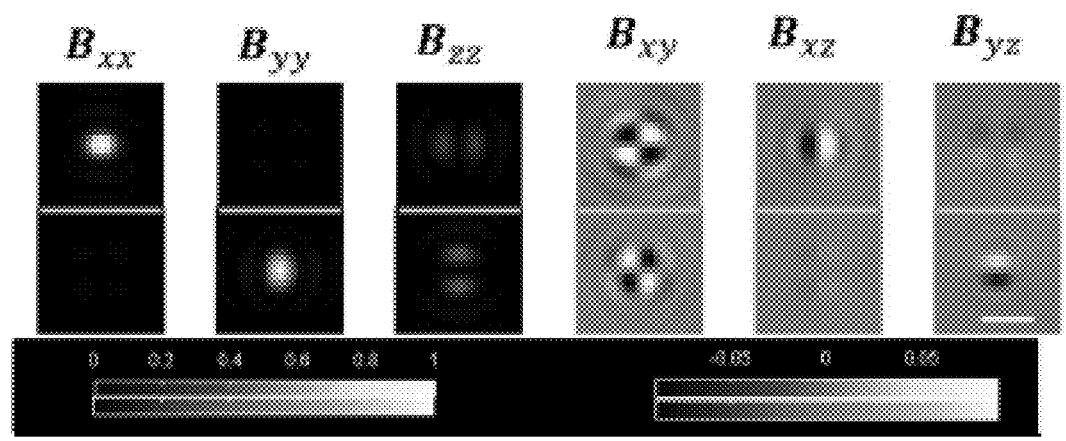
FIG. 3

The intensity distribution captured by the camera is a linear superposition of six basis images weighted by a second-moment vector $m$. s: signal; b: background $$I = s \underbrace{[B_{xx}\ B_{yy}\ B_{zz}\ B_{xy}\ B_{xz}\ B_{yz}]}_{B} \underbrace{\begin{bmatrix} \langle \mu_x^2 \rangle \\ \langle \mu_y^2 \rangle \\ \langle \mu_z^2 \rangle \\ \langle \mu_x \mu_y \rangle \\ \langle \mu_x \mu_z \rangle \\ \langle \mu_y \mu_z \rangle \end{bmatrix}}_{M} + b$$

Only related to the microscope

Only related to the emitter's orientation $$[\theta, \phi, \Omega] \Leftrightarrow [\langle \mu_x^2 \rangle\ \langle \mu_y^2 \rangle\ \langle \mu_z^2 \rangle\ \langle \mu_x \mu_y \rangle\ \langle \mu_x \mu_z \rangle\ \langle \mu_y \mu_z \rangle]$$

Encodes the orientation second moments $M$ information ⟷ Encodes the 3D orientation parameter $(\theta, \phi, \Omega)$

FIG. 4

|  |  |  | pixOL | CHIDO | DH | vortex |
|---|---|---|---|---|---|---|
| high SBR (2500:3) | in focus | mean MASD $\sigma_\delta$ (deg) | 0.8 | 1.0 | 1.4 | 1.3 |
|  |  | mean wobble angle precision $\sigma_\Omega$ (sr) | 0.16 | 0.18 | 0.32 | 0.24 |
|  | average over a 800-nm axial range | mean MASD $\sigma_\delta$ (deg) | 1.1 | 1.1 | 1.5 | 1.7 |
|  |  | mean wobble angle precision $\sigma_\Omega$ (sr) | 0.24 | 0.24 | 0.35 | 0.36 |
|  |  | mean precision for lateral position $\sigma_L$ (nm) | 8.2 | 11.0 | 12.0 | 13.4 |
|  |  | mean precision for axial position $\sigma_h$ (nm) | 12.2 | 15.8 | 11.0 | 14.2 |
| low SBR (2500:10) | in focus | mean MASD $\sigma_\delta$ (deg) | 1.1 | 1.2 | 2.2 | 1.7 |
|  |  | mean wobble angle precision $\sigma_\Omega$ (sr) | 0.23 | 0.25 | 0.52 | 0.33 |
|  | average over a 800-nm axial range | mean MASD $\sigma_\delta$ (deg) | 1.4 | 1.4 | 2.0 | 2.0 |
|  |  | mean wobble angle precision $\sigma_\Omega$ (sr) | 0.30 | 0.30 | 0.46 | 0.45 |
|  |  | mean precision for lateral position $\sigma_L$ (nm) | 11.4 | 16.2 | 18.5 | 20.0 |
|  |  | mean precision for axial position $\sigma_h$ (nm) | 17.9 | 23.1 | 16.9 | 21.7 |

FIG. 29

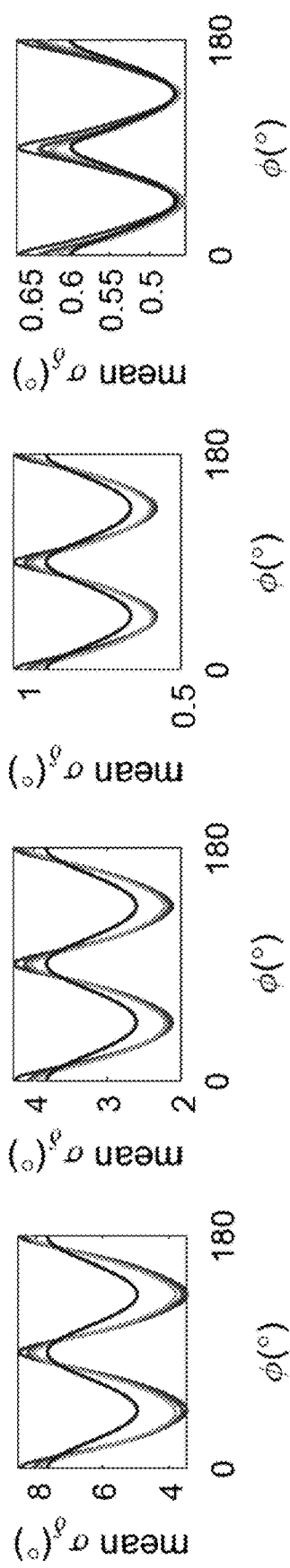
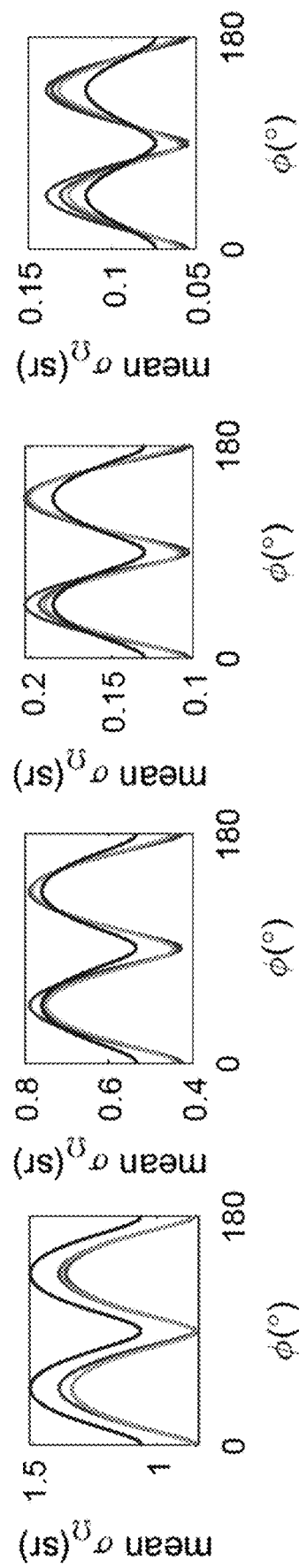
FIG. 35E  FIG. 35F  FIG. 35G  FIG. 35H
FIG. 35I  FIG. 35J  FIG. 35K  FIG. 35L

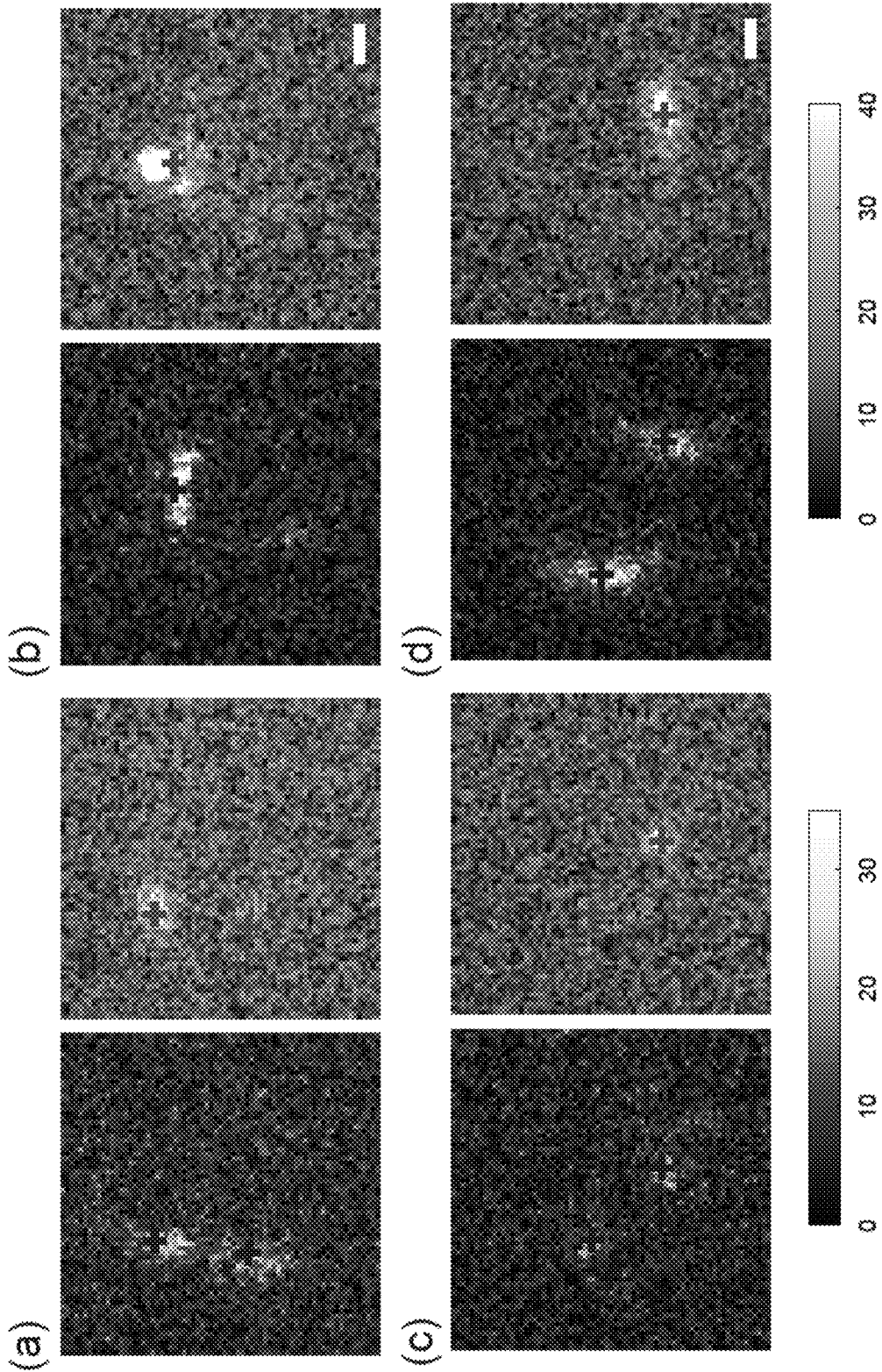

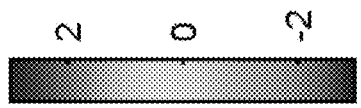
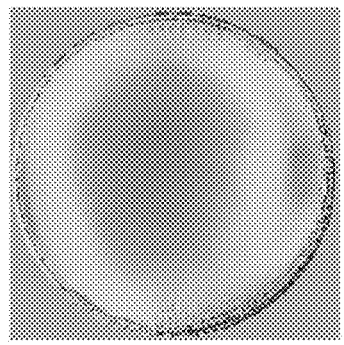
FIG. 56D
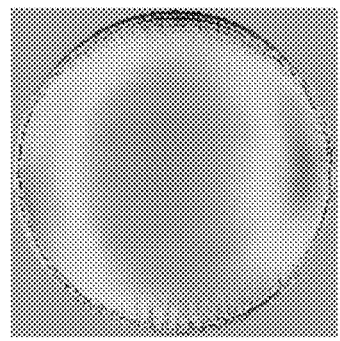
FIG. 56C
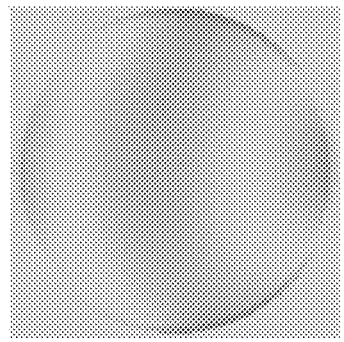
FIG. 56B
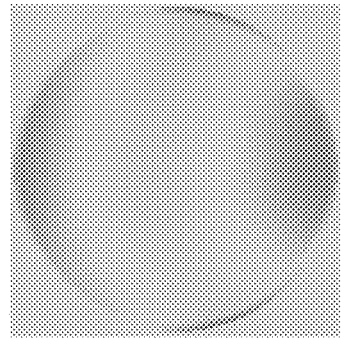
FIG. 56A

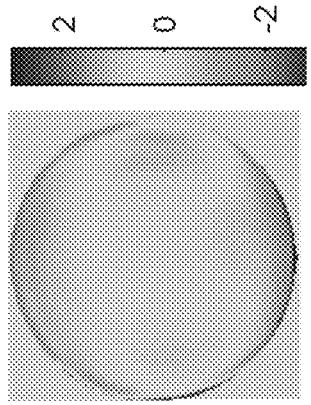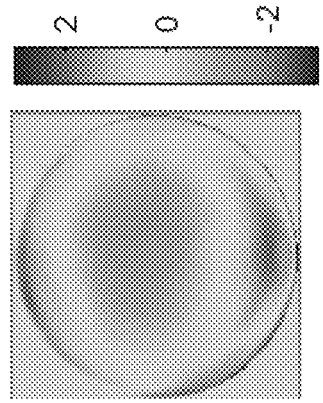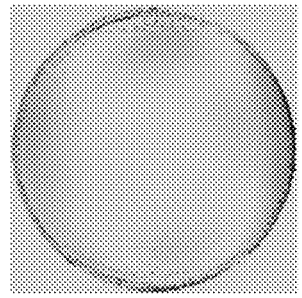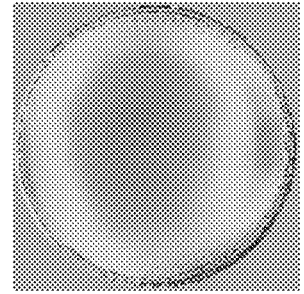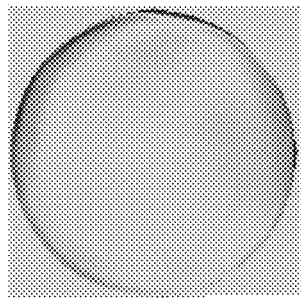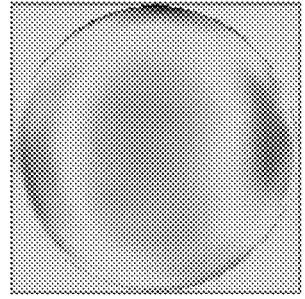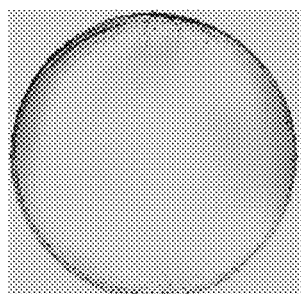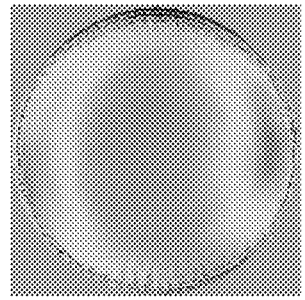
FIG. 57A  FIG. 57B

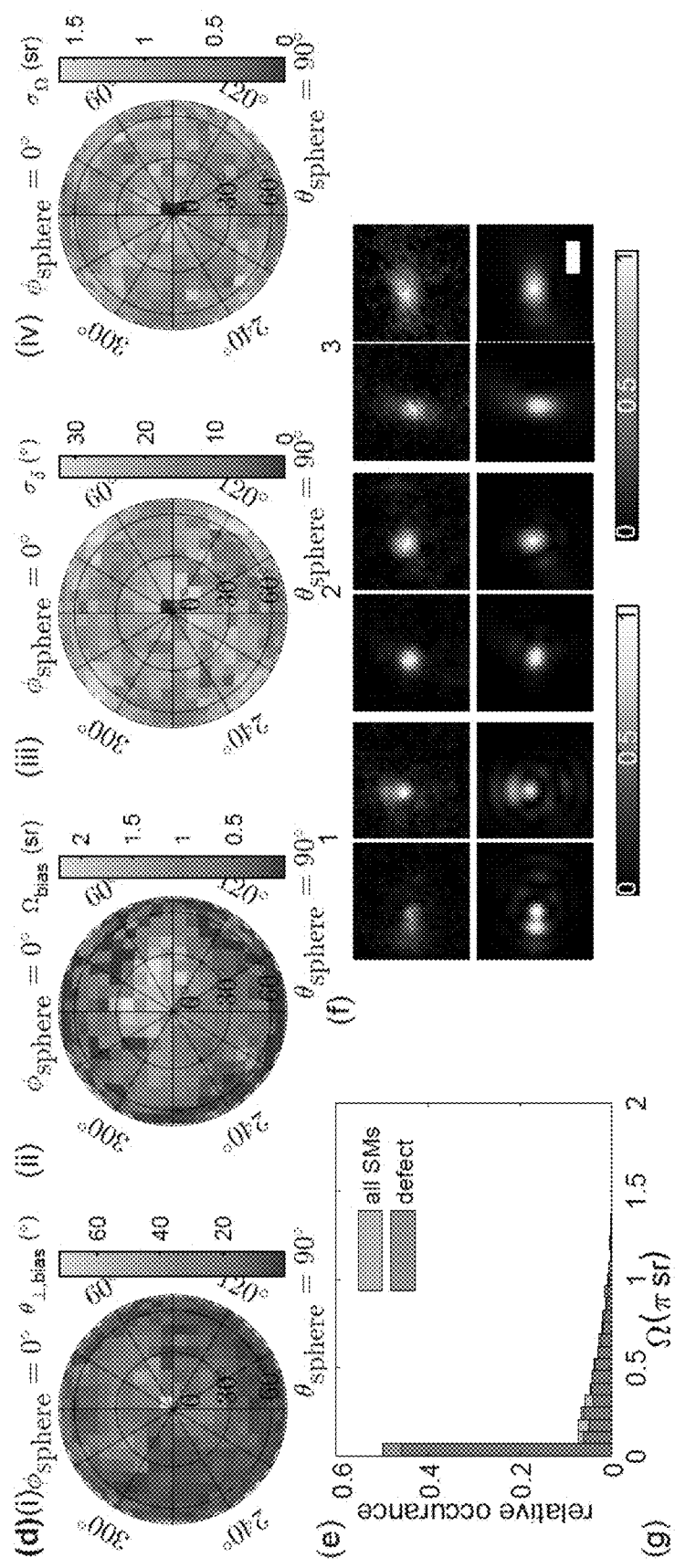

Algorithm 1 Estimating the 3D orientation and 3D location of individual emitters based on cropped images 1: input: $[I, A_{library}]$
   $\triangleright$ $A_{library} = [A_1, ..., A_n]$ is a set of basis matrices for emitters located at $[x, y, h] = \{[0, 0, h_1], ..., [0, 0, h_n]\}$ where $h = [-300, -250, ..., 300]$ nm represents the locations of $n$ h-slices.
   $\triangleright$ $n$ is the number of h-slices.
2: for $j \leftarrow 1$ to $n$ do
3: $\quad A \leftarrow A_j$
   $\triangleright$ $A$ represents the current basis matrix.
4: $\quad$ Crop $A$ so that each basis image in $A$ has a size of $21 \times 21$ pixels
5: $\quad \hat{\zeta}^0_{q,j} \leftarrow A^{-1}(I - b)$
   $\triangleright$ Obtain an initial brightness, position, and orientation estimate for the $q^{th}$ emitter, assuming its image matches $A_j$.
6: $\quad$ Obtain a refined $\hat{\zeta}_{q,j}$, grid estimation $w_{q,j}$, and loss value $\ell_{NLL,q,j}$ from algorithm 2.
   $\triangleright$ Use $\hat{\zeta}^0_{q,j}$ as the initial value, $[0, 0, h_j]$ as the initial grid location estimation $w^0_{q,j}$, and an iteration number of 30 for algorithm 2.
7: end for
8: Obtain a final estimate $\hat{\zeta}_q$ and $w_q$ from algorithm 2.
   $\triangleright$ Use $\hat{\zeta}_{q,j}$ and $w_{q,j}$ that has the smallest loss value $\ell_{NLL,q,j}$ and an iteration number of 100 for algorithm 2.

FIG. 63A

Algorithm 2. Estimating 3D orientation and 3D location using FISTA with backtracking 1: input: $[I, \zeta^0, w^0, A_{library}, N]$
2: Using $A_{library}$, compute basis matrix $A$ centered at the estimated initial grid location $w^0$.
3: $w_0 \leftarrow w^0, \zeta_0 \leftarrow \zeta^0, v_1 \leftarrow \zeta^0$  ▷ $v_1$ is a nearby point of $\zeta^0$ that will be used to accelerate the optimization.
4: $t_1 \leftarrow 1$, and take $L_0 > 0$ and $\eta > 1$.
   ▷ $L_0$ denotes a constant chosen for initializing the step size, and $\eta$ is a constant chosen to adjust step sizes in future steps.
5: for $k \leftarrow 1$ to $N$ do  ▷ $N$ is the total number of iterations
6:   Calculate the best step size by finding the smallest integer $i_k \geq 0$ such that with $L_k = \eta^{i_k} L_{k-1}$, $\ell_{NLL}(v_{k,L_k}) \leq \ell_{NLL}(v_k) + \nabla_v \ell_{NLL}(v_k)^T [v_{k,L_k} - v_k] + \frac{L_k}{2} \|v_{k,L_k} - v_k\|_2^2$
   $v_{k,L_k} = P_{L2}(P_{L1}(v_k - \frac{1}{L_k} \nabla_v \ell_{NLL}(v_k))) \leftarrow A^T(1 - (I \oslash (Av_k + b)))$, and operator $\oslash$ represents element-wise division of two vectors.
   $P_{L1}$ and $P_{L2}$ are projection operators shown in Eqn. S20 and Eqn. S21
7:   $L_k \leftarrow \eta^{i_k} L_{k-1}$
8:   $\zeta_k \leftarrow v_k - \frac{1}{L_k} \nabla_v \ell_{NLL}(v_k)$  ▷ using Eqn. S17
9:   Based on $\zeta_k$ and $w_{k-1}$, compute $[\hat{g}, \hat{g}, \hat{h}_k]$ and its closest grid point $w_k = [f_0, g_0, h_0]$
10:  Compute $A$ centered at the new grid location $w_k$ using $A_{library}$.
11:  Compute $\zeta_{k-1,new}$ and $\zeta_{k,new}$ based on the new grid location $w_k$.
     ▷ $\zeta_{k-1,new} = \zeta_{k-1} + [\alpha_0, \alpha_1 \zeta_{k-1,[1,3]}, \alpha_2 \zeta_{k-1,[1,3]}, \alpha_3 \zeta_{k-1,[1,3]}]$, $\zeta_{k,new} = \zeta_k + [\alpha_0, \alpha_1 \zeta_{k,[1,3]}, \alpha_2 \zeta_{k,[1,3]}, \alpha_3 \zeta_{k,[1,3]}]$, where
     $\alpha_0 = [0, 0, 0, 0, 0]$, $\alpha_1 = (w_{k-1,1} - w_{k,1})$, $\alpha_2 = (w_{k-1,2} - w_{k,2})$, $\alpha_3 = (w_{k-1,3} - w_{k,3})$
12:  $\zeta_{k-1} \leftarrow \zeta_{k-1,new}$, and $\zeta_k \leftarrow \zeta_{k,new}$
13:  $t_k \leftarrow \frac{1 + \sqrt{1 + 4t_k^2}}{2}$
14:  $v_{k+1} \leftarrow \zeta_k + \frac{t_k - 1}{t_{k+1}}(\zeta_k - \zeta_{k-1})$
15: end for

FIG. 63B

PIXEL-WISE POINT SPREAD FUNCTION ENGINEERING SYSTEMS AND METHODS

CROSS-REFERENCE TO RELATED APPLICATIONS

This application claims priority from U.S. Provisional Application Ser. No. 63/228,868 filed on Aug. 3, 2021, the content of which is incorporated herein by reference in its entirety.

STATEMENT REGARDING FEDERALLY SPONSORED RESEARCH OR DEVELOPMENT

This invention was made with government support under 1653777 awarded by the National Science Foundation and GM124858 awarded by the National Institutes of Health. The government has certain rights in the invention.

MATERIAL INCORPORATED BY REFERENCE

Not applicable.

FIELD OF THE DISCLOSURE

The present disclosure generally relates to single-molecule orientation localization microscopy (SMOLM) systems and methods and in particular to methods for producing optical masks for use in SMOLM systems.

BACKGROUND OF THE DISCLOSURE

In soft matter, thermal energy causes molecules to continuously translate and rotate, even in crowded environments, impacting the spatial organization and function of most molecular assemblies, such as lipid membranes. At the bulk level, these dynamics are typically measured using absorption, fluorescence, nuclear magnetic resonance, or Raman spectroscopies. Directly measuring the orientation and spatial organization of large collections of single molecules remains elusive, particularly with high sampling densities (>900 molecules/$\mu m^2$) and nanoscale resolution.

Tracking a molecule's 3D position and orientation (and associated translational and rotational motions) within soft matter is critical for understanding the intrinsically heterogeneous and complex interactions of its various components across length scales, including associations of surrounding molecules, functional groups, ions, and charges. In living cells, the local organization of and interfaces between many biomolecular assemblies, such as lipid membranes, chromosomes, and cytoskeletal proteins, ensure the proper functioning of all cellular compartments. The orientation and organization of molecules also significantly impact the nanoscale morphology of supramolecular structures, the physical and mechanical properties of polymers, and the carrier mobility in organic solar cells and organic light-emitting diodes.

Molecular orientations are commonly inferred from measuring an order parameter determined via X-ray diffraction, infrared spectroscopy, NMR, Raman spectroscopy, sum frequency generation spectroscopy, and fluorescence microscopy. However, the order parameter is an ensemble average taken over many molecules and cannot unambiguously determine the 3D orientation of a single molecule (SM). Spectrally-resolved SM localization microscopy (SMLM) has been developed to map the local polarity or hydrophobicity of protein aggregates and subcellular structures, and fluorescence lifetime imaging has been applied to recognize sub-resolution lipid domains in the plasma membrane. However, these approaches require specific environment-sensitive fluorescent probes (e.g., Nile red, Laurdan, and 3-hydroxyflavone derivatives) whose excited electronic states are sensitive to the local environment, resulting in detectable changes in fluorescence spectra (intensities) or lifetimes. Alternatively, the orientation and motion of any fluorescent probe are directly influenced by its local environment, regardless of its solvatochromicity or lifetime. Therefore, imaging the 3D orientation and wobble of SMs (i.e. "orientation spectra") offers an alternative and widely applicable strategy for sensing molecular interactions within a sample of interest using any SMLM-compatible fluorescent dyes. Orientation spectra, which are characteristics of the molecules, may be inferred from angular emission spectra and polarization spectra, which are characteristics of the detected photons. Nanoscale imaging of SM orientation spectra may provide direct insight into the spatial organization of molecular assemblies, macromolecules, and subcellular structures, which is helpful for constructing mechanistic models of biological systems.

SUMMARY OF THE DISCLOSURE

In one aspect, a computer-implemented method for producing an optical mask for an SMOLM imaging system is disclosed that includes providing, to a computing device, a baseline optical mask comprising a plurality of mask pixels distributed at a plurality of mask pixel positions within a mask plane, each mask pixel comprising at least one optical modulation element configured to modulate at least one optical parameter of a photon produced by an emitter propagating therethrough. The method further includes providing, to the computing device, a plurality of emitter images indicative of dipole spread functions captured using the SMOLM imaging system provided with the baseline optical mask, each image comprising a plurality of image pixels indicative of a dipole spread function, each image pixel comprising a pixel position and a pixel intensity indicative of a number of photons detected at the pixel position, wherein each emitter image is obtained for a reference emitter positioned at a reference lateral position and at one sample orientation within an orientation space. The method further includes determining, using the computing device, a loss function comprising a matrix quantifying variances in precision of emitter orientations estimated from the dipole spread functions from the plurality of images. The method further includes iteratively modifying, using the computing device, at least one optical parameter of at least one mask pixel to minimize the loss function to produce the optical mask. In some aspects, the at least one optical parameter modulated by each mask pixel comprises a phase, a polarization, a birefringence, and any combination thereof. In some aspects, the optical parameter modulated by each mask pixel is the phase. In some aspects, the plurality of emitter images are obtained by imaging an emitter at a plurality of orientations within the orientation space using the SMOLM imaging system provided with a baseline optical mask or a modified optical mask; or simulating each emitter image using a computational model of a SMOLM imaging system provided with a baseline optical mask or a modified optical mask. In some aspects, each emitter image is simulated using a dipole-dipole model. In some aspects, the matrix quantifying variances in precision of emitter orientations estimated from the dipole spread functions from the plurality of images comprises a Cramér-Rao bound matrix K, wherein the Cramér-Rao bound matrix quantifies a lower bound on a variance of estimated emitter orientations. In some aspects, the loss function l is given by:

$$l = \min_P \sum_{m \in \mathbb{C}} \sqrt{K(P, m)},$$

where m is a second-moment vector m of a dipole spread function obtained using the optical mask P, and C is a uniformly sampled emitter orientation space. In some aspects, the method further includes producing additional optical masks for images of an emitter positioned at different axial positions within the SMOLM imaging system, for images of an emitter comprising background photons, or for images of emitters positioned out of the focal plane of the SMOLM imaging system. In some aspects, the loss function is quantified and minimized by a divergence statistical model. In some aspects, each emitter image of the plurality of images is indicative of at least two dipole spread functions corresponding to at least two emitters within each image.

In one aspect, a computer-implemented method for producing a phase mask for an SMOLM imaging system is disclosed that includes providing, to a computing device, a baseline optical mask comprising a plurality of mask pixels distributed at a plurality of mask pixel positions within a mask plane, each mask pixel comprising at least one optical modulation element configured to modulate a phase of a photon produced by an emitter propagating therethrough. The method further includes providing, to the computing device, a plurality of emitter images indicative of dipole spread functions captured using the SMOLM imaging system provided with the baseline optical mask, each image comprising a plurality of image pixels indicative of a dipole spread function, each image pixel comprising a pixel position and a pixel intensity indicative of a number of photons detected at the pixel position, wherein each emitter image is obtained for a reference emitter positioned at a reference lateral position and at one sample orientation within an orientation space. The method further includes determining, using the computing device, a loss function comprising a matrix quantifying variances in precision of emitter orientations estimated from the dipole spread functions from the plurality of images. The method further includes iteratively modifying, using the computing device the phase of at least one mask pixel to minimize the loss function to produce the optical mask. In some aspects, the plurality of emitter images are obtained by imaging an emitter at a plurality of orientations within the orientation space using the SMOLM imaging system provided with a baseline phase mask or a modified phase mask; or simulating each emitter image using a computational model of a SMOLM imaging system provided with a baseline phase mask or a modified phase mask. In some aspects, each emitter image is simulated using a dipole-dipole model. In some aspects, the matrix quantifying variances in precision of emitter orientations estimated from the dipole spread functions from the plurality of images comprises a Cramér-Rao bound matrix K, wherein the Cramér-Rao bound matrix quantifies a lower bound on a variance of estimated emitter orientations. In some aspects, the loss function l is given by:

$$l = \min_P \sum_{m \in \mathbb{C}} \sqrt{K(P, m)},$$

where m is a second-moment vector m of a dipole spread function obtained using the optical mask P, and C is a uniformly sampled emitter orientation space. In some aspects, the method further includes producing additional phase masks for images of an emitter positioned at different axial positions within the SMOLM imaging system, for images of an emitter comprising background photons, or for images of emitters positioned out of the focal plane of the SMOLM imaging system. In some aspects, the loss function is quantified and minimized by a divergence statistical model. In some aspects, each emitter image of the plurality of images is indicative of at least two dipole spread functions corresponding to at least two emitters within each image.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 3 contains a series of images showing basis images at the back focal plane (upper) and the image plane (lower).

FIG. 4 is a schematic representation of the method of obtaining a 3D orientation vector from an intensity distribution captured by a camera of a single molecule microscope system.

FIG. 29 is a table of the measurement precision of pixOL compared to other techniques: CHIDO, double helix (DH), and unpolarized vortex. The best-possible measurement precisions are calculated using the Cramér-Rao bound (CRB) for mean orientation angle $[\theta, \phi]$ (MASD, $\sigma_\delta$), wobble angle $\alpha_\Omega$, lateral position $\sigma_L$, and axial position $\sigma_h$. MASD quantifies the combined precision of measuring $\theta$ and $\phi$ as the half-angle of a cone representing orientation uncertainty (Eqn. S23). The orientation precisions are calculated for fixed emitters ($\Omega$=0 sr) and averaged over the whole orientation sphere. The localization precisions are calculated for isotropic emitters ($\Omega$=2π sr). Emitters are located within water (1.33 refractive index) with a 2500:3 signal to background ratio (SBR, signal photons:background photons/pixel)) and a 2500:10 SBR.

FIG. 32 shows the effect of modulating super-critical fluorescence differently from sub-critical fluorescence.

FIG. 35 represents optimizing phase masks for various signal to background ratios (SBRs, signal photons:background photons/pixel).

FIG. 35E is a graph of the best-possible measurement precision of various engineered DSFs calculated using the Cramér-Rao bound (CRB) for mean angular standard deviation $\sigma_\delta$ averaged uniformly over all $\theta$. Grey: mask in FIG. 35A, red: mask in 35B, yellow: mask in FIG. 35C, and purple: mask in FIG. 35D. Precision is calculated for emitters at a water-glass interface with SBRs of 380:10.

FIG. 35F is a graph of the best-possible measurement precision of various engineered DSFs calculated using the Cramér-Rao bound (CRB) for mean angular standard deviation $\sigma_\delta$ and averaged uniformly over all $\theta$. Grey: mask in FIG. 35A, red: mask in FIG. 35B, yellow: mask in FIG. 35C, and purple: mask in FIG. 35D. Precision is calculated for emitters at a water-glass interface with SBRs of 380:2.

FIG. 35G is a graph of the best-possible measurement precision of various engineered DSFs calculated using the Cramér-Rao bound (CRB) for mean angular standard deviation $\sigma_\delta$ averaged uniformly over all $\theta$. Grey: mask in FIG. 35A, red: mask in FIG. 35B, yellow: mask in FIG. 35C, and purple: mask in FIG. 35D. Precision is calculated for emitters at a water-glass interface with SBRs of 3800:10.

FIG. 35H is a graph of the best-possible measurement precision of various engineered DSFs calculated using the Cramér-Rao bound (CRB) for mean angular standard deviation $\sigma_\delta$ and averaged uniformly over all $\theta$. Grey: mask in FIG. 35A, red: mask in FIG. 35B, yellow: mask in FIG. 35C, and purple: mask in FIG. 35D. Precision is calculated for emitters at a water-glass interface with SBRs of 3800:2.

FIG. 35I is a graph of the best-possible measurement precision of various engineered DSFs calculated using the Cramér-Rao bound (CRB) for mean wobble angle precision $\sigma_\Omega$ averaged uniformly over all $\theta$. Grey: mask in FIG. 35A, red: mask in FIG. 35B, yellow: mask in FIG. 35C, and purple: mask in (d). Precision is calculated for emitters at a water-glass interface with SBRs of 380:10.

FIG. 35J is a graph of the best-possible measurement precision of various engineered DSFs calculated using the Cramér-Rao bound (CRB) for (e-h) mean angular standard mean wobble angle precision $\sigma_\Omega$ averaged uniformly over all $\theta$. Grey: mask in FIG. 35A, red: mask in FIG. 35B, yellow: mask in FIG. 35C, and purple: mask in FIG. 35D. Precision is calculated for emitters at a water-glass interface with SBRs of 380:2.

FIG. 35K is a graph of the best-possible measurement precision of various engineered DSFs calculated using the Cramér-Rao bound (CRB) for mean wobble angle precision $\sigma_\Omega$ averaged uniformly over all $\theta$. Grey: mask in FIG. 35A, red: mask in FIG. 35B, yellow: mask in FIG. 35C, and purple: mask in FIG. 35D. Precision is calculated for emitters at a water-glass interface with SBRs of 3800:10.

FIG. 35L is a graph of the best-possible measurement precision of various engineered DSFs calculated using the Cramér-Rao bound (CRB) for mean wobble angle precision $\sigma_\Omega$ averaged uniformly over all $\theta$. Grey: mask in FIG. 35A, red: mask in FIG. 35B, yellow: mask in FIG. 35C, and purple: mask in 35D. Precision is calculated for emitters at a water-glass interface with SBRs of 3800:2.

FIG. 42A is a set of 2 polarization-resolved images (red: x and blue: y) of Nile red within spherical lipid bilayers (DPPC with cholesterol). The lateral position [x, y] of each detected molecule is overlaid as crosses (blue cross in the x-polarized image and red cross in the y-polarized image). Scale bar: 500 nm. Color bar: photons/pixel.

FIG. 42B is another set of 2 polarization-resolved images (red: x and blue: y) of Nile red within spherical lipid bilayers (DPPC with cholesterol). The lateral position [x, y] of each detected molecule is overlaid as crosses (blue cross in the x-polarized image and red cross in the y-polarized image). Scale bar: 500 nm. Color bar: photons/pixel.

FIG. 42C is yet another set of 2 polarization-resolved images (red: x and blue: y) of Nile red within spherical lipid bilayers (DPPC with cholesterol). The lateral position [x, y] of each detected molecule is overlaid as crosses (blue cross in the x-polarized image and red cross in the y-polarized image). Scale bar: 500 nm. Color bar: photons/pixel.

FIG. 42D is yet another set of 2 polarization-resolved images (red: x and blue: y) of Nile red within spherical lipid bilayers (DPPC with cholesterol). The lateral position [x, y] of each detected molecule is overlaid as crosses (blue cross in the x-polarized image and red cross in the y-polarized image). Scale bar: 500 nm. Color bar: photons/pixel.

FIG. 46L is a graph representing the percentage of trials that successfully detect one emitter for $\Omega$=2 sr. 200 independent images were generated for emitter within water located at h=400 nm with 2500 signal photons in total and 3 background photons per pixel detected.

Figures 47A, 47B, 47C, 47D:
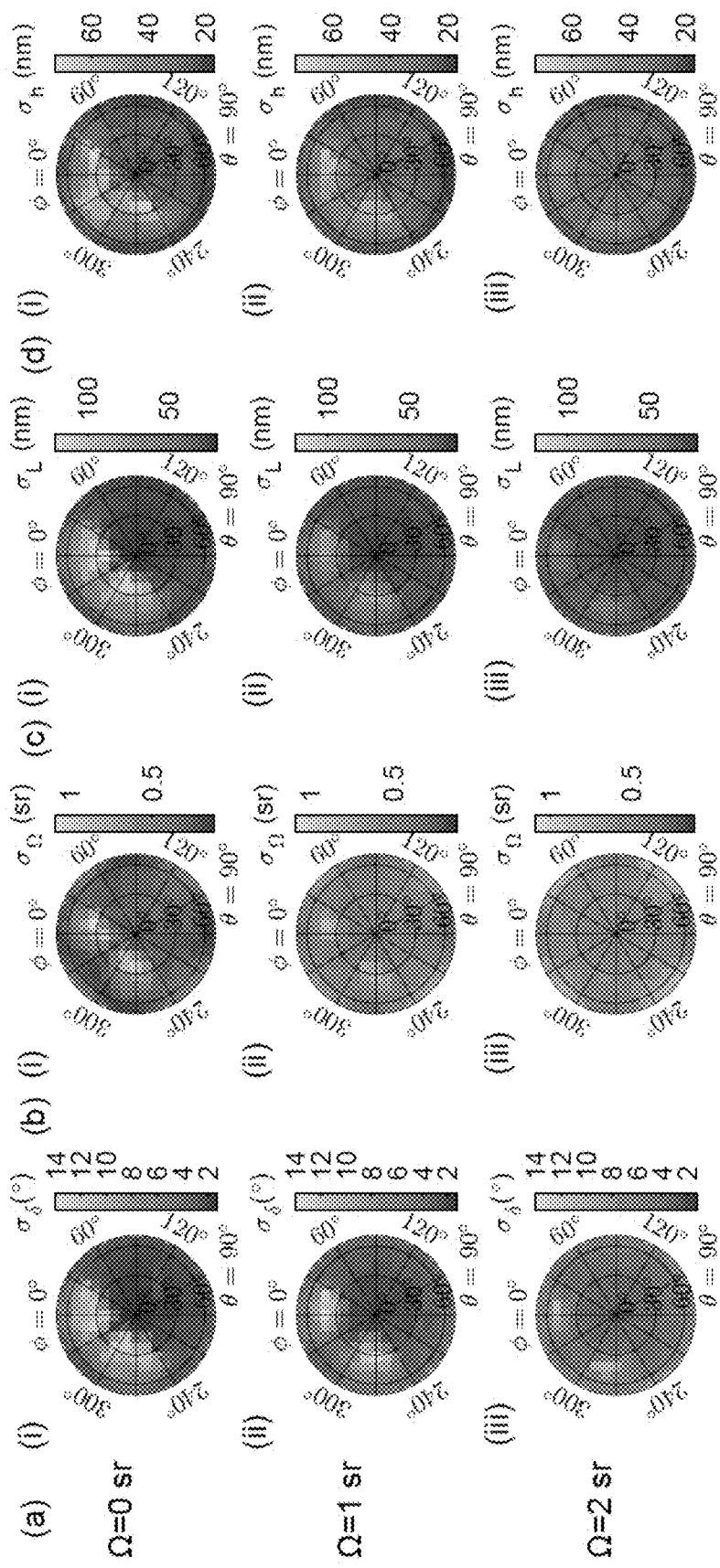

FIG. 47A is a set of graphs of the precision and accuracy of estimating $\sigma_\delta$ (deg) for emitters at h=700 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 3 background photons per pixel detected.

FIG. 47B is a set of graphs of the precision and accuracy of estimating $\sigma_\Omega$ (sr) for emitters at h=700 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 3 background photons per pixel detected.

FIG. 47C is a set of graphs of the precision and accuracy of estimating $\sigma_L$ (nm) for emitters at h=700 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 3 background photons per pixel detected.

FIG. 47D is a set of graphs of the precision and accuracy of estimating $\delta_h$ (nm) for emitters at h=700 nm with a nominal focal plane placed at z=−580 nm with low background at various orientations ($\Omega \in \{0, 1, 2\}$ sr, $\theta \in [0°, 90°]$, θ∈[0°, 360°)). At each orientation, 200 independent images were generated for emitter within water located at h=700 nm with 2500 signal photons in total and 3 background photons per pixel detected.

Figures 47E, 47F, 47G, 47H:
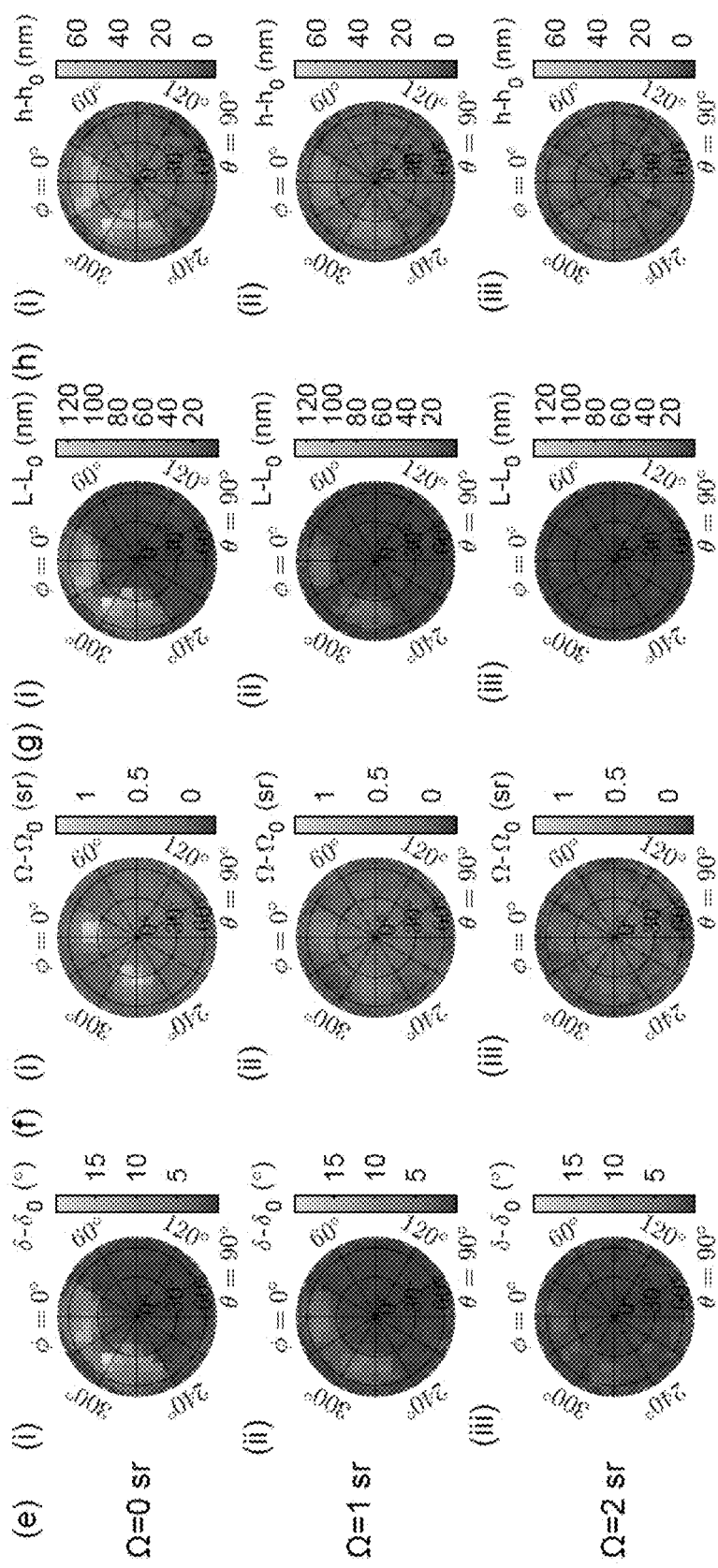

FIG. 47E is a set of graphs of the precision and accuracy of estimating δ-δ$_0$ (deg) for emitters at h=700 nm with a nominal focal plane placed at z=-580 nm with low background at various orientations (Ω∈{0, 1, 2} sr, θ∈[0°, 90°], θ∈[0°, 360°)). At each orientation, 200 independent images were generated for emitter within water located at h=700 nm with 2500 signal photons in total and 3 background photons per pixel detected.

FIG. 47F is a set of graphs of the precision and accuracy of estimating Ω-Ω$_0$ (sr) for emitters at h=700 nm with a nominal focal plane placed at z=-580 nm with low background at various orientations (Ω∈{0, 1, 2} sr, θ∈[0°, 90°], θ∈[0°, 360°)). At each orientation, 200 independent images were generated for emitter within water located at h=700 nm with 2500 signal photons in total and 3 background photons per pixel detected.

FIG. 47G is a set of graphs of the precision and accuracy of estimating L-L$_0$ (nm) for emitters at h=700 nm with a nominal focal plane placed at z=-580 nm with low background at various orientations (Ω∈{0, 1, 2} sr, θ∈[0°, 90°], θ∈[0°, 360°)). At each orientation, 200 independent images were generated for emitter within water located at h=700 nm with 2500 signal photons in total and 3 background photons per pixel detected.

FIG. 47H is a set of graphs of the precision and accuracy of estimating h-h$_0$ (nm) for emitters at h=700 nm with a nominal focal plane placed at z=-580 nm with low background at various orientations (Ω∈{0, 1, 2} sr, θ∈[0°, 90°], θ∈[0°, 360°)). At each orientation, 200 independent images were generated for emitter within water located at h=700 nm with 2500 signal photons in total and 3 background photons per pixel detected.

Figure 47L:
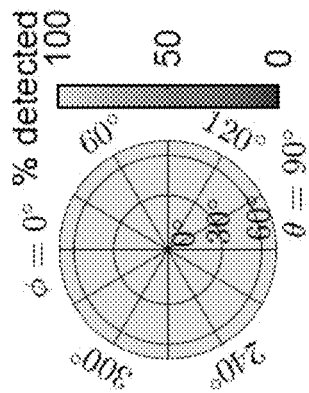
Figure 47K:
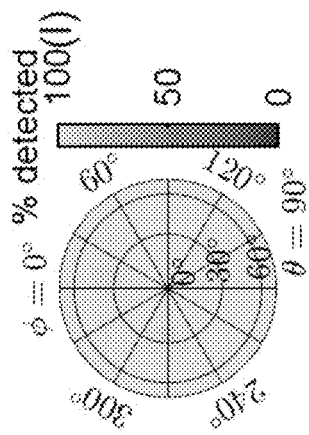
Figure 47J:
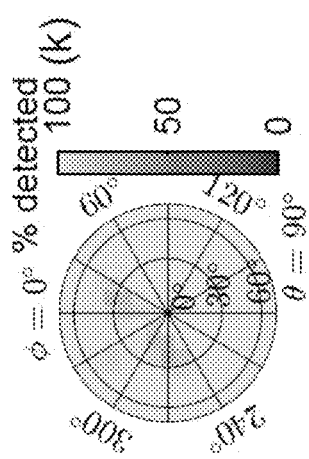

FIG. 47J is a graph representing the percentage of trials that successfully detect one emitter for Ω=0 sr. 200 independent images were generated for emitter within water located at h=700 nm with 2500 signal photons in total and 3 background photons per pixel detected.

FIG. 47K is a graph representing the percentage of trials that successfully detect one emitter for Ω=1 sr. 200 independent images were generated for emitter within water located at h=700 nm with 2500 signal photons in total and 3 background photons per pixel detected.

FIG. 47L is a graph representing the percentage of trials that successfully detect one emitter for Ω=2 sr. 200 independent images were generated for emitter within water located at h=700 nm with 2500 signal photons in total and 3 background photons per pixel detected.

Figures 48A, 48B, 48C, 48D:
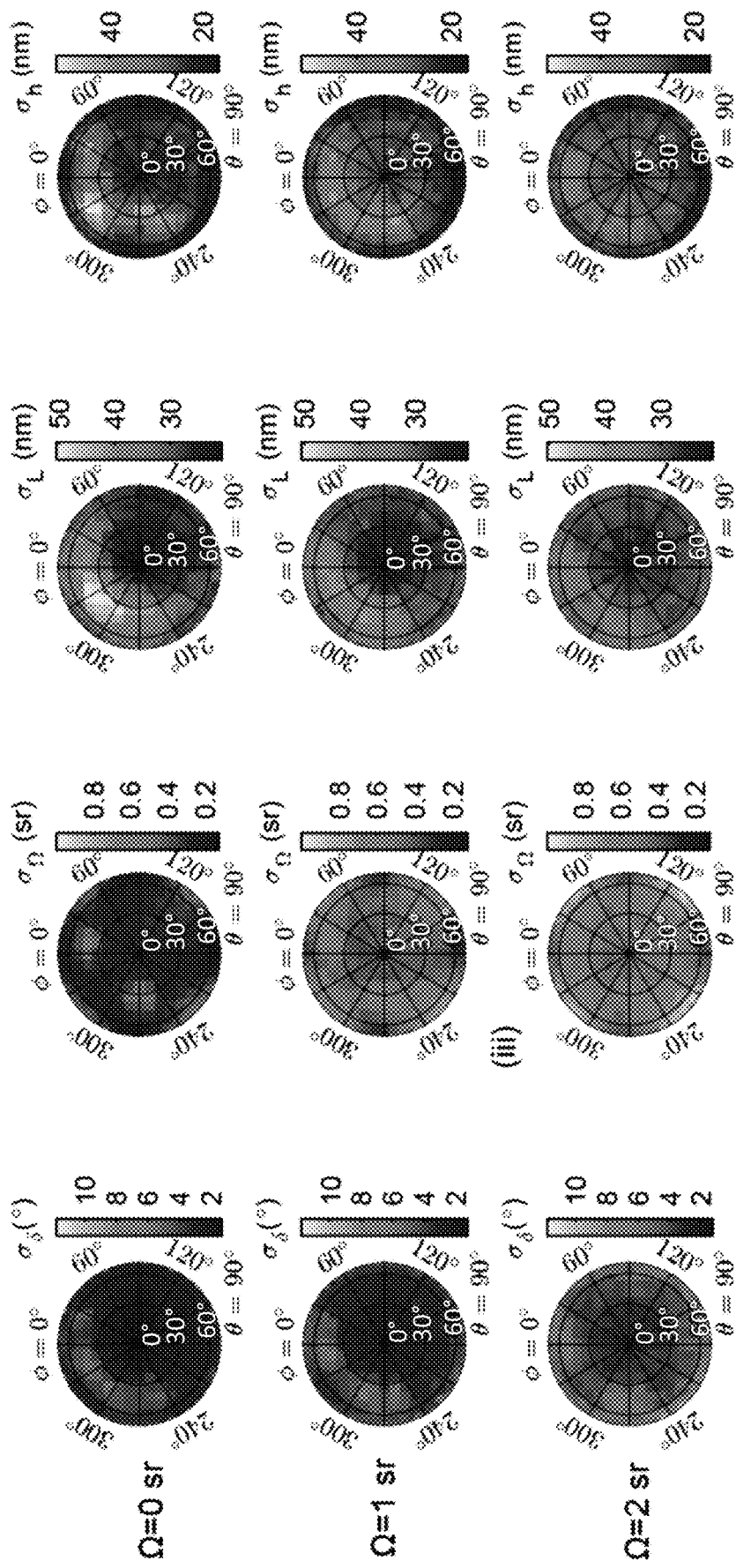

FIG. 48A is a set of graphs of the precision and accuracy of estimating σ$_δ$ (deg) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

FIG. 48B is a set of graphs of the precision and accuracy of estimating σ$_Ω$ (sr) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

FIG. 48C is a set of graphs of the precision and accuracy of estimating σ$_L$ (nm) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

FIG. 48D is a set of graphs of the precision and accuracy of estimating δ$_h$ (nm) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

Figure 48H:
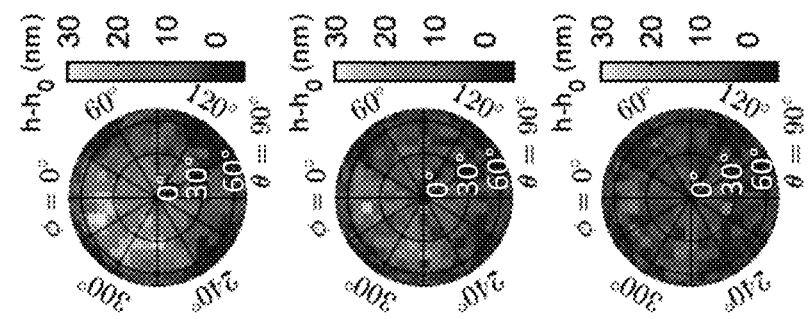
Figure 48G:
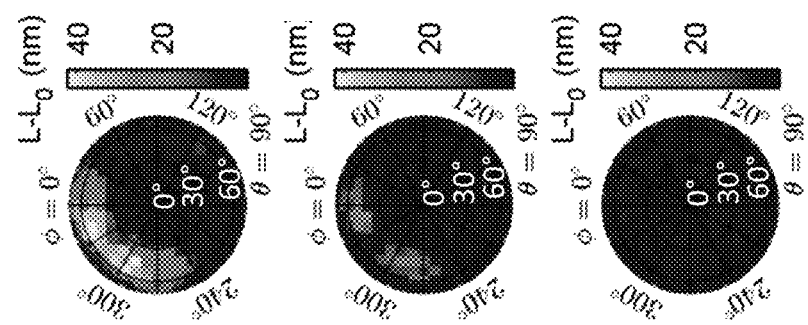
Figure 48F:
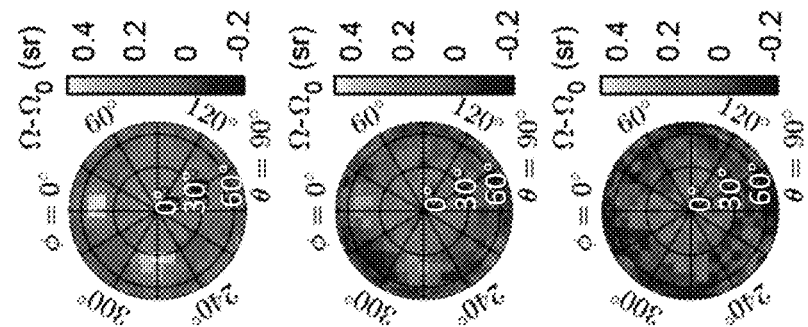
Figure 48E:
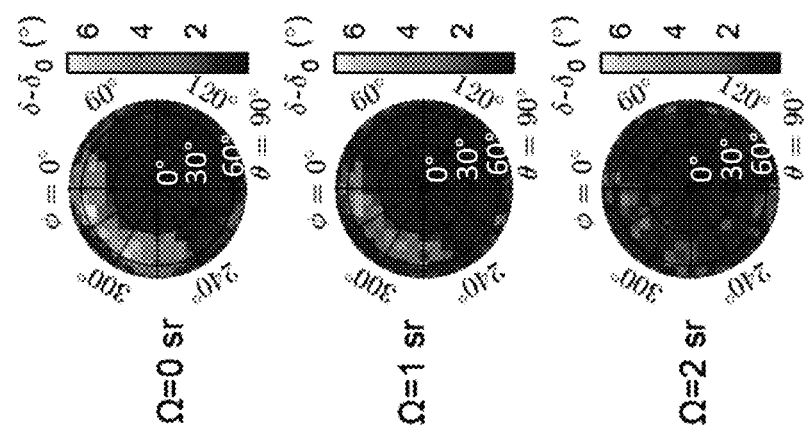

FIG. 48E is a set of graphs of the precision and accuracy of estimating δ-δ$_0$ (deg) for emitters at h=700 nm with a nominal focal plane placed at z=-580 nm with low background at various orientations (Ω∈{0, 1, 2} sr, θ∈[0°, 90°], θ∈[0°, 360°)). At each orientation, 200 independent images were generated for emitter within water located at h=0 nm with 2500 signal photons in total and 3 background photons per pixel detected.

FIG. 48F is a set of graphs of the precision and accuracy of estimating Ω-Ω$_0$ (sr) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

FIG. 48G is a set of graphs of the precision and accuracy of estimating L-L$_0$ (nm) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

FIG. 48H is a set of graphs of the precision and accuracy of estimating h-h$_0$ (nm) for emitters at h=700 nm with a nominal focal plane placed at z=-580 nm after filtering biased estimates at various orientations (Ω∈{0, 1, 2} sr, θ∈[0°, 90°], φ∈[0°, 360°)). Estimates >90 nm away from the ground truth 2D position (x0, y0) are removed. At each orientation, 200 independent images were generated for emitter within water located at h=700 nm with 2500 signal photons in total and 3 background photons per pixel detected.

Figures 48J, 48K, 48L:
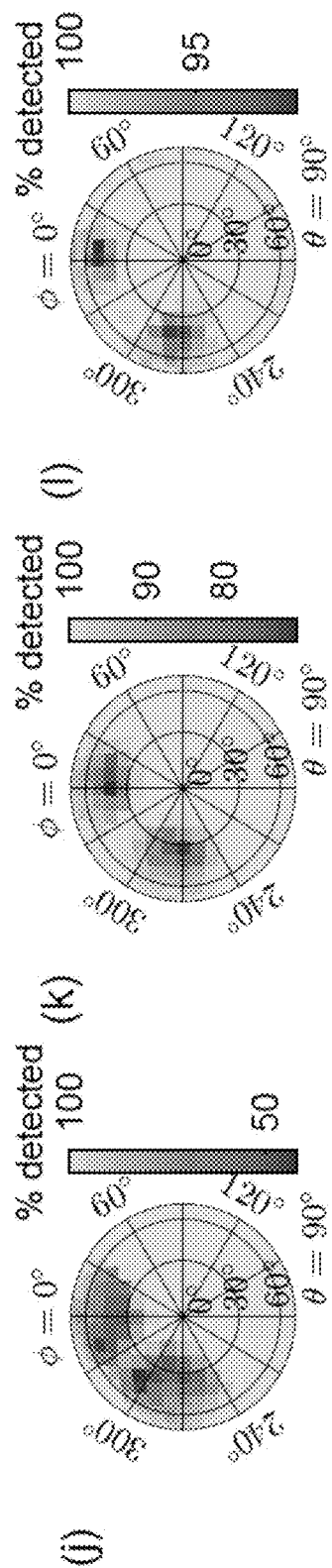

FIG. 48J is a graph representing the percentage of trials that successfully detect one emitter for Ω=0 sr. 200 independent images were generated for emitter within water located at h=700 nm with 2500 signal photons in total and 3 background photons per pixel detected. After filtering biased estimates at various orientations ($\Omega \in \{0, 1, 2\}$ sr, $\theta \in [0°, 90°]$, $\phi \in [0°, 360°]$), estimates >90 nm away from the ground truth 2D position (x0, y0) are removed.

FIG. 48K is a graph representing the percentage of trials that successfully detect one emitter for $\Omega=1$ sr. 200 independent images were generated for emitter within water located at h=700 nm with 2500 signal photons in total and 3 background photons per pixel detected. After filtering biased estimates at various orientations ($\Omega \in \{0, 1, 2\}$ sr, $\theta \in [0°, 90°]$, $\phi \in [0°, 360°]$), estimates >90 nm away from the ground truth 2D position (x0, y0) are removed.

FIG. 48L is a graph representing the percentage of trials that successfully detect one emitter for $\Omega=2$ sr. 200 independent images were generated for emitter within water located at h=700 nm with 2500 signal photons in total and 3 background photons per pixel detected. After filtering biased estimates at various orientations ($\Omega \in \{0, 1, 2\}$ sr, $\theta \in [0°, 90°]$, $\phi \in [0°, 360°]$), estimates >90 nm away from the ground truth 2D position (x0, y0) are removed.

Figures 49A, 49B, 49C, 49D:
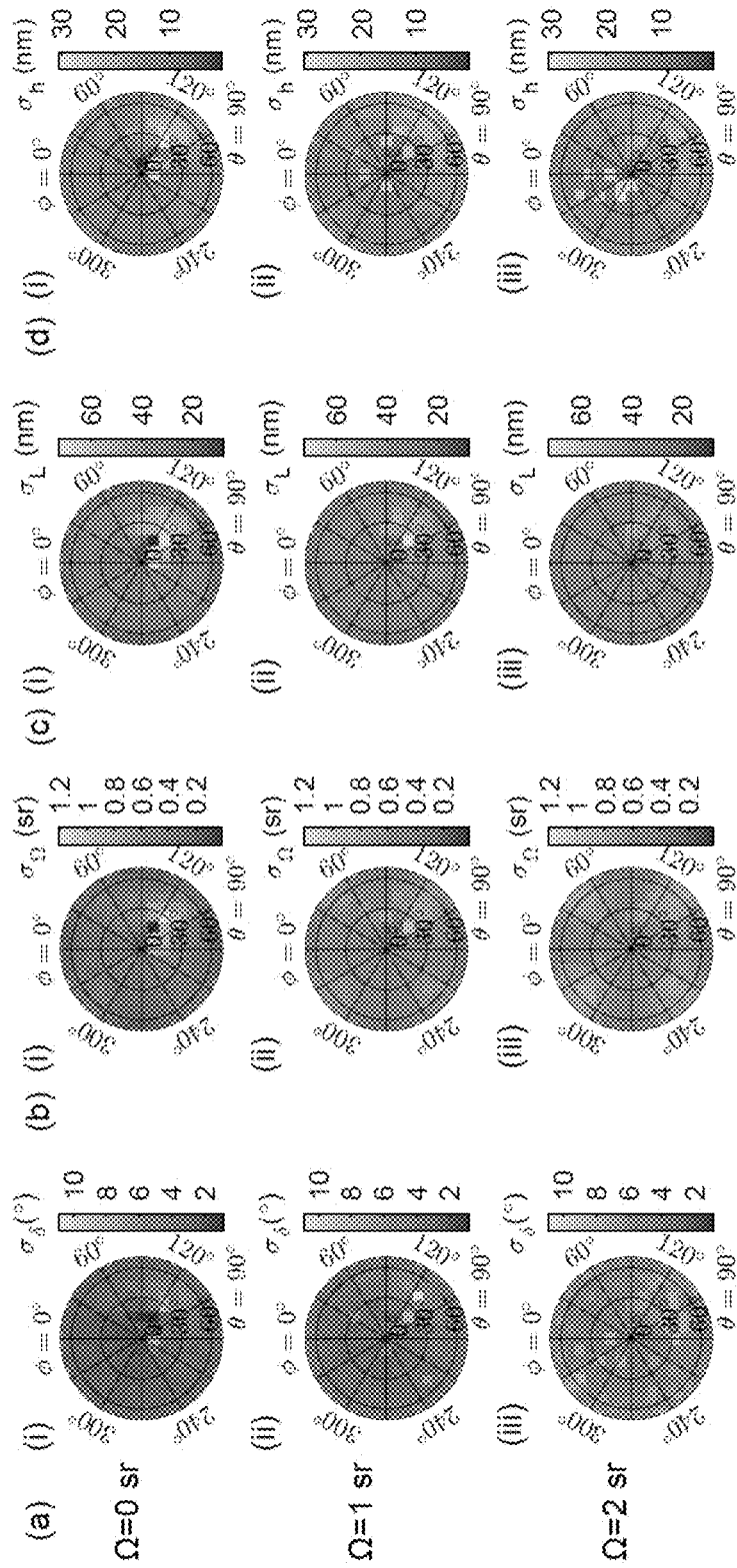

FIG. 49A is a set of graphs of the precision and accuracy of estimating $\sigma_\delta$ (deg) for emitters at h=0 nm with a nominal focal plane placed at z=−580 nm with high background at various orientations ($\Omega \in \{0, 1, 2\}$ sr, $\theta \in [0°, 90°]$, $\phi \in [0°, 360°]$). At each orientation, 200 independent images were generated for emitter within water located at h=0 nm with 2500 signal photons in total and 10 background photons per pixel detected.

FIG. 49B is a set of graphs of the precision and accuracy of estimating $\sigma_\Omega$ (sr) for emitters at h=0 nm with a nominal focal plane placed at z=−580 nm with high background at various orientations ($\Omega \in \{0, 1, 2\}$ sr, $\theta \in [0°, 90°]$, $\phi \in [0°, 360°]$). At each orientation, 200 independent images were generated for emitter within water located at h=0 nm with 2500 signal photons in total and 10 background photons per pixel detected.

FIG. 49C is a set of graphs of the precision and accuracy of estimating $\sigma_L$ (nm) for emitters at h=0 nm with a nominal focal plane placed at z=−580 nm with high background at various orientations ($\Omega \in \{0, 1, 2\}$ sr, $\theta \in [0°, 90°]$, $\phi \in [0°, 360°]$). At each orientation, 200 independent images were generated for emitter within water located at h=0 nm with 2500 signal photons in total and 10 background photons per pixel detected.

FIG. 49D is a set of graphs of the precision and accuracy of estimating $\delta_h$ (nm) for emitters at h=0 nm with a nominal focal plane placed at z=−580 nm with high background at various orientations ($\Omega \in \{0, 1, 2\}$ sr, $\theta \in [0°, 90°]$, $\theta \in [0°, 360°]$). At each orientation, 200 independent images were generated for emitter within water located at h=0 nm with 2500 signal photons in total and 10 background photons per pixel detected.

Figure 49H:
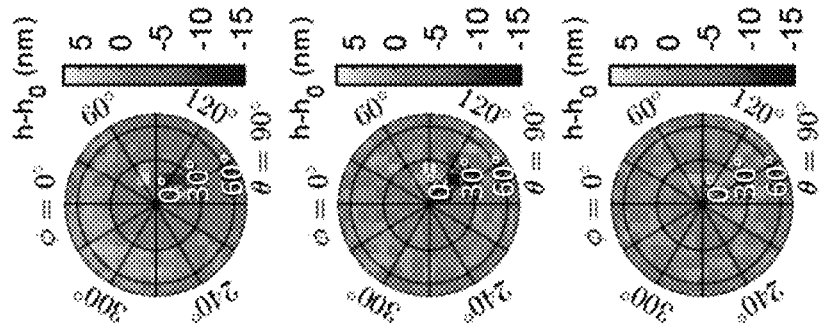
Figure 49G:
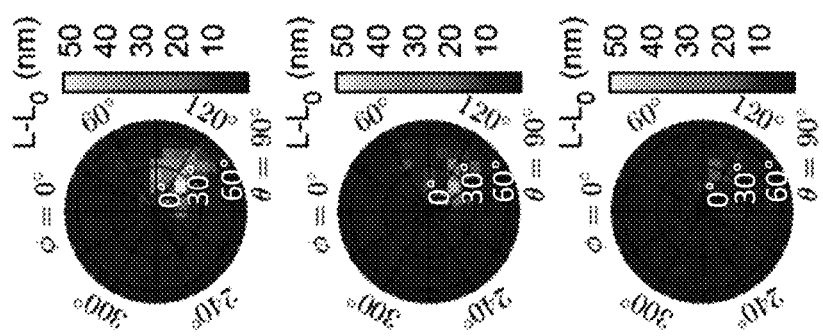
Figure 49F:
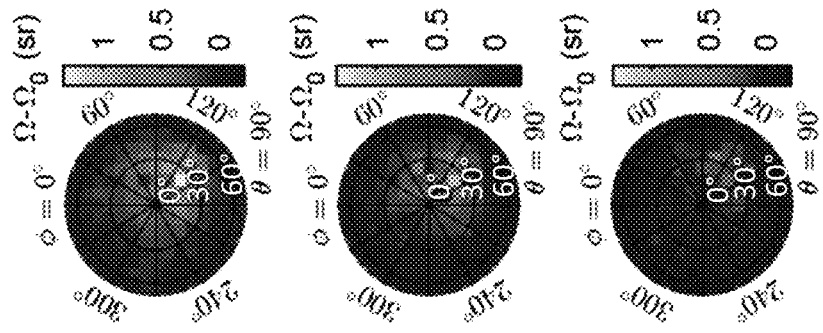
Figure 49E:
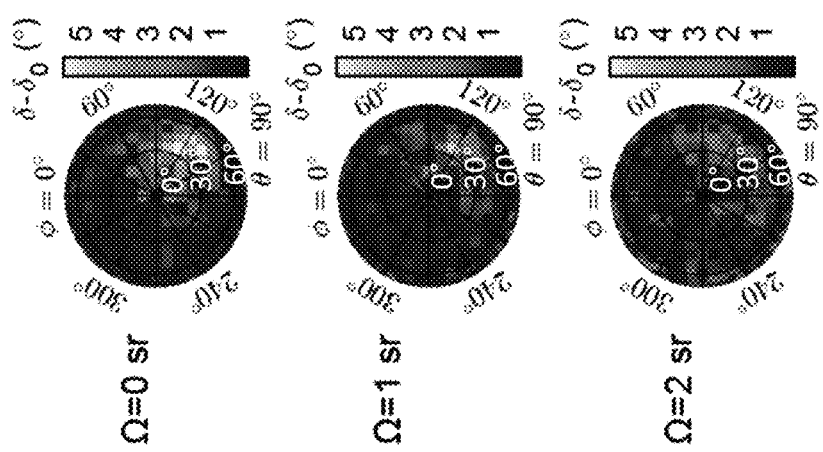

FIG. 49E is a set of graphs of the precision and accuracy of estimating $\delta-\delta_0$ (deg) for emitters at h=0 nm with a nominal focal plane placed at z=−580 nm with high background at various orientations ($\Omega \in \{0, 1, 2\}$ sr, $\theta \in [0°, 90°]$, $\theta \in [0°, 360°]$). At each orientation, 200 independent images were generated for emitter within water located at h=0 nm with 2500 signal photons in total and 3 background photons per pixel detected.

FIG. 49F is a set of graphs of the precision and accuracy of estimating $\Omega-\Omega_0$ (sr) for emitters at h=0 nm with a nominal focal plane placed at z=−580 nm with high background at various orientations ($\Omega \in \{0, 1, 2\}$ sr, $\theta \in [0°, 90°]$, $\theta \in [0°, 360°]$). At each orientation, 200 independent images were generated for emitter within water located at h=0 nm with 2500 signal photons in total and 10 background photons per pixel detected.

FIG. 49G is a set of graphs of the precision and accuracy of estimating $L-L_0$ (nm) for emitters at h=0 nm with a nominal focal plane placed at z=−580 nm with high background at various orientations ($\Omega \in \{0, 1, 2\}$ sr, $\theta \in [0°, 90°]$, $\theta \in [0°, 360°]$). At each orientation, 200 independent images were generated for emitter within water located at h=0 nm with 2500 signal photons in total and 10 background photons per pixel detected.

FIG. 49H is a set of graphs of the precision and accuracy of estimating $h-h_0$ (nm) for emitters at h=0 nm with a nominal focal plane placed at z=−580 nm with high background at various orientations ($\Omega \in \{0, 1, 2\}$ sr, $\theta \in [0°, 90°]$, $\theta \in [0°, 360°]$). At each orientation, 200 independent images were generated for emitter within water located at h=0 nm with 2500 signal photons in total and 3 background photons per pixel detected.

Figure 49L:
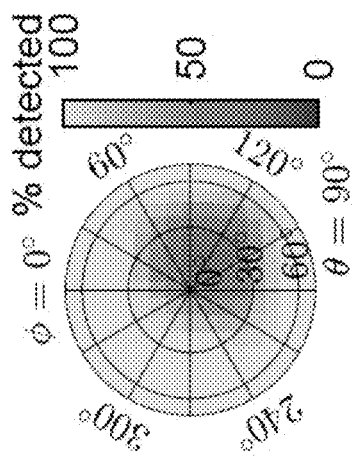
Figure 49K:
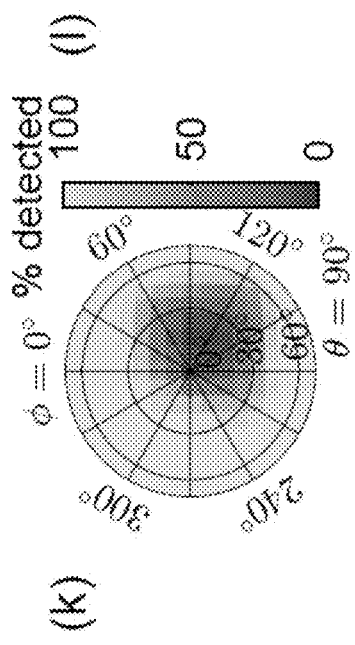
Figure 49J:
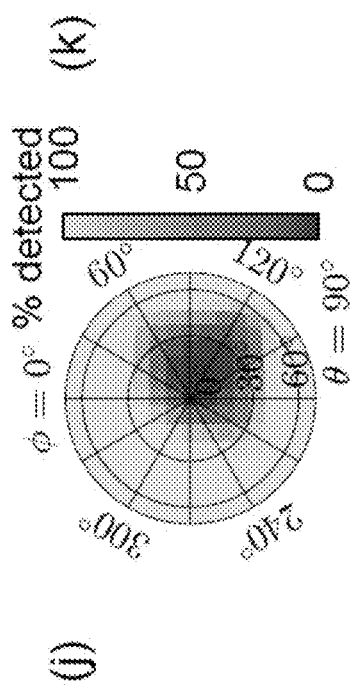

FIG. 49J is a graph representing the percentage of trials that successfully detect one emitter for $\Omega=0$ sr. 200 independent images were generated for emitter within water located at h=0 nm with 2500 signal photons in total and 10 background photons per pixel detected.

FIG. 49K is a graph representing the percentage of trials that successfully detect one emitter for $\Omega=1$ sr. 200 independent images were generated for emitter within water located at h=0 nm with 2500 signal photons in total and 10 background photons per pixel detected.

FIG. 49L is a graph representing the percentage of trials that successfully detect one emitter for $\Omega=2$ sr. 200 independent images were generated for emitter within water located at h=0 nm with 2500 signal photons in total and 10 background photons per pixel detected.

Figure 50D:
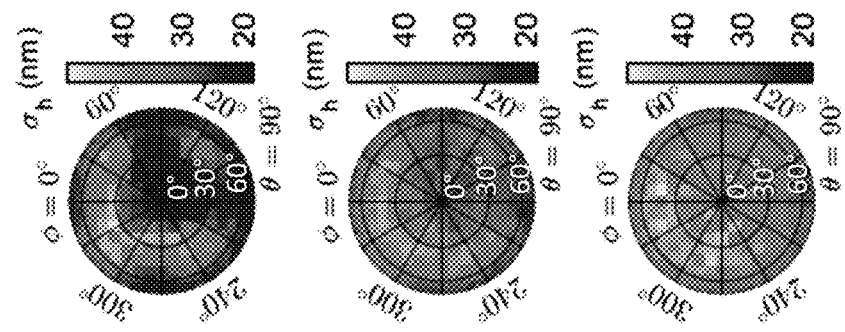
Figure 50C:
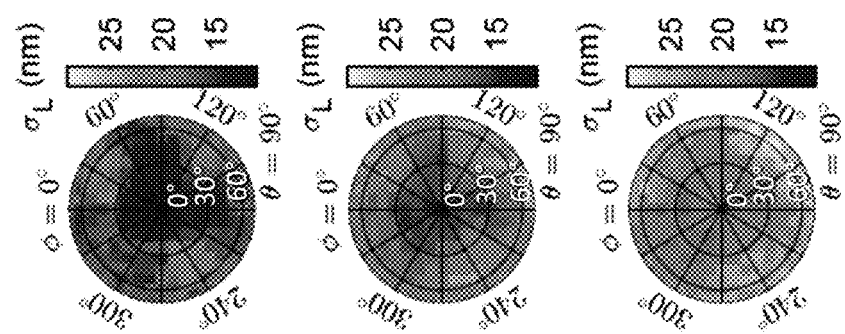
Figure 50B:
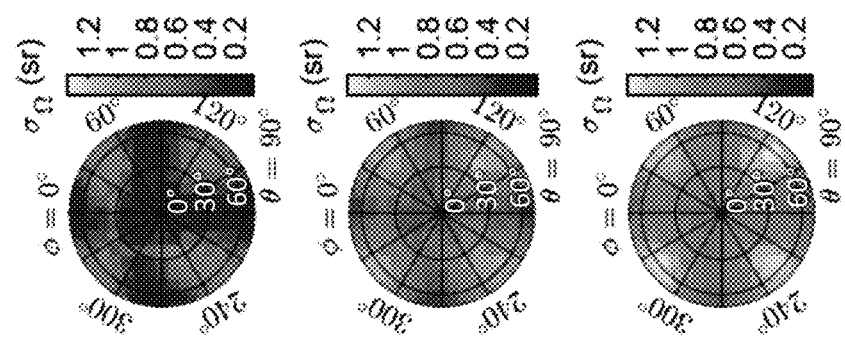
Figure 50A:
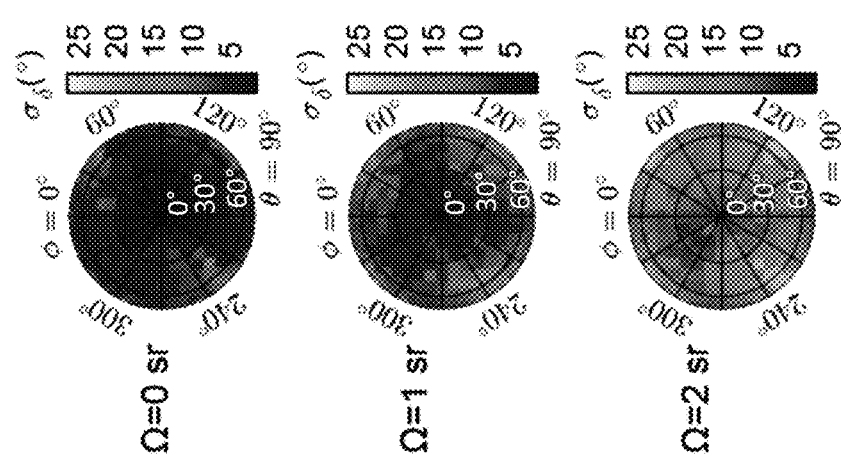

FIG. 50A is a set of graphs of the precision and accuracy of estimating $\sigma_\delta$ (deg) for emitters at h=400 nm with a nominal focal plane placed at z=−580 nm with high background at various orientations ($\Omega \in \{0, 1, 2\}$ sr, $\theta \in [0°, 90°]$, $\phi \in [0°, 360°]$). At each orientation, 200 independent images were generated for emitter within water located at h=400 nm with 2500 signal photons in total and 10 background photons per pixel detected.

FIG. 50B is a set of graphs of the precision and accuracy of estimating $\sigma_\Omega$ (sr) for emitters at h=400 nm with a nominal focal plane placed at z=−580 nm with high background at various orientations ($\Omega \in \{0, 1, 2\}$ sr, $\theta \in [0°, 90°]$, $\phi \in [0°, 360°]$). At each orientation, 200 independent images were generated for emitter within water located at h=400 nm with 2500 signal photons in total and 10 background photons per pixel detected.

FIG. 50C is a set of graphs of the precision and accuracy of estimating $\sigma_L$ (nm) for emitters at h=400 nm with a nominal focal plane placed at z=−580 nm with high background at various orientations ($\Omega \in \{0, 1, 2\}$ sr, $\theta \in [0°, 90°]$, $\phi \in [0°, 360°]$). At each orientation, 200 independent images were generated for emitter within water located at h=400 nm with 2500 signal photons in total and 10 background photons per pixel detected.

FIG. 50D is a set of graphs of the precision and accuracy of estimating $\delta_h$ (nm) for emitters at h=400 nm with a nominal focal plane placed at z=−580 nm with high background at various orientations ($\Omega \in \{0, 1, 2\}$ sr, $\theta \in [0°, 90°]$, $\theta \in [0°, 360°]$). At each orientation, 200 independent images were generated for emitter within water located at h=400 nm with 2500 signal photons in total and 10 background photons per pixel detected.

Figure 50H:
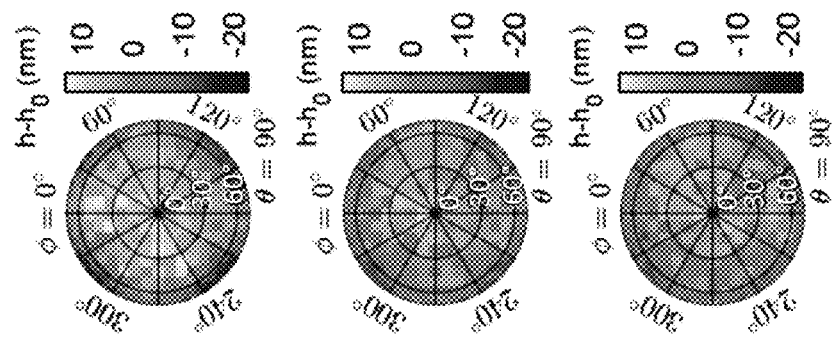
Figure 50G:
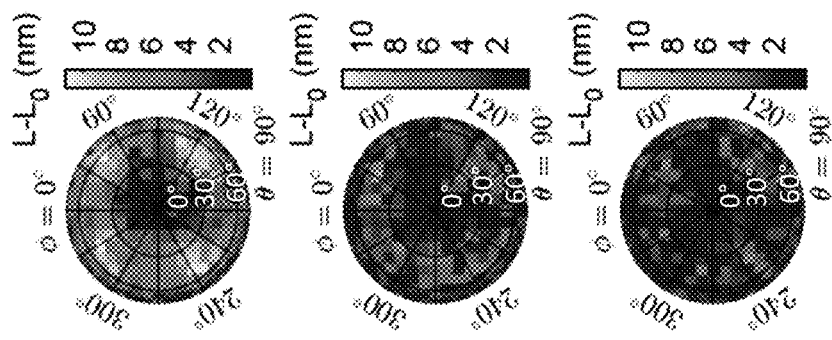
Figure 50F:
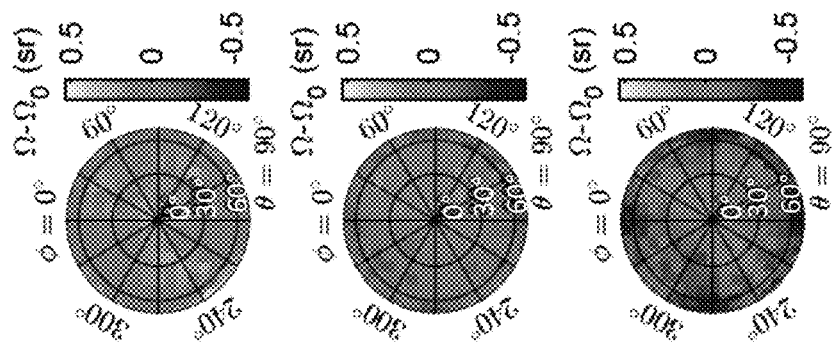
Figure 50E:
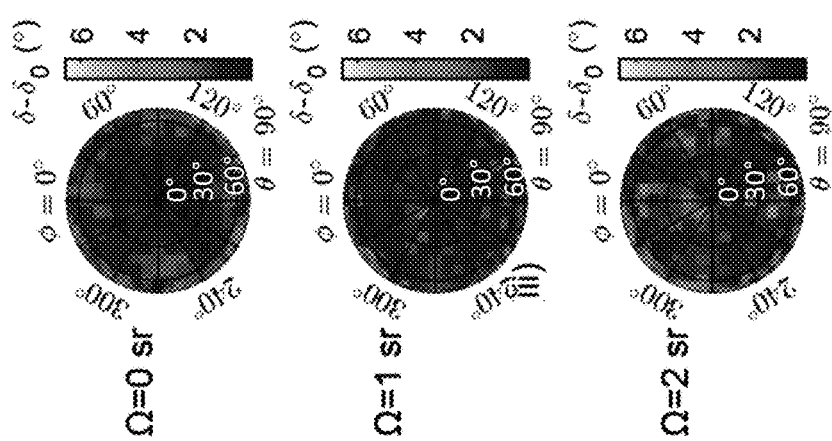

FIG. 50E is a set of graphs of the precision and accuracy of estimating $\delta-\delta_0$ (deg) for emitters at h=400 nm with a nominal focal plane placed at z=−580 nm with high background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.

FIG. 50F is a set of graphs of the precision and accuracy of estimating $\Omega - \Omega_0$ (sr) for emitters at h=400 nm with a nominal focal plane placed at z=−580 nm with high background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 10 background photons per pixel detected.

FIG. 50G is a set of graphs of the precision and accuracy of estimating $L-L_0$ (nm) for emitters at h=400 nm with a nominal focal plane placed at z=−580 nm with high background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 10 background photons per pixel detected.

FIG. 50H is a set of graphs of the precision and accuracy of estimating $h-h_0$ (nm) for emitters at h=400 nm with a nominal focal plane placed at z=−580 nm with high background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.

Figure 50L:
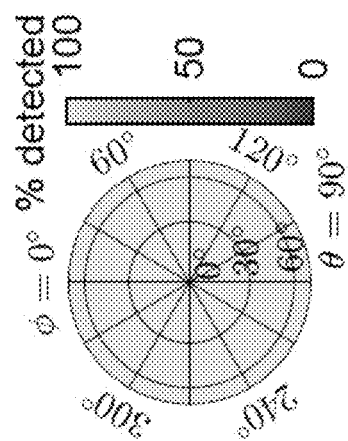
Figure 50K:
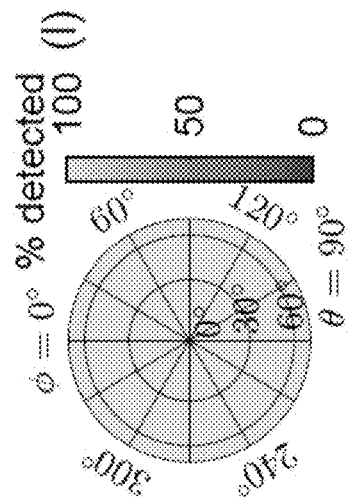
Figure 50J:
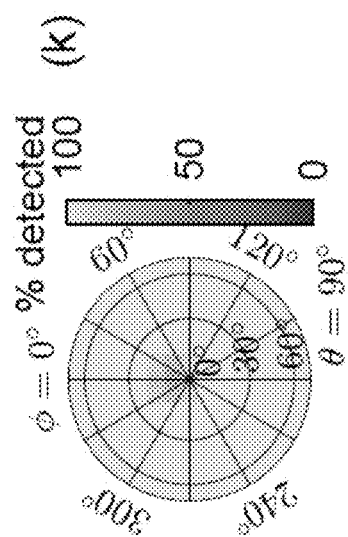

FIG. 50J is a graph representing the percentage of trials that successfully detect one emitter for $\Omega=0$ sr. 200 independent images were generated for emitter within water located at h=400 nm with 2500 signal photons in total and 10 background photons per pixel detected.

FIG. 50K is a graph representing the percentage of trials that successfully detect one emitter for $\Omega=1$ sr. 200 independent images were generated for emitter within water located at h=400 nm with 2500 signal photons in total and 10 background photons per pixel detected.

FIG. 50L is a graph representing the percentage of trials that successfully detect one emitter for $\Omega=2$ sr. 200 independent images were generated for emitter within water located at h=400 nm with 2500 signal photons in total and 10 background photons per pixel detected.

Figures 51A, 51B, 51C, 51D:
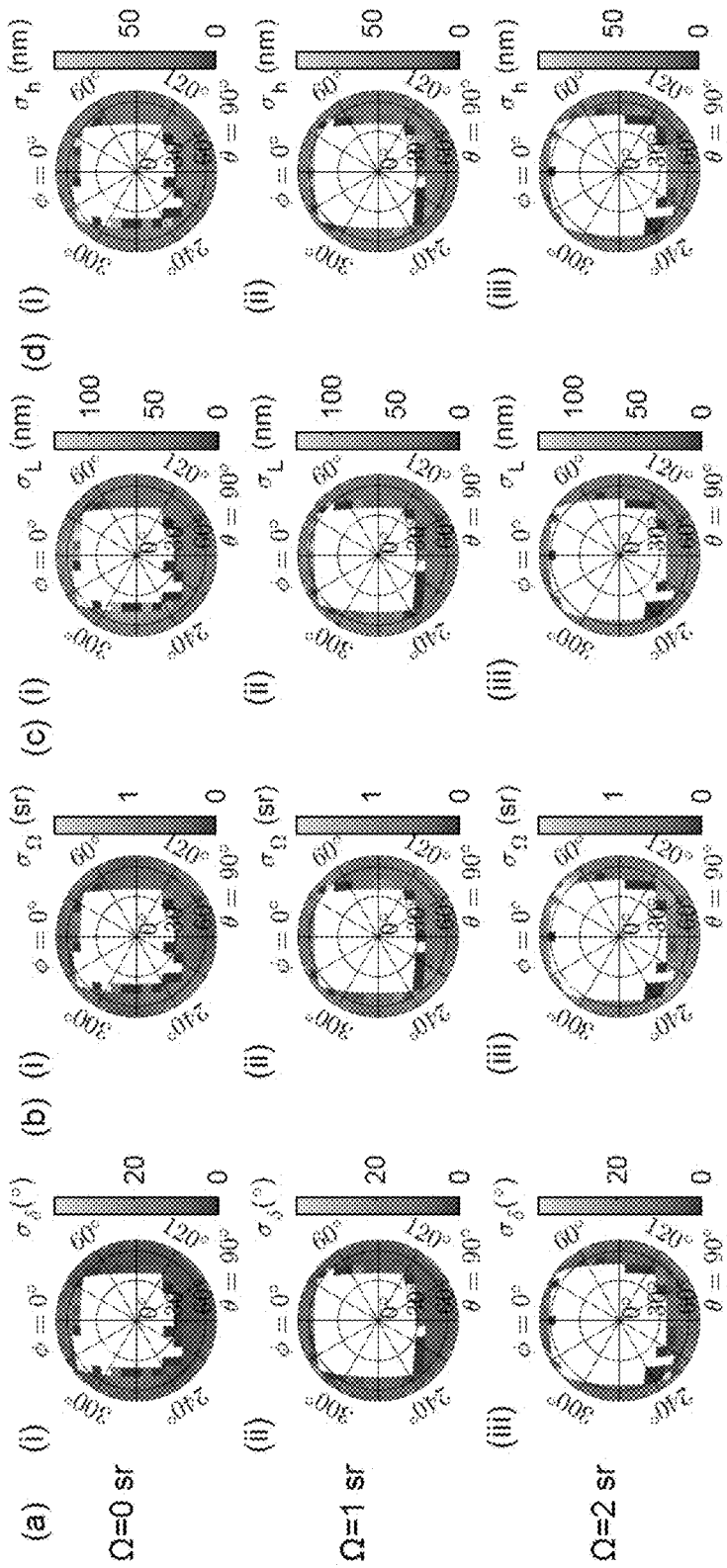

FIG. 51A is a set of graphs of the precision and accuracy of estimating $\sigma_\delta$ (deg) for emitters at h=700 nm with a nominal focal plane placed at z=−580 nm with high background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 10 background photons per pixel detected.

FIG. 51B is a set of graphs of the precision and accuracy of estimating $\sigma_\Omega$ (sr) for emitters at h=700 nm with a nominal focal plane placed at z=−580 nm with high background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 10 background photons per pixel detected.

FIG. 51C is a set of graphs of the precision and accuracy of estimating $\sigma_L$ (nm) for emitters at h=700 nm with a nominal focal plane placed at z=−580 nm with high background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 10 background photons per pixel detected.

FIG. 51D is a set of graphs of the precision and accuracy of estimating $\delta_h$ (nm) for emitters at h=700 nm with a nominal focal plane placed at z=−580 nm with high background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 10 background photons per pixel detected.

Figures 51E, 51F, 51G, 51H:
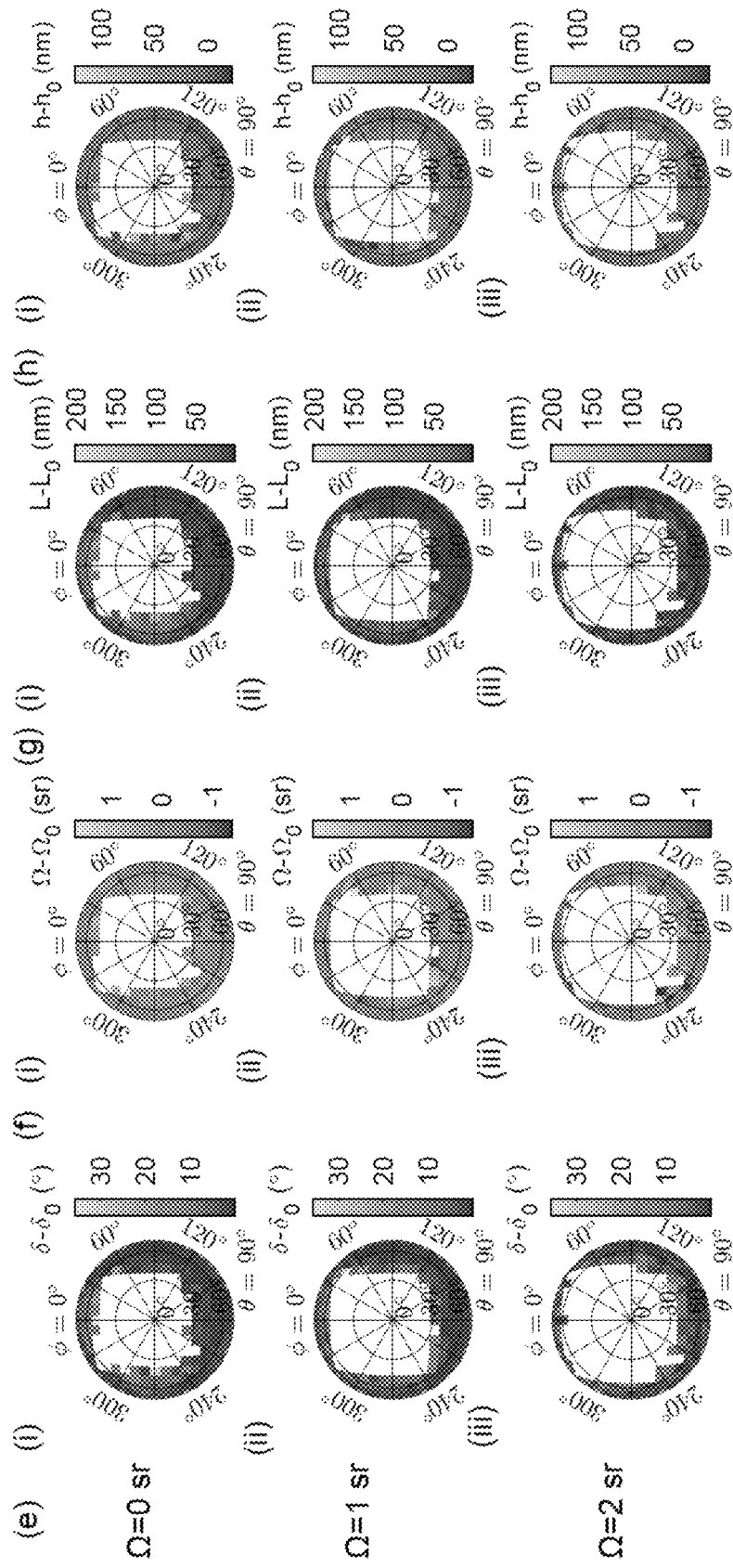

FIG. 51E is a set of graphs of the precision and accuracy of estimating $\delta - \delta_0$ (deg) for emitters at h=700 nm with a nominal focal plane placed at z=−580 nm with high background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 3 background photons per pixel detected.

FIG. 51F is a set of graphs of the precision and accuracy of estimating $\Omega - \Omega_0$ (sr) for emitters at h=700 nm with a nominal focal plane placed at z=−580 nm with high background at various orientations ($\Omega \in \{0, 1, 2\}$ sr, $\theta \in [0°, 90°]$, $\phi \in [0°, 360°)$). At each orientation, 200 independent images were generated for emitter within water located at h=700 nm with 2500 signal photons in total and 10 background photons per pixel detected.

FIG. 51G is a set of graphs of the precision and accuracy of estimating $L-L_0$ (nm) for emitters at h=700 nm with a nominal focal plane placed at z=−580 nm with high background at various orientations ($\Omega \in \{0, 1, 2\}$ sr, $\theta \in [0°, 90°]$, $\theta \in [0°, 360°)$). At each orientation, 200 independent images were generated for emitter within water located at h=700 nm with 2500 signal photons in total and 10 background photons per pixel detected.

FIG. 51H is a set of graphs of the precision and accuracy of estimating $h-h_0$ (nm) for emitters at h=700 nm with a nominal focal plane placed at z=−580 nm with high background at various orientations ($\Omega \in \{0, 1, 2\}$ sr, $\theta \in [0°, 90°]$, $\theta \in [0°, 360°)$). At each orientation, 200 independent images were generated for emitter within water located at h=700 nm with 2500 signal photons in total and 3 background photons per pixel detected.

Figure 51L:
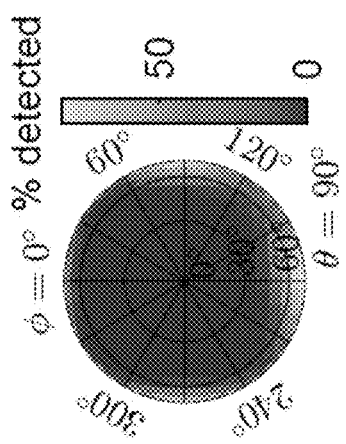
Figure 51K:
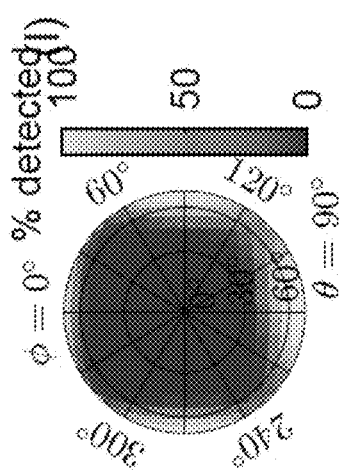
Figure 51J:
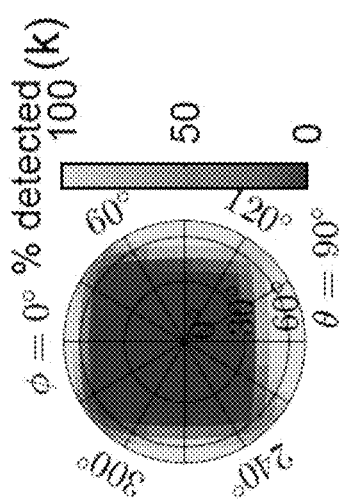

FIG. 51J is a graph representing the percentage of trials that successfully detect one emitter for $\Omega=0$ sr. 200 independent images were generated for emitter within water located at h=700 nm with 2500 signal photons in total and 10 background photons per pixel detected.

FIG. 51K is a graph representing the percentage of trials that successfully detect one emitter for $\Omega=1$ sr. 200 independent images were generated for emitter within water located at h=700 nm with 2500 signal photons in total and 10 background photons per pixel detected.

FIG. 51L is a graph representing the percentage of trials that successfully detect one emitter for $\Omega=2$ sr. 200 independent images were generated for emitter within water located at h=700 nm with 2500 signal photons in total and 10 background photons per pixel detected.

Figures 52A, 52B, 52C, 52D:
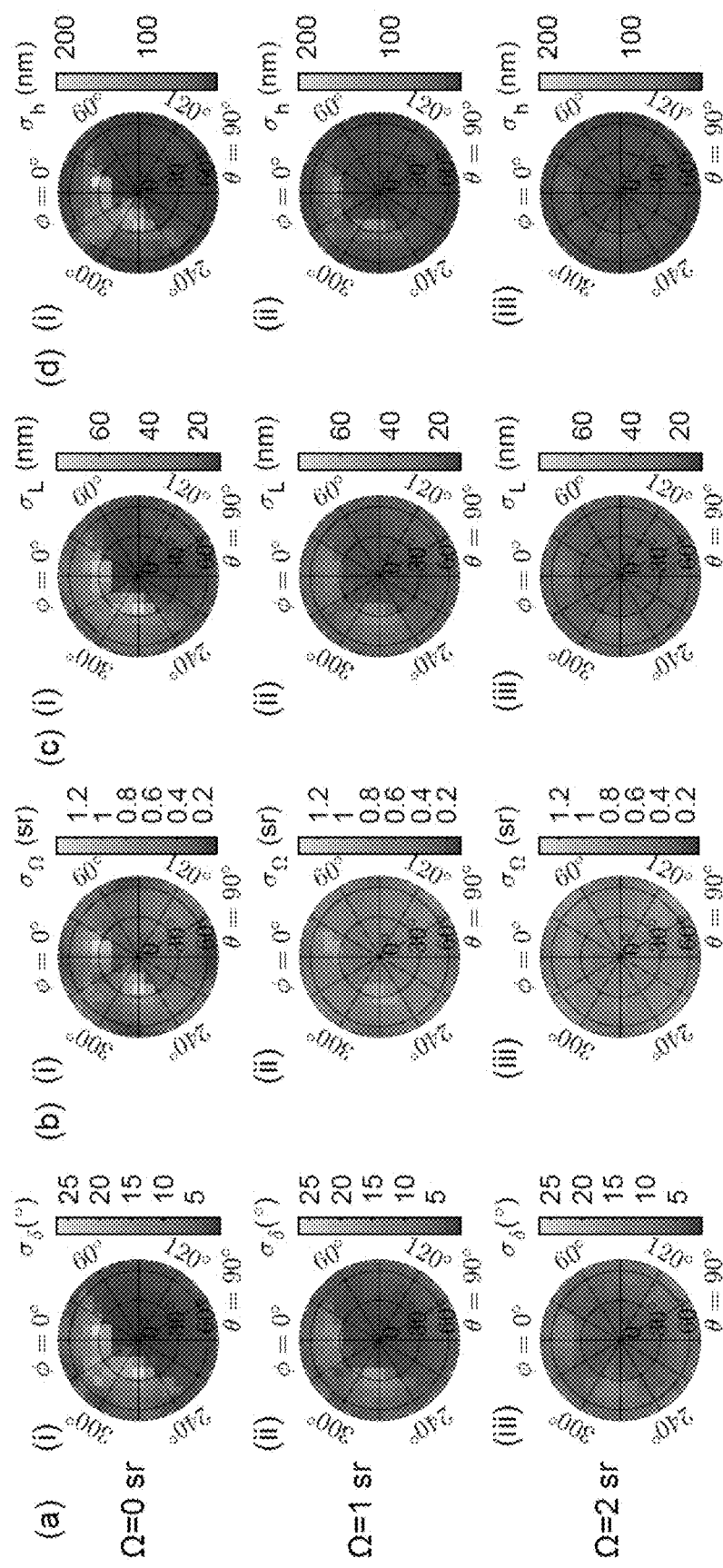

FIG. 52A is a set of graphs of the precision and accuracy of estimating $\sigma_\delta$ (deg) for emitters at h=400 nm with a nominal focal plane placed at z=−580 nm with low background at various orientations ($\Omega \in \{0, 1, 2\}$ sr, $\theta \in [0°, 90°]$, $\phi \in [0°, 360°)$). An incorrect NFP position of z=−400 nm is used for estimation. At each orientation, 200 independent images were generated for emitter within water located at h=400 nm with 2500 signal photons in total and 3 background photons per pixel detected.

FIG. 52B is a set of graphs of the precision and accuracy of estimating $\sigma_\Omega$ (sr) for emitters at h=400 nm with a nominal focal plane placed at z=−580 nm with low background at various orientations ($\Omega \in \{0, 1, 2\}$ sr, $\theta \in [0°, 90°]$, $\phi \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

FIG. 52C is a set of graphs of the precision and accuracy of estimating $\delta_L$ (nm) for emitters at h=400 nm with a nominal focal plane placed at $z=-580$ nm with low background at various orientations ($\Omega \in \{0, 1, 2\}$ sr, $\theta \in [0°, 90°]$, $\phi \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

FIG. 52D is a set of graphs of the precision and accuracy of estimating $\delta_h$ (nm) for emitters at h=400 nm with a nominal focal plane placed at $z=-580$ nm with low background at various orientations ($\Omega \in \{0, 1, 2\}$ sr, $\theta \in [0°, 90°]$, $\phi \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

Figures 52E, 52F, 52G, 52H:
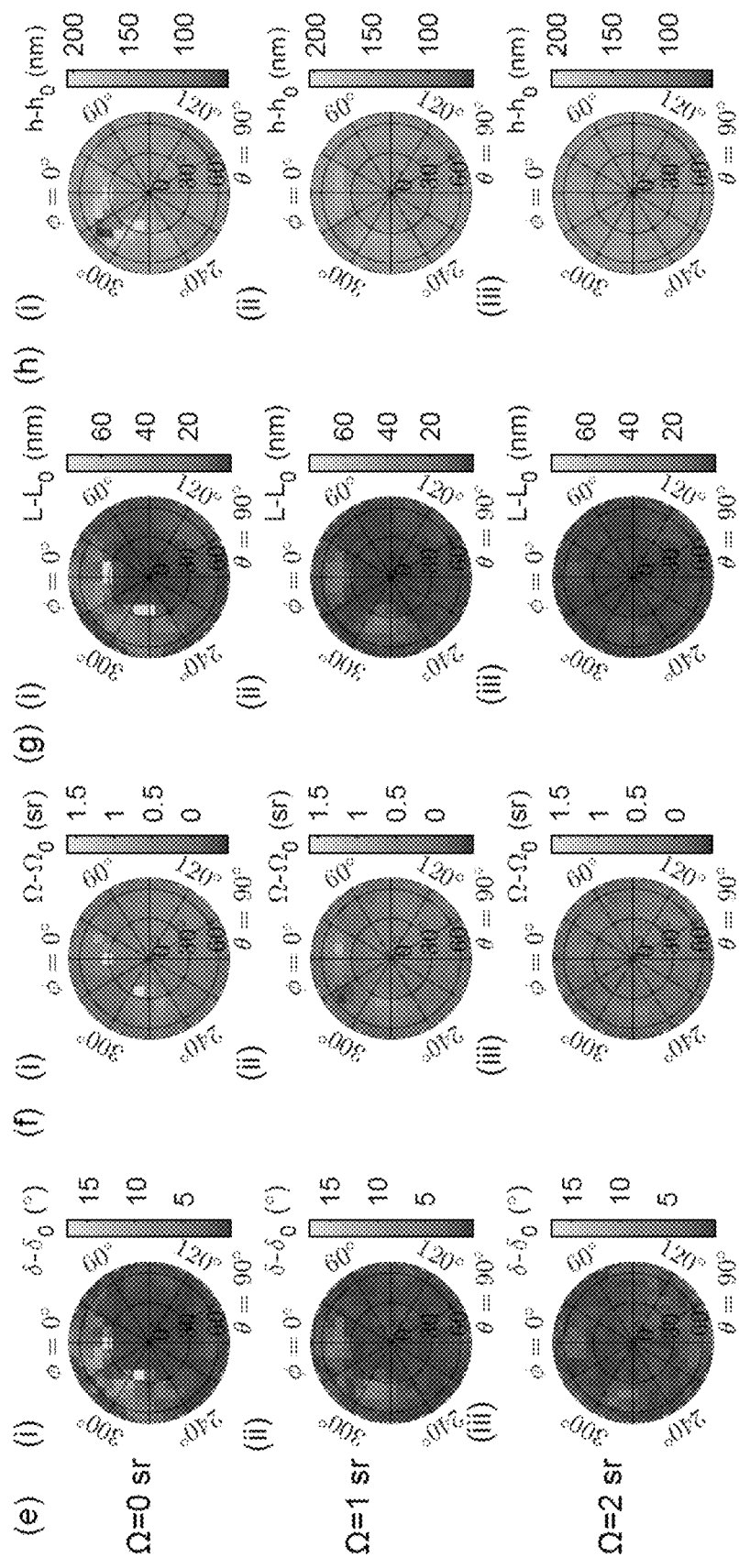

FIG. 52E is a set of graphs of the precision and accuracy of estimating $\delta - \delta_0$ (deg) for emitters at h=400 nm with a nominal focal plane placed at $z=-580$ nm with low background at various orientations ($\Omega \in \{0, 1, 2\}$ sr, $\theta \in [0°, 90°]$, $\theta \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

FIG. 52F is a set of graphs of the precision and accuracy of estimating $\Omega - \Omega_0$ (sr) for emitters at h=400 nm with a nominal focal plane placed at $z=-580$ nm with low background at various orientations ($\Omega \in \{0, 1, 2\}$ sr, $\theta \in [0°, 90°]$, $\theta \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

FIG. 52G is a set of graphs of the precision and accuracy of estimating $L - L_0$ (nm) for emitters at h=400 nm with a nominal focal plane placed at $z=-580$ nm with low background at various orientations ($\Omega \in \{0, 1, 2\}$ sr, $\theta \in [0°, 90°]$, $\theta \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

FIG. 52H is a set of graphs of the precision and accuracy of estimating $h - h_0$ (nm) for emitters at h=400 nm with a nominal focal plane placed at $z=-580$ nm with low background at various orientations ($\Omega \in \{0, 1, 2\}$ sr, $\theta \in [0°, 90°]$, $\theta \in [0°, 360°)$). An incorrect NFP position of $z=-400$ nm is used for estimation. At each orientation, 200 independent images were generated for emitter within water located at h=400 nm with 2500 signal photons in total and 3 background photons per pixel detected.

Figure 52L:
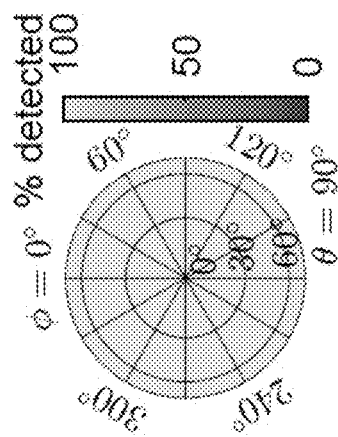
Figure 52K:
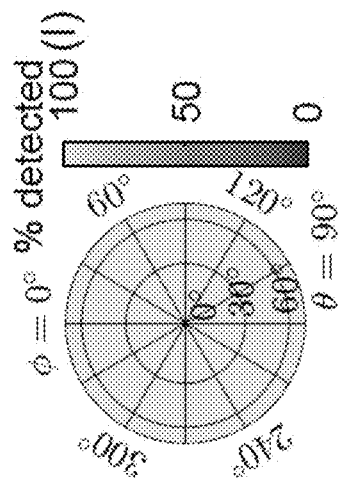
Figure 52J:
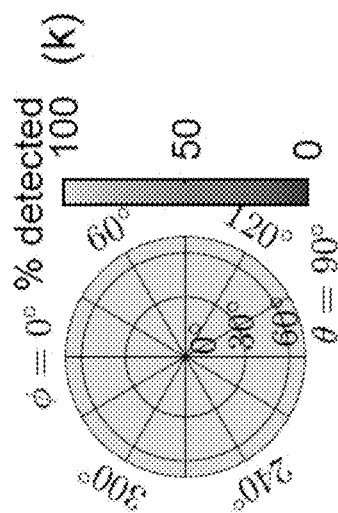

FIG. 52J is a graph representing the percentage of trials that successfully detect one emitter for $\Omega=0$ sr. 200 independent images were generated for emitter within water located at h=400 nm with 2500 signal photons in total and 3 background photons per pixel detected. An incorrect NFP position of $z=-400$ nm is used for estimation.

FIG. 52K is a graph representing the percentage of trials that successfully detect one emitter for $\Omega=1$ sr. 200 independent images were generated for emitter within water located at h=400 nm with 2500 signal photons in total and 3 background photons per pixel detected. An incorrect NFP position of $z=-400$ nm is used for estimation.

FIG. 52L is a graph representing the percentage of trials that successfully detect one emitter for $\Omega=2$ sr. 200 independent images were generated for emitter within water located at h=400 nm with 2500 signal photons in total and 3 background photons per pixel detected. An incorrect NFP position of $z=-400$ nm is used for estimation.

Figures 53A, 53B:
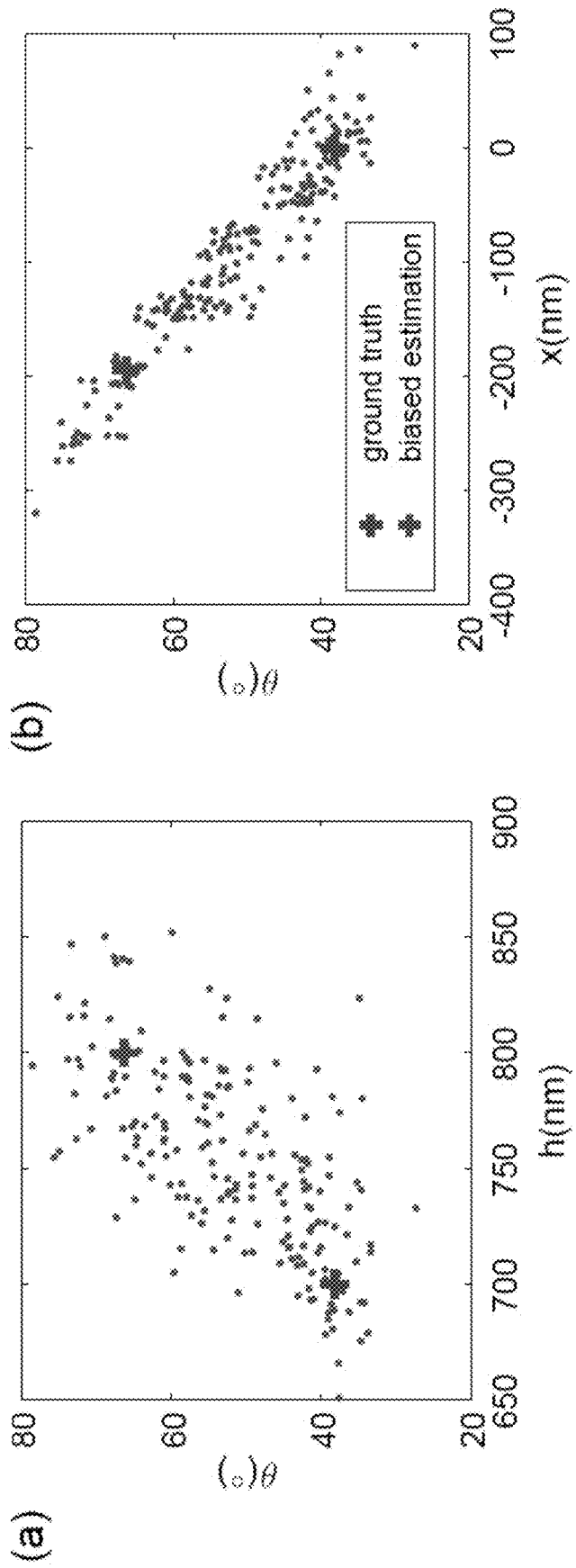

FIG. 53A is a graph of the axial position estimation h vs. polar angle estimation $\theta$ for an emitter in water with a nominal focal plane placed at $z=-580$ nm. The emitter here is located at $(x_0, y_0, h_0) = (0, 0, 700)$ nm with 3D orientation $(\theta_0, \phi_0, \Omega_0) = (38°, 162°, 0)$. The algorithm described herein is used to fit 200 independently generated noisy images.

FIG. 53B is a graph of the horizontal position estimation x vs. polar angle estimation $\theta$ for an emitter in water with a nominal focal plane placed at $z=-580$ nm. The emitter here is located at $(x_0, y_0, h_0) = (0, 0, 700)$ nm with 3D orientation $(\theta_0, \phi_0, \Omega_0) = (38°, 162°, 0)$. The algorithm is used to fit 200 independently generated noisy images.

Figures 53C, 53D, 53E:
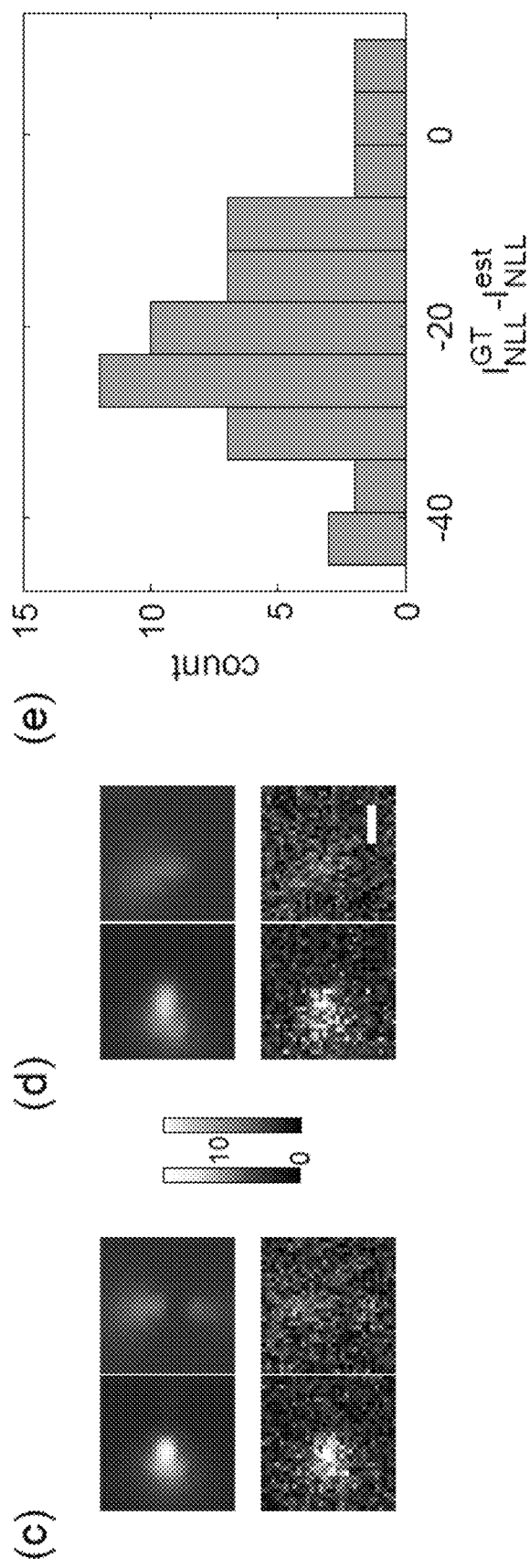

FIG. 53C is a set of (top) Noiseless DSF images and (bottom) images with Poisson shot noise for an emitter whose position and orientation match the ground truth. (Red) x-polarized, (blue) y-polarized. Colorbar: photons/pixel. Scalebar: 500 nm.

FIG. 53D is a set of (top) Noiseless DSF images and (bottom) images with Poisson shot noise for an emitter whose position and orientation match the biased estimate shown in FIG. 53A and FIG. 53B. (Red) x-polarized, (blue) y-polarized. Colorbar: photons/pixel. Scalebar: 500 nm.

FIG. 53E is a histogram comparing the value of the negative log likelihood $l^{GT}_{NLL}$ of the ground truth (Eqn. S15) to the value of the negative log likelihood $l^{est}_{NLL}$ of the biased position and orientation (>90 nm away from the ground truth 2D position $(x_0, y_0)$). Negative values indicate that the ground truth position and orientation are more consistent with the noisy image than the biased estimate, i.e., $l^{GT}_{NLL} < l^{est}_{NLL}$, but our estimation algorithm converged to the biased value instead.

Figure 30:
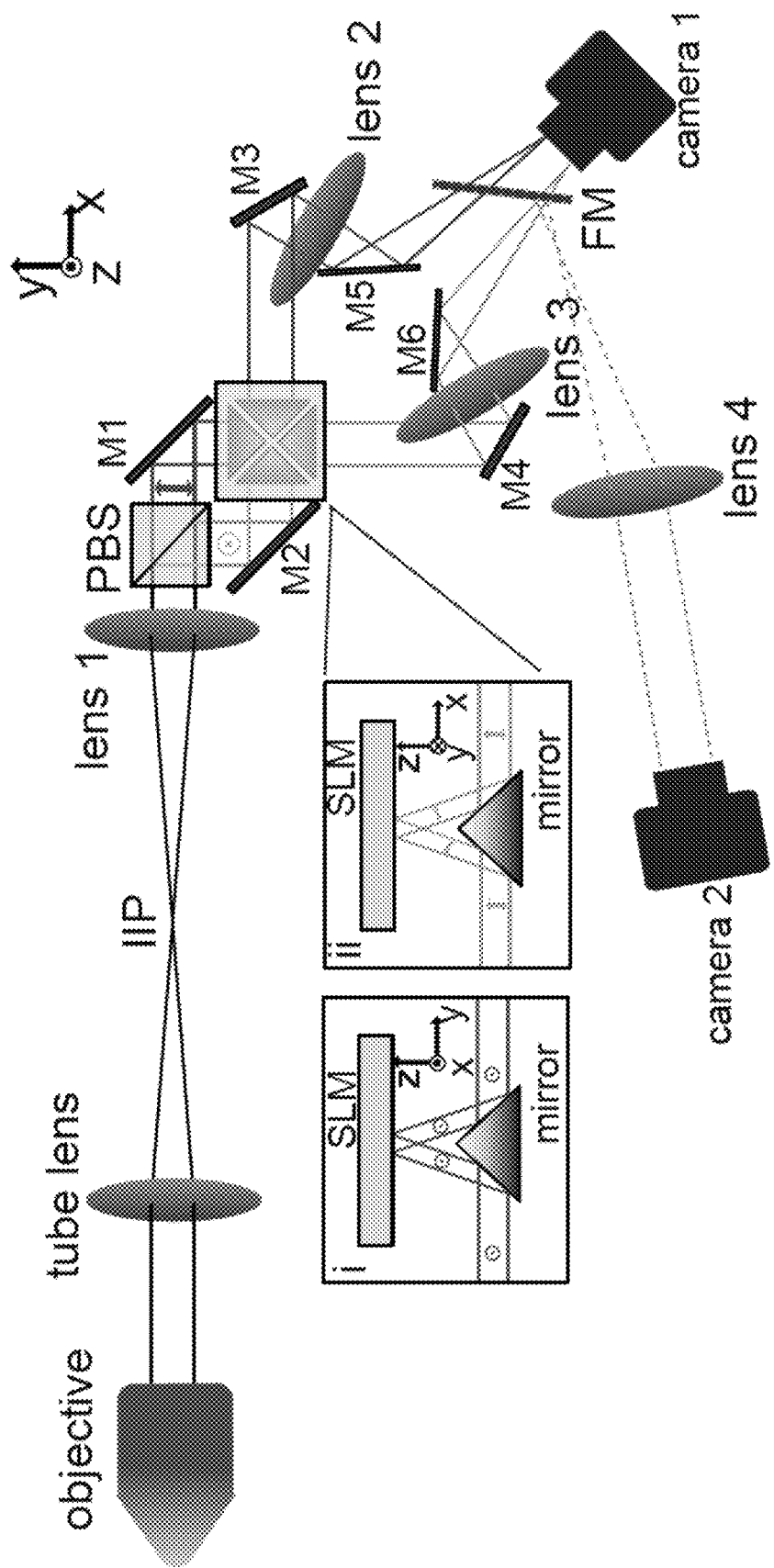
FIG. 30 is an imaging system schematic. Fluorescence from single molecules is collected by the objective. A polarization-sensitive 4f system, comprising 3 lenses (lenses 1-3) and a polarizing beam splitter (PBS), is added after the microscope's intermediate image plane (IIP). The PBS splits the light into x-polarized (red) and y-polarized (cyan) fluorescence. A pyramid mirror is used to reflect light from two channels onto the spatial light modulator (SLM) placed at the conjugate back focal plane (BFP) of the microscope (insets i and ii). The pixOL phase mask is loaded onto the SLM to modulate the phase of both channels simultaneously. Lenses 2 and 3 focus the x- and y-polarized fluorescence onto two non-overlapping regions of a single CMOS camera (camera 1). Arrows denote the polarization of the light in each channel. The system can be modified to image the BFP by using the flipping mirror (FM). Camera 2 is shown to be imaging the y-polarized BFP, but the x-polarized BFP can be imaged by simply translating the camera appropriately. M1-5, mirrors.
Figure 54B:
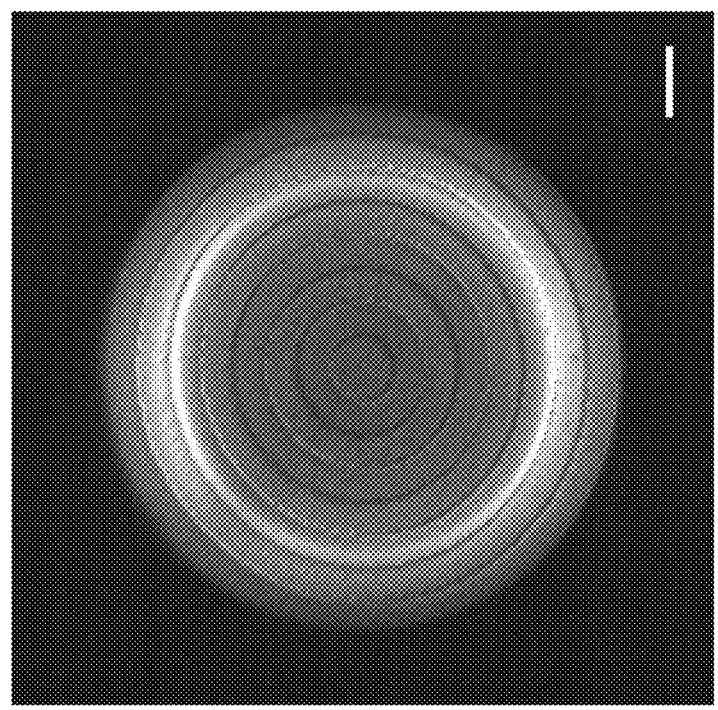
Figure 54A:
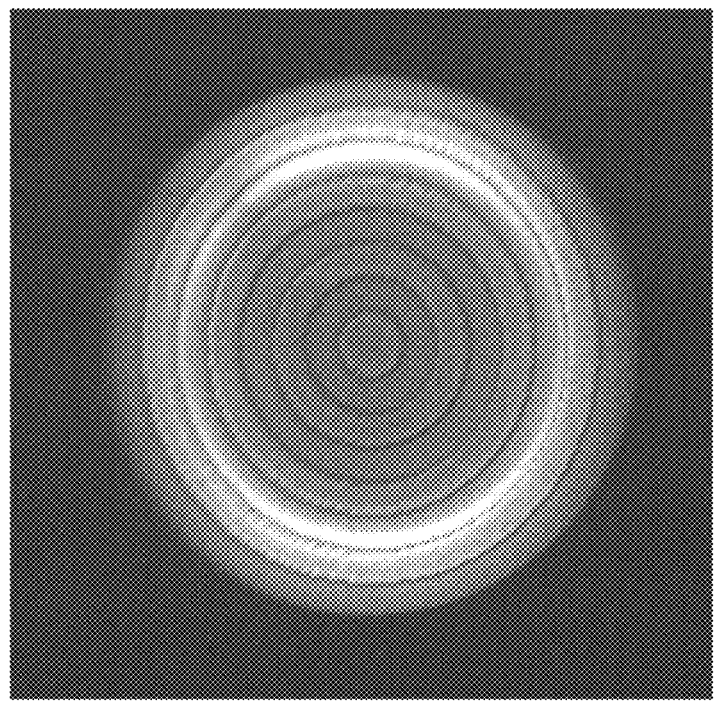

FIG. 54A is a back focal plane (BFP) images captured from the x-polarization channel using the flipping mirror in FIG. 30. A binary phase mask consisting of concentric rings of increasing radius (10-pixel interval) is loaded onto the spatial light modulator (SLM). The center of the phase mask is calibrated by matching the center of ring pattern to the center of the objective lens pupil. Obtaining sharp images of the ring pattern and pupil simultaneously ensures that the phase mask is positioned properly along the optical axis. The BFPs shown here are illuminated by a single layer of fluorescent spheres on coverglass exposed to air. Scale bar: 500 μm.

FIG. 54B is a back focal plane (BFP) images captured from the y-polarization channel using the flipping mirror in FIG. 30. A binary phase mask consisting of concentric rings of increasing radius (10-pixel interval) is loaded onto the spatial light modulator (SLM). The center of the phase mask is calibrated by matching the center of ring pattern to the center of the objective lens pupil. Obtaining sharp images of the ring pattern and pupil simultaneously ensures that the phase mask is positioned properly along the optical axis. The BFPs shown here are illuminated by a single layer of fluorescent spheres on coverglass exposed to air. Scale bar: 500 μm.

Figures 55A, 55B, 55C:
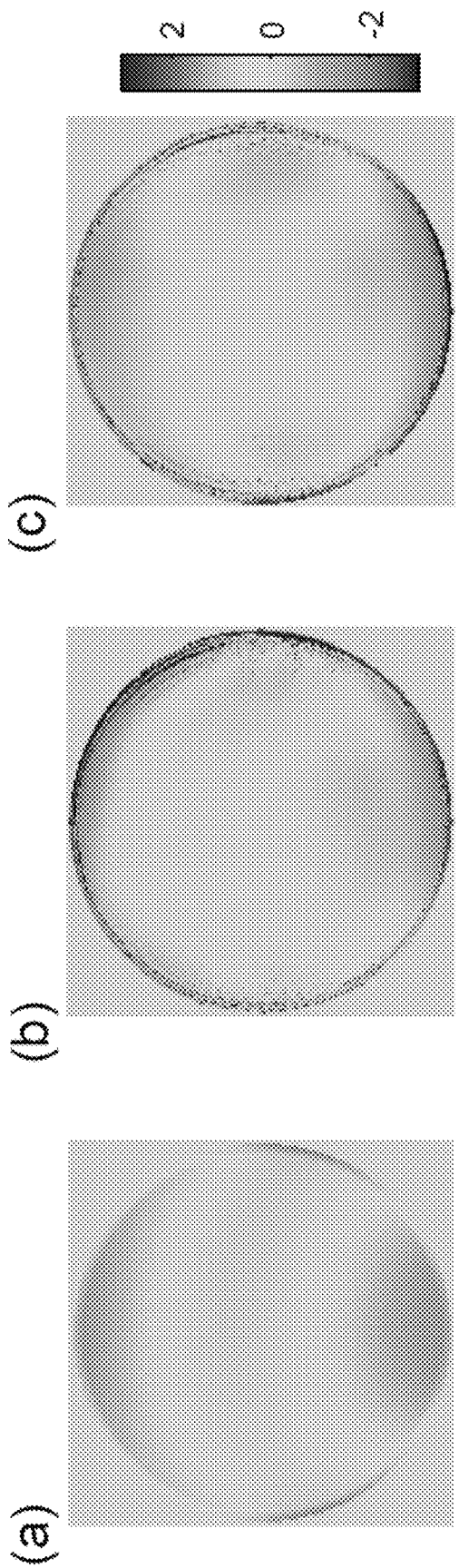

FIG. 55A is an image of a perfect pixOL phase mask. Colorbar: phase (rad).

FIG. 55B is an image of a calibrated experimental pupil phase pattern from the x-polarization channel. Colorbar: phase (rad).

FIG. 55C is an image of a calibrated experimental pupil phase pattern from the y-polarization channel. Colorbar: phase (rad).

Figure 55D:
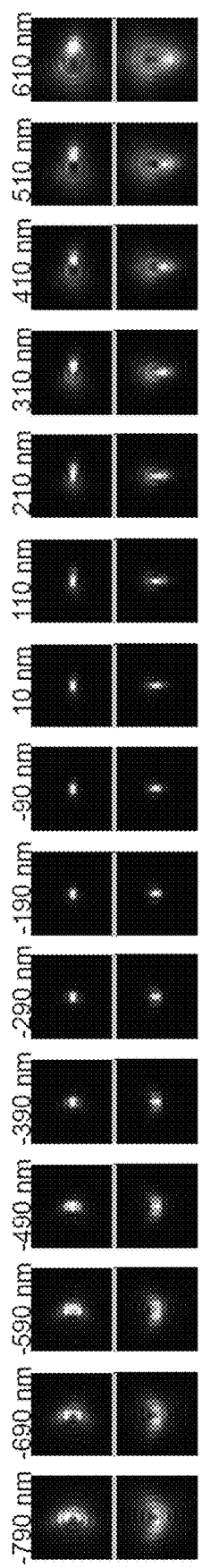

FIG. 55D is a set of images of ideal pixOL DSFs (red: x-polarized, blue: y-polarized) for various defocus positions z=−790 nm to z=610 nm. The intensities of each red-blue image pair are normalized. Colorbar: normalized intensity. Scalebar: 400 nm.

Figure 55E:
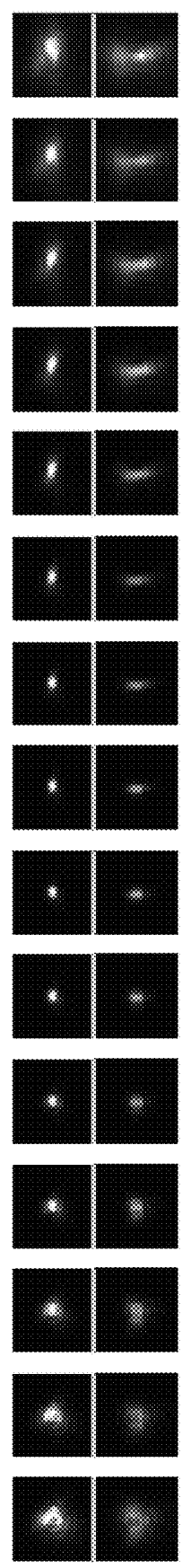

FIG. 55E is a set of images of experimental DSFs (red: x-polarized, blue: y-polarized) for various defocus positions z=−790 nm to z=610 nm. The intensities of each red-blue image pair are normalized. Colorbar: normalized intensity. Scalebar: 400 nm.

Figure 55F:
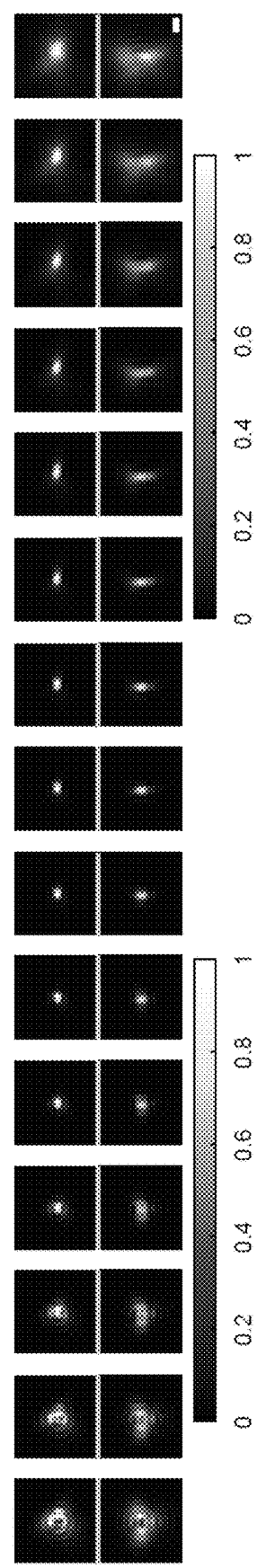

FIG. 55F is a set of images of simulated DSFs (red: x-polarized, blue: y-polarized) for various defocus positions z=−790 nm to z=610 nm using the calibrated phase masks in FIG. 55B and FIG. 55C. The intensities of each red-blue image pair are normalized. Colorbar: normalized intensity. Scalebar: 400 nm.

FIG. 56A is an image of a perfect pixOL phase mask. Colorbar: phase (rad).

FIG. 56B is an image of a perfect conjugate pixOL phase mask (pixOL*). Colorbar: phase (rad).

FIG. 56C is an image of a calibrated experimental phase pattern from the x-polarization channel. Colorbar: phase (rad).

FIG. 56D is an image of a calibrated experimental phase pattern from the y-polarization channel. Colorbar: phase (rad).

Figure 56E:
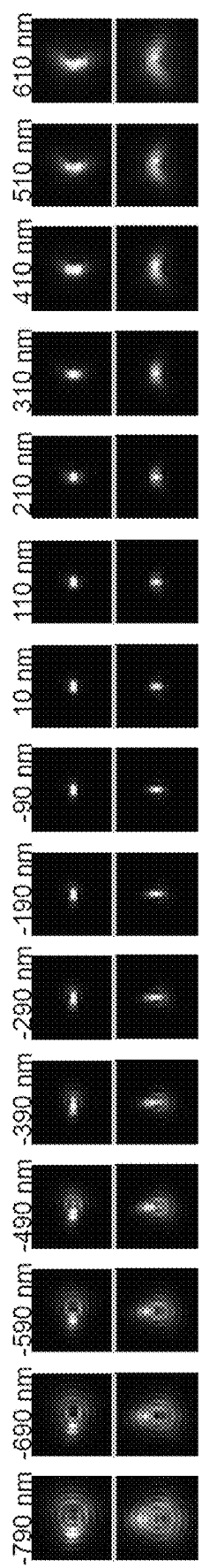

FIG. 56E is a set of ideal pixOL* DSFs (red: x-polarized, blue: y-polarized) for various defocus positions z=−790 nm to z=610 nm. The intensities of each red-blue image pair are normalized. Colorbar: normalized intensity. Scalebar: 400 nm.

Figure 56F:
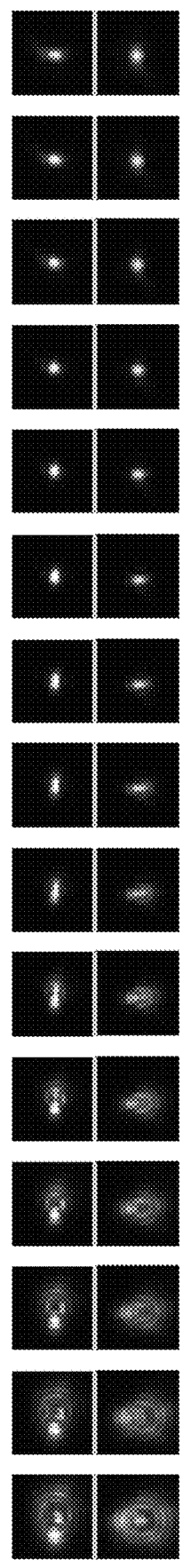

FIG. 56F is a set of experimental DSFs (red: x-polarized, blue: y-polarized) for various defocus positions z=−790 nm to z=610 nm. The intensities of each red-blue image pair are normalized. Colorbar: normalized intensity. Scalebar: 400 nm.

Figure 56G:
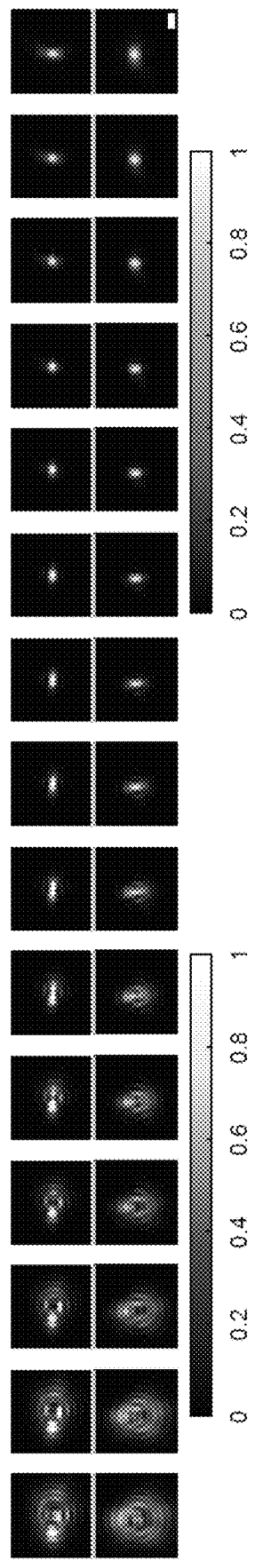

FIG. 56G is a set of simulated DSFs using the calibrated phase masks in FIG. 56C and FIG. 56D (red: x-polarized, blue: y-polarized) for various defocus positions z=−790 nm to z=610 nm. The intensities of each red-blue image pair are normalized. Colorbar: normalized intensity. Scalebar: 400 nm.

FIG. 57A is a set of images of the calibrated pixOL phase masks from the (i) x and (iii) y polarization channels. Smoothed versions of the pixOL phase mask are shown corresponding to DSFs in the (ii) x and (iv) y polarization channels. The smoothed phase masks are reconstructed by projecting the calibrated phase masks into a Zernike basis using the first 231 Zernike polynomials. Colorbar: phase (rad).

FIG. 57B is a set of images of the calibrated pixOL* phase masks from the (i) x and (iii) y polarization channels. Smoothed versions of the pixOL* phase mask are shown corresponding to DSFs in the (ii) x and (iv) y polarization channels. The smoothed phase masks are reconstructed by projecting the calibrated phase masks into a Zernike basis using the first 231 Zernike polynomials. Colorbar: phase (rad).

Figure 57C:
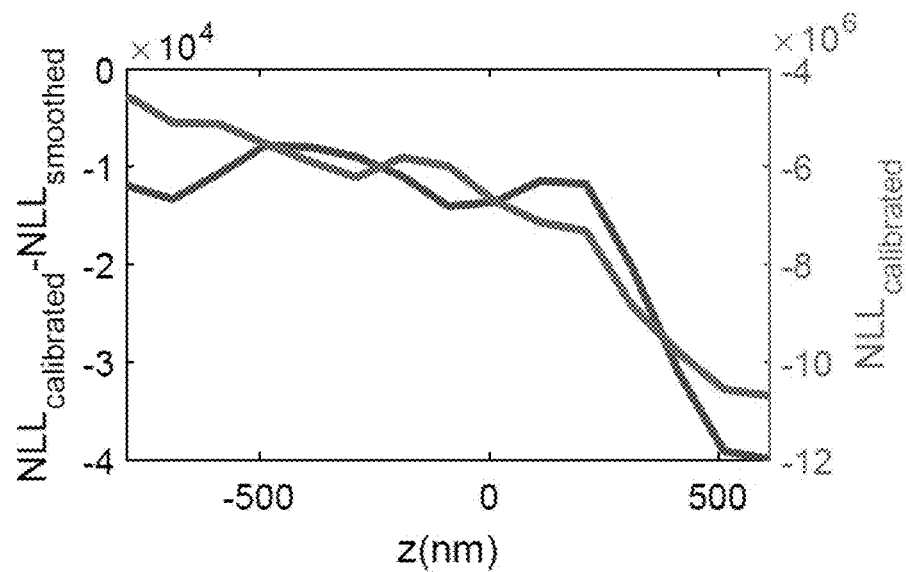

FIG. 57C is a graph comparing model accuracy using the negative log likelihood (NLL, Eqn. S15) between simulated dipole spread functions (DSFs) and images of fluorescent beads in FIG. 55D and FIG. 56E across all axial positions z. Differences in NLL are calculated for DSFs using the calibrated ($NLL_{calibrated}$) vs. smoothed phase masks ($NLL_{smoothed}$) for pixOL. Blue: $NLL_{calibrated}$−$NLL_{smoothed}$; orange: $NLL_{calibrated}$.

Figure 57D:
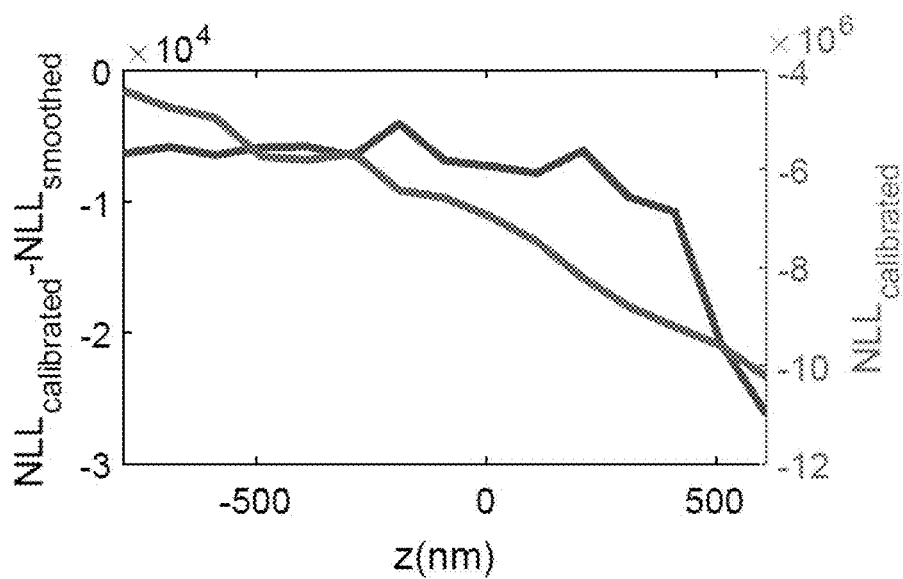

FIG. 57D is a graph comparing model accuracy using the negative log likelihood (NLL, Eqn. S15) between simulated dipole spread functions (DSFs) and images of fluorescent beads in FIG. 55D and FIG. 56E across all axial positions z. Differences in NLL are calculated for DSFs using the calibrated ($NLL_{calibrated}$) vs. smoothed phase masks ($NLL_{smoothed}$) for pixOL*. Blue: $NLL_{calibrated}$−$NLL_{smoothed}$; orange: $NLL_{calibrated}$.

Figures 58A, 58B:
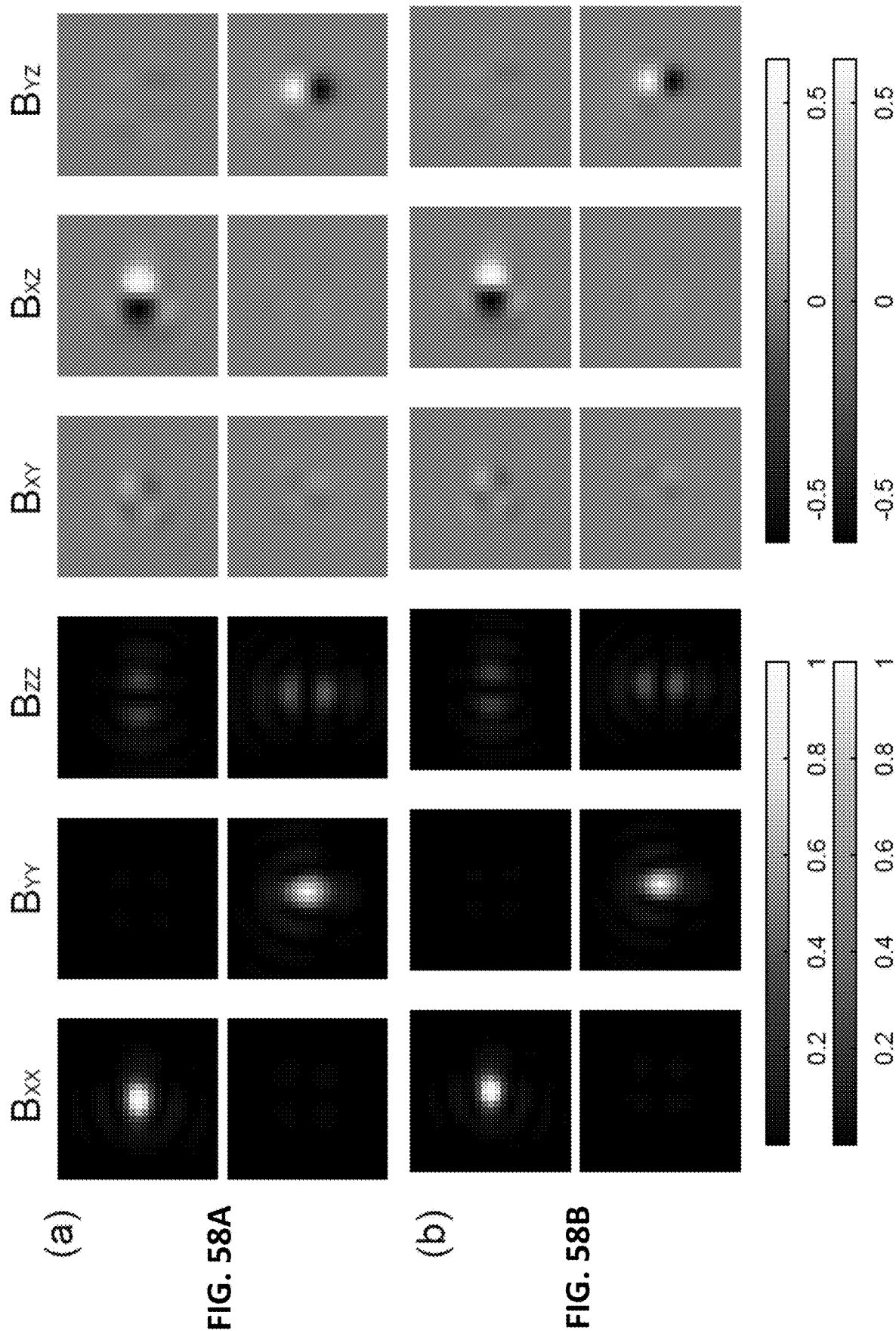

FIG. 58A is a set of image-plane basis images B of the pixOL phase mask for an in-focus emitter of wavelength 641 nm. The image intensities are normalized relative to the brightest basis image ($B_{XX}$).

FIG. 58B is a set of image-plane basis images B of the pixOL phase mask for an in-focus emitter of wavelength 582 nm. The image intensities are normalized relative to the brightest basis image ($B_{XX}$).

Figure 58C:
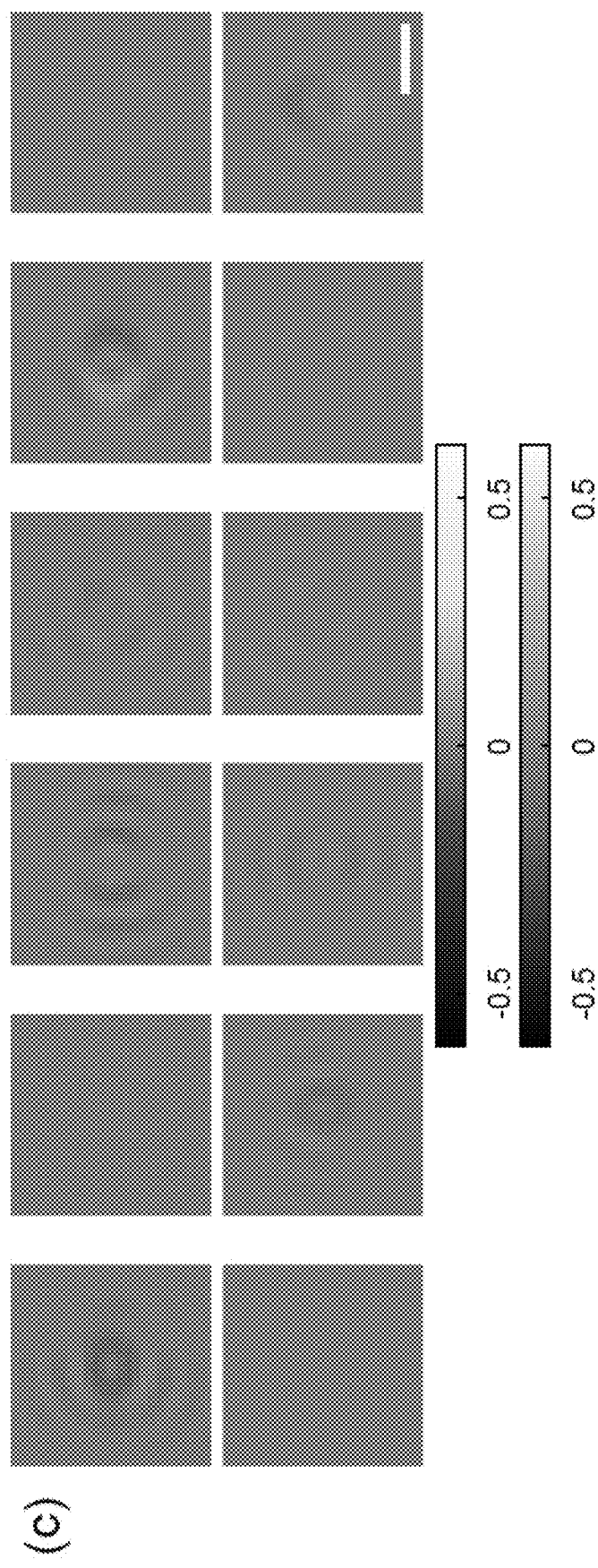

FIG. 58C is a set of the difference between basis images in FIG. 58A and FIG. 58B. Colorbars: normalized intensity. Scalebar: 500 nm.

Figures 59A, 59B:
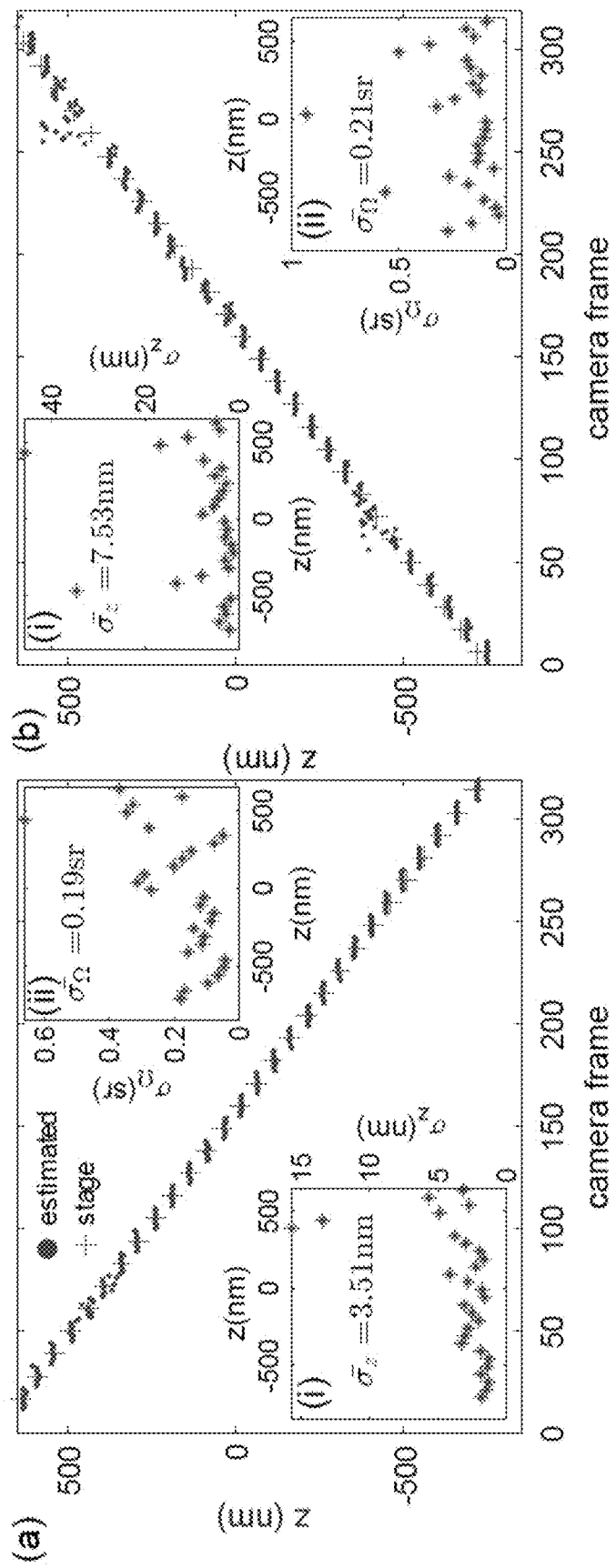

FIG. 59A is a plot of the trajectory of defocus estimates z for a bead scanned axially from z=−790 nm to z=610 nm with a step size of 50 nm (11 camera frames per step). Red dot: estimated axial distance z between the bead and focal plane in each frame; green cross: expected stage position. Inset (i): Experimental axial precision $\sigma_z$ at each scanning plane (mean precision $\sigma_z$ is 3.51 nm). Inset (ii): Experimental emission anisotropy precision $\sigma_\Omega$ at each scanning plane (average precision $\sigma_\Omega$ is 0.19 sr).

FIG. 59B is a plot of the trajectory of defocus estimates z for a bead scanned axially in the opposite direction of the bead in FIG. 59A from z=−790 nm to z=610 nm with a step size of 50 nm (11 camera frames per step). Red dot: estimated axial distance z between the bead and focal plane in each frame; green cross: expected stage position. Inset (i): Experimental axial precision $\sigma_z$ at each scanning plane (mean precision $\sigma_z$ is 7.53 nm). Inset (ii): Experimental emission anisotropy precision $\sigma_\Omega$ at each scanning plane (average precision $\sigma_\Omega$ is 0.21 sr).

Figures 59C, 59D, 59E:
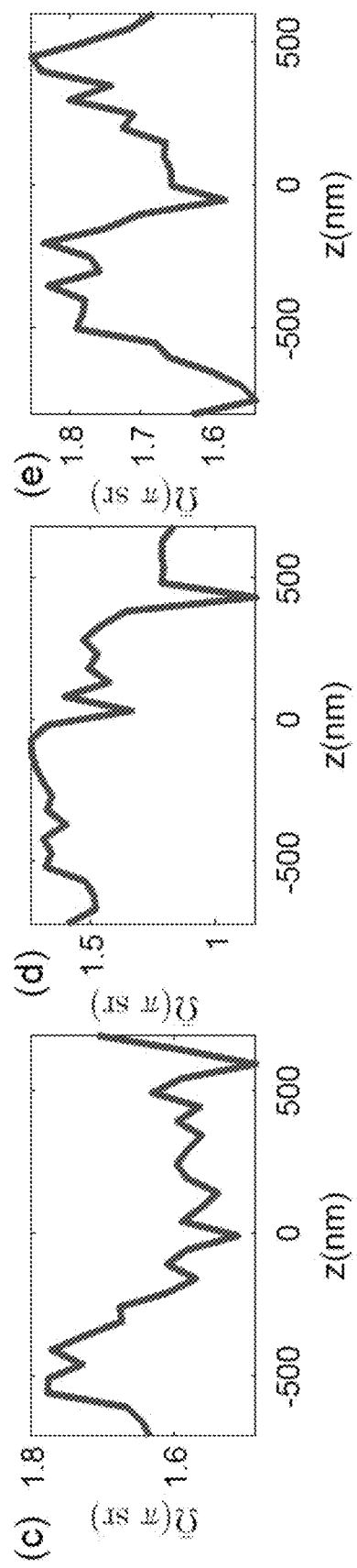

FIG. 59C is a graph of the mean emission anisotropies of the bead in FIG. 59A quantified as an effective wobble angle $\Omega$ at each scanning plane.

FIG. 59D is a graph of the mean emission anisotropies of the bead in FIG. 59B quantified as an effective wobble angle $\Omega$ at each scanning plane.

Figure 27A:
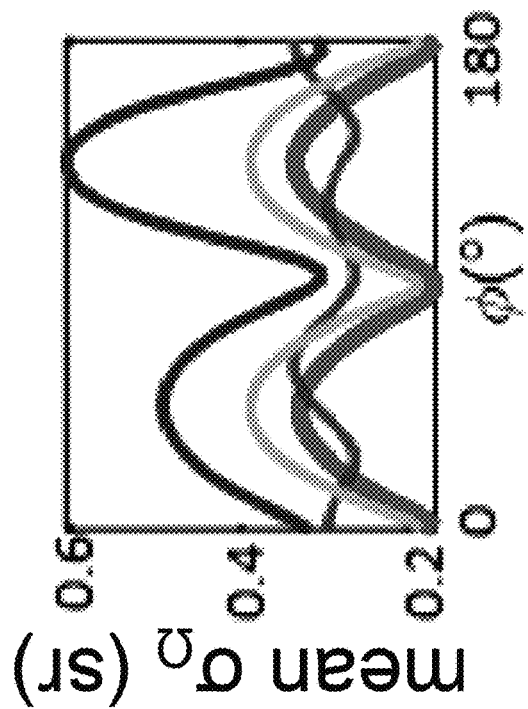
FIG. 27A is a graph of the mean of the mean square angular error (MSAE) $σ_A$ best-possible measurement precision of pixOL DSF calculated from the Cramér-Rao bound (CRB) matrix K for emitters within water (RI=1.33) with 1000 signal photons and 2 background photons per pixel detected using various engineered DSFs. Red: pixOL, yellow: defocused polarized DSF focused at 200 nm below the coverslip, grey: CHIDO, purple: tri-spot. The MSAE is a combined metric for the standard deviation $\sigma_\theta$ of $\theta$ and the standard deviation $\sigma_\phi$, of $\phi$.
Figure 27B:
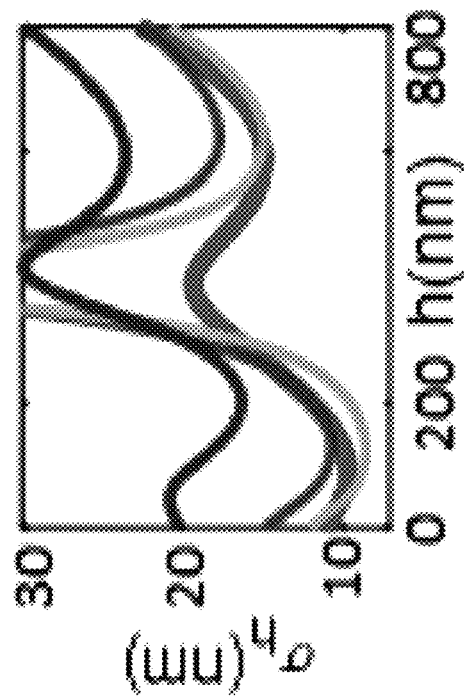
FIG. 27B is a graph of the average precision $\sigma_\Omega$ best-possible measurement precision of pixOL DSF calculated from the Cramér-Rao bound (CRB) matrix K for emitters within water (RI=1.33) with 1000 signal photons and 2 background photons per pixel detected using various engineered DSFs. Red: pixOL, yellow: defocused polarized DSF focused at 200 nm below the coverslip, grey: CHIDO, purple: tri-spot. Average precision $\sigma_\Omega$ for measuring the wobbling solid angle $\Omega$.
Figure 27C:
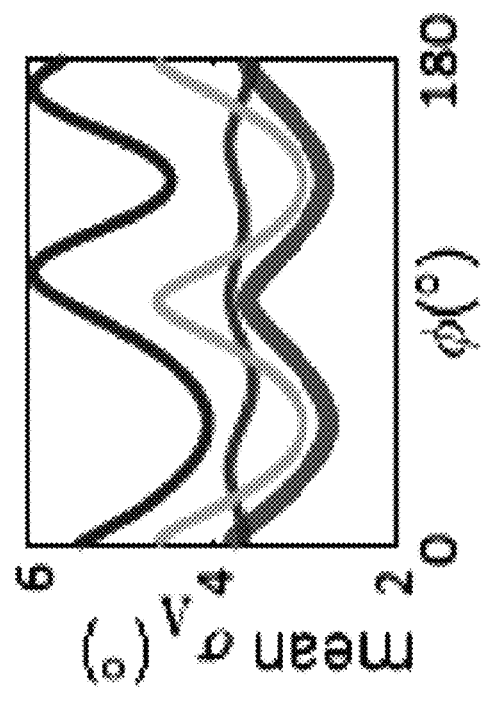
FIG. 27C is a graph of the average localization of lateral position $\sigma_t$ best-possible measurement precision of pixOL DSF calculated from the Cramér-Rao bound (CRB) matrix K for emitters within water (RI=1.33) with 1000 signal photons and 2 background photons per pixel detected using various engineered DSFs. Red: pixOL, yellow: defocused polarized DSF focused at 200 nm below the coverslip, grey: CHIDO, purple: tri-spot.
Figure 27D:
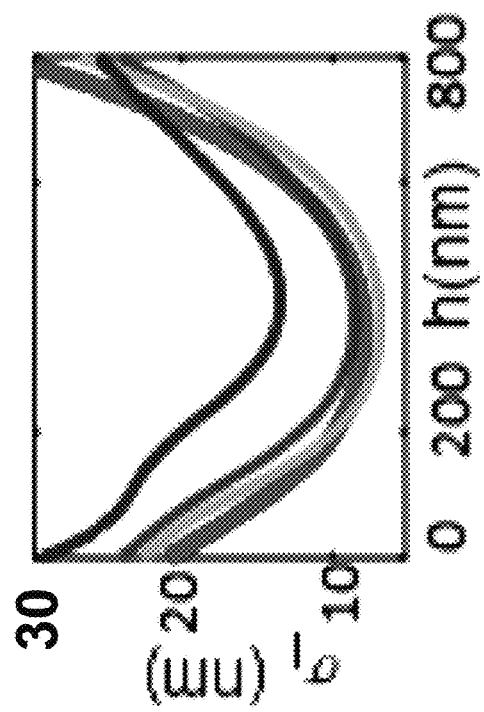
FIG. 27D is a graph of the average localization $\sigma_h$ best-possible measurement precision of pixOL DSF calculated from the Cramér-Rao bound (CRB) matrix K for emitters within water (RI=1.33) with 1000 signal photons and 2 background photons per pixel detected using various engineered DSFs. Red: pixOL, yellow: defocused polarized DSF focused at 200 nm below the coverslip, grey: CHIDO, purple: tri-spot. Height h is above the interface for an isotropic emitter
Figure 27E:
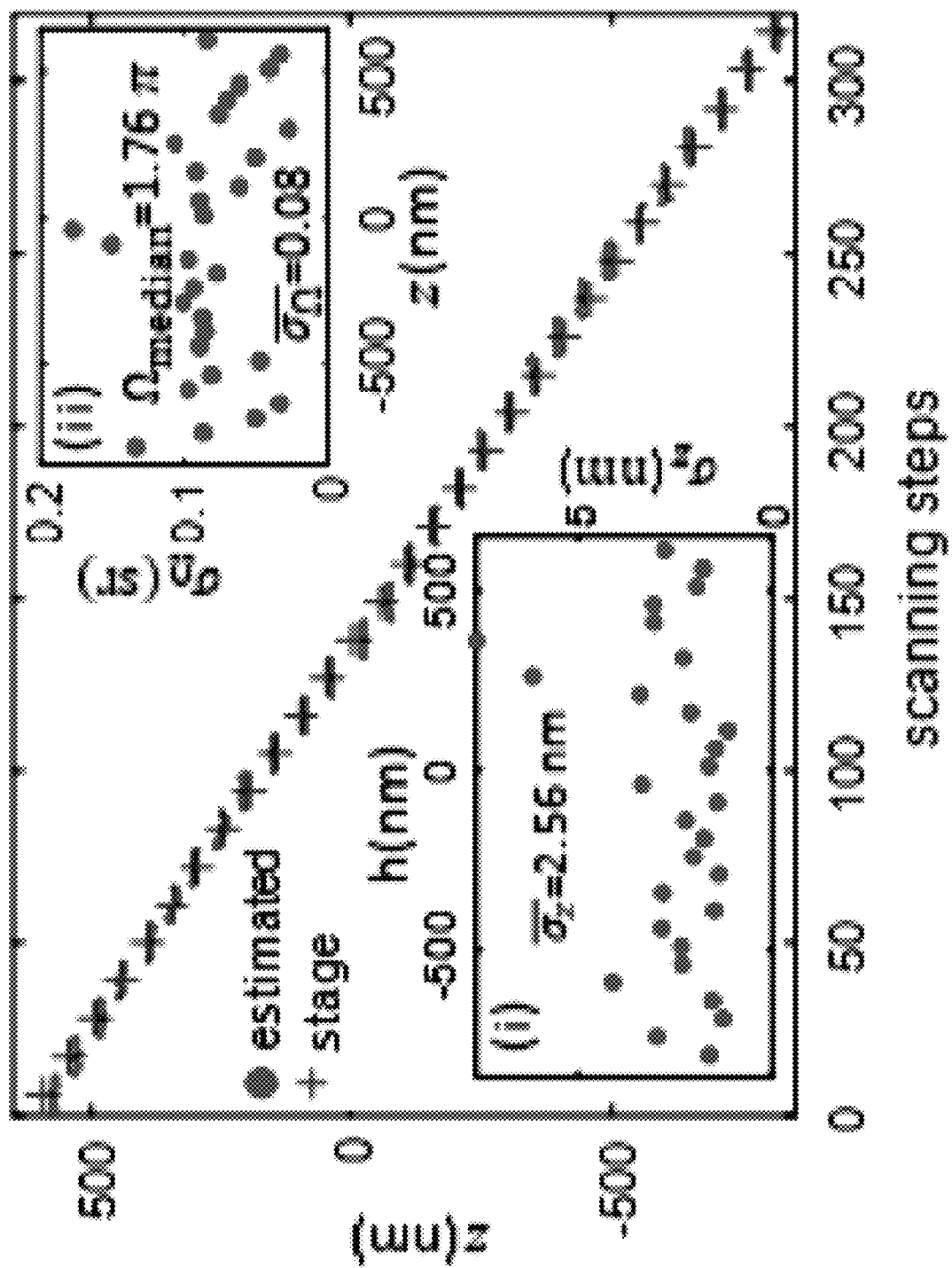
FIG. 27E is a plot of the location and orientation estimation of a fluorescent bead. The sample is scanned axially from z=−790 nm to z=610 nm with a step size of 50 nm (11 camera frames per step). Red dot: estimated focal plane location z in each frame (MDL: change x axis label to "camera frame"); green cross: expected stage position. Inset (i): experimental axial localization precision $\sigma_z$ at each scanning plane. The mean precision over all z-planes is $\sigma_z$=2.56 nm. (ii) Experimental wobble angle precision $\sigma_\Omega$ at each scanning plane. The average wobble angle measurement precision $\sigma_\theta$=0.08 over all scanning planes.

FIG. 59E is a graph of the mean emission anisotropies of the bead in FIG. 27E quantified as an effective wobble angle $\Omega$ at each scanning plane.

Figures 60A, 60B, 60C, 60D:
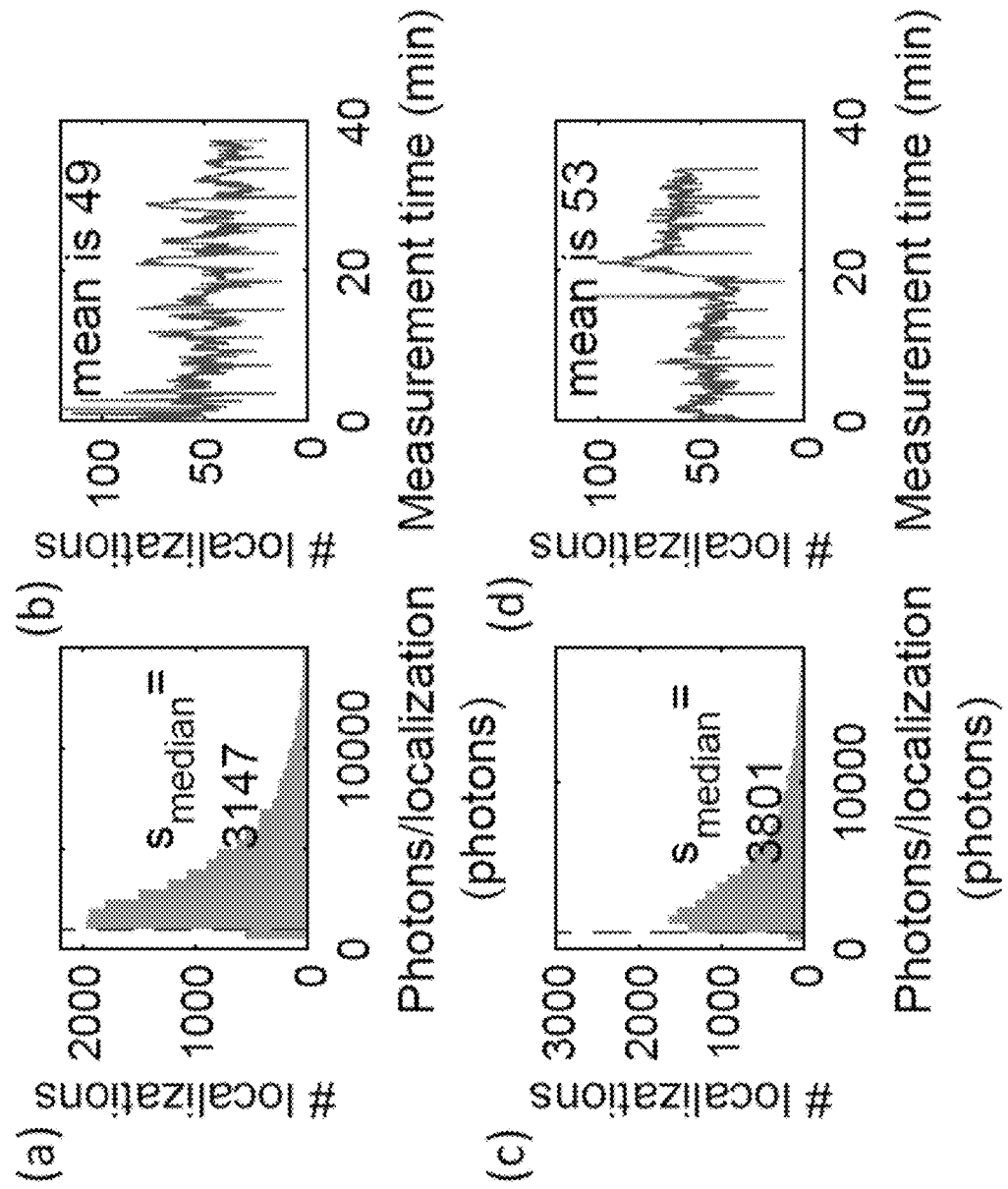

FIG. 60A is a graph of the photons s detected per localization of Nile red (NR) within spherical supported lipid bilayers (SLBs) consisting of DPPC plus cholesterol. The red dashed line represents s=1000 photons.

FIG. 60B is a graph of the localization rate per 0.11 minutes for NR within DPPC plus cholesterol SLBs.

FIG. 60C is a graph of the photons s detected per localization of Nile red within spherical supported lipid bilayers (SLBs) consisting of DPPC only. The red dashed line represents s=1000 photons.

FIG. 60D is a graph of the localization rate per 0.11 minutes for NR within DPPC-only SLBs.

Figure 61A:
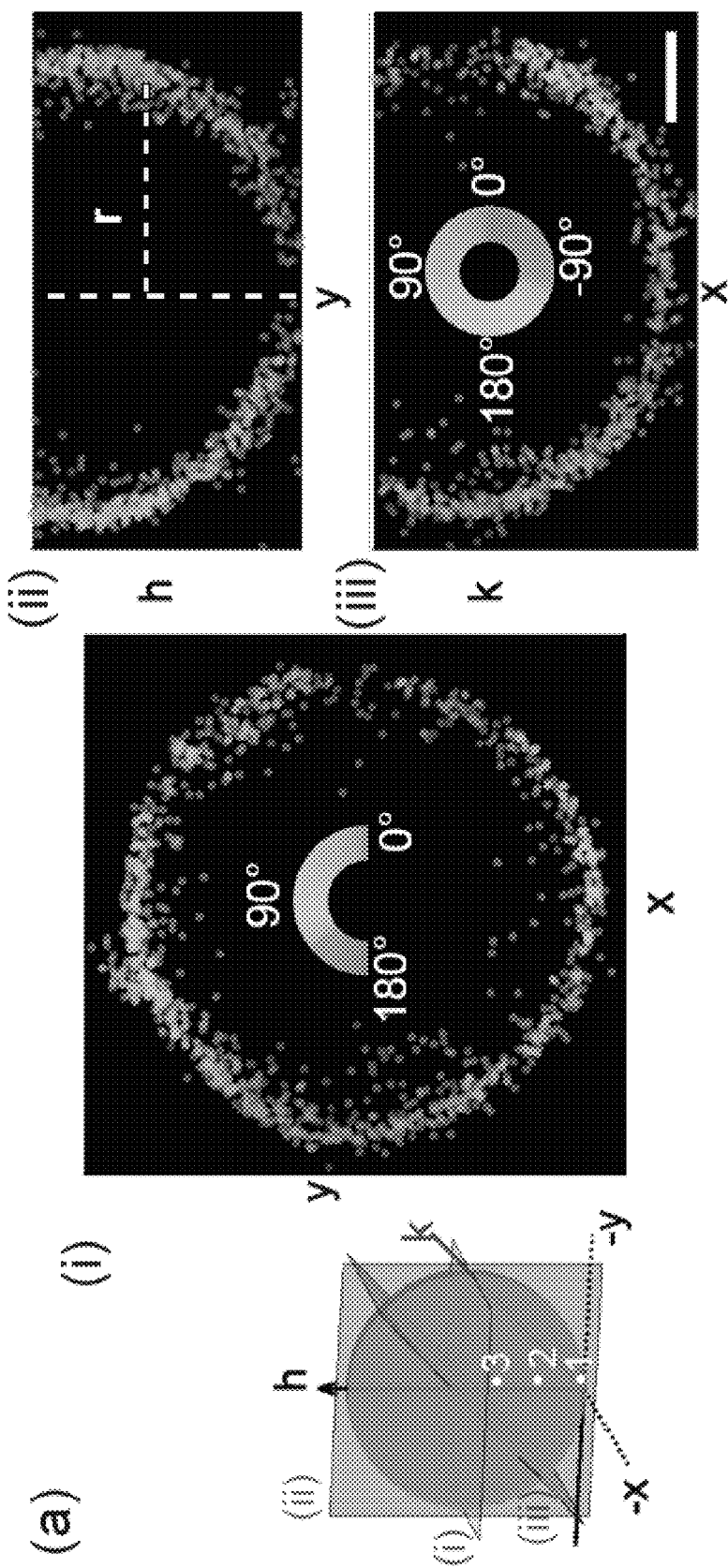

FIG. 61A is a set of SMOLM images of the 3D orientations and 3D locations of Nile red (NR) within a spherical supported lipid bilayer consisting of DPPC plus cholesterol. Azimuthal angle ϕ of each NR molecule for the three cross-sections in inset: (i) x-y slice, (ii) y-h slice, and (iii) plane with y+h=1000 nm. Each slice has a thickness of 100 nm. Colorbar: ϕ (deg). (ii) and (iii) shares the same colormap shown in (iii). Scalebar: 400 nm.

Figures 61B, 61C:
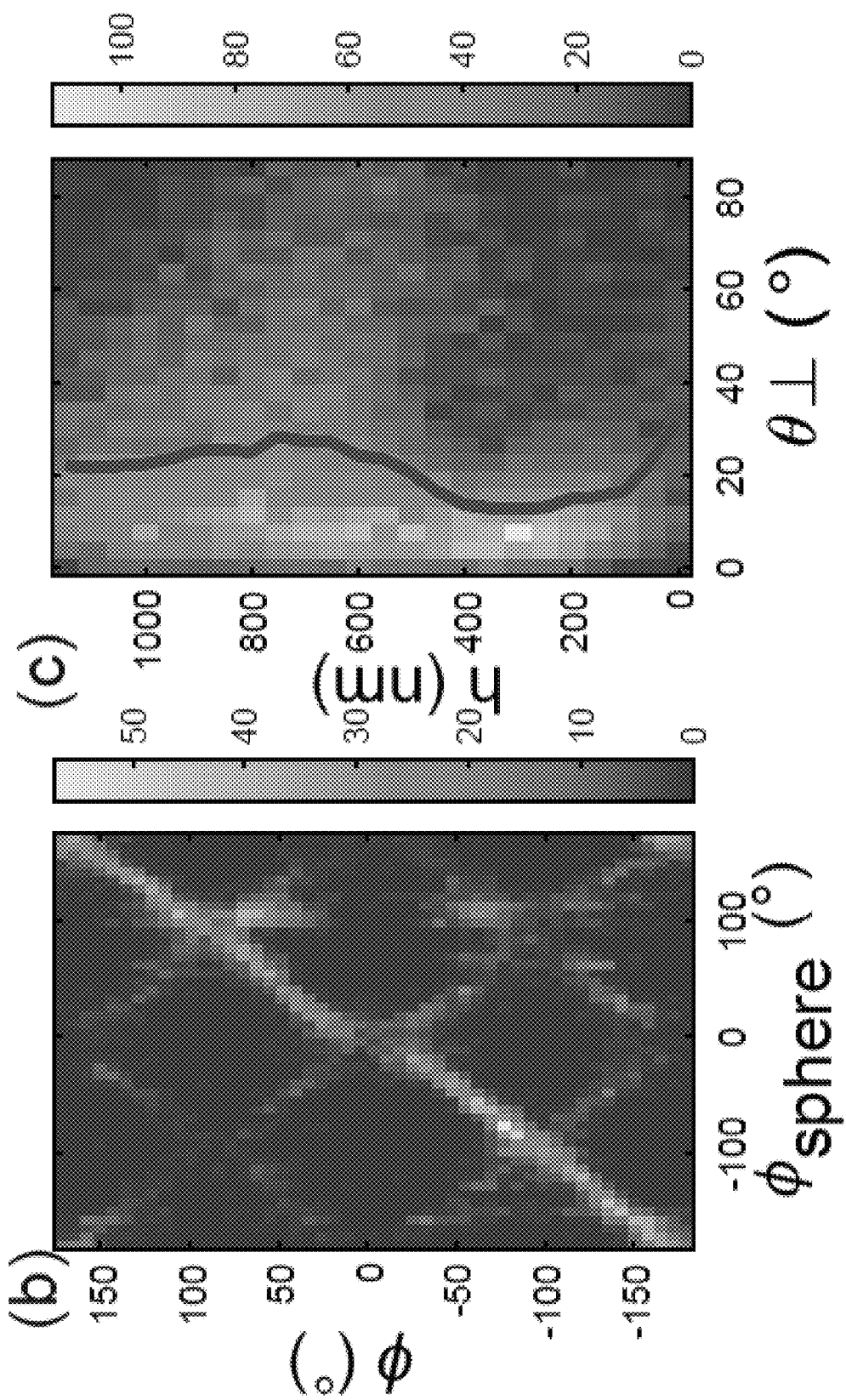

FIG. 61B is an image of the NR orientations ϕ relative to their positions on the sphere's surface $\phi_{sphere}$. Colorbars: SM counts per bin.

FIG. 61C is an image of the NR axial locations h vs. orientations θ⊥. Colorbars: SM counts per bin. Red line: median value of θ⊥ at each axial location h.

FIG. 61D is a set of graphs of the experimental estimated bias in measuring NR (i) orientation $\theta\perp_{,bias}$ and (ii) wobble angle $\Omega_{bias}$, plotted as a function of NR position on the spherical surface [$\theta_{sphere}$, $\phi_{sphere}$] of the SLB, assuming that the ground truth orientations of NR are normal to the spherical surface (θ⊥=0) and completely fixed (Ω=0 sr). (iii,iv) Same as (i,ii) but for (iii) angular standard deviation $\sigma_\delta$ (Eqn. S23) and (iv) wobble angle precision $\sigma_\Omega$.

Figures 28A, 28B:
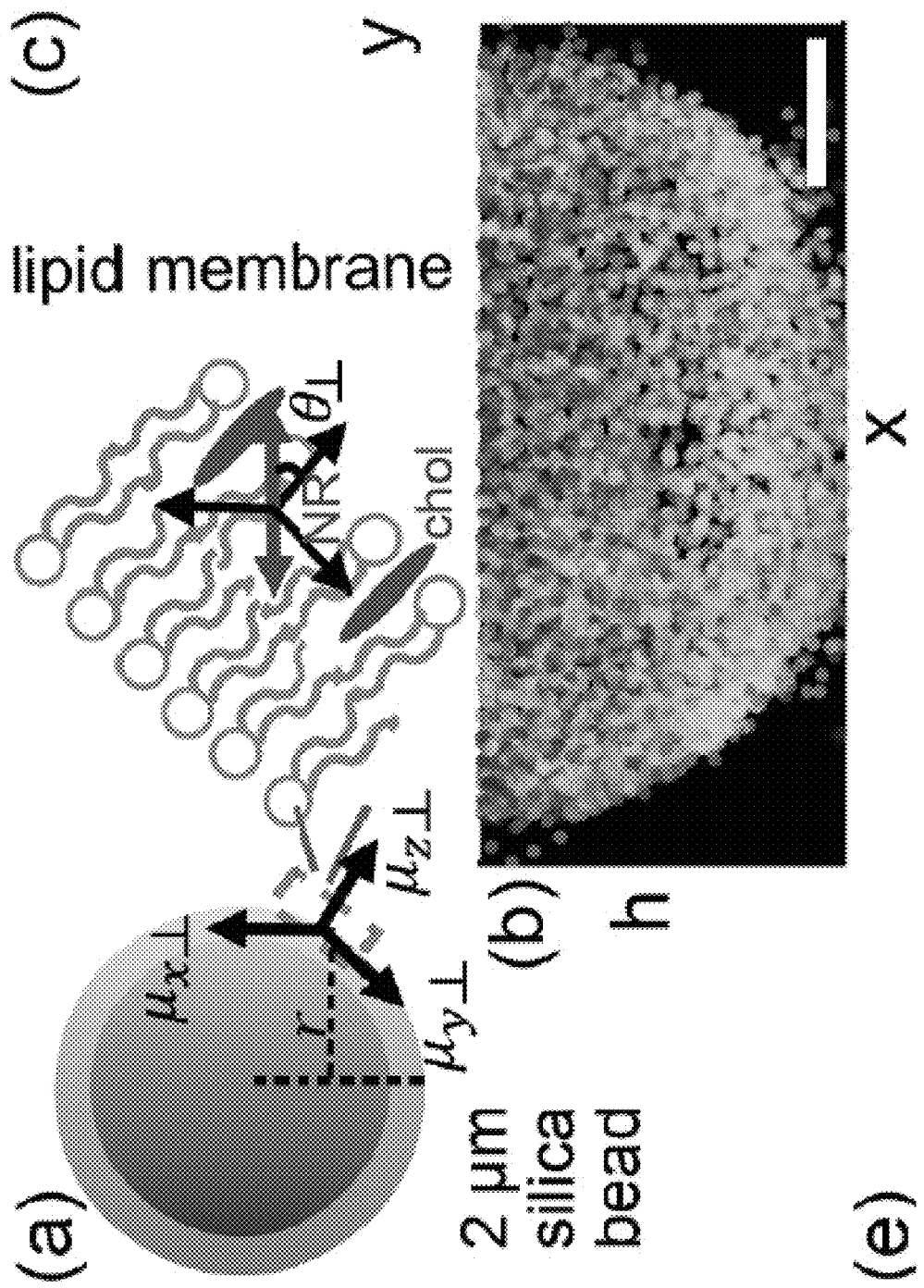
FIG. 28A is a schematic of an experiment measuring the 3D orientation and 3D location of Nile reds on supported lipid bilayers (SLBs). Two types of SLBs, namely DPPC with 40% cholesterol (chol) and DPPC, to 2 μm silica beads are used. The angle $\theta_\perp$ is defined as the angle between the estimated orientation of Nile red (NR) and the vector $\mu_z\perp$ perpendicular to the spherical surface. r is used to present the distance from the estimated location to the vertical diameter of the sphere.
FIG. 28B is an image of the x-h view of the estimated $\theta$ for the bottom half of bead for a bead coated with DPPC and cholesterol.
Figure 28D:
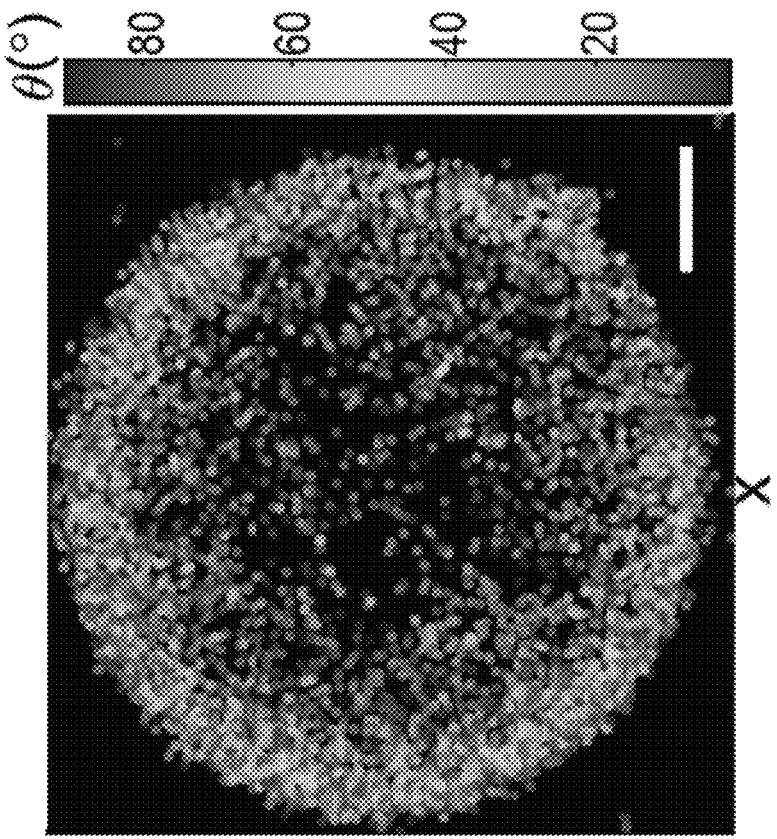
FIG. 28D is an image of the x-y view of the estimated $\theta$ for the bottom half of bead for a bead coated with DPPC only.
Figure 28C:
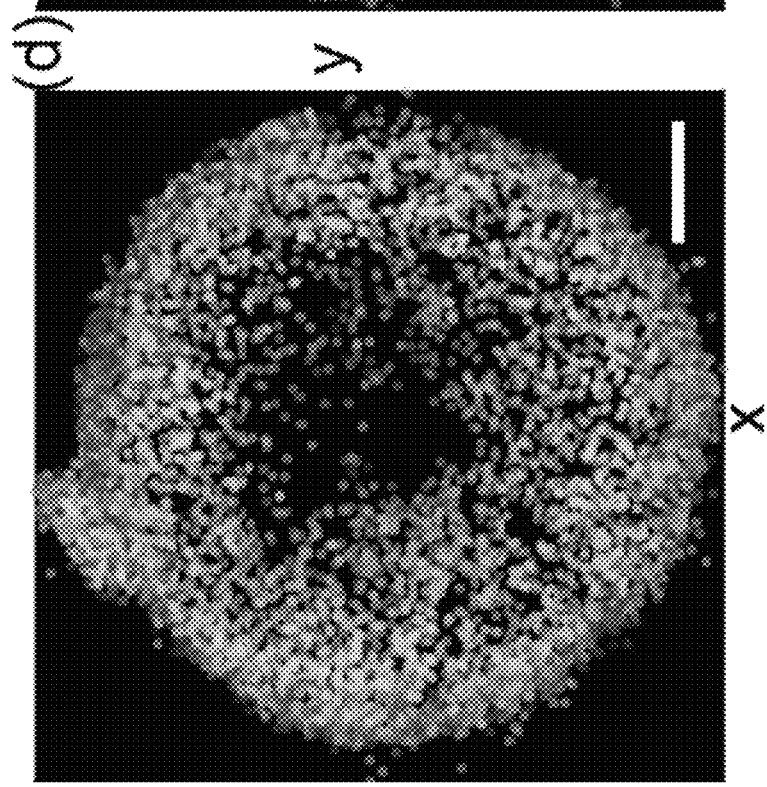
FIG. 28C is an image of the x-y view of the estimated $\theta$ for the bottom half of bead for a bead coated with DPPC and cholesterol.
Figure 28E:
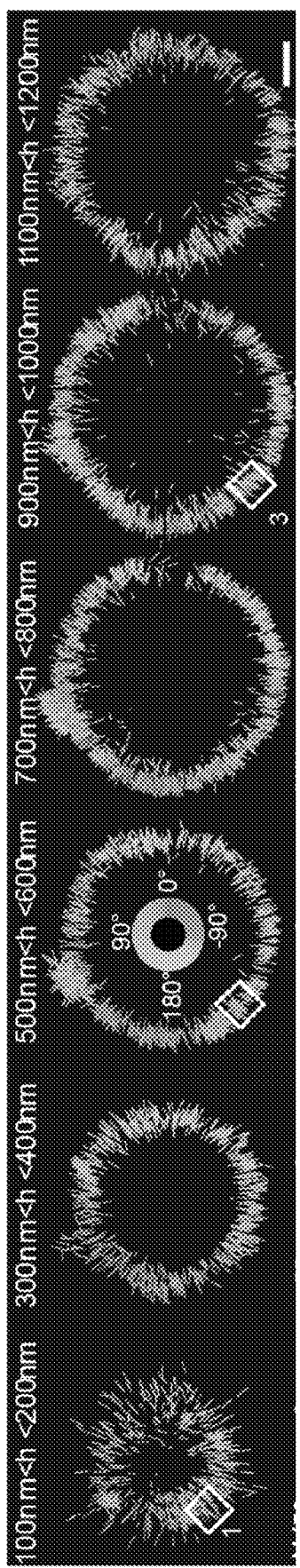
FIG. 28E is a set of x-y view images of all individual orientation measurements in different z-slices along and associated histograms of a bead coated with DPPC and cholesterol. The lines are oriented according to the 3D mean orientation angle $(\theta, \phi)$ and colors are coded according to $\phi$ angle.

FIG. 61E is a histogram of the NR wobble Ω for (green) all localizations over the sphere and (purple) molecules within the membrane defect in FIG. 28E.

FIG. 61F is a set of images of (top row) sum of all pixOL images of NR located within a 50×50×100 nm³ box at three locations in FIG. 61A inset: (1) h=150 nm, (2) h=550 nm, (3) h=950 nm. (bottom row) Simulated pixOL images for emitters oriented perpendicular to the SLB and centered at the three dots locations in FIG. 61A inset with $\phi_{sphere}$=135°. (Red) x-polarized, (blue) y-polarized. Colorbars: normalized intensity. Scalebar: 500 nm.

Figure 61G:
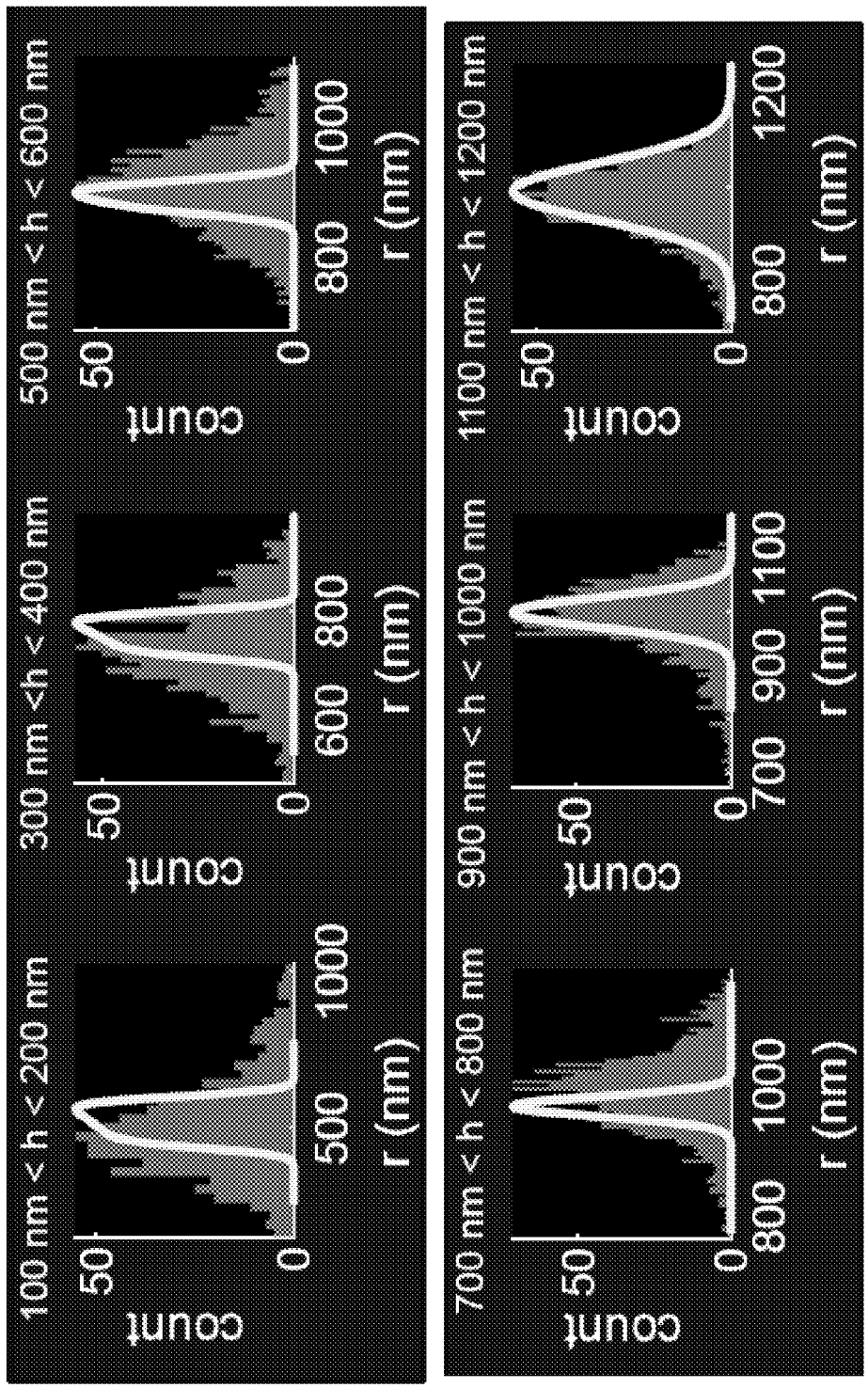

FIG. 61G is a set of histograms of NR lateral positions r (see FIG. 61A(ii)) relative to the sphere's center within each h slice compared to a model distribution (yellow lines, Eqn. S27), accounting for the curved spherical surface and pixOL's localization precision.

Figure 62A:
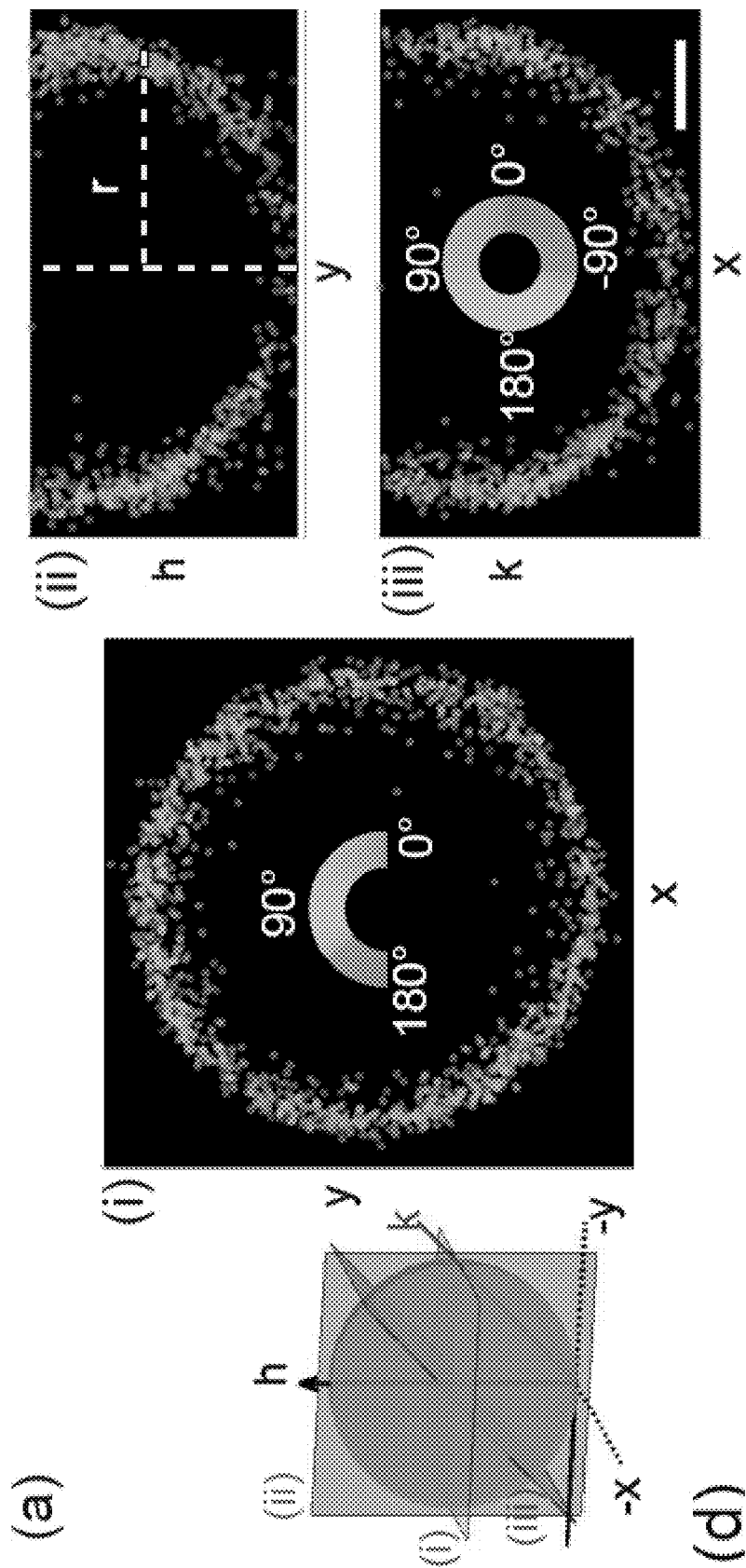

FIG. 62A is a set of SMOLM images of the 3D orientations and 3D locations of Nile red (NR) within a spherical supported lipid bilayer consisting of DPPC only. Azimuthal angle ϕ of each NR molecule for three slices in inset: (i) x-y slice, (ii) y-h slice, and (iii) plane with y+h=1000 nm. Each slice has a thickness of 100 nm. Colorbar: ϕ (deg). (ii) and (iii) shares the same colormap shown in (iii). Scale bar: 400 nm.

Figure 62B:
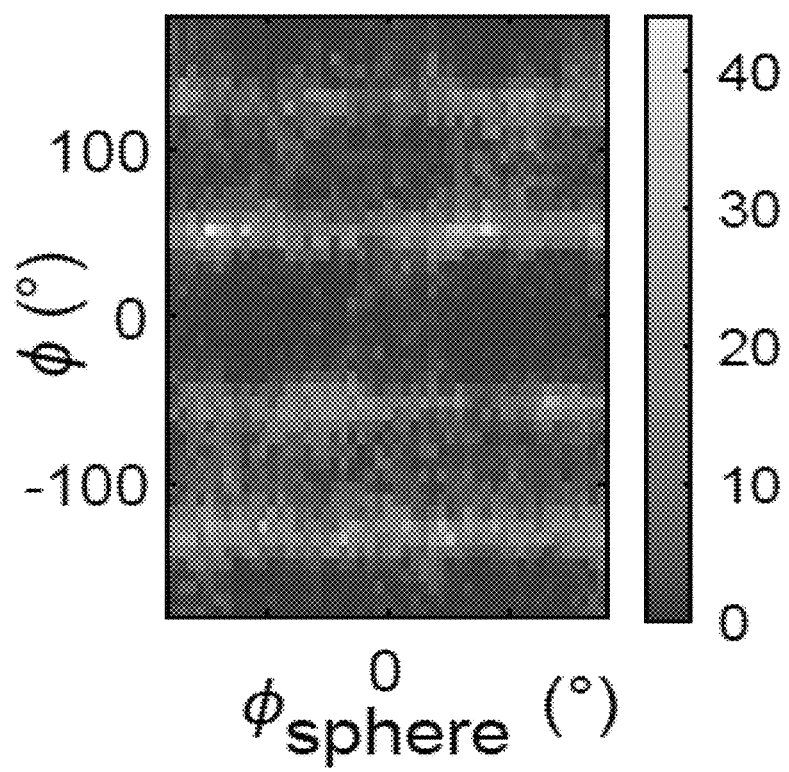

FIG. 62B is an image of NR orientations ϕ relative to their positions on the sphere's surface $\phi_{sphere}$ for estimations with signal photons larger than 1000.

Figure 62C:
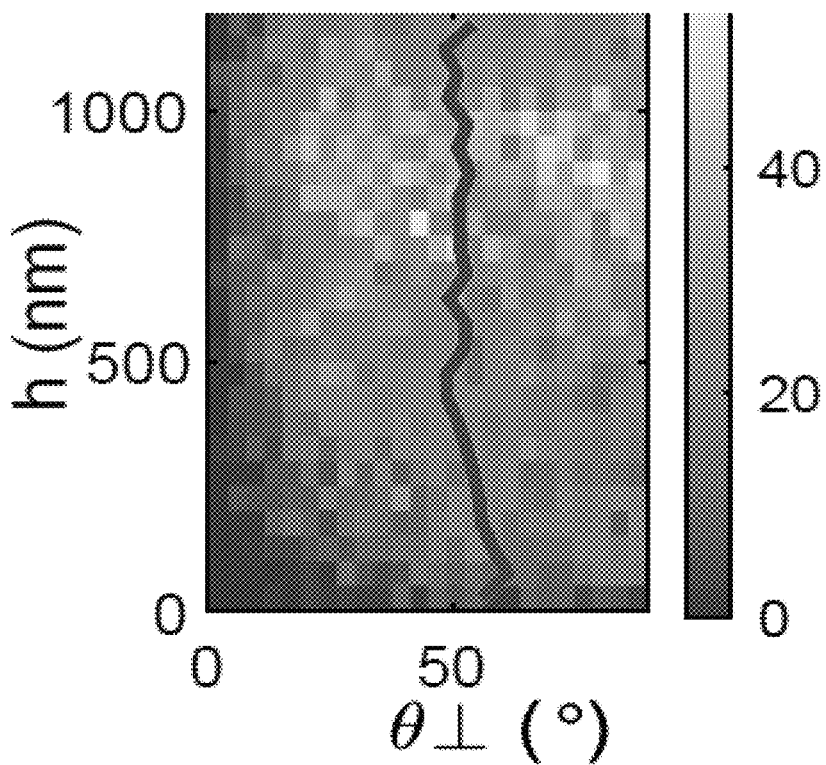

FIG. 62C is an image of NR axial locations h vs. orientations θ⊥ for estimations with signal photons larger than 1000. Colorbars: SM counts per bin. Red line: the median value of θ⊥ at each axial location h.

Figure 62D:
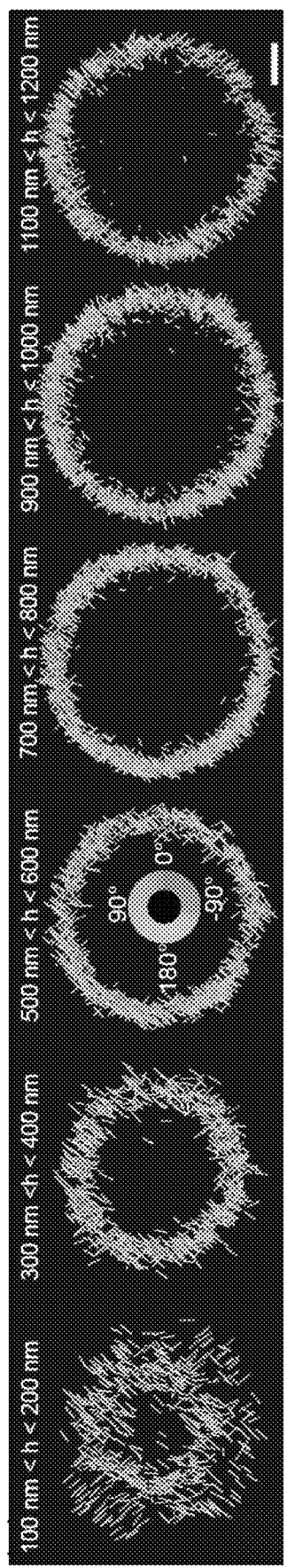
Figure 62E:
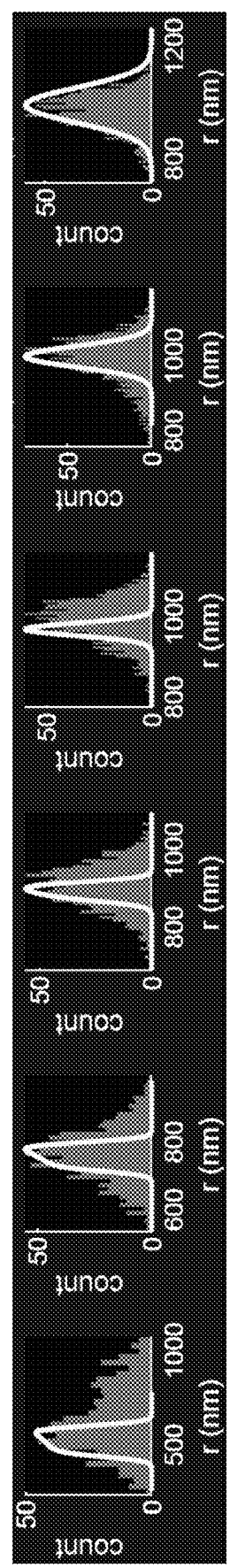

FIG. 62D is a set of images of x-y cross-sections of the bead depicting the 3D orientation (θ, ϕ) of each NR as a line segment. The length and direction of each line indicate in-plane magnitude $(\mu_x^2+\mu_y^2)^{1/2}$ and azimuthal orientation ϕ, respectively. Colors represent azimuthal orientation ϕ. Scale bar: 400 nm FIG. 62E is a set of histograms NR lateral positions r (see FIG. 62A(ii)) relative to the sphere's center within each h slice compared to a model distribution (yellow lines, Eqn. S27), accounting for the curved spherical surface and pixOL's localization precision.

Figures 62F, 62G, 62H:
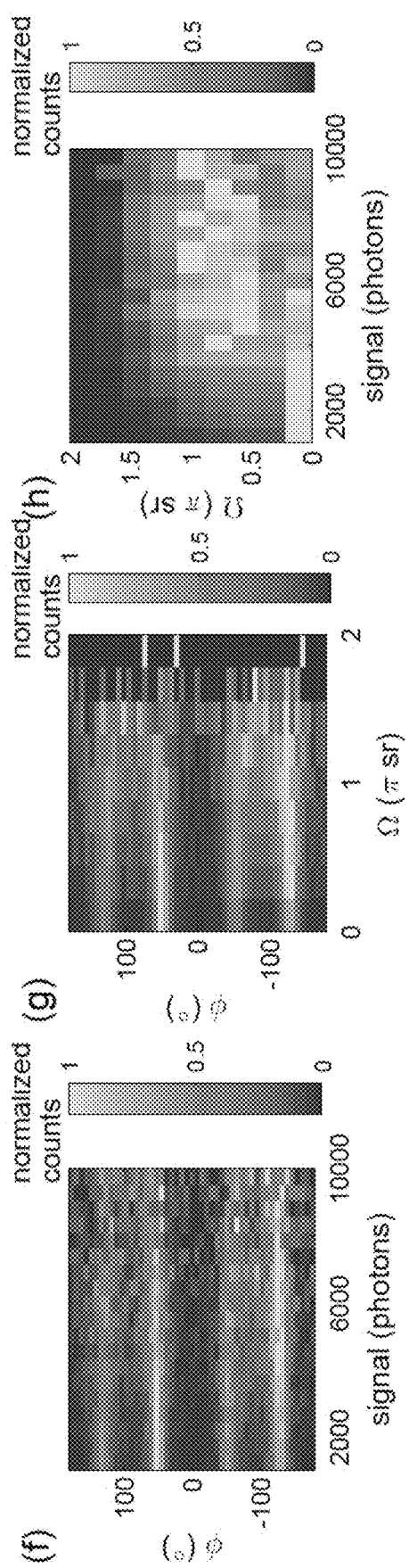

FIG. 62F is an image of NR azimuthal orientations ϕ relative to their signal photons.

FIG. 62G is an image of NR azimuthal orientations ϕ relative to their wobble angles Ω.

FIG. 62H is an image of NR wobble angle Ω relative to their signal photons.

FIG. 63A is a computer algorithm for estimating the 3D orientation and 3D location of individual emitters based on cropped images.

FIG. 63B is a computer algorithm for estimating 3D orientation and 3D location using FISTA with backtracking.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

A defining feature of soft matter is the impact of thermal fluctuations on the organization and self-assembly of molecules into mesoscopic structures like lipid membranes—processes that are notoriously difficult to observe directly. SMOLM extends conventional SMLM to measure both the positions and 3D orientations of >105 single fluorescent molecules with high precision in under 5 minutes. The orientation and rotational dynamics of fluorescent probes reveal their interactions with the surrounding environment, such as the ordering of and condensation dynamics within lipid membranes. Nanoscale imaging spectroscopy measures single-molecule orientation spectra, i.e., the six orientational second moments of dipole emitters, to resolve nanoscale chemical properties, similar to classic spectroscopies such as absorption, fluorescence emission, fluorescence lifetime, and NMR.

Single-molecule orientation localization microscopy, also referred to herein as SMOLM, directly measures the orientation spectra (3D orientation plus "wobble") of lipophilic probes transiently bound to lipid membranes. SMOLM sheds light on the organizational and functional dynamics of lipid-lipid, lipid-protein, and other soft matter assemblies at the single-molecule level with nanoscale resolution.

To achieve high spatiotemporal resolution and sufficient sampling density, the PAINT (points accumulation for imaging in nanoscale topography) blinking mechanism may be applied, in which certain lipophilic dyes exhibit fluorescence solely while in a non-polar environment. We thereby resolve nanoscale lipid domains with resolution beyond the diffraction limit and monitor in-situ lipid compositional changes induced by low doses of sphingomyelinase. SMOLM imaging clearly shows its potential to resolve interactions between various lipid molecules, enzymes, and fluorescent probes with detail that has never been achieved previously. SMOLM imaging makes use of an orientation-sensitive engineered dipole spread function (DSF) to efficiently encode the 3D orientation and wobble of dipole-like emitters into fluorescence images, as well as a maximum likelihood estimator that promotes sparsity for estimating molecular position, orientation, and wobble from those images robustly and accurately. This combination of hardware and software is critical for resolving molecular positions and orientations unambiguously and accurately; otherwise, neighboring molecules, wobbling molecules, and translationally diffusing molecules could be confused with one another.

Figure 2:
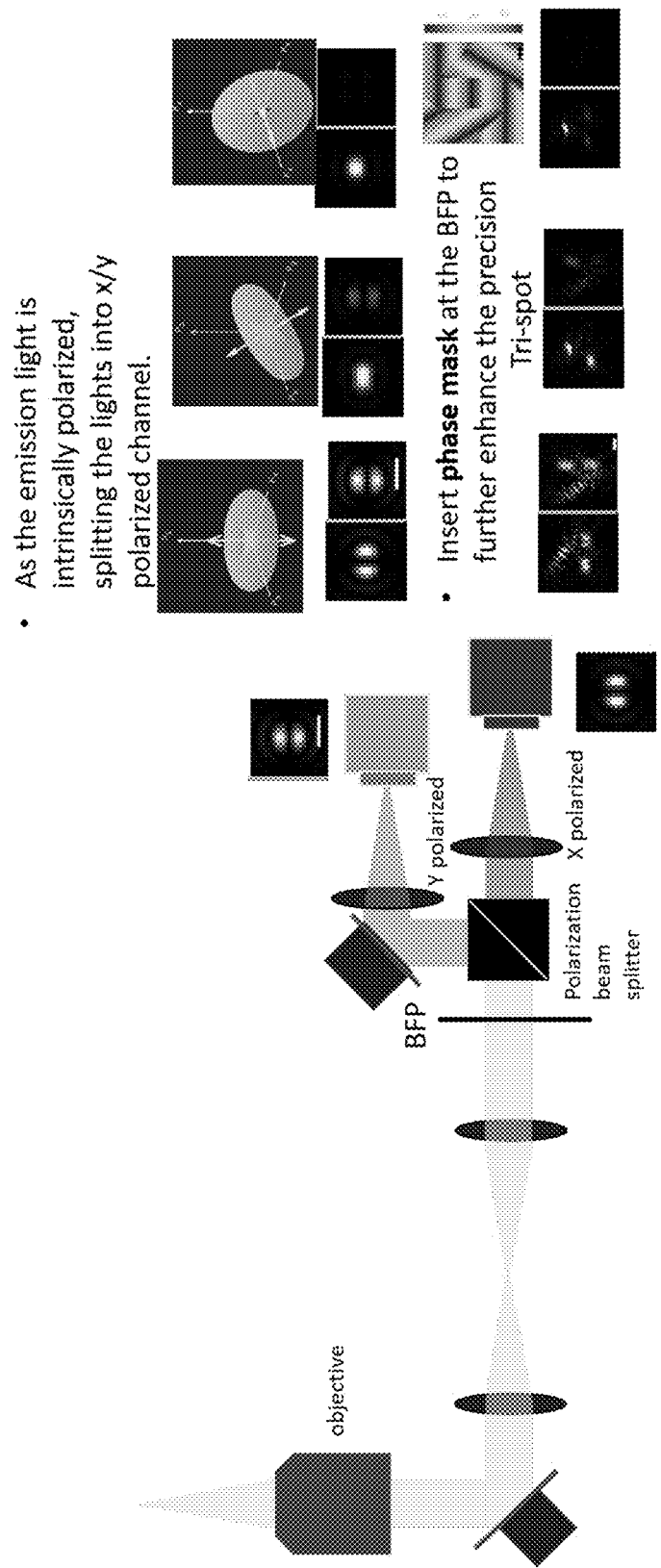
FIG. 2 is a schematic drawing illustrating a single molecule microscopy system with a phase mask inserted at the back focal plane (BFP).

To improve imaging sensitivity, DSF engineering makes use of a phase mask at the back focal plane of a microscope to modulate the detected DSFs of each emitter (see FIG. 2). Applications that have a low signal-to-noise ratio (SNR) or densely labeled samples pose challenges to existing multi-spot DSFs. It is desirable to optimize a DSF for a specific sample of interest to achieve optimal imaging performance.

In various aspects, an algorithm, termed pixOL, simultaneously optimizes all pixels of a phase mask across two orthogonally polarized imaging channels for applications with a low SNR. Unlike optimization using Zernike polynomial, pixOL can directly take advantage of super-critical fluorescence arising from imaging SMs near a refractive index interface. Using the resulting phase mask provides for simultaneous measurement of 3D orientation and 3D location of an emitter with small statistical variance. The parameters in the pixOL algorithm may be varied to optimize a phase mask to fit a range of microscopes and imaging applications.

As described in the example below, the pixOL DSF may be used to measure the orientation of Nile red (NR) molecules transiently attached to two supported lipid bilayers (SLBs): DPPC (di(16:0) PC) and DPPC with cholesterol. The orientations of NR measured by the pixOL DSF reveal the chemical compositions of the SLBs.

Localization and Orientation Estimation of SMOLM

Imaging Model and Pixol Algorithm

In one aspect, the goal of the pixOL algorithm is to simultaneously optimize all pixels of a phase mask $P \in R^{n \times n}$ so that the resulting dipole-spread function (DSF) has optimal precision for measuring the 3D orientation $[\mu_x, \mu_y, \mu_z, \Omega]$ of dipole-like emitters. The dipole's average orientation ($\theta$, $\phi$) in spherical coordinates during a camera frame can be related to its unit vector parameterization $\mu=[\mu_x, \mu_y, \mu_z]^T$ in Cartesian space by $$[\mu_x, \mu_y, \mu_z] = [\sin\theta\cos\phi, \sin\theta\sin\phi, \cos\theta]. \quad (S1)$$

A wobbling dipole with the orientation parameters $[\mu_x, \mu_y, \mu_z, \Omega]$, where the solid angle $\Omega$ characterizes rotational diffusion within a hard-edged cone, may be characterized using the six orientational second moments $m \in R^6$ as $$m = \langle\mu_x^2\rangle, \langle\mu_y^2\rangle, \langle\mu_z^2\rangle, \langle\mu_x\mu_y\rangle, \langle\mu_x\mu_z\rangle, \langle\mu_y\mu_z\rangle^T \quad (S2)$$

where $$\langle\mu_x^2\rangle = \gamma\mu_x^2 + (1-\gamma)/3, \quad (S3a)$$

$$\langle\mu_y^2\rangle = \gamma\mu_y^2 + (1-\gamma)/3, \quad (S3b)$$

$$\langle\mu_z^2\rangle = \gamma\mu_z^2 + (1-\gamma)/3, \quad (S3c)$$

$$\langle\mu_x\mu_y\rangle = \gamma\mu_x\mu_y, \quad (S3d)$$

$$\langle\mu_x\mu_z\rangle = \gamma\mu_x\mu_z, \quad (S3e)$$

$$\langle\mu_y\mu_z\rangle = \gamma\mu_y\mu_z, \quad (S3f)$$

$$\gamma = 1 - 3\Omega/4\pi + \Omega^2/8\pi^2. \quad (S3g)$$

Figure 26A:
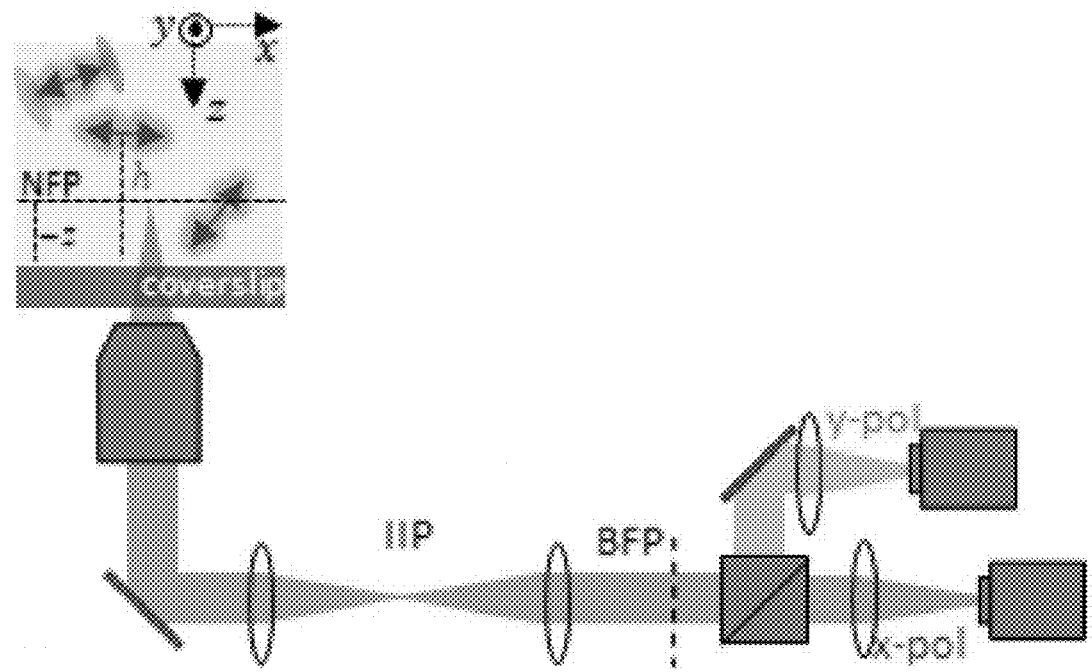
FIG. 26A is a pixOL phase mask imaging system schematic. A microscope objective is focused at a nominal focal plane (NFP) (dotted black line) within water at a distance −z above (+z below) the coverslip (z=0). The objective collects fluorescence photons from emitters at various locations (x,y,h). A polarization-sensitive 4f system, comprising 3 lenses and a polarizing beam splitter (PBS), is added after the microscope's intermediate image plane (IIP) to enable the placement of the pixOL optimized phase mask at the back focal plane (BFP). (MDL: move dashed line to be exactly halfway between two 4f lenses.) Two cameras (or two regions of a single cam-era) capture x-polarized (red) and y-polarized (cyan) light.

In some embodiments, the phase mask can be optimized for a microscope that splits the collected fluorescence into x- and y-polarized channels (FIG. 26A). To model such a system, the x- and y-polarized electric field $E_{BFP}$ at the back focal plane (BFP) can be written as $$E_{BFP}(u,v) = \exp\left(jk_1z\sqrt{1-(u^2+v^2)}\right)\exp\left(jk_hh\sqrt{1-\frac{n_1^2}{n_h^2}(u^2+v^2)}\right) \quad (S4)$$

$$\begin{bmatrix} g_{x,BFP}^{(x)}(u,v) & g_{y,BFP}^{(x)}(u,v) & g_{z,BFP}^{(x)}(u,v) \\ g_{x,BFP}^{(y)}(u,v) & g_{y,BFP}^{(y)}(u,v) & g_{z,BFP}^{(y)}(u,v) \end{bmatrix} \begin{bmatrix} \mu_x \\ \mu_y \\ \mu_x \end{bmatrix},$$

Where $g_{i,BFP}^{(l)}$ are the basis fields observed in an i-polarized BFP from a dipole at axial position h with orientation $\mu_i$ and i, $l \in \{x, y, z\}$. The objective can be focused at a nominal focal plane positioned at a distance $-z$ above the coverslip. The wavenumber $k_h = nh2\pi/\lambda$ represents the wave propagation constant in a sample with refractive index of $n_h$ (assumed to be water in each of our experiments, $n_h=1.33$), and the wavenumber $k_1 = n_1 2\pi/\lambda$ represents the wave propagation constant in immersion oil with refractive index of n1=1.518. The BFP coordinates can be normalized such that $u^2+v^2<1$. To optimize both axial precision and orientation precision across a large axial range, the trade-offs between the multi-parameter optimization goals must be balanced. In a particular embodiment, the pixOL phase mask is optimized for in-focus emitters at the water-glass interface (z=h=0 nm).

For computational convenience, a discrete model $g_i$ of the basis fields can be used, sampling the BFP with sufficient pixels and zero-padding to match the spatial light modulator (SLM) of the imaging system. The polarized basis fields $[g_i^{(x)}, g_i^{(y)}]^T$ can be concatenated at the image plane of the microscope and express them jointly as $$g_i = \begin{bmatrix} g_i^{(x)} \\ g_i^{(y)} \end{bmatrix} = \mathcal{F}\left\{\begin{bmatrix} \exp(jP) \\ \exp(jP) \end{bmatrix} \odot \begin{bmatrix} g_{i,BFP}^{(x)} \\ g_{i,BFP}^{(y)} \end{bmatrix}\right\}, \quad (S5)$$

where $F\{\cdot\}$ denotes a discrete 2D Fourier transform, $\odot$ represents element-wise multiplication of two vectors or matrices. The basis images $B=[B_{xx}, B_{yy}, B_{zz}, B_{xy}, B_{xz}, B_{yz}] \in R^{N \times 6}$ in the image plane can be calculated as $$B_{xx} = g_x \odot g_x^* \quad (S6a)$$

$$B_{yy} = g_y \odot g_y^* \quad (S6b)$$

$$B_{zz} = g_z \odot g_z^* \quad (S6c)$$

$$B_{xy} = g_x \odot g_y^* + g_x^* \odot g_y \quad (S6d)$$

$$B_{xz} = g_x \odot g_z^* + g_x^* \odot g_z \quad (S6e)$$

$$B_{yz} = g_y \odot g_z^* + g_y^* \odot g_z. \quad (S6f)$$

Figure 31:
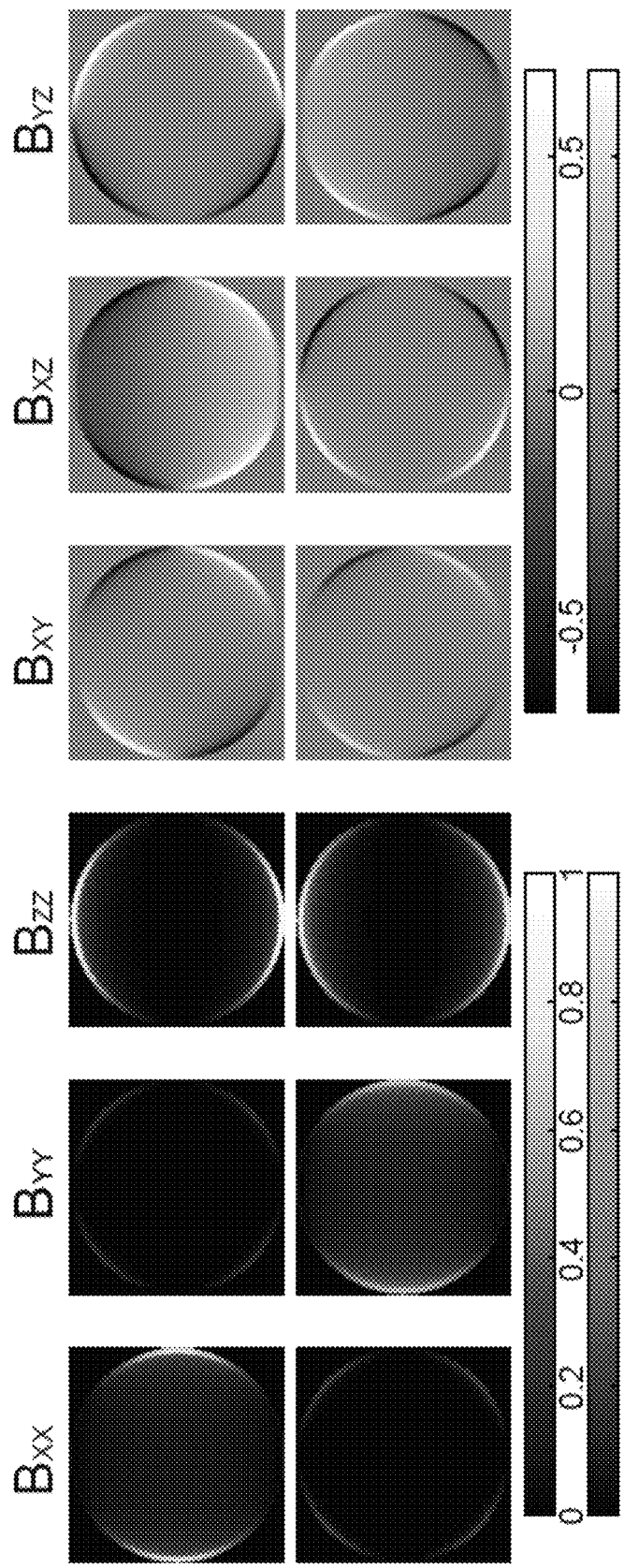
FIG. 31 is a set of basis images $B_{BFP}$ at the back-focal plane (BFP) of an x-y polarized microscope (red: x-polarized, blue: y-polarized, FIG. 26A). The radius of the circular support in the BFP corresponds to the finite numerical aperture of the microscope's objective lens. The image intensities are normalized relative to the brightest basis image ($B_{XX}$). Colorbars: normalized intensity.
Figures 32A, 32B, 32C:
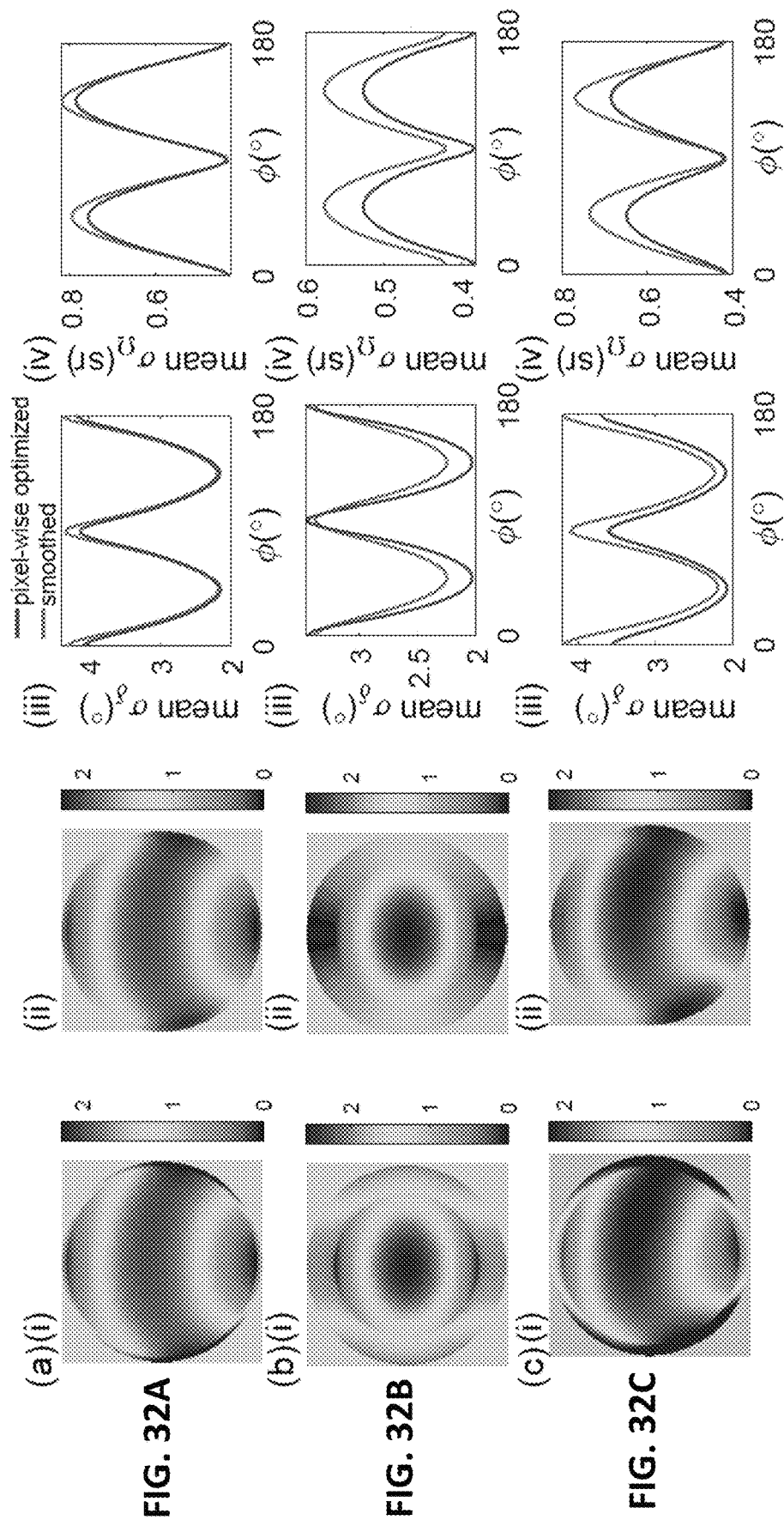
FIG. 32A is a set of panels where (i) Pixel-based optimization for emitters located at the interface between a glass and water (refractive index=1.33). The masks are optimized for an objective with a numerical aperture of 1.4, (ii) The super-critical regions of the masks in (i) are smoothed using phase values from the sub-critical regions. (iii) Mean angular standard deviation $\sigma_\delta$ and (iv) mean wobbling angle precision $\sigma_\Omega$ averaged over all $\theta$ for emitters with 380 signal photons and 2 background photons per pixel.
FIG. 32B is a set of panels where (i) Pixel-based optimization for emitters located at the interface between a glass and air (refractive index=1). The masks are optimized for an objective with a numerical aperture of 1.4. (ii) The supercritical regions of the masks in (i) are smoothed using phase values from the sub-critical regions. (iii) Mean angular standard deviation $\sigma_\delta$ and (iv) mean wobbling angle precision $\sigma_\Omega$ averaged over all $\theta$ for emitters with 380 signal photons and 2 background photons per pixel.
FIG. 32C is a set of panels where (i) Pixel-based optimization for emitters located at the interface between a glass and water (refractive index=1.33). The masks are optimized for an objective with a numerical aperture of 1.5. (ii) The super-critical regions of the masks in (i) are smoothed using phase values from the sub-critical regions. (iii) Mean angular standard deviation $\sigma_\delta$ and (iv) mean wobbling angle precision $\sigma_\Omega$ averaged over all $\theta$ for emitters with 380 signal photons and 2 background photons per pixel.
Figures 33A, 33B, 33C:
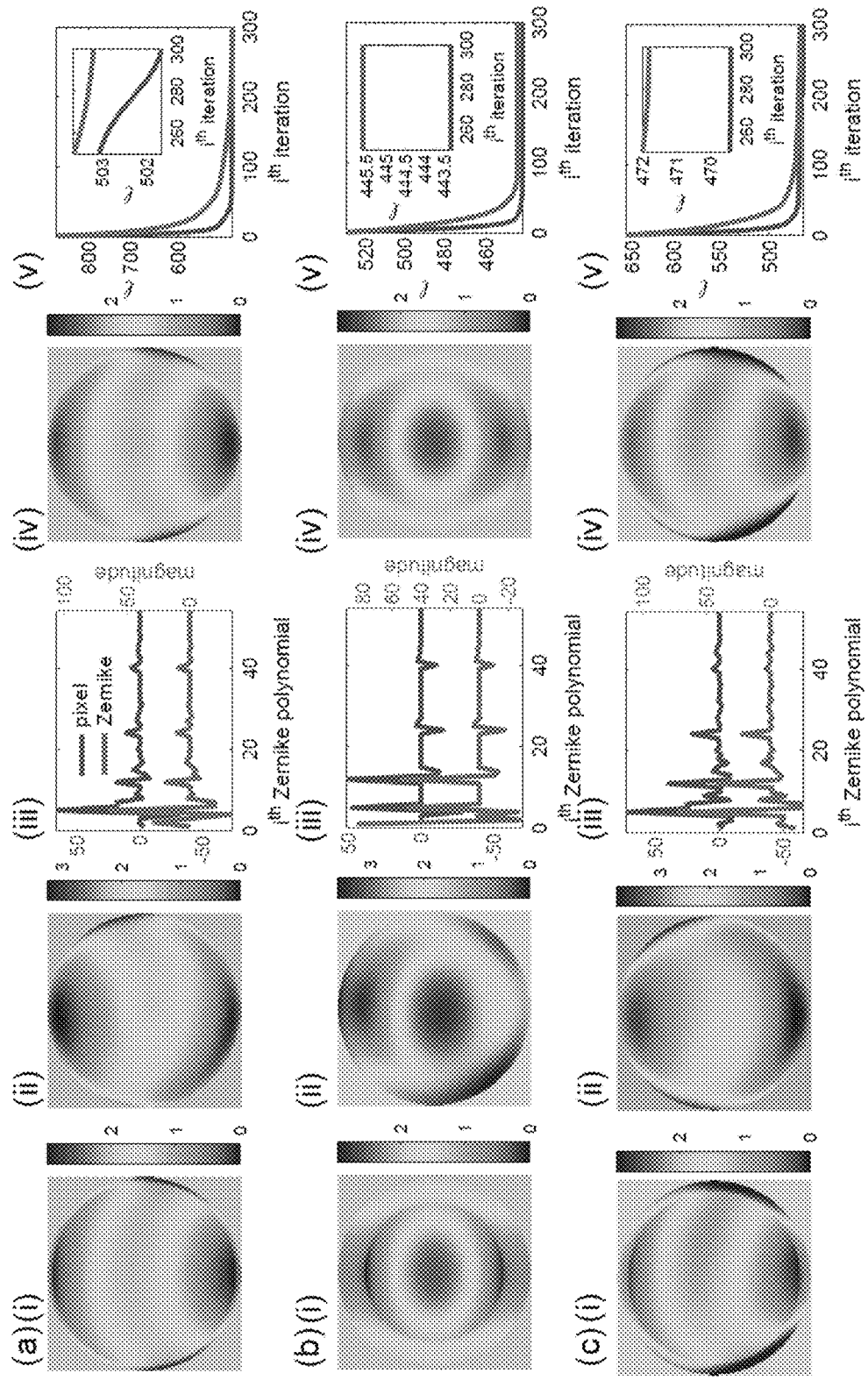
FIG. 33A is a set of panels where (i) Pixel-based optimization and (ii) Zernike polynomial-based optimization for emitters located at the interface between a glass coverslip and water (refractive index=1.33). The masks are optimized for an objective with a numerical aperture of 1.4. (iii) Zernike polynomial decompositions of (blue) the pixel-wise optimized mask in (i) and (orange) the Zernike-optimized mask in (ii). Y axis: magnitude of the ith Zernike polynomial. (iv) Phase mask reconstructed from the Zernike decomposition (blue curve in (iii)) of the pixel-based optimized phase mask in (i) using the first 55 Zernike polynomials. (iv) Optimization loss curves for the (blue) pixel-wise optimized mask in (i) and (orange) the Zernike-optimized mask in (iii). Inset: the loss curves at the last 50 optimization steps. The loss function is calculated using $\ell$ (Eqn. 11) for emitters with a total signal photons of 380 and 2 background photons/pixel.
FIG. 33B is a set of panels where (i) Pixel-based optimization and (ii) Zernike polynomial-based optimization for emitters located at the interface between a glass coverslip and air (refractive index=1). The masks are optimized for an objective with a numerical aperture of 1.4. (iii) Zernike polynomial decompositions of (blue) the pixel-wise optimized mask in (i) and (orange) the Zernike-optimized mask in (ii). Y axis: magnitude of the ith Zernike polynomial. (iv) Phase mask reconstructed from the Zernike decomposition (blue curve in (iii)) of the pixel-wise optimized phase mask in (i) using the first 55 Zernike polynomials. (iv) Optimization loss curves for the (blue) pixel-wise optimized mask in (i) and (orange) the Zernike-optimized mask in (iii). Inset: the loss curves at the last 50 optimization steps. The loss function is calculated using l (Eqn. 11) for emitters with a total signal photons of 380 and 2 background photons/pixel.
FIG. 33C is a set of panels where (i) Pixel-based optimization and (ii) Zernike polynomial-based optimization for emitters located at the interface between a glass coverslip and water (refractive index=1.33). The masks are optimized for an objective with a numerical aperture of 1.5. (iii) Zernike polynomial decompositions of (blue) the pixel-wise optimized mask in (i) and (orange) the Zernike-optimized mask in (ii). Y axis: magnitude of the ith Zernike polynomial. (iv) Phase mask reconstructed from the Zernike decomposition (blue curve in (iii)) of the pixel based optimized phase mask in (i) using the first 55 Zernike polynomials. (iv) Optimization loss curves for the (blue) pixel-wise optimized mask in (i) and (orange) the Zernike-optimized mask in (iii). Inset: the loss curves at the last 50 optimization steps. The loss function is calculated using $\ell$ (Eqn. 11) for emitters with a total signal photons of 380 and 2 background photons/pixel.
Figure 34:
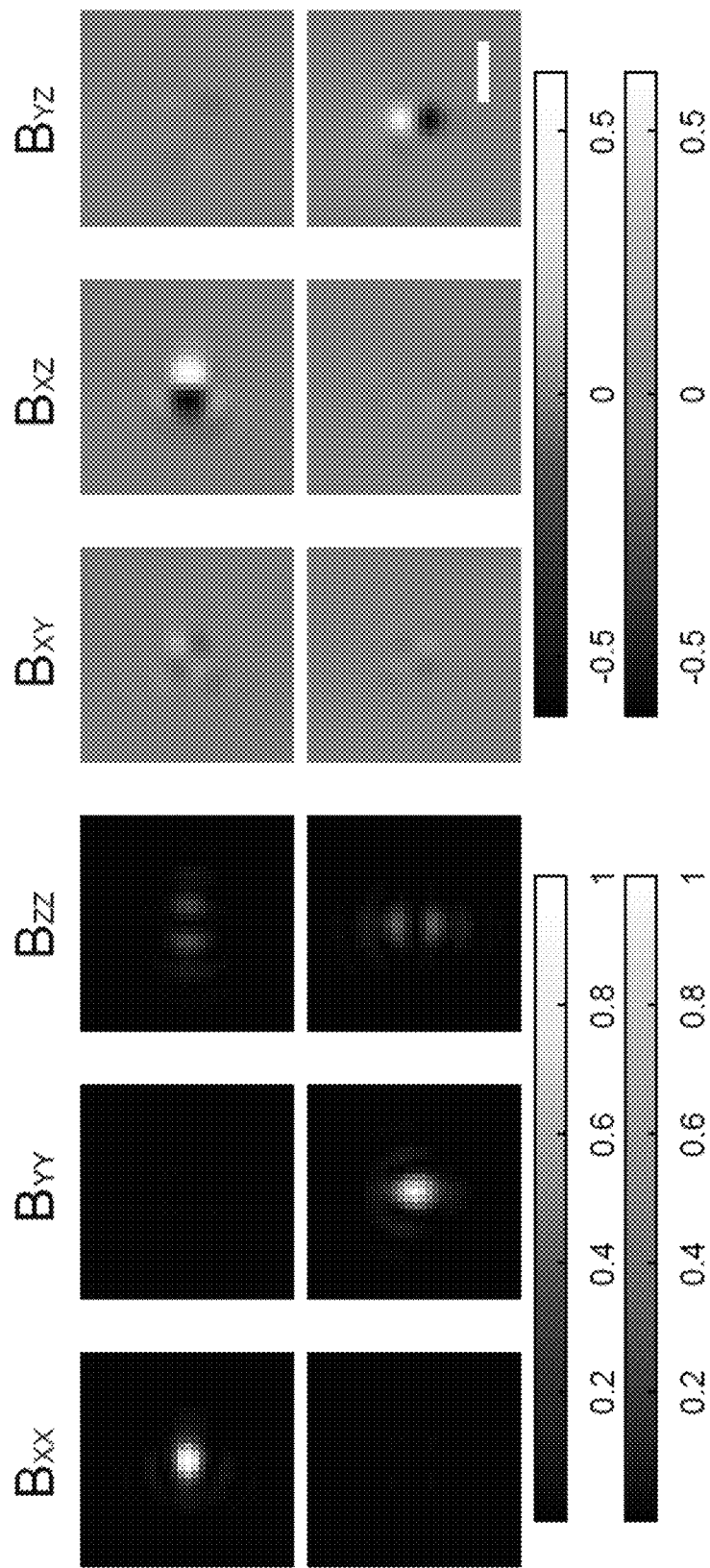
FIG. 34 is a set of image plane basis images B corresponding to the polarization-sensitive imaging system (red: x-polarized, blue: y-polarized) and pixOL phase mask for an in-focus emitter. The image intensities are normalized relative to the brightest basis image ($B_{xx}$). Colorbars: normalized intensity. Scalebar: 500 nm.
Figure 35A:
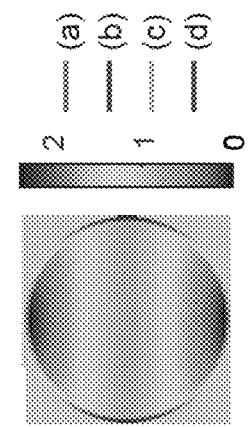
FIG. 35A is a Phase mask optimized for emitters with SBR of 380:10, Colorbar: phase (rad).
Figure 35B:
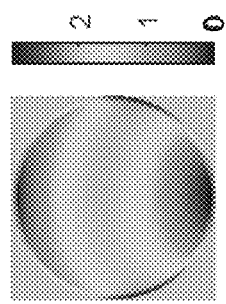
FIG. 35B is a Phase mask optimized for emitters with SBR of 380:2. Colorbar: phase (rad).
Figure 35C:
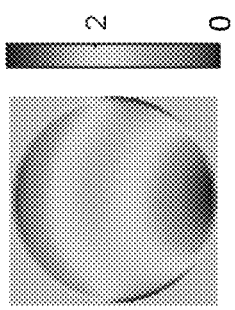
FIG. 35C is a Phase mask optimized for emitters with SBR of 3800:10. Colorbar: phase (rad).
Figure 35D:
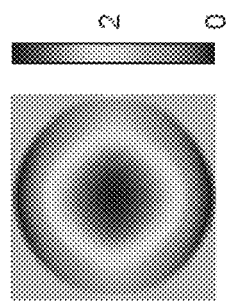
FIG. 35D is a Phase mask optimized for emitters with SBR of 3800:2. Colorbar: phase (rad).
Figure 36:
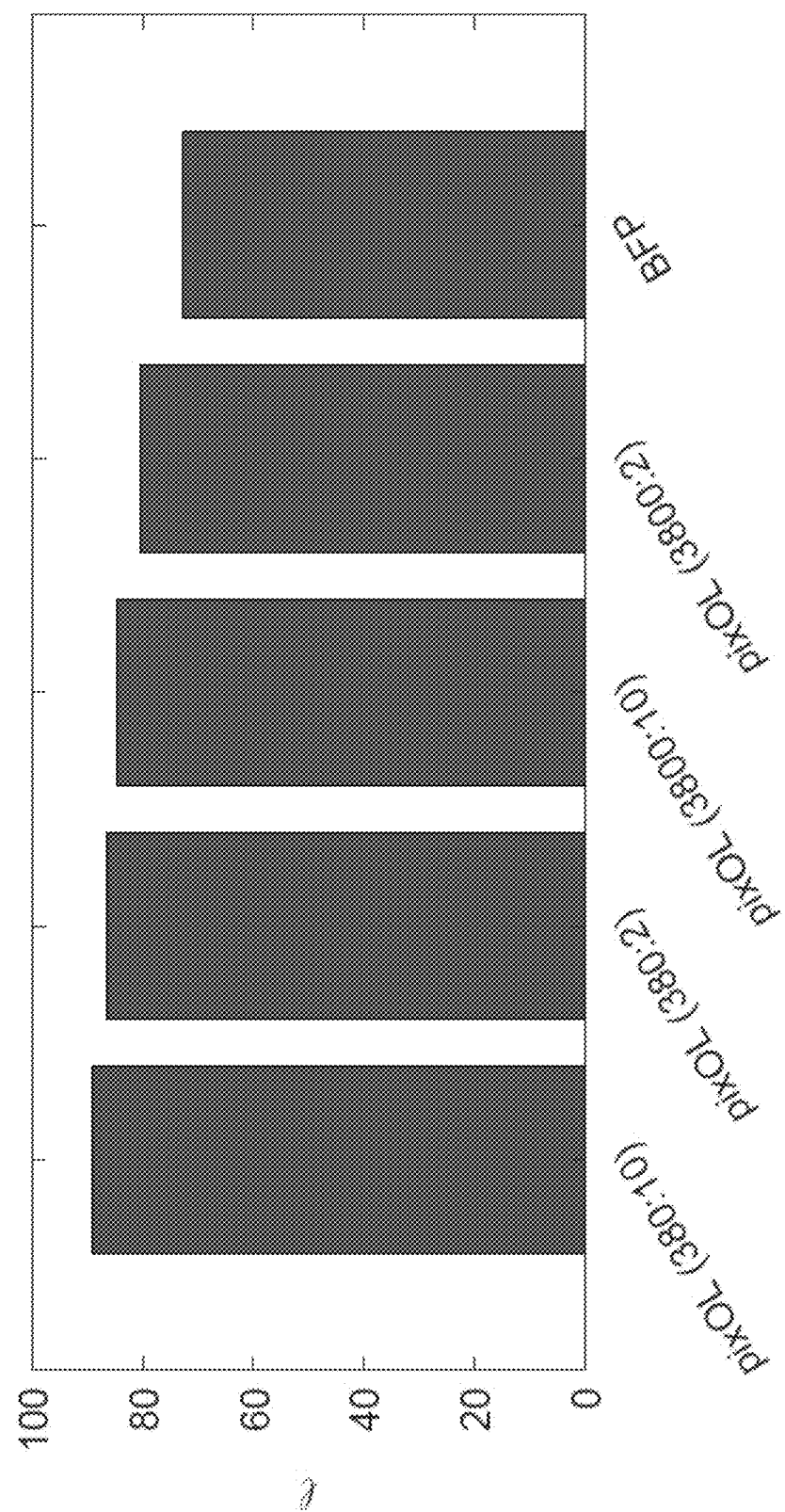
FIG. 36 is a graph of orientation estimation precision of pixOL phase masks compared to direct back focal plane (BFP) imaging, which achieves performance close to the best-case, quantum-limited orientation measurement precision. Four pixOL masks (FIG. 35 A-D) are optimized for emitters at various signal to background ratios (SBRs, signal photons:background photons/pixel): 380:10, 380:2, 380:10, and 3800:2. Orientation precision is calculated using the loss function l (Eqn. 11) for emitters with an SBR of 3800:0.
Figures 37A, 37B, 37C, 37D:
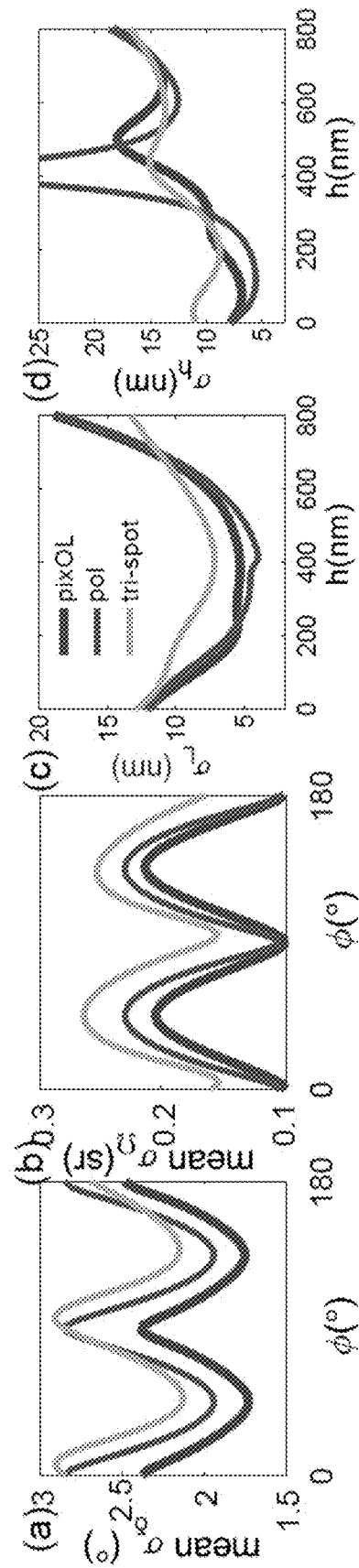
FIG. 37A is a graph of the estimation precision of pixOL compared to techniques designed solely for 3D orientation measurements. Red: pixOL, blue: x-y polarized standard DSF (pol) defocused at 200 nm above the coverslip, yellow: tri-spot. Mean angular standard deviation $\sigma_\delta$ (MASD) averaged uniformly over all $\theta$. MASD quantifies the combined precision of measuring $\theta$ and $\phi$ as the half-angle of a cone representing orientation uncertainty (Eqn. S23). MASD is calculated for in-focus SMs with fixed orientation ($\Omega$=0 sr). Emitters are immersed in water (1.33 refractive index) with 2500 signal photons and 3 background photons per pixel.
FIG. 37B is a graph of the estimation precision of pixOL compared to techniques designed solely for 3D orientation measurements. Red: pixOL, blue: x-y polarized standard DSF (pol) defocused at 200 nm above the coverslip, yellow: tri-spot. Mean wobble angle precision $\sigma\Omega$ averaged uniformly over all $\theta$.
FIG. 37C is a graph of the estimation precision of pixOL compared to techniques designed solely for 3D orientation measurements. Red: pixOL, blue: x-y polarized standard DSF (pol) defocused at 200 nm above the coverslip, yellow: tri-spot. Localization precisions $\sigma_L$ lateral position. Localization precisions are for isotropic emitters ($\Omega$=2$\pi$ sr). Emitters are immersed in water (1.33 refractive index) with 2500 signal photons and 3 background photons per pixel.
FIG. 37D is a graph of the estimation precision of pixOL compared to techniques designed solely for 3D orientation measurements. Red: pixOL, blue: x-y polarized standard DSF (pol) defocused at 200 nm above the coverslip, yellow: tri-spot. Localization precisions $\sigma_h$ for measuring axial location h above the interface. Localization precisions are for isotropic emitters ($\Omega$=2$\pi$ sr). Emitters are immersed in water (1.33 refractive index) with 2500 signal photons and 3 background photons per pixel.
Figures 38A, 38B:
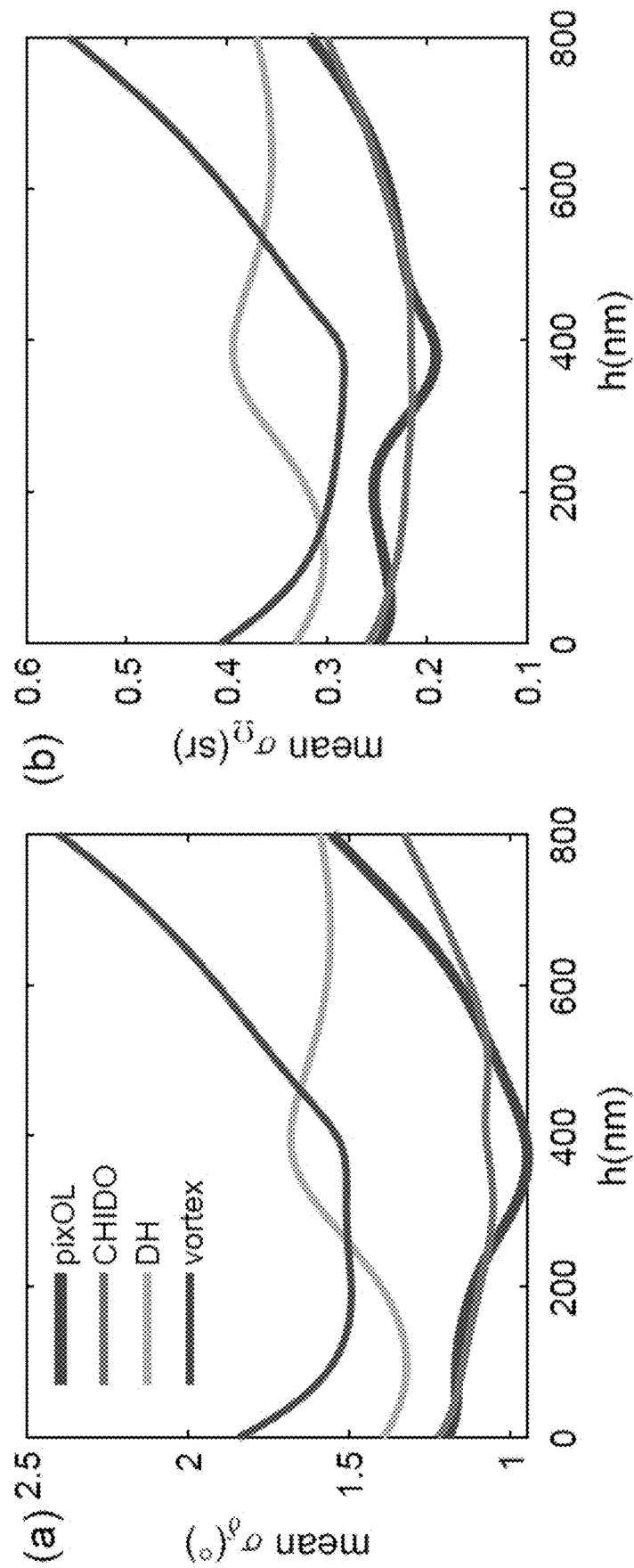
FIG. 38A is a graph of the orientation estimation precision of pixOL for emitters at various axial locations h compared to techniques designed for 3D orientation and 3D position measurements. Red: pixOL, grey: CHIDO, yellow: double helix (DH), purple: unpolarized vortex. Mean angular standard deviation $\sigma_\delta$ (MASD) averaged uniformly over all $\theta$ and $\phi$. MASD quantifies the combined precision of measuring $\theta$ and $\phi$ as the half-angle of a cone representing orientation uncertainty (Eqn. S23)
FIG. 38B is a graph of the orientation estimation precision of pixOL for emitters at various axial locations h compared to techniques designed for 3D orientation and 3D position measurements. Red: pixOL, grey: CHIDO, yellow: double helix (DH), purple: unpolarized vortex. Mean wobble angle precision $\sigma_\Omega$ averaged uniformly over all $\theta$ and $\phi$. Emitters have fixed orientations ($\Omega$=0 sr), and are immersed in water (1.33 refractive index) with 2500 signal photons and 3 background photons per pixel.

These images $B_{il}$ correspond to the DSF (Eqn. 1) produced by a dipole with an orientational second moment $m_{il}$, where i,l $\in \{x, y, z\}$. A similar expression can be derived for the basis images $B_{BFP}$ in the back focal plane (FIG. 31).

In some embodiments, the best possible precision for estimating the orientational moments m can be calculated using the Cramér-Rao bound (CRB) matrix K using $$K = \left(\sum_{j=1}^{N} \frac{s^2}{I_j} B_j^T B_j\right)^{-1}, \quad (S7)$$

where $B_j \in R^{1 \times 6}$ is the jth row of B, the superscript T denotes a matrix transpose.

In various aspects, the pixOL method and SMOLM imaging methods make use of an emitter model characterizing the physical and optical properties of the emitters to be imaged using the SMOLM system as described herein. In various aspects, the emitter model may be representative of any suitable emitter type including, but not limited to, a dipole-like emitter, as described below.

Figure 1:
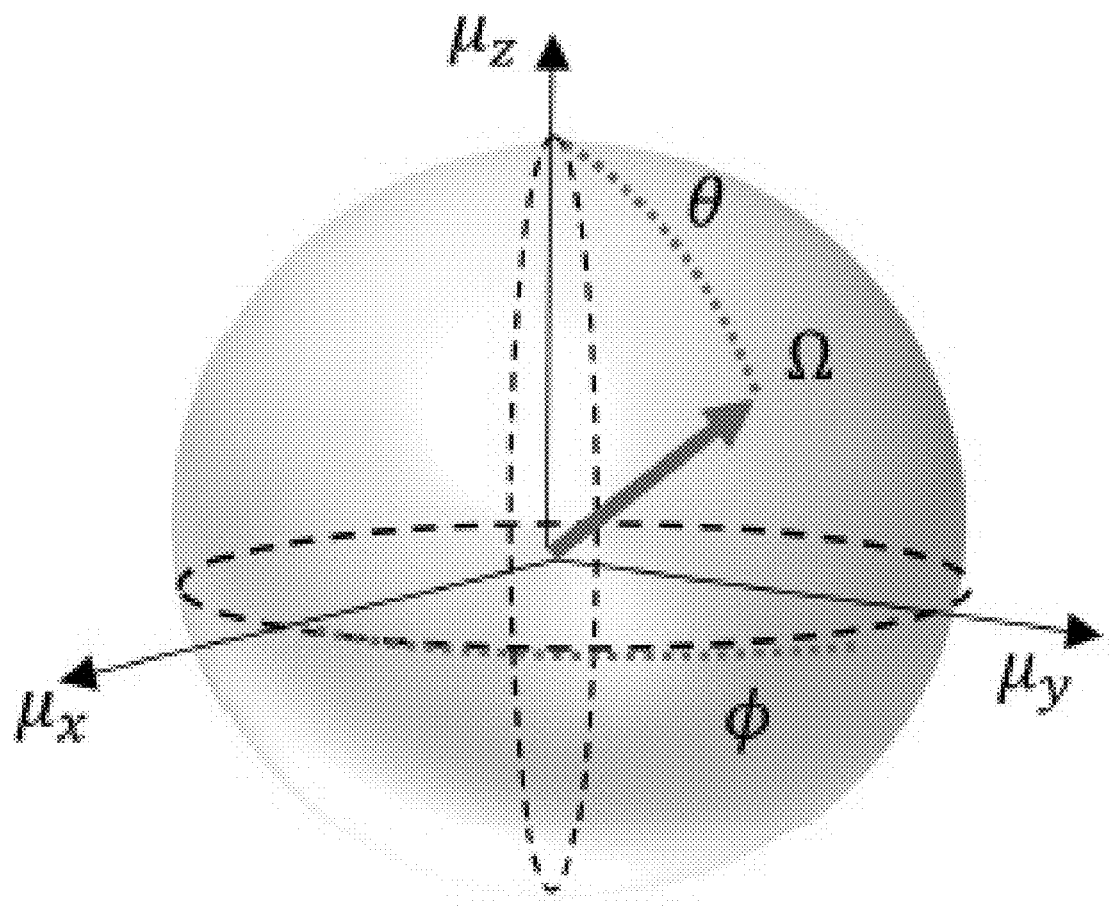
FIG. 1 is a schematic drawing illustrating a dipole emitter representation of a light-emitting molecule.

In various aspects, a marker model typically used in SMOLM imaging including, but not limited to, a fluorescent molecule may be modeled as a dipole-like emitter wobbling within a cone (see FIG. 1). An orientational unit vector $\mu=[\mu_x, \mu_y, \mu z]=[\sin \theta \cos \phi, \sin \theta \sin \phi, \cos \theta]^T$ and a solid angle $\Omega$ define the center orientation and the wobbling area of the cone, respectively. Assuming that a molecule's rotational correlation time is faster than its excited state lifetime and the camera acquisition time, its orientation state can be full characterized by a second-moment vector (see FIG. 4) $m=[\langle\mu_x^2\rangle, \langle\mu_y^2\rangle, \langle\mu_z^2\rangle, \langle\mu_x\mu_y\rangle, \langle\mu_x\mu_z\rangle, \langle\mu_y\mu_z\rangle,]^T$ where each component is a time-averaged second moment of $\mu$ within a single camera acquisition period. A fluorescence microscope image of such an emitter captured by an n-pixel camera $I\in \mathbb{R}^n$, can be modeled as a linear superposition of six basis images weighted by m as follows:

$$I=sBm+b=s[B_{xx}, B_{yy}, B_{zz}, B_{xy}, B_{xz}, B_{yz}]m+b, \quad (1)$$

where s is the number of photons detected from the molecule and b is the number of background photons in each pixel. Referring to FIG. 3, each basis image $B_k \in \mathbb{R}^n$ ($k \in \{xx, yy, zz, xy, xz, yz\}$) corresponds to the response of the optical system to each orientational second-moment component $m_k$ and can be calculated by the vectorial diffraction theory.

Single-Molecule Detection and 3D Orientation and 3D Position Estimation

Detecting single molecules (SMs) and estimating their 3D positions and orientations (6 second moments m) can be computationally expensive and non-convex. In some embodiments, these challenges can be overcome by 1) applying a linear approximation to the forward imaging model and 2) separating the detection and estimation process into sequential steps.

In some embodiments, the forward model (Eqn. 1) can be extended to accommodate images containing Q≥1 SMs such that $$I = \sum_q s_q B(x_q, y_q) m_q + b, \quad (S9)$$

where $s_q$ is the brightness in photons, $[x_q, y_q, h_q]$ is the 3D location, and $m_q$ is the orientational second moment vector of the qth emitter.

Figure 39:
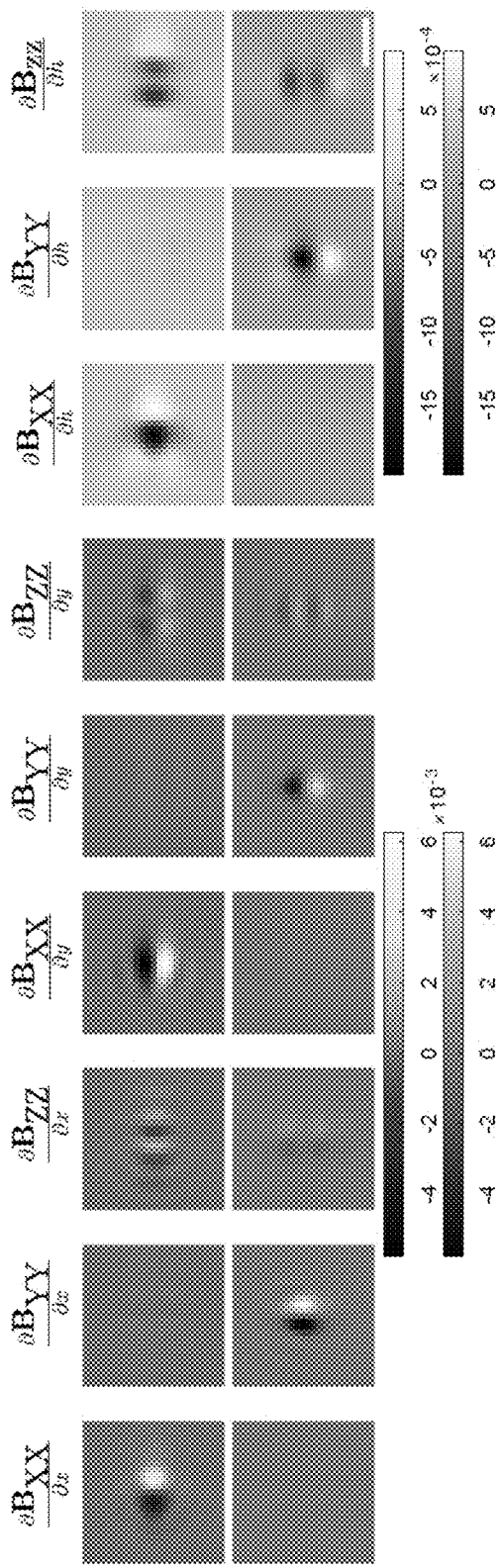
FIG. 39 is a set of images of partial derivatives of the first three basis images ($B_{XX}$, $B_{YY}$, $B_{ZZ}$) in FIG. 34 with respect to 3D position [x, y, h]. Colorbars: photons/nm. Scalebar: 500 nm.
Figures 40A, 40B, 40C:
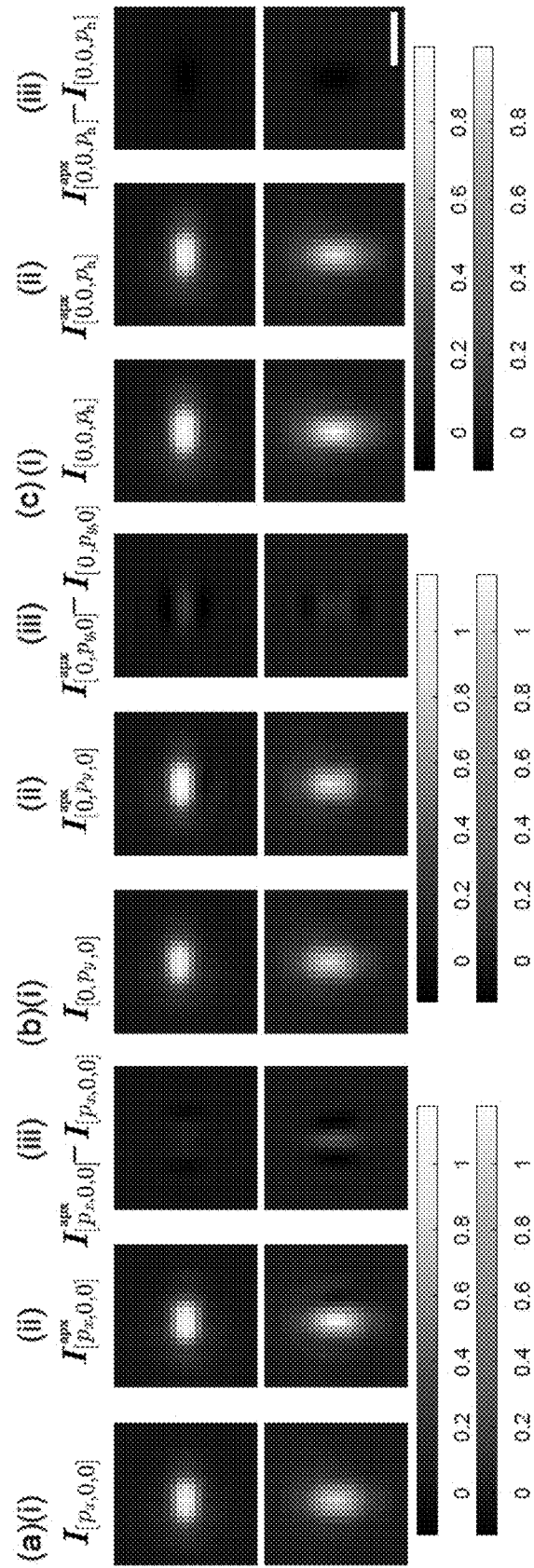
FIG. 40A is a set of images showing the accuracy of the first-order approximation of the pixOL DSF. (i) Images I of the pixOL DSF using a fully accurate model for isotropic emitters located at [0, 0, $p_x$]. The grid spacing is given by [$p_x$=58.5, $p_y$=58.5, $p_h$=50] nm along x, y, and h. (ii) Images $I_{apx}$ of the pixOL DSF using a first-order polynomial approximation (Eqn. S11). The first-order approximation is evaluated relative to the origin [$x_0$=0, $y_0$=0, $h_0$=0]. (iii) Difference between I and $I_{apx}$. Images in each panel are normalized relative to the accurate pixOL DSF I. Scalebar: 500 nm.
FIG. 40B is a set of images showing accuracy of the first-order approximation of the pixOL DSF. (i) Images I of the pixOL DSF using a fully accurate model for isotropic emitters located at [0, $p_y$, 0]. The grid spacing is given by [$p_x$=58.5, $p_y$=58.5, $p_h$=50] nm along x, y, and h. (ii) Images $I_{apx}$ of the pixOL DSF using a first-order polynomial approximation (Eqn. S11). The first-order approximation is evaluated relative to the origin [$x_0$=0, $y_0$=0, $h_0$=0]. (iii) Difference between I and $I_{apx}$. Images in each panel are normalized relative to the accurate pixOL DSF I. Scalebar: 500 nm.
FIG. 40C is a set of images showing accuracy of the first-order approximation of the pixOL DSF. (i) Images I of the pixOL DSF using a fully accurate model for isotropic emitters located at [0, 0, $p_h$]. The grid spacing is given by [$p_x$=58.5, $p_y$=58.5, $p_h$=50] nm along x, y, and h. (ii) Images $I_{apx}$ of the pixOL DSF using a first-order polynomial approximation (Eqn. S11). The first-order approximation is evaluated relative to the origin [$x_0$=0, $y_0$=0, $h_0$=0]. (iii) Difference between I and $I_{apx}$. Images in each panel are normalized relative to the accurate pixOL DSF I. Scalebar: 500 nm.

In some embodiments, the basis images B change shape for SMs at different axial locations, but only shifts linearly for SMs at different lateral positions. To reduce the computational burden of 3D localization, the continuous 3D location space can be discretized using a first-order polynomial approximation. The imaging model becomes $$I = \sum_q \left[ s_q B(x_{q0}, y_{q0}, h_{q0}) m_q + s_q \frac{\partial B(x_{q0}, y_{q0}, h_{q0})}{\partial x} m_q dx_q \right.$$
$$\left. s_q \frac{\partial B(x_{q0}, y_{q0}, h_{q0})}{\partial y} m_q dy_q + s_q \frac{\partial(x_{q0}, y_{q0}, h_{q0})}{\partial h} m_q dh_q \right] + b, \quad (S10)$$

where $[x_{q0}, y_{q0}, h_{q0}]$ is the closest discrete grid point to the continuous location $[x_q, y_q, h_q]$. The off-grid distances $[dx_q, dy_q, dh_q]=[x_q, y_q, h_q]-[x_{q0}, y_{q0}, h_{q0}]$ characterize the difference between the true position and the closest grid point. As the last three columns (i.e., images) of the basis matrix B have a total energy of zero (FIG. 35), the forward model can be further simplified by excluding these last three images in the first-order approximation. The forward model becomes $$I = \sum_q A_q \zeta_q + b, \quad (S11)$$

where $$A_q = \left[ B(x_{q0}, y_{q0}, h_{q0}), \frac{\partial B^o(x_{q0}, y_{q0}, h_{q0})}{\partial x}, \right. \quad (S12a)$$
$$\left. \frac{\partial B^o(x_{q0}, y_{q0}, h_{q0})}{\partial y}, \frac{\partial B^o(x_{q0}, y_{q0}, h_{q0})}{\partial h} \right],$$

$$\zeta_q = \left[ s_q m_q^T, s_q (m_q^o)^T dx_q, s_q (m_q^o)^T dy_q, s_q (m_q^o)^T dh_q \right]^T, \quad (S12b)$$

and the basis matrix $B_o$ excludes the last three basis images (FIG. 39) and the second moment vector $m_{oq}$ excludes the last three elements. Importantly, the matrix $A_q$ may be precomputed for a specific imaging system and choice of location grid, while $\zeta_q$ contains the molecular brightness, orientation, and position information to be estimated. In a particular embodiment, the grid spacing can be set to $[p_x=58.5, p_y=58.5, p_h=50]$ nm along the x, y, and h directions. With this grid size, the approximated pixOL DSF can be very similar to that using a fully accurate model (FIG. 40). The chosen grid size balances computational speed and accuracy; in other embodiments, approximation errors can be reduced by using smaller grid sizes at the cost of computational burden. In these embodiments, the 3D orientation and 3D position estimation problem can be simplified using a linear forward model (Eqn. S11) involving only 15 elements in $\zeta_q$ for each emitter, i.e., 6 brightness-weighted second moments at each spatial grid point plus 3 brightness- and moment-weighted first-order distances for each off-grid direction. In other embodiments, the original first-order approximation model in Eqn. S10 involves 24 parameters for each SM.

In some embodiments, detection and estimation can be performed as separate tasks involving three main parts. In these embodiments, determining the number of emitters and their 2D locations within an image. In the second step, an initial estimate of an emitter's 3D orientation and 3D position is obtained based on cropped images centered at each detected SM. Finally, the algorithm updates the estimates of all emitters simultaneously using the entire image.

In some embodiments, to simplify the detection process, the axial dimension can be ignored and a 2D forward model is used $$I^{2D} = \sum_q \zeta_q^{2D} A_q^{2D} + b, \quad (S13)$$

where $$A_q^{2D} = \left[ B_a(x_{q0}, y_{q0}), \frac{\partial B_a^o(x_{q0}, y_{q0})}{\partial x}, \frac{\partial B_a^o(x_{q0}, y_{q0})}{\partial y} \right], \quad (S14a)$$

Figure 41:
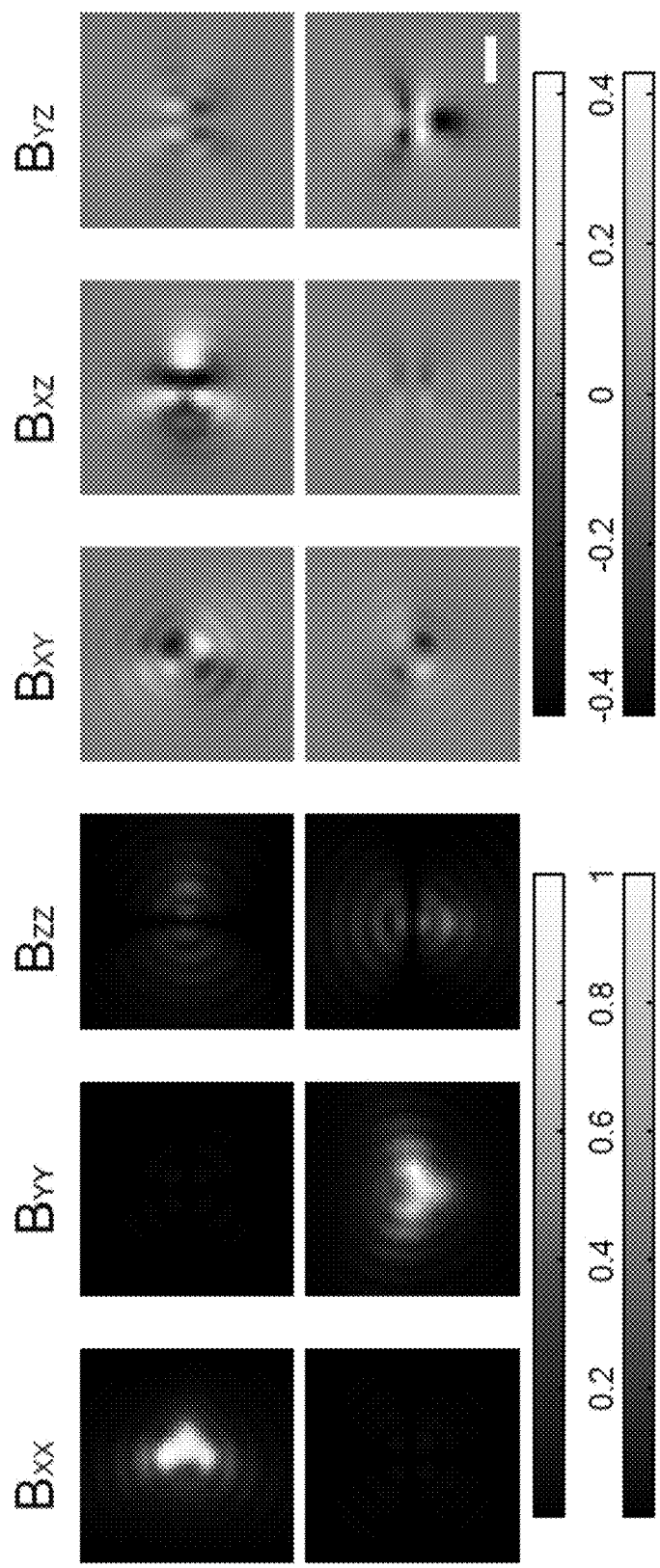
FIG. 41 is a set of average basis images Ba (red: x-polarized, blue: y-polarized) used for detecting single molecules (Eqn. S14c). Basis images for an emitter at h=0 nm and h=900 nm are averaged together. The image intensities are normalized relative to the brightest basis image ($B_{XX}$). Colorbars: normalized intensity. Scalebar: 500 nm.

-continued $$\zeta_q^{2D} = [s_q m_q^T, s_q(m_q^o)^T dx_q, s_q(m_q^o)^T dy_q]^T, \quad \text{(S14b)}$$

$$B_a = (B(x_q, y_q, h_q = 0) + B(x_q, y_q, h_q = 900 \text{ nm}))/2, \quad \text{(S14c)}$$

and $B_a$ is an average basis matrix combining the basis images at the top of the focal volume with the basis images at the bottom axial plane (FIG. 41). A RoSE-O algorithm can be used, which is designed to detect and estimate the 2D locations and 3D orientations of SMs, to determine the number of emitters and an initial estimate of their 2D locations $(x_q, y_q)$.

In some embodiments, the input image to RoSE-O can be concatenated from cropped images collected from the x and y polarization channels. In these embodiments, fluorescent beads can be used to generate a polynomial registration map between the two channels. Then the center of the field of view of interest in the y polarization channel can be manually selected. The corresponding center in the x channel can be calculated using the registration map. Then two images with a small field of view centered at the chosen position within the two polarization channels can be cropped, and the two images can be concatenated together to form a single image. This image can be used by RoSE-O to detect SMs and estimate each of their 2D positions and 3D orientations (FIG. 42).

In the second step, an initial estimate of the 3D orientations and 3D locations of individual emitters can be obtained. For each detected emitter, an image of 21×21 pixels centered at the grid point $(x_{q0}, y_{q0})$ nearest to the estimated 2D location $(x_q, y_q)$ from the first step can be isolated. Using each cropped image $I_{det}$, algorithm 1 in FIG. 63A can estimate the 15 parameters in $\zeta_q$ simultaneously by minimizing the negative log-likelihood for qth emitter $$\ell_{NLL,q} = \sum_{i=1}^{N} [A_q \zeta_q + b - I_{det} \odot \log(A_q \zeta_q + b)]_i. \quad \text{(S15)}$$

where [•]i represents the ith element of a vector. In step 3, the estimated $\zeta q$ for the Q SMs can be combined as the initial value $\zeta_0$. Algorithm 2 in FIG. 63B, based on FISTA, can be used to refine brightness, position, and orientation estimates $\zeta q$ simultaneously for all emitters based on the entire captured image by minimizing the negative log-likelihood for all Q SMs $$\ell_{NLL} = \sum_i^N \left\{ \sum_q (A_q \zeta_q) + b - I_{det} \odot \log\left[\sum_q (A_q \zeta_q) + b\right] \right\}_i. \quad \text{(S16)}$$

The 3D locations $(x_q, y_q, h_q)$ and orientational moments $\hat{m}_q$ of molecule q can be extracted from $\zeta_q$ using $$\hat{s}_q = \sum_{i=1}^{3} \zeta_{q,i}, \quad \text{(S17a)}$$

$$\hat{m}_q = \frac{1}{\hat{s}_q} \zeta_{q,1:6}, \quad \text{(S17b)}$$

$$\hat{x}_q = \hat{x}_{q0} + \frac{\sum_{i=7}^{9} \zeta_{q,i}}{\sum_{i=7}^{3} \zeta_{q,i}}, \quad \text{(S17c)}$$

$$\hat{y}_q = \hat{y}_{q0} + \frac{\sum_{i=10}^{12} \zeta_{q,i}}{\sum_{i=7}^{3} \zeta_{q,i}}, \quad \text{(S17d)}$$

$$\hat{h}_q = \hat{h}_{q0} + \frac{\sum_{i=13}^{15} \zeta_{q,i}}{\sum_{i=7}^{3} \zeta_{q,i}}, \quad \text{(S17e)}$$

where $\zeta_{q,i}$ represents the ith element of vector $\zeta_q$. The estimated second-moment vectors $\hat{m}_q$ are next projected to first-moment orientation space $(\hat{\phi}, \hat{\theta}, \hat{\Omega})$ using a weighted least-square estimator as follows.

$$(\hat{\phi}, \hat{\theta}, \hat{\Omega}) = \underset{\phi', \theta', \Omega'}{\mathrm{argmin}} (\hat{m}_q - m_q(\phi', \theta', \Omega'))^T K^{-1} (\hat{m}_q - m_q(\phi', \theta', \Omega')). \quad \text{(S18)}$$

Note that weighting by a Fisher information matrix $(K^{-1})$ ensures that more weight is given to the second moments $m_i$ for which pixOL demonstrates superior precision.

When estimating $\zeta q$, two sequential projection operations can be used to enhance the convexity and guarantee that the second-moment $\hat{m}_q$ estimates are physically meaningful. The first projection $P_{L1}$ enforces the first three brightness-weighted moments $[\zeta_{q,1}, \zeta_{q,2}, \zeta_{q,3}]$ to be positive. It also ensures that the off-grid distances $[d_{xq}, d_{yq}, d_{hq}]$ are smaller than a threshold t, since a large off-grid distance will reduce the robustness of the first-order polynomial approximation (Eqn. S10). Parameters $[\zeta_{q,i}, dw_{iq}]$ related to each orientational moment $m_{q,I}$ are projected separately, where $$i \in \{1,2,3\}, \quad \text{(S19a)}$$

$$dw_q^1 = \zeta_{q,[7,10,13]}, \quad \text{(S19)}$$

$$dw_q^2 = \zeta_{q,[8,11,14]}, \quad \text{(S19c)}$$

$$dw_q^3 = \zeta_{q,[9,12,15]}. \quad \text{(S19d)}$$

This projection can be written as $$P_{L1}([\zeta_{q,i}, dw_q^i]) = \begin{cases} 0, & \text{if } \|dw_q^i\|_2 \le \frac{-\zeta_{q,i}}{t} \\ (\zeta_{q,i}, dw_q^i), & \text{if } \|dw_q^i\|_2 \le \zeta_{q,i} t \\ \left(\frac{\zeta_{q,i} + t\|dw_q^i\|_2}{1+t^2}, \frac{\zeta_{q,i} + t\|dw_q^i\|_2}{1+t^2} \frac{t dw_q^i}{\|dw_q^i\|_2}\right), & \text{if } \|dw_q^i\|_2 \ge \zeta_{q,i} t, \end{cases} \quad \text{(S20)}$$

and can be set to t=117 nm.

The second projection $P_{L2}$ ensures that the second-moment $\hat{m}_q$ estimates correspond to a wobble $\Omega$ that is physically meaningful, given by $$P_{L2}(\pi_q) = [\pi_{q,1:3}, k\pi_{q,4:6}, \pi_{q,7:15}], \quad \text{(S21)}$$

where $$k = \frac{\max(0, \min(1.5e - 0.5, 1))}{1.5e - 0.5}, \quad \text{(S22)}$$

and e is the largest eigenvalue of the second moment matrix.

The algorithm can be modified to estimate the NFP of the objective z if the axial positions h of the emitters are known (FIG. 27E and FIG. 59). If knowledge is lacking of both the emitter axial positions and the NFP position, it is possible to "guess" an arbitrary NFP position. The algorithm will yield an estimated emitter axial position that will simply be shifted by the difference between the hypothetical NFP position and the true NFP position (FIG. 52).

In some aspects, the locations and orientations of single molecules may be estimated simultaneously using a sparsity-promoting maximum likelihood estimator. Briefly, the object space is represented by a rectangular lattice of grid points with spacing equal to the camera pixel size. Each grid point may contain at most a single molecule parameterized by brightness, position offsets, and six orientational second moments.

To robustly estimate the number of underlying molecules and their parameters in the presence of SM image overlap, a regularized maximum likelihood exploiting a group-sparsity norm to estimate the parameters of each grid point may be used. The algorithm begins by estimating the strength, i.e., brightness, of each of the second moments $\tilde{m}_k$ independently at all object grid points. The localizations may be pooled together, i.e., their brightnesses and position offsets, across the six second moments, to identify the most likely molecules in the object space. Once these molecules are identified, a constrained maximum likelihood is solved to minimize systematic biases induced by the sparsity norm, yielding estimates of the brightnesses, locations, and orientations (second moments $\tilde{m}$) of all molecules in the image. Localizations with signal estimates of less than 400 photons detected may be removed to eliminate unreliable localizations.

The estimated second-moment vectors $\tilde{m}$ were next projected to the physical orientation space (polar angle θ, azimuthal angle φ, and wobbling area Ω of a transition dipole moment μ) by a weighted least-square estimator:

$$(\theta, \phi, \Omega) = \underset{\theta,\phi,\Omega}{\operatorname{argmin}}(\tilde{m} - m(\hat{\theta}, \hat{\phi}, \hat{\Omega}))^T FIM(\tilde{m} - m(\hat{\theta}, \hat{\phi}, \hat{\Omega})) \quad (2)$$

such that $$m(\theta, \phi, \Omega) = [\langle\mu_x^2\rangle, \langle\mu_y^2\rangle, \langle\mu_z^2\rangle, \langle\mu_x\mu_y\rangle, \langle\mu_x\mu_z\rangle, \langle\mu_y\mu_z\rangle]^T, \quad (3)$$

$$\langle\mu_x^2\rangle = \gamma\mu_x^2 + \frac{1-\gamma}{3}, \langle\mu_x\mu_y\rangle = \gamma\mu_x\mu_y, \quad (4)$$

$$\langle\mu_y^2\rangle = \gamma\mu_y^2 + \frac{1-\gamma}{3}, \langle\mu_x\mu_z\rangle = \gamma\mu_x\mu_z, \quad (5)$$

$$\langle\mu_z^2\rangle = \gamma\mu_z^2 + \frac{1-\gamma}{3}, \langle\mu_y\mu_z\rangle = \gamma\mu_y\mu_z, \quad (6)$$

$$[\mu_x, \mu_y, \mu_z] = [\sin\theta\cos\phi, \sin\theta\sin\phi, \cos\theta], \text{ and} \quad (7)$$

$$\gamma = \frac{1}{2}\cos^2\left(2\arcsin\sqrt{\frac{\Omega}{8\pi}}\right) + \frac{1}{2}\cos\left(2\arcsin\sqrt{\frac{\Omega}{8\pi}}\right), \quad (8)$$

where γ is the rotational constraint and FIM is the Fisher information (FI) matrix calculated from the basis images. Here, the FI matrix associated with estimating the six orientational second moments m is defined as $$FIM = \sum_{i=1}^{n} \frac{1}{I_i} \nabla I_i^T \nabla I_i, \quad (9)$$

where i denotes the ith pixel of an image $I \in \mathbb{R}^n$ captured by a camera and $$\nabla I_i = \left[\frac{\partial I_i}{\partial m_{xx}}, \frac{\partial I_i}{\partial m_{yy}}, \frac{\partial I_i}{\partial m_{zz}}, \frac{\partial I_i}{\partial m_{xy}}, \frac{\partial I_i}{\partial m_{xz}}, \frac{\partial I_i}{\partial m_{yz}}\right].$$

Due to the linearity of the forward imaging model (1) in terms of the second moments, the FI matrix can be further simplified as $$FIM = \sum_{i=1}^{n} \frac{s^2}{I_i} B_i^T B_i. \quad (10)$$

where $B_i$ represents the $i^{th}$ row of $B \in \mathbb{R}^{n \times 6}$. The weighted least square estimation can be efficiently performed by caching Hadamard products of each pair of the basis images.

Note that $\tilde{m}$ and m denote second-moment outputs of the maximum likelihood estimator and the weighted least-square estimator respectively. The FI matrix assigns weights to each orientational component $m_k$ inversely proportional to the expected measurement variance of the DSFs used in SMOLM. Equation (2) may be minimized using any existing method without limitation including, but not limited to, the f mincon function in MATLAB (Mathworks, R2019a). The eigenvector corresponding to the largest eigenvalue of the second-moment matrix may be assigned as the initial orientation of the minimization of (2).

Quantifying the Precision of Measuring 3D Orientation and 3D Position

Figures 43A, 43B, 43C, 43D:
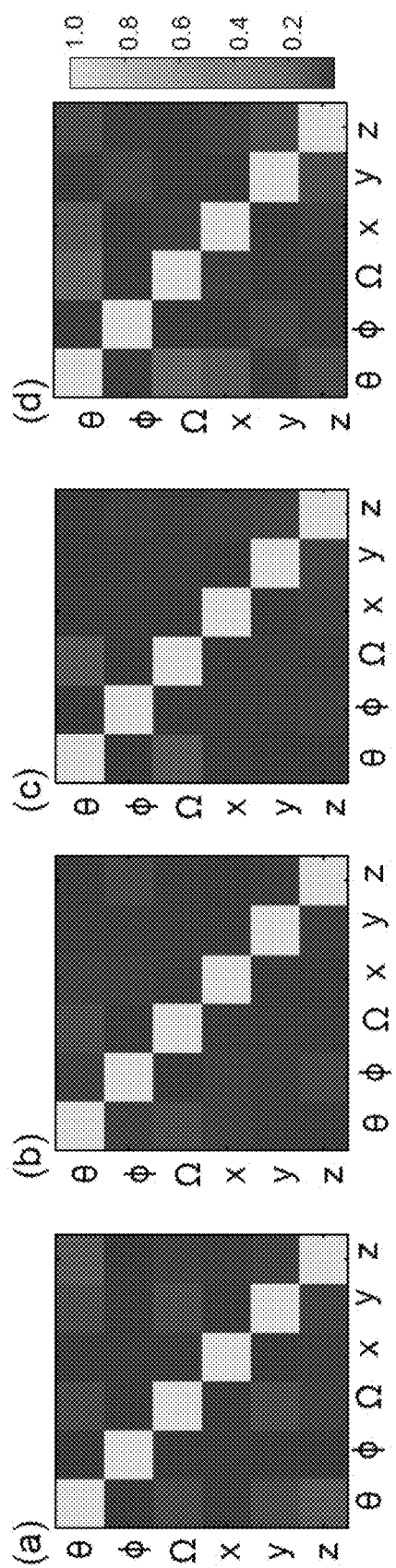
FIG. 43A is a grid representing the coupling between different position and orientation parameters for pixOL compared to other methods. Average of the entries in the Fisher information matrix $K^{-1}$ for estimating 3D orientation, rotational wobble, and 3D position when using pixOL. Averages are computed over all orientations and for emitters located within an axial range of $h \in [0, 800]$. To normalize the matrix, element $K_{[i,j]}^{-1}$ in ith row and jth column is divided by $K_{[i,i]}^{-1/2} K[j,j]^{-1/2}$. The emitters are immersed in water (1.33 refractive index) and imaged using an objective focused at a normal focal plane of −580 nm, collecting 2500 signal photons and 3 background photons per pixel.
FIG. 43B is a grid representing the coupling between different position and orientation parameters for pixOL compared to other methods. Average of the entries in the Fisher information matrix $K^{-1}$ for estimating 3D orientation, rotational wobble, and 3D position when using CHIDO. Averages are computed over all orientations and for emitters located within an axial range of $h \in [0, 800]$. To normalize the matrix, element $K_{[i,j]}^{-1}$ in ith row and jth column is divided by $K_{[i,i]}^{-1/2} K[j,j]^{-1/2}$. The emitters are immersed in water (1.33 refractive index) and imaged using an objective focused at a normal focal plane of −580 nm, collecting 2500 signal photons and 3 background photons per pixel.
FIG. 43C is a grid representing the coupling between different position and orientation parameters for pixOL compared to other methods. Average of the entries in the Fisher information matrix $K^{-1}$ for estimating 3D orientation, rotational wobble, and 3D position when using double helix. Averages are computed over all orientations and for emitters located within an axial range of $h \in [0, 800]$. To normalize the matrix, element $K_{[i,j]}^{-1}$ in ith row and jth column is divided by $K_{[i,i]}^{-1/2} K[j,j]^{-1/2}$. The emitters are immersed in water (1.33 refractive index) and imaged using an objective focused at a normal focal plane of −580 nm, collecting 2500 signal photons and 3 background photons per pixel.
FIG. 43D is a grid representing the coupling between different position and orientation parameters for pixOL compared to other methods. Average of the entries in the Fisher information matrix $K^{-1}$ for estimating 3D orientation, rotational wobble, and 3D position when using unpolarized vortex. Averages are computed over all orientations and for emitters located within an axial range of $h \in [0, 800]$. To normalize the matrix, element $K_{[i,j]}^{-1}$ in ith row and jth column is divided by $K_{[i,i]}^{-1/2} K[j,j]^{-1/2}$. The emitters are immersed in water (1.33 refractive index) and imaged using an objective focused at a normal focal plane of −580 nm, collecting 2500 signal photons and 3 background photons per pixel.

In one aspect, the Fisher information matrix quantifies the amount of information contained within any DSF regarding the parameters to be estimated. The shape of the pixOL DSF contains information of both the emitter's axial location and its 3D orientation. Due to the discrete sampling and finite size of the camera pixels, the off-grid distances [dx, dy, dh] related to the emitter's location [x, y, h] relative to the closest grid point [$x_0$, $y_0$, $h_0$] also affect the shape of the DSF image. Therefore, the covariance between any pair of position and orientation parameters [x, y, h, θ, φ, Ω] is nonzero (FIG. 43). Thus, to properly quantify the best-possible precision of measuring 3D position and 3D orientation, while also considering correlations thereof, Fisher information matrices for joint estimation of 3D position and 3D orientation can be calculated (FIG. 27A-D).

Figures 44A, 44B, 44C, 44D:
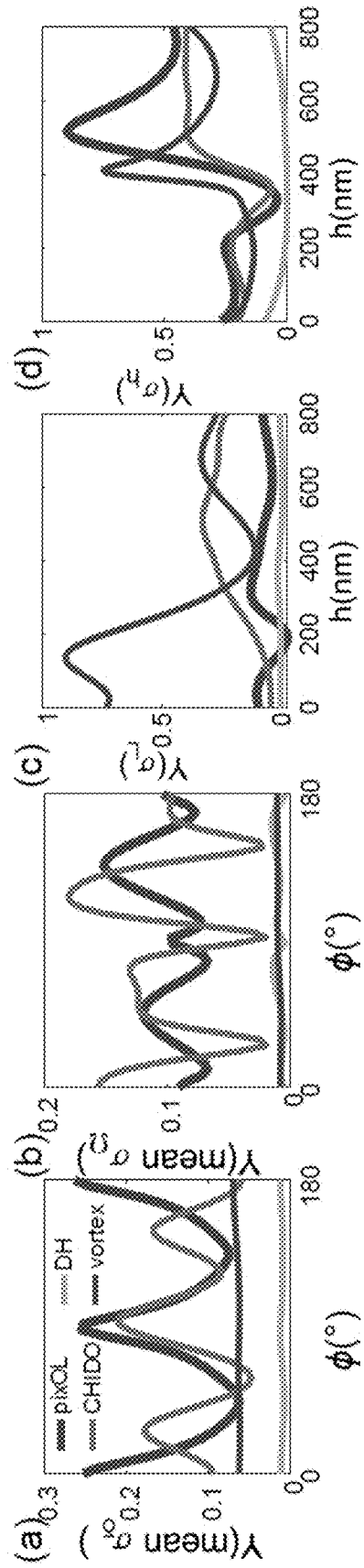
FIG. 44A is a graph of the difference ratio Y, which quantifies the difference in measurement precision accounting for orientation-position correlations vs. ignoring them (Eqn. S26), for orientation precision $\sigma_\delta$, averaged over all polar orientations θ. In-focus SMs with fixed orientation ($\Omega = 0$ sr) are used. Emitters are immersed in water (1.33 refractive index) with 2500 signal photons and 3 background photons per pixel.
FIG. 44B is a graph of the difference ratio Y for wobble angle precision σn. In-focus SMs with fixed orientation ($\Omega = 0$ sr) are used. Emitters are immersed in water (1.33 refractive index) with 2500 signal photons and 3 background photons per pixel.
FIG. 44C is a graph of the difference ratio Y for lateral localization precision oi. Isotropic emitters ($\Omega = 2\pi$ sr) are used. Emitters are immersed in water (1.33 refractive index) with 2500 signal photons and 3 background photons per pixel.
FIG. 44D is a graph of the difference ratio Y for axial localization precision $\delta_h$. Isotropic emitters ($\Omega = 2\pi$ sr) are used. Emitters are immersed in water (1.33 refractive index) with 2500 signal photons and 3 background photons per pixel.
Figures 45A, 45B, 45C, 45D:
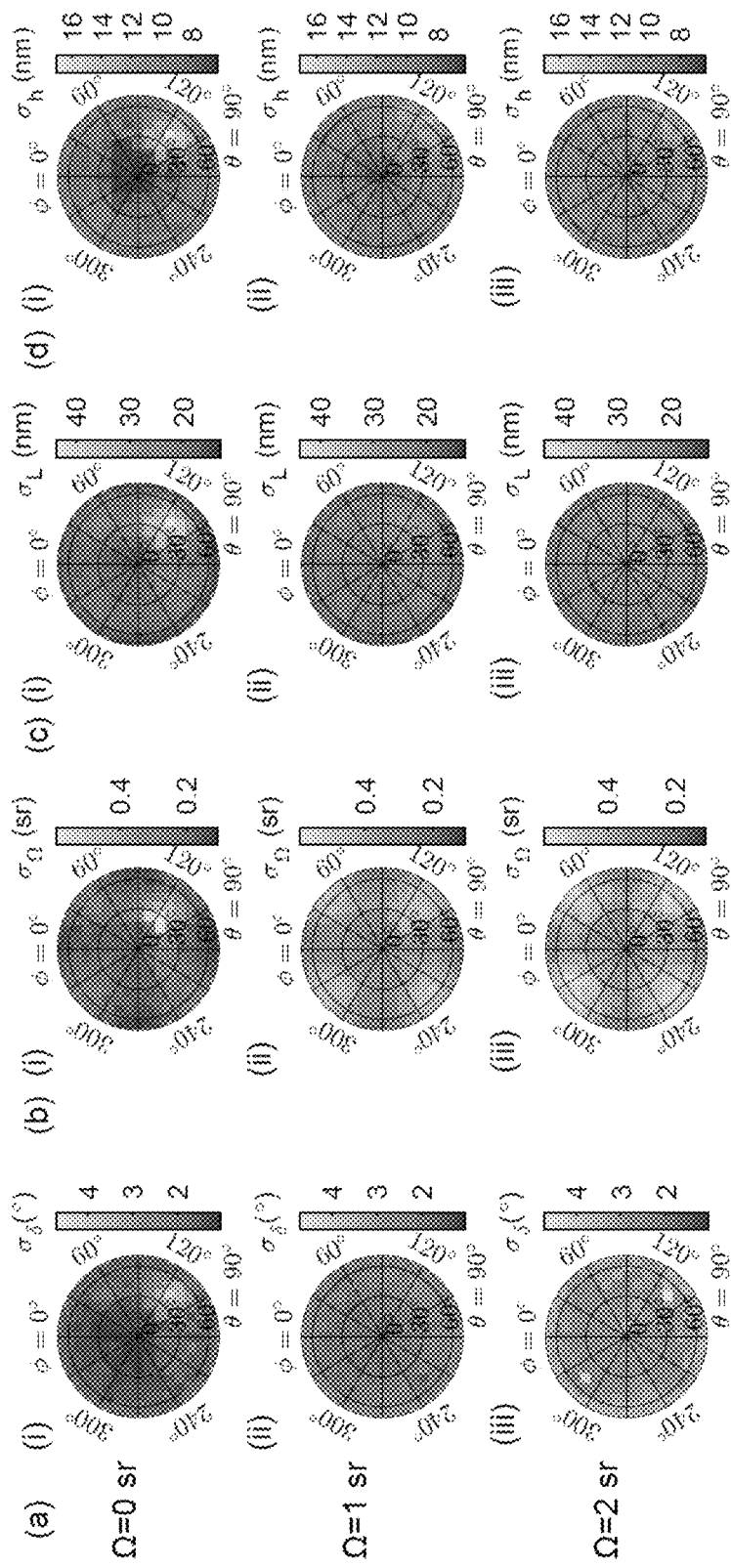
FIG. 45A is a set of graphs of the precision and accuracy of estimating $\sigma_\delta$ (deg) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
FIG. 45B is a set of graphs of the precision and accuracy of estimating $\sigma_\Omega$ (sr) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
FIG. 45C is a set of graphs of the precision and accuracy of estimating $\delta_L$ (nm) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
FIG. 45D is a set of graphs of the precision and accuracy of estimating $\delta_h$ (nm) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
Figures 45E, 45F, 45G, 45H:
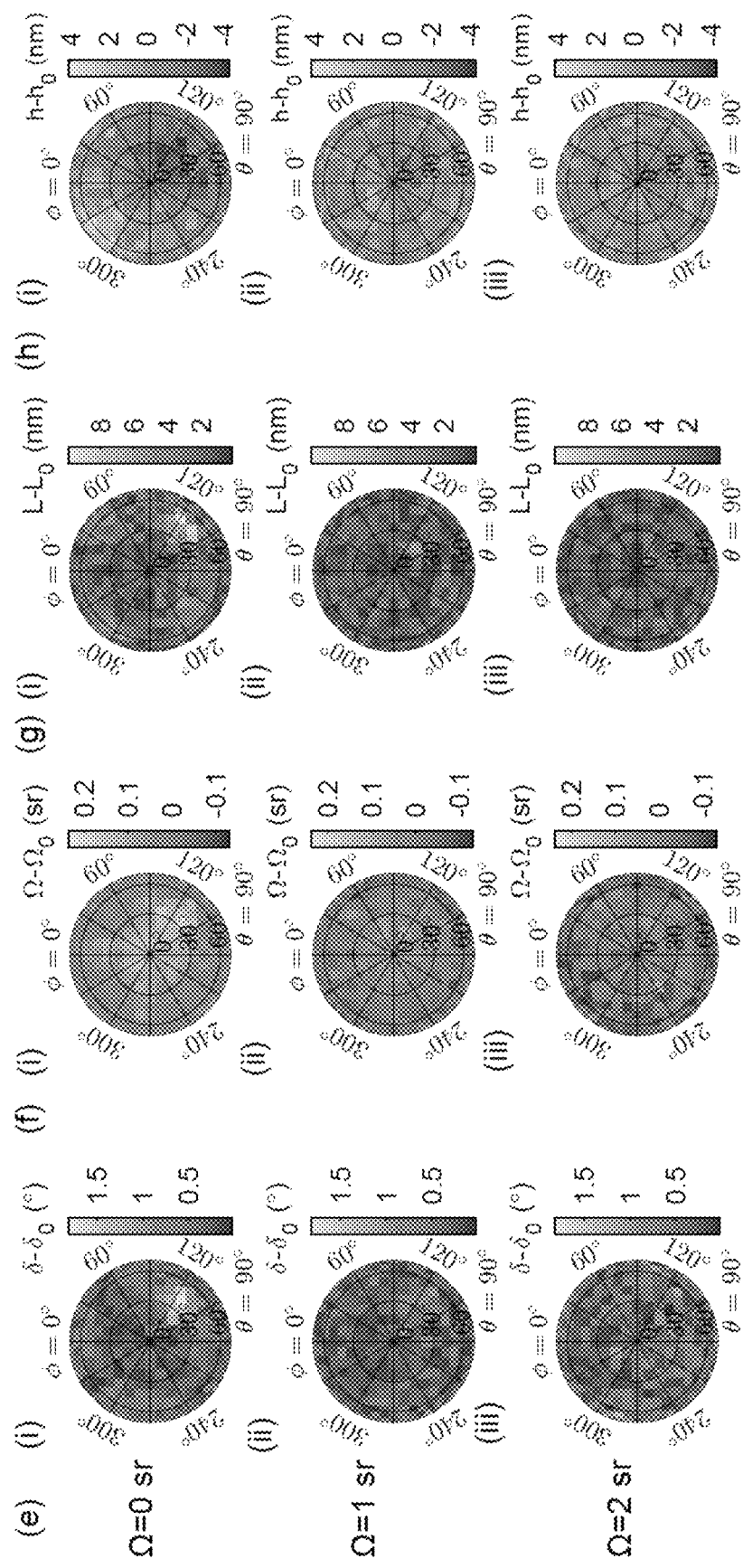
FIG. 45E is a set of graphs of the precision and accuracy of estimating $\delta - \delta_0$ (deg) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
FIG. 45F is a set of graphs of the precision and accuracy of estimating $\Omega - \Omega_0$ (sr) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
FIG. 45G is a set of graphs of the precision and accuracy of estimating $L - L_0$ (nm) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
FIG. 45H is a set of graphs of the precision and accuracy of estimating $h-h_0$ (nm) for emitters at h=0 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=0 nm with 2500 signal photons in total and 3 background photons per pixel detected.
Figure 45L:
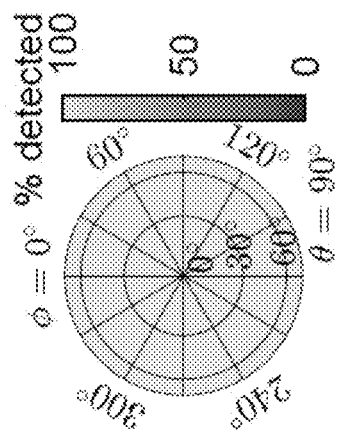
FIG. 45L is a graph representing the percentage of trials that successfully detect one emitter for $\Omega$=2 sr. 200 independent images were generated for emitter within water located at h=0 nm with 2500 signal photons in total and 3 background photons per pixel detected.
Figure 45K:
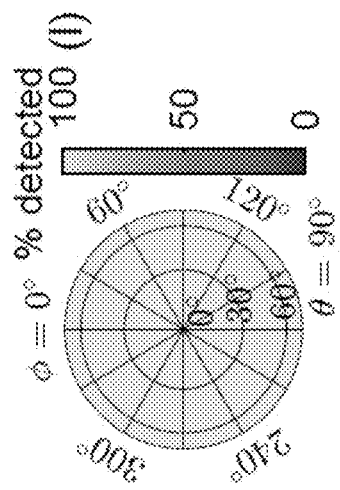
FIG. 45K is a graph representing the percentage of trials that successfully detect one emitter for $\Omega$=1 sr. 200 independent images were generated for emitter within water located at h=0 nm with 2500 signal photons in total and 3 background photons per pixel detected.
Figure 45J:
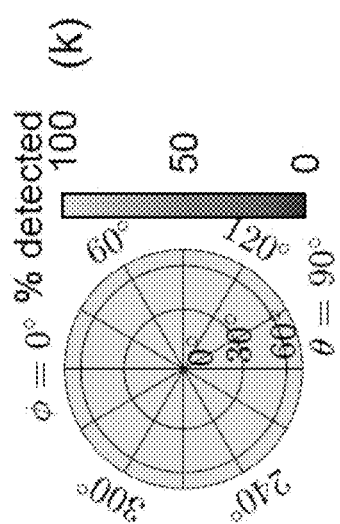
FIG. 45J is a graph representing the percentage of trials that successfully detect one emitter for $\Omega$=0 sr. 200 independent images were generated for emitter within water located at h=0 nm with 2500 signal photons in total and 3 background photons per pixel detected.
Figures 46A, 46B, 46C, 46D:
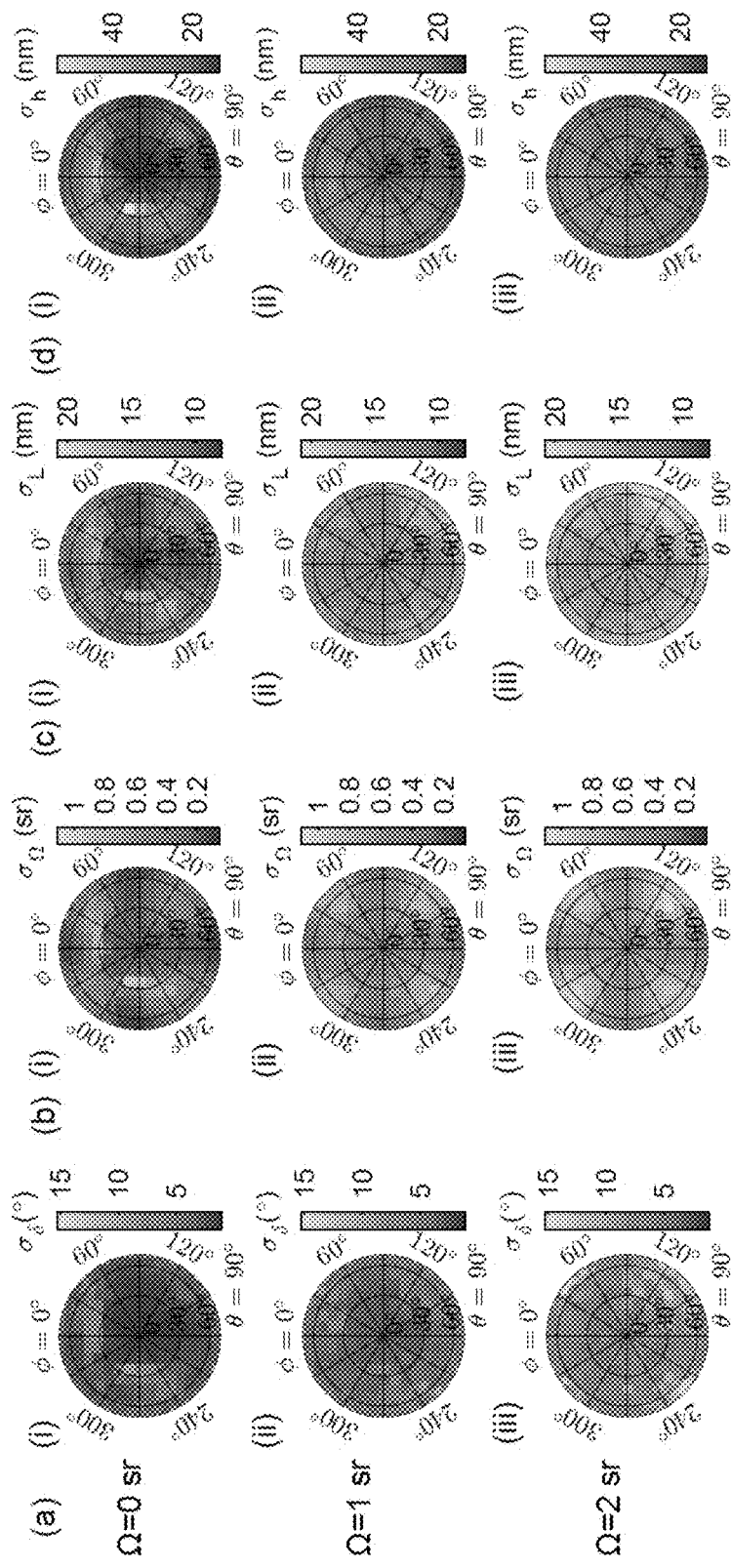
FIG. 46A is a set of graphs of the precision and accuracy of estimating $\sigma\delta$ (deg) for emitters at h=400 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=400 nm with 2500 signal photons in total and 3 background photons per pixel detected.
FIG. 46B is a set of graphs of the precision and accuracy of estimating $\sigma_\Omega$ (sr) for emitters at h=400 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=400 nm with 2500 signal photons in total and 3 background photons per pixel detected.
FIG. 46C is a set of graphs of the precision and accuracy of estimating $\sigma_L$ (nm) for emitters at h=400 nm with a nominal focal plane placed at z=−580 nm with low background at various orientations ($\Omega \in \{0, 1, 2\}$ sr, $\theta \in [0°, 90°]$, $\phi \in [0°, 360°)$). At each orientation, 200 independent images were generated for emitter within water located at h=400 nm with 2500 signal photons in total and 3 background photons per pixel detected.
FIG. 46D is a set of graphs of the precision and accuracy of estimating $\delta_h$ (nm) for emitters at h=400 nm with a nominal focal plane placed at z=−580 nm with low background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.
Figures 46E, 46F, 46G, 46H:
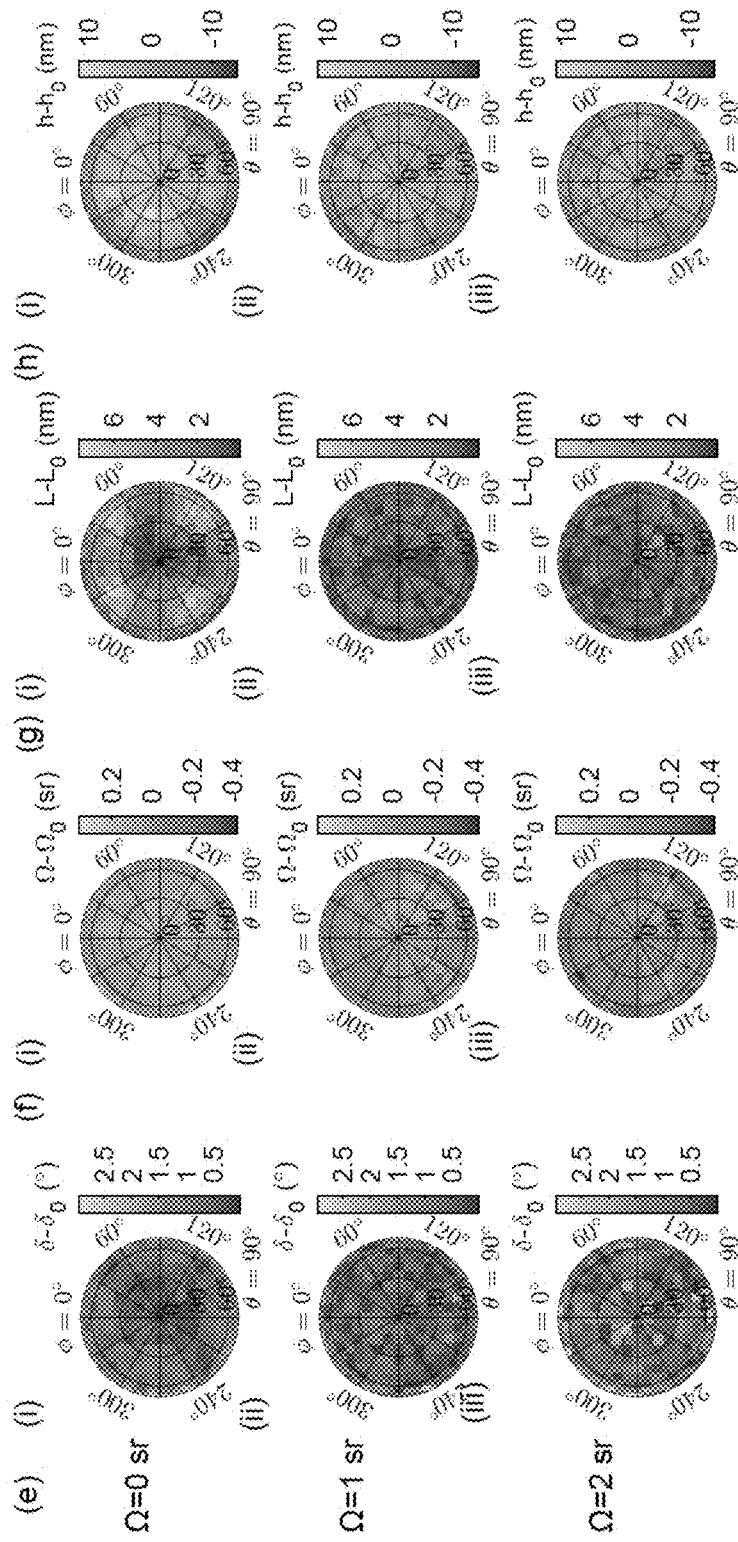
FIG. 46E is a set of graphs of the precision and accuracy of estimating $\delta-\delta_0$ (deg) for emitters at h=400 nm with a nominal focal plane placed at z=−580 nm with low background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.
FIG. 46F is a set of graphs of the precision and accuracy of estimating $\Omega-\Omega_0$ (sr) for emitters at h=400 nm with a nominal focal plane placed at z=−580 nm with low background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.
FIG. 46G is a set of graphs of the precision and accuracy of estimating $L-L_0$ (nm) for emitters at h=400 nm with a nominal focal plane placed at z=−580 nm with low background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.
FIG. 46H is a set of graphs of the precision and accuracy of estimating $h-h_0$ (nm) for emitters at h=400 nm with a nominal focal plane placed at z=−580 nm with low background at various orientations ($\Omega \in \{0, 1, 2\}$ sr, $\theta \in [0°, 90°]$, $\theta \in [0°, 360°)$). At each orientation, 200 independent images were generated for emitter within water located at h=400 nm with 2500 signal photons in total and 3 background photons per pixel detected.
Figure 46L:
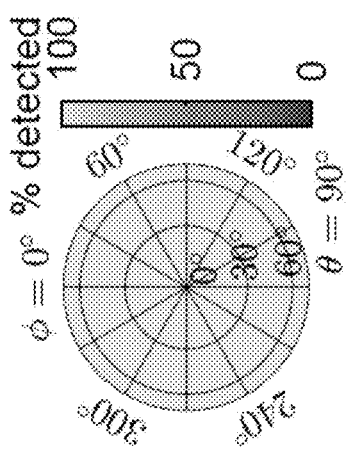
FIG. 46J is a graph representing the percentage of trials that successfully detect one emitter for $\Omega$=0 sr. 200 independent images were generated for emitter within water located at h=400 nm with 2500 signal photons in total and 3 background photons per pixel detected.
FIG. 46K is a graph representing the percentage of trials that successfully detect one emitter for $\Omega$=1 sr. 200 independent images were generated for emitter within water located at h=400 nm with 2500 signal photons in total and 3 background photons per pixel detected.
Figure 46K:
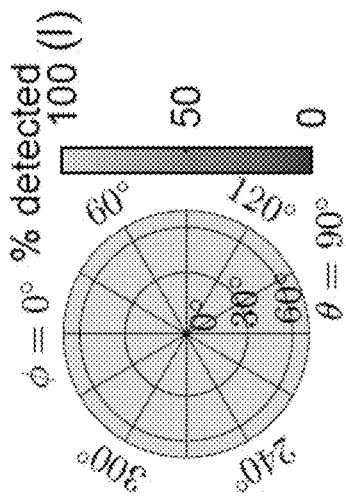
Figure 46J:
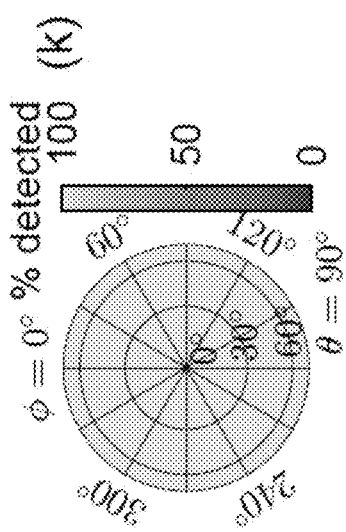

For FIGS. 27A and B, a 6×6 Fisher information matrix that includes 3 location and 3 orientation parameters is calculated. By inverting the Fisher information matrix, the CRB matrix K is obtained, whose diagonal elements quantify the estimation variance of 3D orientation [θ, φ, Ω] and 3D location [x, y, h]. To quantify the precision of estimating the mean orientation [θ, φ], the angular precision $\sigma_\delta$ can be calculated, which is the half-angle of the uncertainty cone for estimating the mean orientation direction. It is a summary metric that combines the precision $\sigma_\theta$ of measuring θ and the standard deviation $\sigma_\phi$ of measuring φ, given by $$\sigma_\delta = 2\arcsin\left(\sqrt{\frac{\sin(\theta)\sqrt{\det(K_{4:5,4:5})}}{4\pi}}\right), \quad (S23)$$

where $K_{4:5,4:5}$ is a 2×2 sub-matrix of K representing 3D orientation [θ, ϕ] precision formed by fourth and fifth rows and columns. Orientation space (θ, ϕ) is sampled uniformly using $$\phi = 2\pi v_1, \quad (S24)$$

$$\theta = \arccos(2u_1 - 1), \quad (S25)$$

where $v_1$, $u_1$ are uniformly distributed on (0,1). The angular precision $\sigma_\delta$ and wobbling angle precision $\sigma_\Omega$ can then be averaged over all θ in FIGS. 27A and B. To quantify 3D location precision for isotropic emitters (FIGS. 27C and D), a 9×9 Fisher information matrix can be built, which includes the 3 location parameters and 6 orientational moments. This formulation avoids the undefined mean orientation direction (θ, ϕ) of these emitters. The correlation between the 3D orientation and 3D location will degrade estimation precision in general. The difference ratio Y between the precision calculated with orientation-position correlation and without is quantified using $$Y(\sigma) = \frac{\sigma_{with\ correlation} - \sigma_{without\ correlation}}{\sigma_{without\ correlation}}, \quad (S26)$$

where $\sigma_{without\ correlation}$ is calculated using matrices K that quantify solely 3D localization precision or 3D orientation measurement precision. It is noticed that the performance of large DSFs (i.e., those that are greater than 3 times the size of the standard DSF) is less influenced by orientation-position correlations (FIG. 44).

Quantifying Estimation Bias when Measuring 3D Orientation and 3D Position

To determine if correlations between measurements of 3D orientation and 3D position influence estimation performance, images of emitters with various orientations and axial locations and a nominal focal plane set to z=−580 nm were simulated (FIG. 45-51). For each configuration, 200 independent images are simulated using the forward model (Eqn. 1) and estimated using algorithms described herein. Overall, pixOL shows excellent precision for measuring 3D orientation and 3D position. However, in some regions of the orientation domain, low estimation precision and accuracy for both 3D orientation and 3D position is noticed. Plotting the estimates in one of these regions, strong correlations between biases in 3D orientations and biases in 3D locations is noticed (FIGS. 53A and B). For example, simulated noiseless images of an emitter at the ground truth position $(x_0, y_0, h_0) = (0, 0, 700)$ nm and orientation $(\theta_0, \phi_0, \Omega_0) = (38°, 162°, 0)$ are very similar to those of a biased estimate of position and orientation (FIGS. 53C and D). However, differences between the noisy images are still discernible. Position-orientation correlations are suspected that create local minima in the likelihood space.

To make high-dimensional parameter estimation computationally feasible, the algorithm can iteratively update its approximate forward model based on its current 3D position estimate (Algorithm 2 in FIG. 63B, step 10). This strategy leads to a non-continuous optimization surface and increases the difficulty for the algorithm to jump out of local minima. It is possible that a neural network-based algorithm will be more computationally efficient and may be able to explore the 6D position-orientation space more robustly. Such an approach could increase estimation precision and remove bias (FIG. 53E).

Phase Masks Produced by DSF Optimization Using pixOL Method

To improve imaging sensitivity in SMOLM imaging, a phase mask at the back focal plane of a microscope may be used to modulate the detected DSFs of each emitter. Applications that have a low signal-to-noise ratio (SNR) or densely labeled samples pose challenges to existing multi-spot DSFs. It is desirable to optimize a DSF for a specific sample of interest to achieve optimal imaging performance using DSF engineering.

An image of a fluorescent emitter, e.g., a molecule or nanoparticle, depends on its orientation. The image also contains information on how much a molecule rotates during a camera frame (called its wobbling). As described herein, individual fluorescent molecules are modeled as dipoles. It is assumed that a molecule rotates (wobbles) within a symmetric cone during one exposure time. As illustrated in FIG. 1, θ,ϕ may be used to describe the center orientation of the cone and solid angle Ω [sr] may be used to describe the wobbling unit area on the unit sphere (Ω=0 means fixed dipole emitter and Ω=4π means a freely rotating, isotropic emitter). Although orientation information is contained within the light captured by a microscope, the traditional imaging system that creates the standard dipole spread function (DSF) cannot convey this information to the image captured by a camera.

The image of an oriented emitter at the back focal plane of an objective can be decomposed into a linear combination of second-order orientation moments ($\langle u_x^2 \rangle$, $\langle u_y^2 \rangle$, $\langle u_z^2 \rangle$, $\langle \mu_{xy} \rangle$, $\langle \mu_{xz} \rangle$, and $\langle \mu_{yz} \rangle$) with their corresponding basis images (see FIG. 4), where ($\mu_x$, $\mu_y$, $\mu_z$) depicts a Cartesian coordinate projection of (θ,ϕ) and ⟨·⟩ represents average operator over camera frame. In various aspects, a phase mask may be designed based on the distribution of the basis function on the back focal plane.

In various aspects, an algorithm termed the pixOL method simultaneously optimizes all pixels of a phase mask across two orthogonally polarized imaging channels for applications with a low SNR. Unlike optimization using Zernike polynomial, pixOL can directly take advantage of supercritical fluorescence arising from imaging SMs near a refractive index interface. Using the resulting phase mask provides for simultaneous measurement of 3D orientation and 3D location of an emitter with small statistical variance. The parameters in the pixOL algorithm may be varied to optimize a phase mask to fit a range of microscopes and imaging applications.

In some aspects, a single-molecule microscope directly encodes an emitter's lateral location into the location of its DSF on the captured 2D image. The axial location (h) and 3D orientation (θ, ϕ, Ω) are hidden in the shape of the DSF, which may be manipulated using different phase mask designs as described herein. To achieve high estimation precision for 3D orientation and 3D location, the shape of the DSF is selected to vary quickly with respect to changes of the orientation and the axial location. This varying speed can be quantified using the Fisher information matrix (see Eqns. (9) and (10) above), which is only related to the microscope design and the imaging sample. Its inverse matrix, Cramér-Rao bound matrix (CRB), gives a lower bound on the estimation variance for any unbiased estimator.

In various aspects, the CRB matrix K is used to estimate the second-moment vector m to optimize the phase mask for a microscope that splits the light into x-polarization and y-polarization channels (see FIG. 2).

To calculate the best possible precision for estimating the orientational Moments m, the Cramér-Rao bound (CRB) matrix K can be calculated using Eqn. (S7) provided above.

In some embodiments, an optimal DSF that minimizes K for any possible orientation $[\mu_x, \mu_y, \mu_z, \Omega]$ can be found to build a loss function $\ell$ (Eqn. 11 below) to represent the sum of the precision of second moments over a uniformly sampled orientation space M.

The mean orientation $\mu=[\mu_x, \mu_y, \mu_z]^T$ can be sampled using $$\mu_x = 2x_1\sqrt{1-x_1^2-x_2^2} \tag{S8a}$$

$$\mu_y = 2x_2\sqrt{1-x_1^2-x_2^2} \tag{S8b}$$

$$\mu_z = 1-2(x_1^2+x_2^2), \tag{S8c}$$

where $x_1$, $x_2$ are uniformly distributed within $(-1, 1)$ and points for which $x_1^2+x_2^2 \geq 1$ are rejected. The wobbling angle $\Omega$ can uniformly sampled within $[0, 2\pi]$.

In some embodiments, using GradientTape for automatic differentiation in Tensorflow, the gradient D of the loss function l with respect to the current phase mask P can be calculated. In some embodiments, the mask for dipole emitters located at the glass-water interface can be optimized with 380 total signal photons detected and 2 background photons in each pixel. In some embodiments, the phase of each pixel can be randomly initialized. The current phase mask can be updated using the Adam algorithm with a learning rate of 0.05 and a total of 300 iterations, and the pixOL algorithm produces a phase mask exp(jP) shown in FIG. 26C and FIG. 35B.

In some aspects, the pixels $P_{ij}$ of the phase mask P are all simultaneously optimized by minimizing the loss function 1 given by:

$$l = \min_P \sum_{m \in \mathbb{C}} \sqrt{K(P, m)} \tag{11}$$

where $\mathbb{C}$ is a uniformly sampled orientation space. The algorithm outputs a phase mask (pixOL phase mask $P_{opt}$) that efficiently encodes the orientation matrix m.

Figure 5:
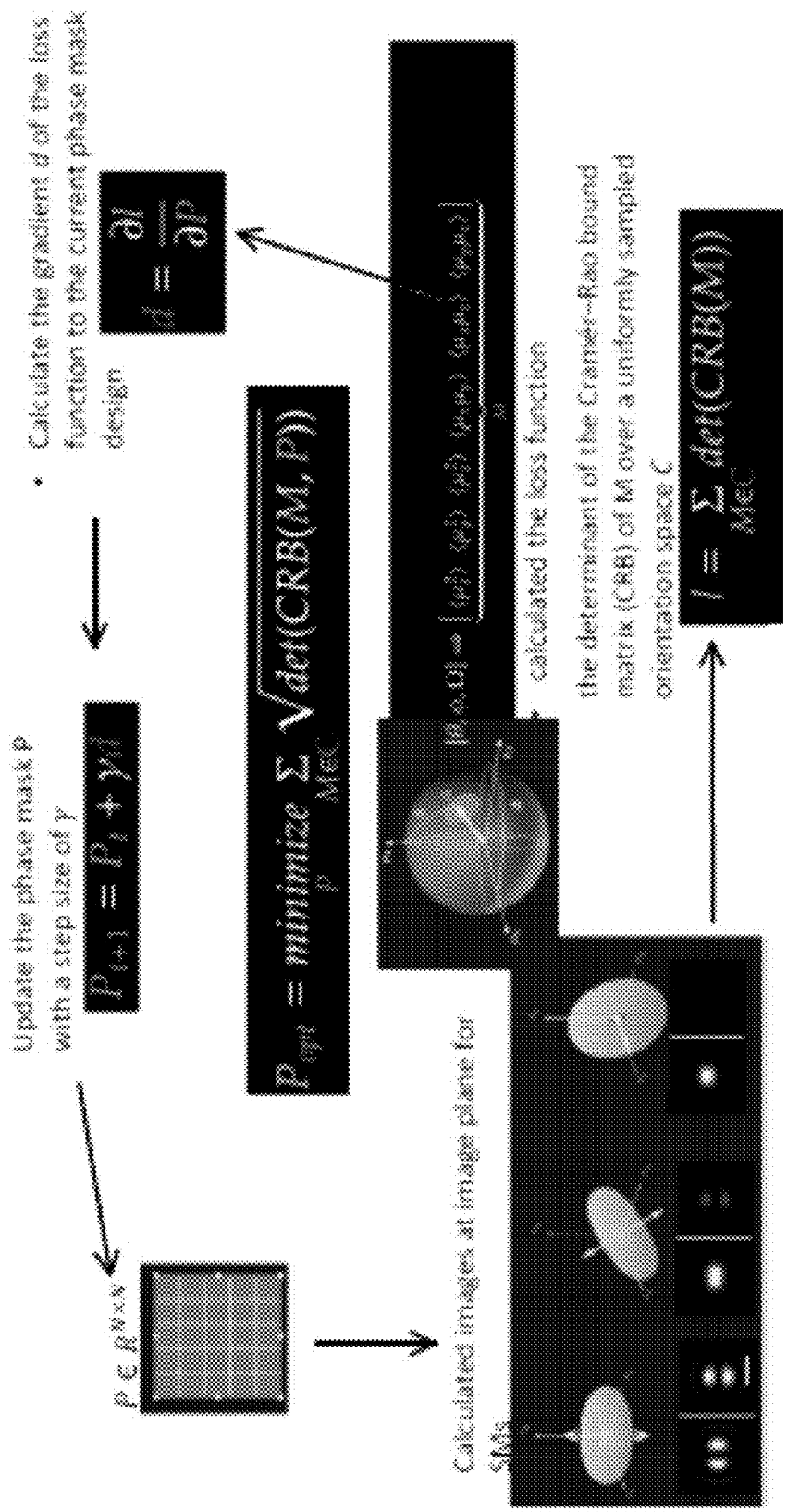
FIG. 5 is a schematic representation of a method for optimizing a phase mask for a single molecule microscopy system.

An overview of the disclosed pixOL method of designing a phase mask for SMOLM imaging is provided as FIG. 5 in one aspect. In this aspect, the loss function is minimized by step-wise updating a succession of candidate phase masks $P_t$ based on the gradient d of the loss function I with respect to the phase mask P $$\left(d = \frac{\partial l}{\partial P}\right)$$

and reevaluating the resulting orientation matrix m and loss function until a minimum loss function is achieved.

In some aspects, the phase mask resulting from the pixOL method may be implemented using a spatial light modulator or other suitable device. In one aspect, the phase mask may be defined directly from the optimization results as described above. In other aspects, the phase mask may be defined using the conjugate of the optimal phase mask obtained using the pixOL method as described above.

SMOLM Imaging

In various aspects, any known SMOLM system may be used to perform SMOLM imaging, with the use of a DSF phase mask optimized using the disclosed methods as described herein. Exemplary SMOLM systems are described in detail in U.S. Patent Application Publication 2018/0307132, the contents of which are incorporated by reference herein in their entirety.

In one aspect, a home-built microscope with a 100× objective lens (NA 1.40, Olympus, UPLSAPO100XOPSF) may be used to perform SMOLM imaging. For NR and MC540 imaging, a 561-nm laser (Coherent Sapphire) with a peak intensity of 1.31 kW/cm² and a dichroic beamsplitter (Semrock, Di03-R488/561) may be used. The emission may be filtered by a bandpass filter (Semrock, FF01-523/610), and separated into x- and y-polarized channels by a polarization beam splitter (PBS, Meadowlark Optics, BB-100-VIS). The phase masks may be generated by a spatial light modulator (Meadowlark Optics, 256 XY Phase Series) onto which the back focal plane of both polarization channels was projected. The modulated SMOLM images may be captured with a typical 30 ms integration time using an sCMOS camera (Hamamatsu ORCA-flash4.0 C11440-22CU).

Computing Systems and Devices

Figure 6:
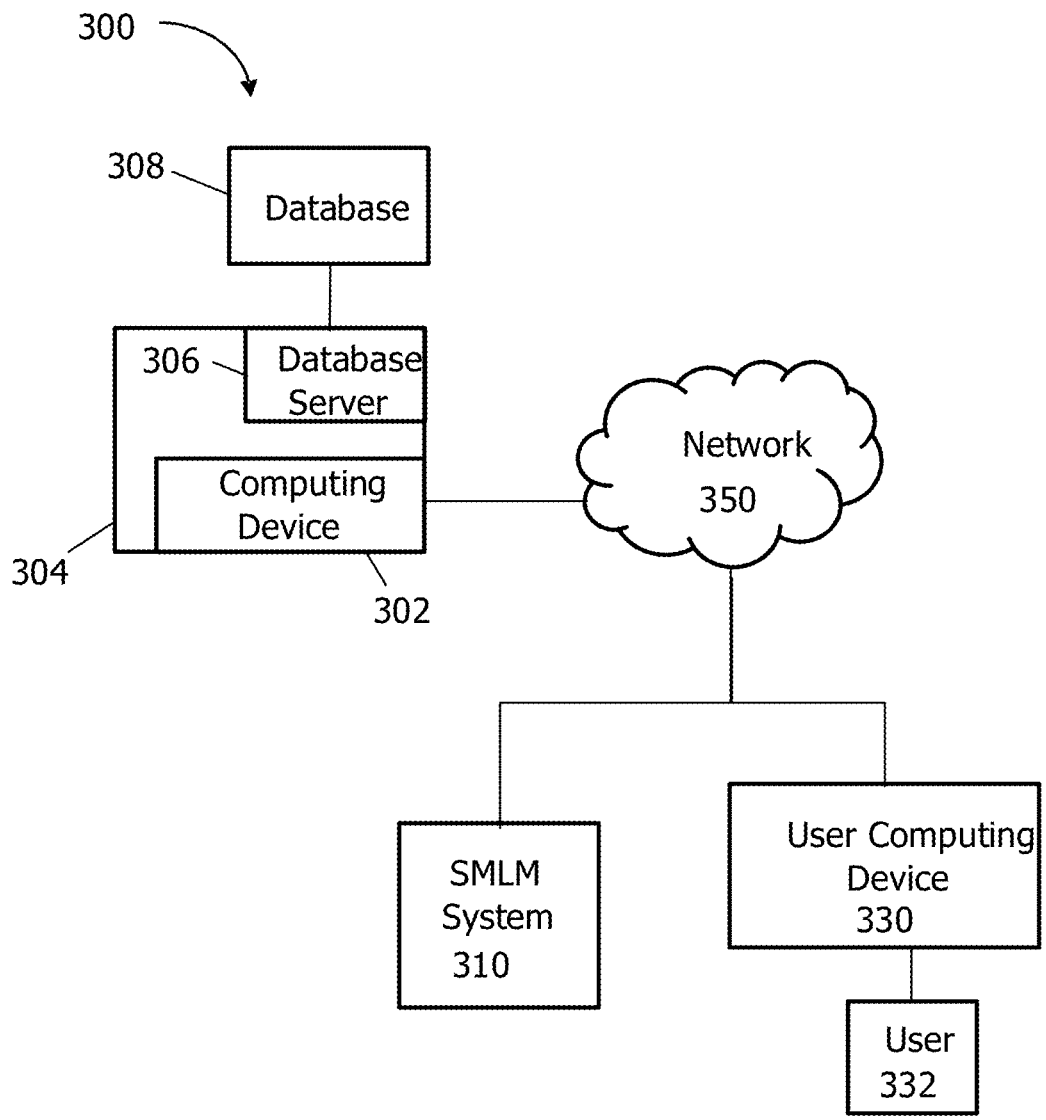
FIG. 6 is a block diagram schematically illustrating a system in accordance with one aspect of the disclosure.

FIG. 6 depicts a simplified block diagram of a computing device for implementing the methods described herein. As illustrated in FIG. 6, the computing device 300 may be configured to implement at least a portion of the tasks associated with the disclosed phase mask optimization method using the SMLM system 310 including, but not limited to: designing a phase mask using the disclosed phase mask optimization method and operating the system 310 to obtain single-molecule localization microscopy (SMLM) images. The computer system 300 may include a computing device 302. In one aspect, the computing device 302 is part of a server system 304, which also includes a database server 306. The computing device 302 is in communication with a database 308 through the database server 306. The computing device 302 is communicably coupled to the SMLM system 310 and a user computing device 330 through a network 60. The network 350 may be any network that allows local area or wide area communication between the devices. For example, the network 350 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user computing device 330 may be any device capable of accessing the Internet including, but not limited to, a desktop computer, a laptop computer, a personal digital assistant (PDA), a cellular phone, a smartphone, a tablet, a phablet, wearable electronics, smartwatch, or other web-based connectable equipment or mobile devices.

Figure 7:
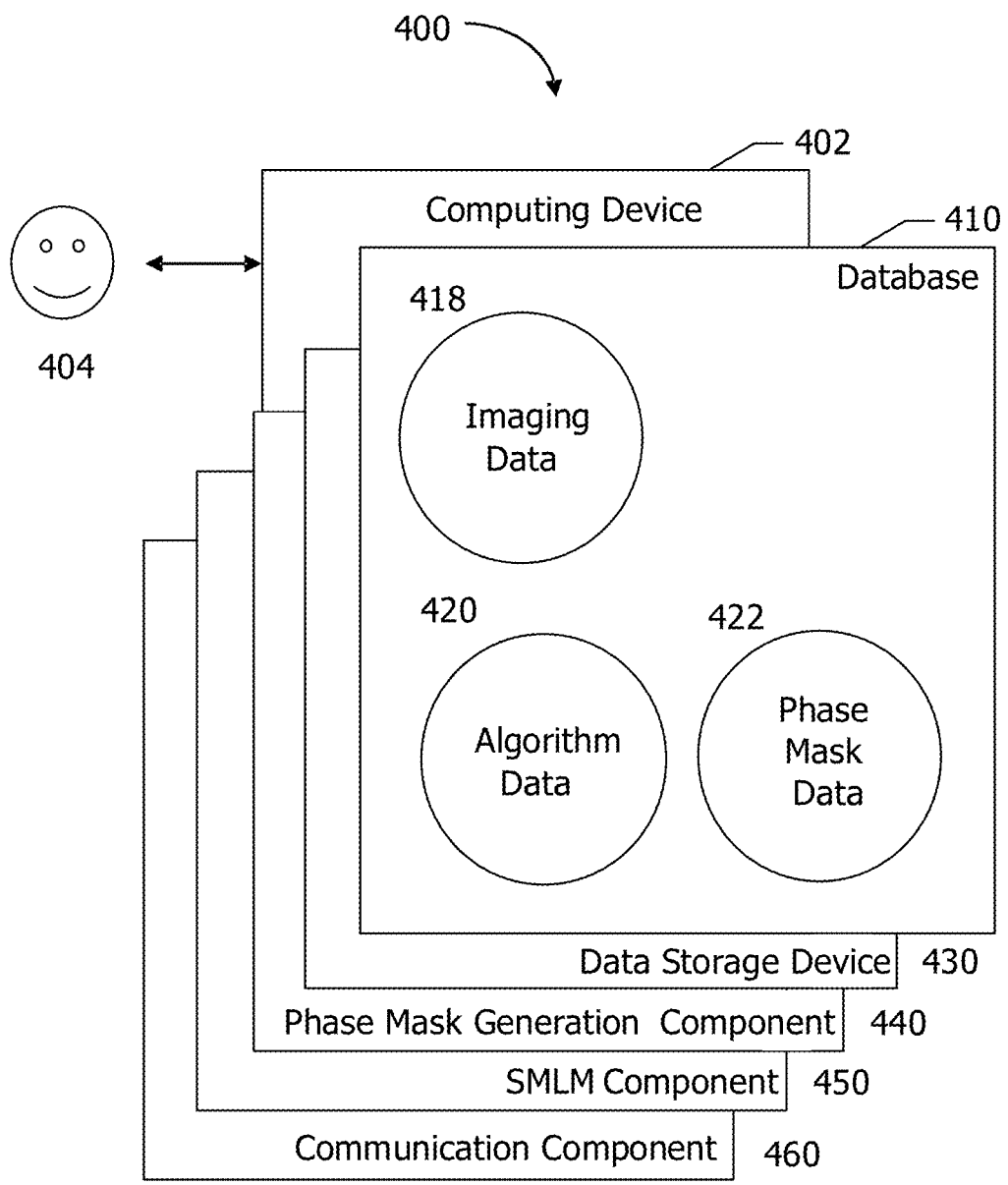
FIG. 7 is a block diagram schematically illustrating a computing device in accordance with one aspect of the disclosure.

In other aspects, the computing device 302 is configured to perform a plurality of tasks associated with designing a phase mask for obtaining SMLM images using the disclosed phase mask optimization method. FIG. 7 depicts a component configuration 400 of computing device 402, which includes database 410 along with other related computing components. In some aspects, computing device 402 is similar to computing device 302 (shown in FIG. 6). A user 404 may access components of computing device 402. In some aspects, database 410 is similar to database 308 (shown in FIG. 6).

In one aspect, database 410 includes SMLM imaging data 418 and algorithm data 420. Non-limiting examples of suitable algorithm data 420 include any values of parameters defining the optimization of the phase mask design and the analysis of SMLM imaging data, such as any of the parameters from the equations described herein.

Computing device 402 also includes a number of components that perform specific tasks. In the exemplary aspect, computing device 402 includes data storage device 430, SMLM component 450, and communication component 460. Data storage device 430 is configured to store data received or generated by computing device 402, such as any of the data stored in database 410 or any outputs of processes implemented by any component of computing device 402. SMLM component 450 is configured to operate or produce signals configured to design a phase mask for obtaining SMLM images using the disclosed phase mask optimization method, to operate an SMLM device to obtain SMLM data, and to reconstruct the SMLM image based on the SMLM data.

Communication component 460 is configured to enable communications between computing device 402 and other devices (e.g. user computing device 330 and IMRT system 310, shown in FIG. 6) over a network, such as network 350 (shown in FIG. 6), or a plurality of network connections using predefined network protocols such as TCP/IP (Transmission Control Protocol/Internet Protocol).

Figure 8:
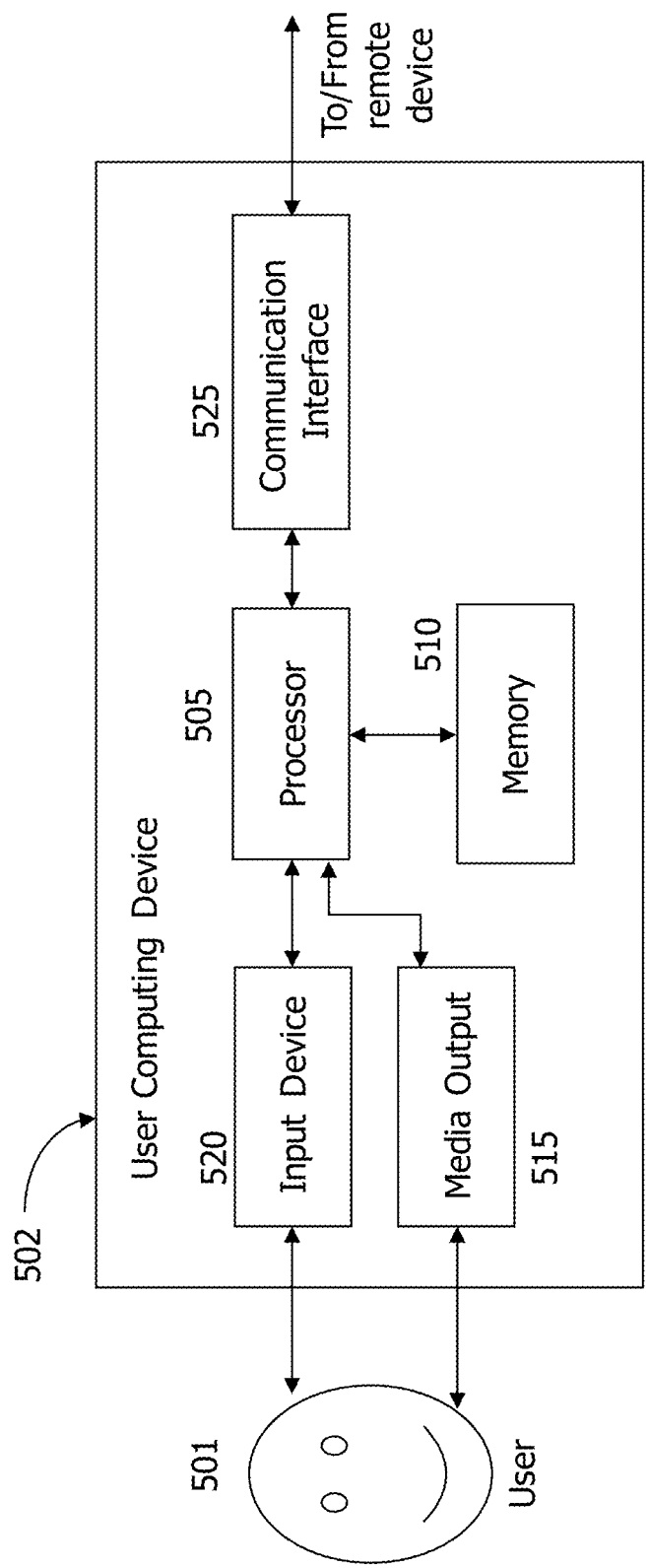
FIG. 8 is a block diagram schematically illustrating a remote or user computing device in accordance with one aspect of the disclosure.

FIG. 8 depicts a configuration of a remote or user computing device 502, such as user computing device 330 (shown in FIG. 6). Computing device 502 may include a processor 505 for executing instructions. In some aspects, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light-emitting diode (OLED) display, cathode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch-sensitive panel (e.g., a touchpad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 9:
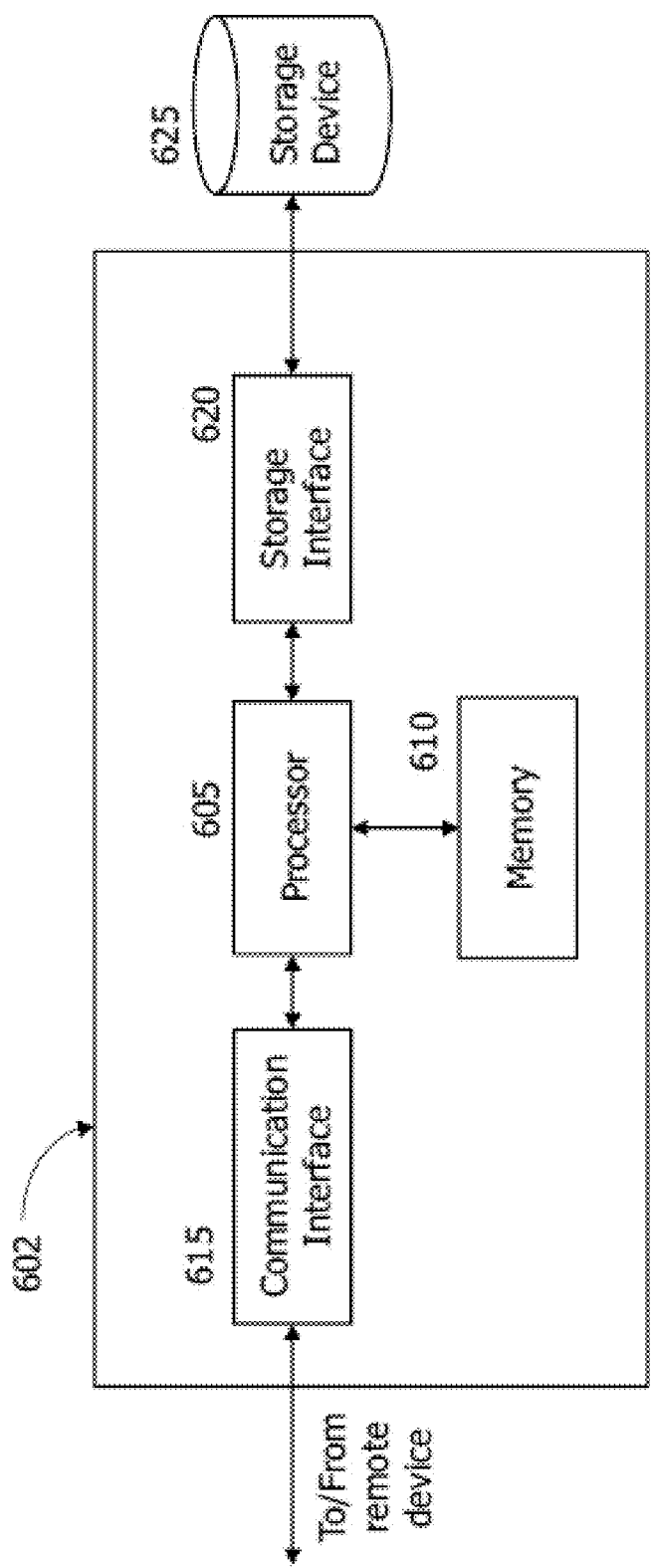
FIG. 9 is a block diagram schematically illustrating a server system in accordance with one aspect of the disclosure.
Figure 10:
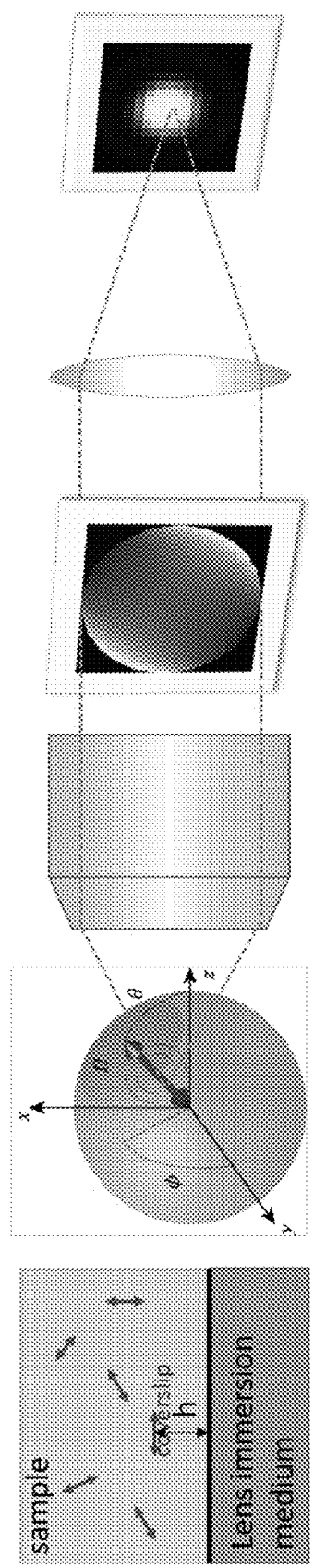
FIG. 10 is a schematic illustration of traditional imaging of a fluorescent sample that takes advantage of the orientation and rotation of a molecule. An image of a fluorescent emitter, e.g., a molecule or nanoparticle, depends on its orientation and axial location (h). The image also contains information on how much a molecule rotates during a camera frame (called its wobbling). Individual fluorescent molecules can be modeled as dipoles and it can be assumed a molecule rotates (wobbles) within a symmetric cone during one exposure time. Then θ, ϕ can be used to describe the center orientation of the cone and use solid angle Ω [sr] to describe the wobbling unit area on the unit sphere (Ω=0 means fixed dipole emitter and Ω=2π means a freely rotating, isotropic emitter). Each emitter also has its distinct 3D location (x, y, h). Completed measurements of the six-dimensional information (θ, ψ, Ω, x, y, h) can be a challenge since the information of orientation and position are coupled in the captured image. The traditional imaging system (that creates the standard dipole spread function (DSF)) performs poorly to convey the orientation (θ, ϕ, Ω) and the axial location (h) to the image captured by a camera.

FIG. 9 illustrates an example configuration of a server system 602. Server system 602 may include, but is not limited to, database server 306 and computing device 302 (both shown in FIG. 6). In some aspects, server system 602 is similar to server system 304 (shown in FIG. 6). Server system 602 may include a processor 605 for executing instructions. Instructions may be stored in a memory area 625, for example. Processor 605 may include one or more processing units (e.g., in a multi-core configuration).

Processor 605 may be operatively coupled to a communication interface 615 such that server system 602 may be capable of communicating with a remote device such as user computing device 330 (shown in FIG. 6) or another server system 602. For example, communication interface 615 may receive requests from user computing device 330 via a network 350 (shown in FIG. 6).

Processor 605 may also be operatively coupled to a storage device 625. Storage device 625 may be any computer-operated hardware suitable for storing and/or retrieving data. In some aspects, storage device 625 may be integrated into server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid-state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 8) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer-executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function that maps outputs to inputs and utilize the predictive function to generate ML outputs based on data inputs. The example inputs and example outputs of the training data may include any of the data inputs or ML outputs described above.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship.

In yet another aspect, ML methods and algorithms are directed toward reinforcement learning, which involves optimizing outputs based on feedback from a reward signal. Specifically, ML methods and algorithms directed toward reinforcement learning may receive a user-defined reward signal definition, receive data input, utilize a decision-making model to generate an ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, an ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware, or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving media, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

In one aspect, a computer program is provided, and the program is embodied on a computer-readable medium. In one aspect, the system is executed on a single computer system, without requiring a connection to a server computer. In a further aspect, the system is being run in a Windows® environment (Windows is a registered trademark of Microsoft Corporation, Redmond, Washington). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independently and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following examples illustrate various aspects of the disclosure.

Figure 11:
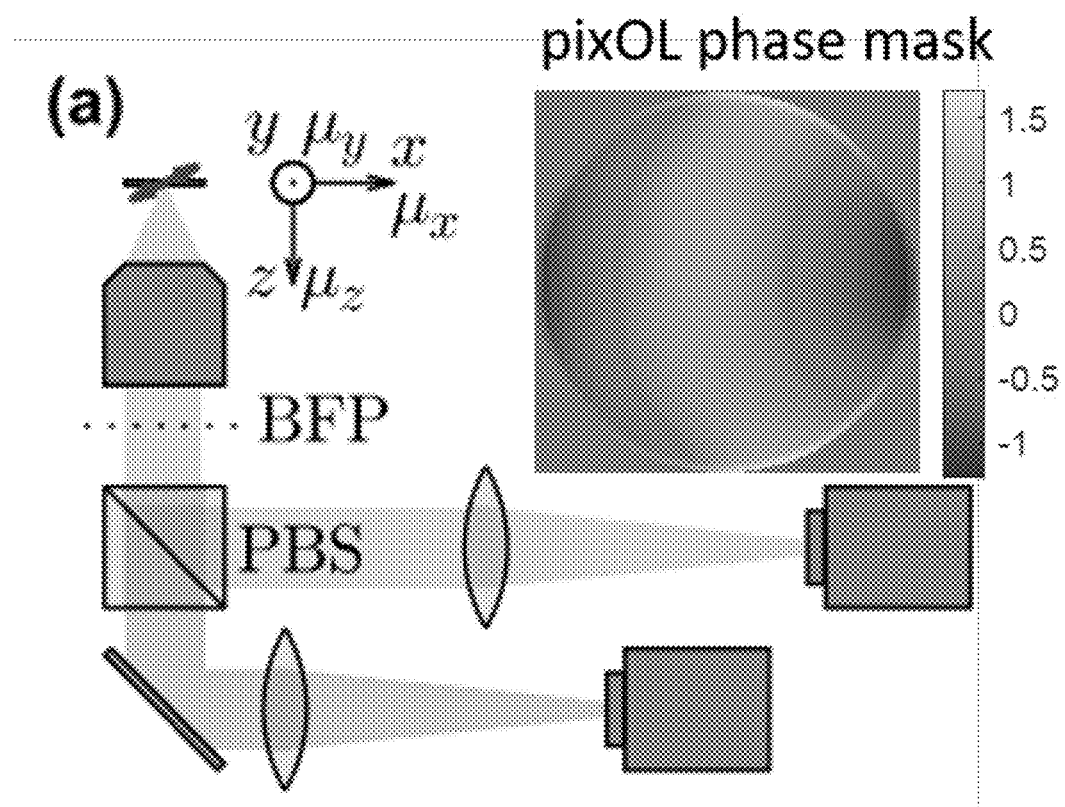
FIG. 11 is a schematic of the imaging scheme of the current disclosure wherein the emission light is manipulated by inserting a pixel-wise optimized phase mask P at the back focal plane (BFP). The polarizing beam splitter (PBS) positioned after the BFP splits the light into two polarization channels. The light is then captured by two cameras or two separate regions of a camera. The Cramér-Rao bound (CRB) matrix $R_M$ for orientational second moments indicates the orientational estimation precision of a technique. A gradient descent algorithm at TensorFlow platform is built to optimize the N×N pixels of the phase mask P simultaneously by minimizing the sum of the square root of the determinant of $R_M$ over a uniformly sampled orientation space. We term the optimized technique pixOL.
Figure 12:
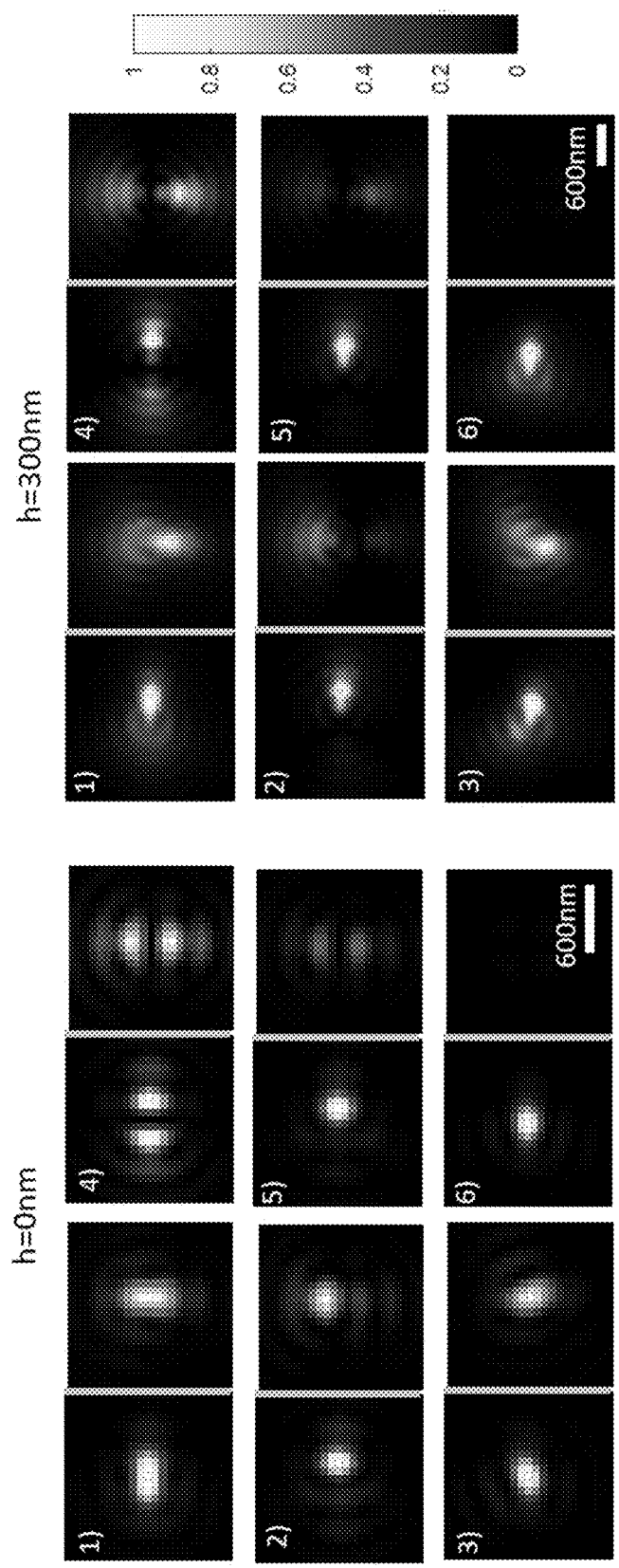
FIG. 12 is a set of images showing how pixOL encodes the orientation and the axial location information to the dipole spread function wherein the orientation and the 3D location can be measured unambiguously. The images show six distinct emitters with difference orientation at two axial positions (h=0 and 300 nm). Emitter 1: an isotropic emitter with Ω=2π; emitter 2: θ=30°, ϕ=45°, Ω=0; emitter 3: θ=90°, ϕ=45°, Ω=0; emitter 4: θ=0°, Ω=0; emitter 5: θ=30°, ϕ=0°, Ω=0; emitter 6: θ=90°, ϕ=0°, 2=0.

Example 1: Pixol: Pixel-Wise Dipole Spread Function Engineering for Measuring the 3D Orientation and 3D Location of Dipole-Like Emitters Here an algorithm is proposed, termed pixOL, to simultaneously optimize all pixels of a phase mask across two orthogonally polarized imaging channels for applications with a low SNR (FIG. 11). Unlike optimization using Zernike polynomials, pixOL can directly take advantage of super-critical fluorescence arising from imaging SMs near a refractive index interface. Using the resulting phase mask (FIG. 11 inset) enables simultaneous measurement of 3D orientation and 3D location of an emitter with small statistical variance. One can easily modify the parameters in pixOL to optimize a phase mask to fit their own microscope and application. Using the pixOL DSF, the orientation of Nile red (NR) molecules transiently attached to two supported lipid bilayers (SLBs): DPPC (di(16:0) PC) and DPPC with cholesterol is measured. The orientations of NR measured by the pixOL DSF reveal the chemical compositions of the SLBs.

Figure 25A:
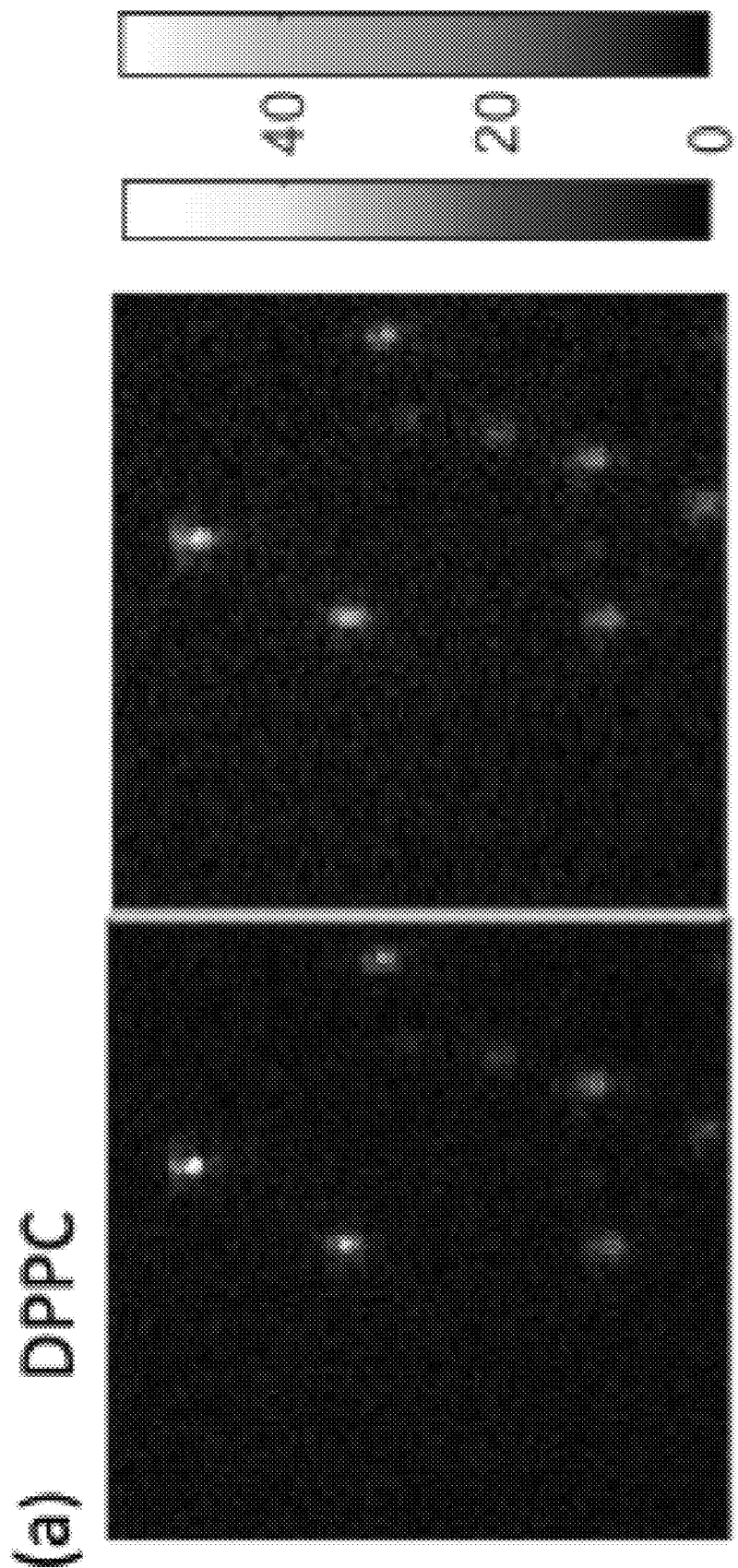
FIG. 25A is a set of two raw pixOL images of DPCC coated silica beads (left=red scale, right=blue scale) using 30 orientation measurements. Colorbar: photons. Scale bar: 1 μm.
Figure 25B:
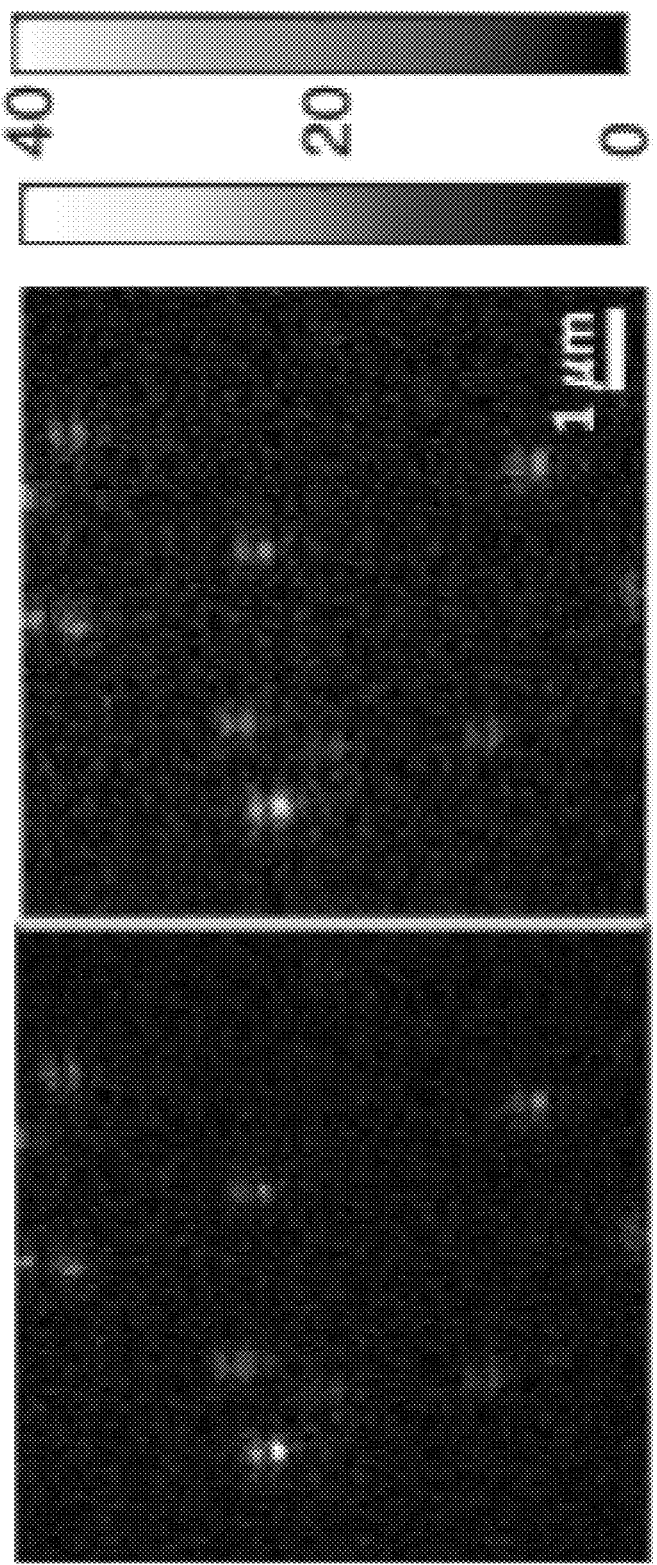
FIG. 25B is a set of two raw pixOL images of DPCC coated silica beads containing 40% cholesterol (left=red scale, right=blue scale) using 30 orientation measurements. Colorbar: photons. Scale bar: 1 μm. (c)

The SM is modeled as a dipole-like emitter (FIGS. 25A and 25B). Each emitter's 3D location is represented by (y, y, h). Polar angle θ and azimuthal angle φ describes the mean orientation of the emitter during a camera frame, and the solid angle Ω [sr] describes the wobble of a molecule during the camera acquisition (Ω=0 represents a fixed dipole emitter and Ω=2 pi means a freely rotating, isotropic emitter). For each set of orientation angles (θ, φ, Ω), there is a unique time-averaged orientational second moment $M \varepsilon R^{6 \times 1}$. The pixOL algorithm optimizes the phase mask P with N×N pixels by simultaneously updating all pixels towards the gradient direction that minimizes the Cramér-Rao (CRB) matrix $R_M \varepsilon R^{6 \times 6}$ as $$P_{opt} = \mathrm{argmin}_{P \in R^{N \times N}} \Sigma \sqrt{(\det(R_M(\theta, \phi, \Omega, P)))},$$

where det(•) donates the matrix determinant, and the summation is over orientation space. Thus, pixOL converges upon the phase mask that optimizes the precision of measuring M.

Figure 13:
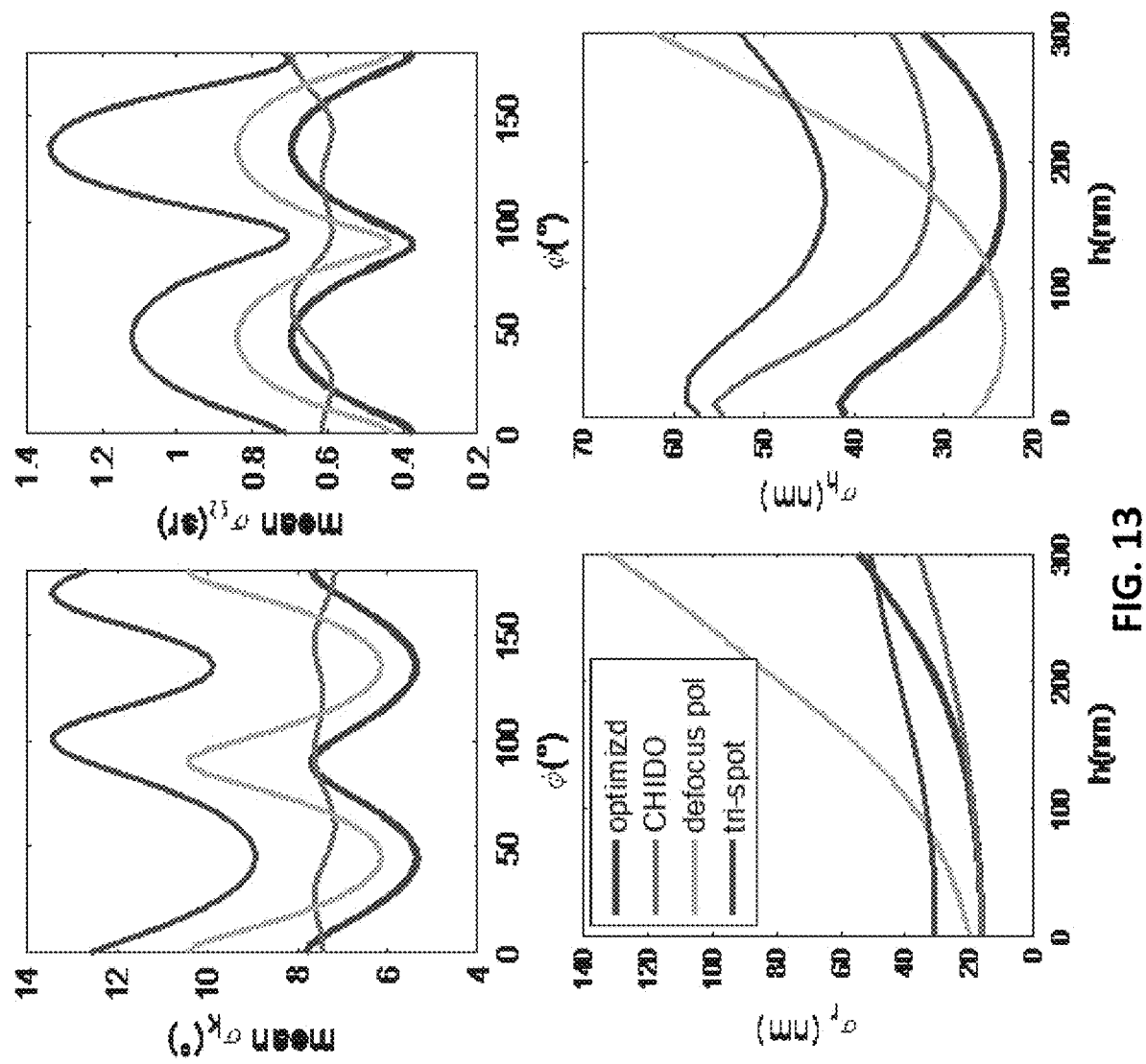
FIG. 13 is a set of graphs comparing DSF methods (tri-spot, CHIDO, defocused polarization, optimized pixOL) calculating the best achievable estimation precision calculated from Cramér-Rao bound theory. pixOL provides smaller uncertainty for θ, ϕ, Ω estimation compared to existing DSFs and also has a good lateral and axial precision. The root-mean square angular error (RMSAE) $σ_k$ is a combined metric from the standard derivation (std) $σ_θ$ of θ estimation and the std $σ_ϕ$ of ϕ estimation ($σ_k = \sqrt{\sin^2θ σ_ϕ^2 + σ_θ^2}$). The std $σ_r$ of lateral precision is a combined metric from the std $σ_x$ of x axis and the std $σ_y$ of y axis ($σ_r = \sqrt{σ_x^2 + σ_y^2}$).
Figure 14:
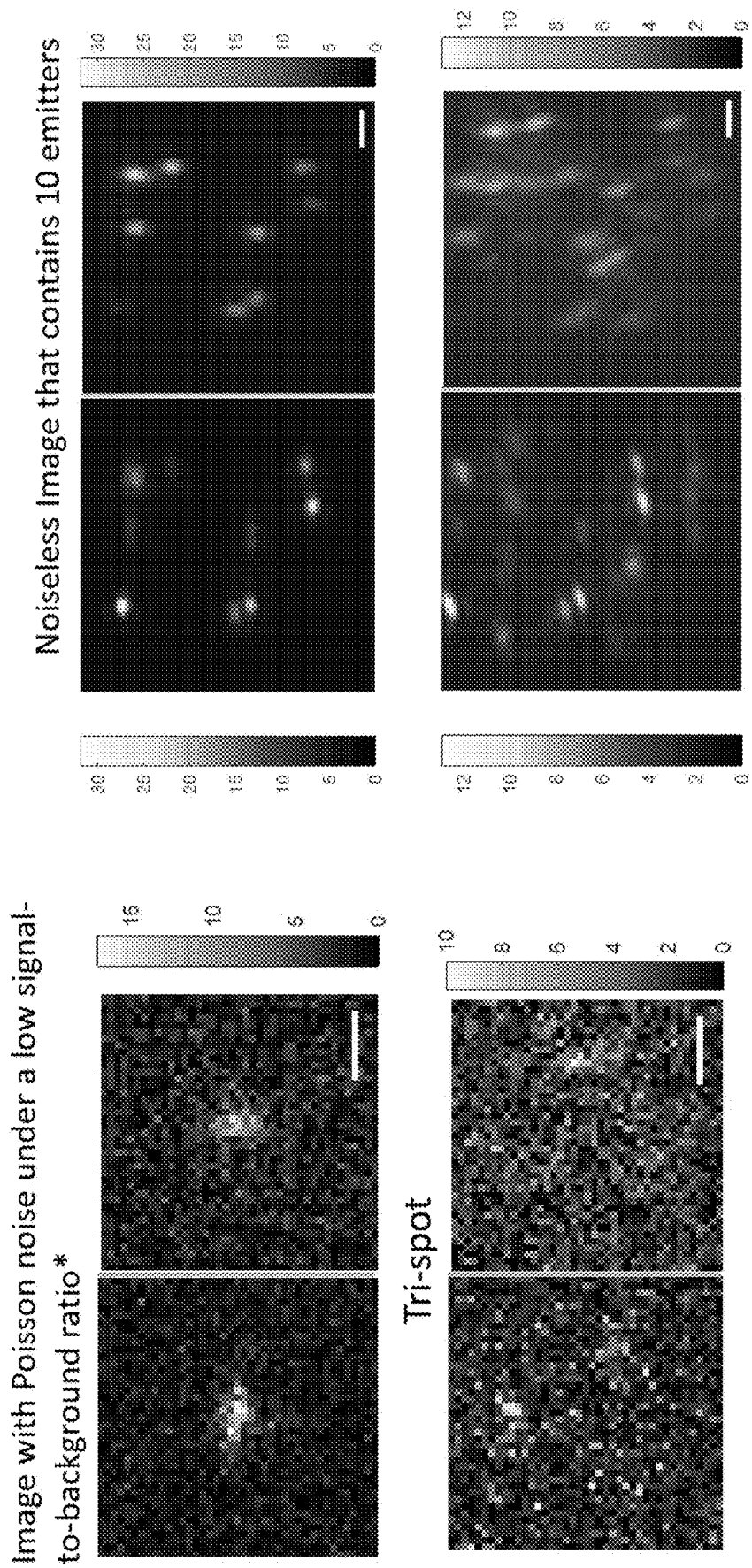
FIG. 14 is a set of images comparing pixOL to tri-spot in Poisson noise and noiseless conditions. The small footprint of pixOL provides it higher detectability for a localization software than multispot DSFs (e.g., tri-spot). The image also has less overlapped dipole spread functions when the emitters' density is high.
Figure 15:
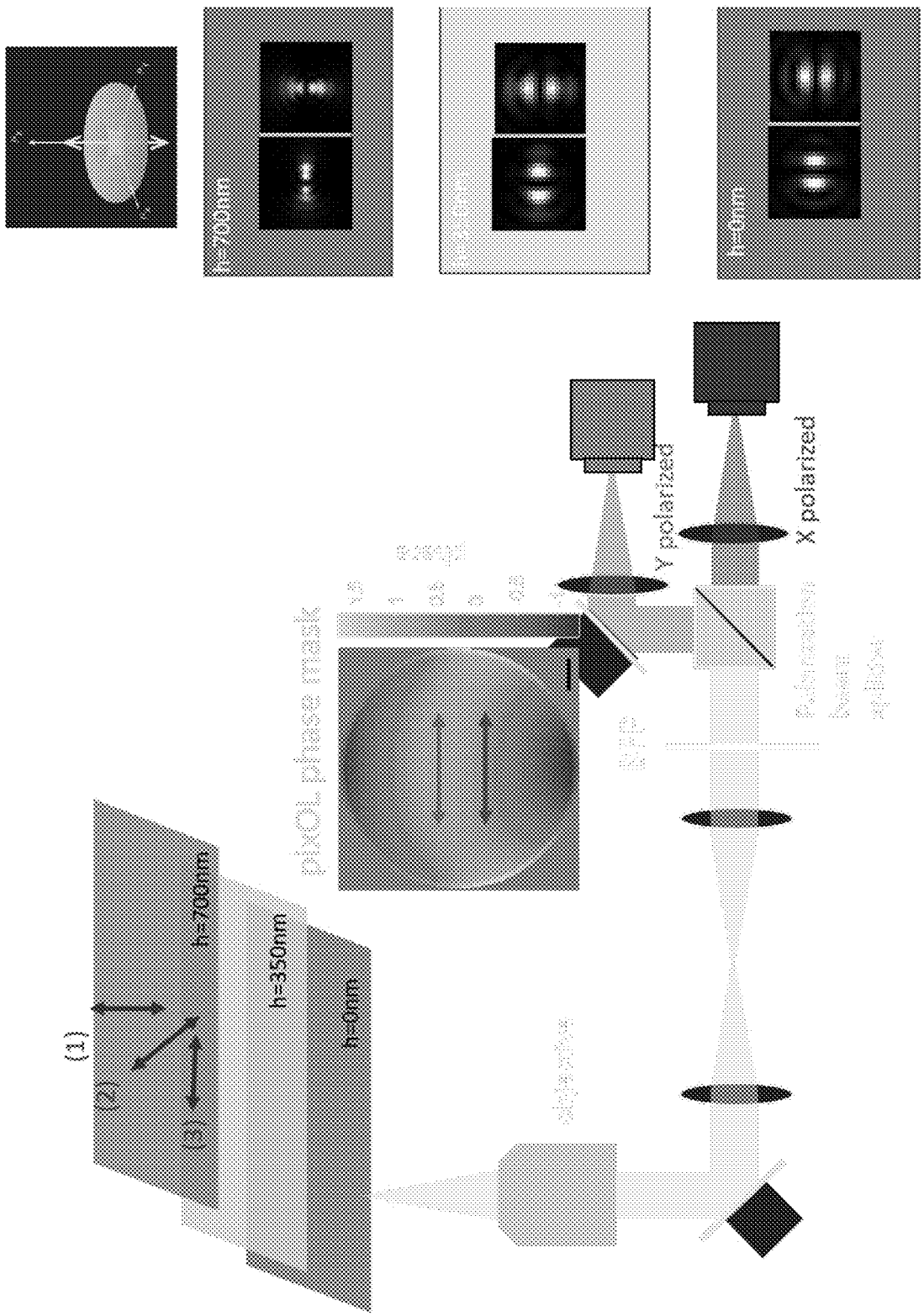
FIG. 15 is a schematic of the pixOL optical set-up.
Figure 16:
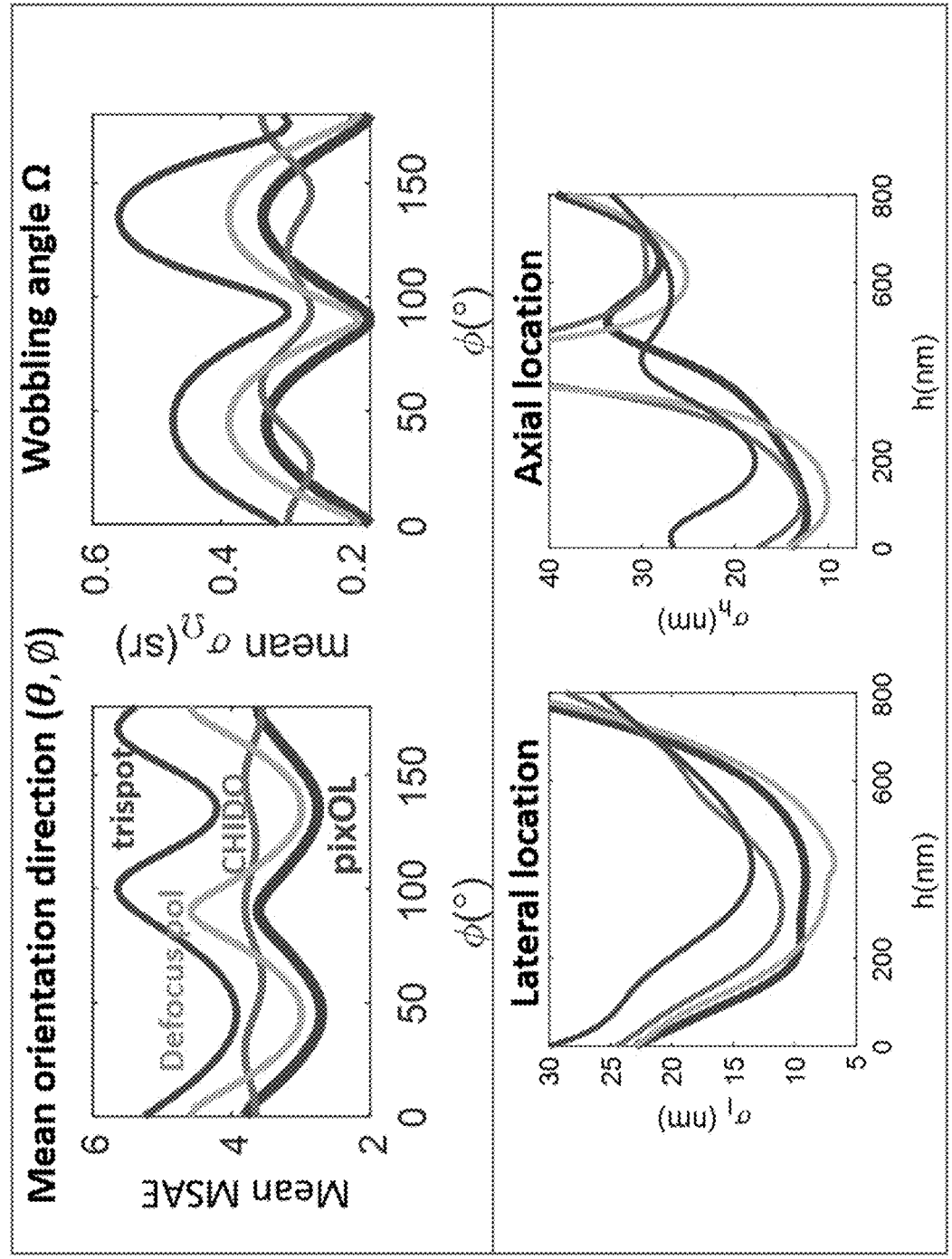
FIG. 16A is a graph of mean orientation direction accuracy between DSFs (trispot, defocused polarization, CHIDO, pixOL) using theoretical models.
FIG. 16B is a graph of wobbling angle accuracy between DSFs (trispot, defocused polarization, CHIDO, pixOL) using theoretical models.
FIG. 16C is a graph of lateral location accuracy between DSFs (trispot, defocused polarization, CHIDO, pixOL) using theoretical models.
FIG. 16D is a graph of axial location accuracy between DSFs (trispot, defocused polarization, CHIDO, pixOL) using theoretical models.
Figure 17:
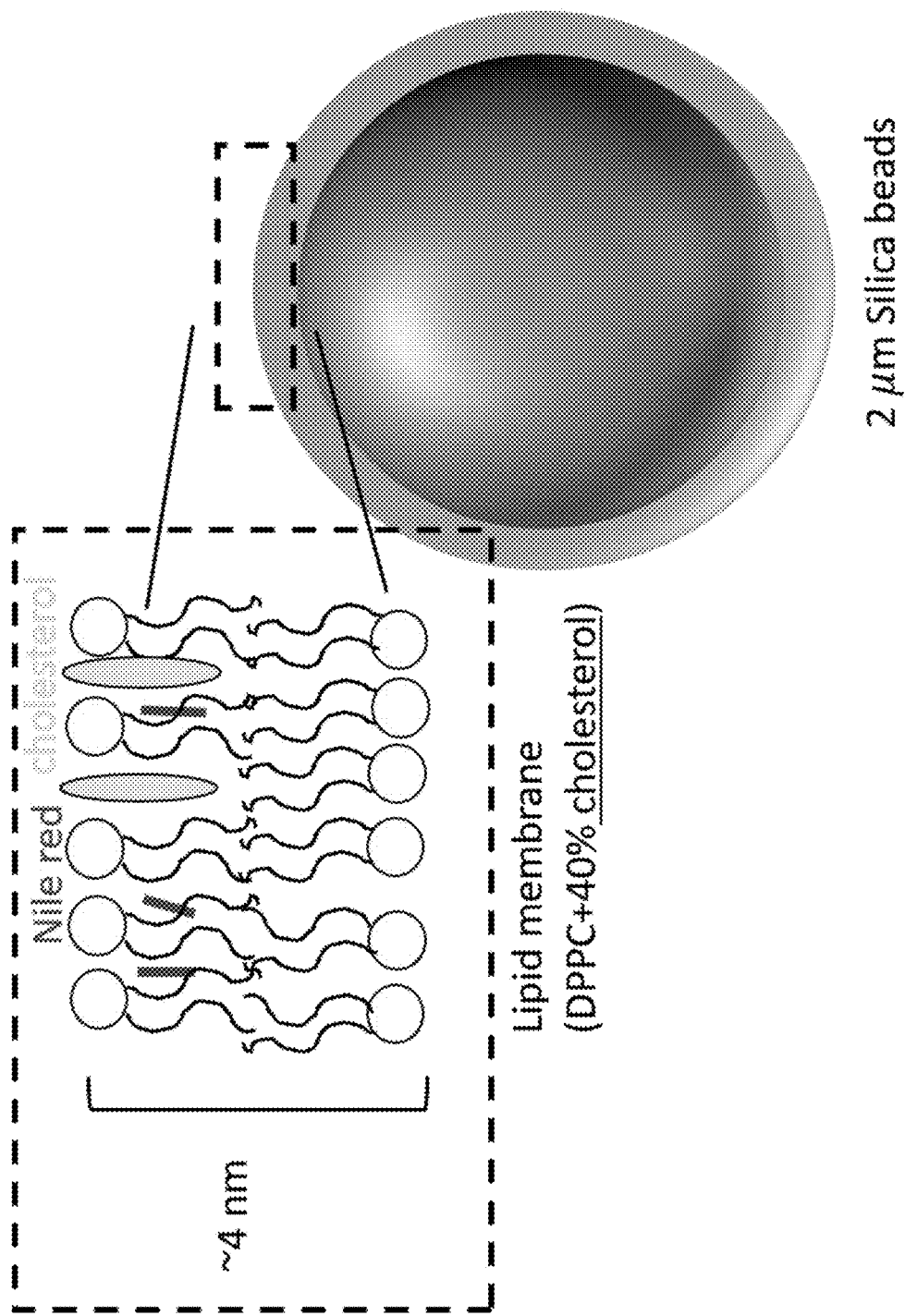
FIG. 17 is a schematic of a fluorescent contrast agent used in pixOL experiments composed of a 2 μm diameter silica bead core with a lipid bilayer coating containing Nile red and cholesterol.
Figure 18:
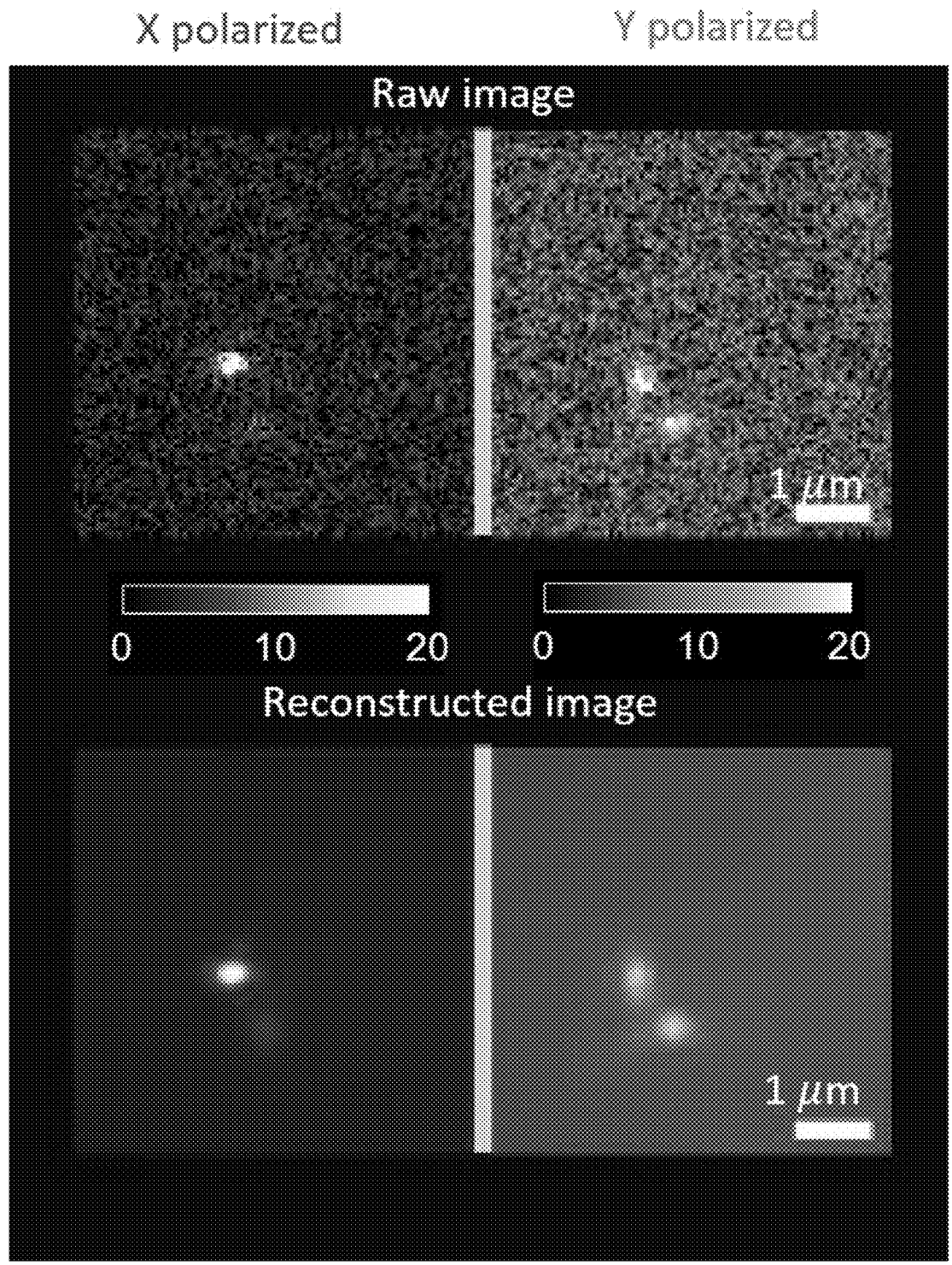
FIG. 18 is a set of x-polarized (left) and y-polarized (right) images of the contrast agent described in FIG. 17 before (top) and after (bottom) pixOL reconstruction.
Figure 19:
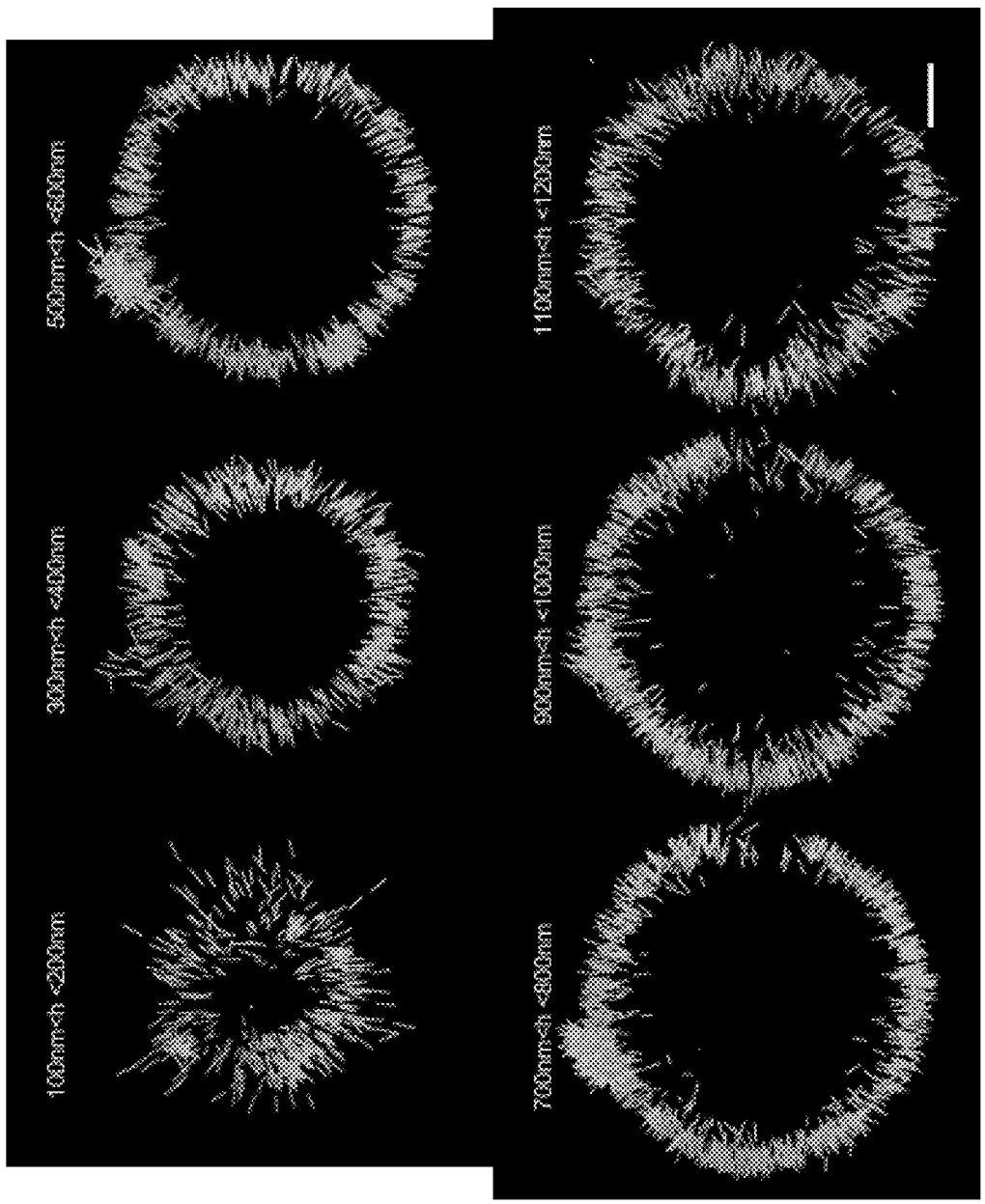
FIG. 19 is a set of pixOL images through an individual silica bead described in FIG. 17, wherein the Nile red is oriented perpendicular to the spherical surface.
Figure 20:
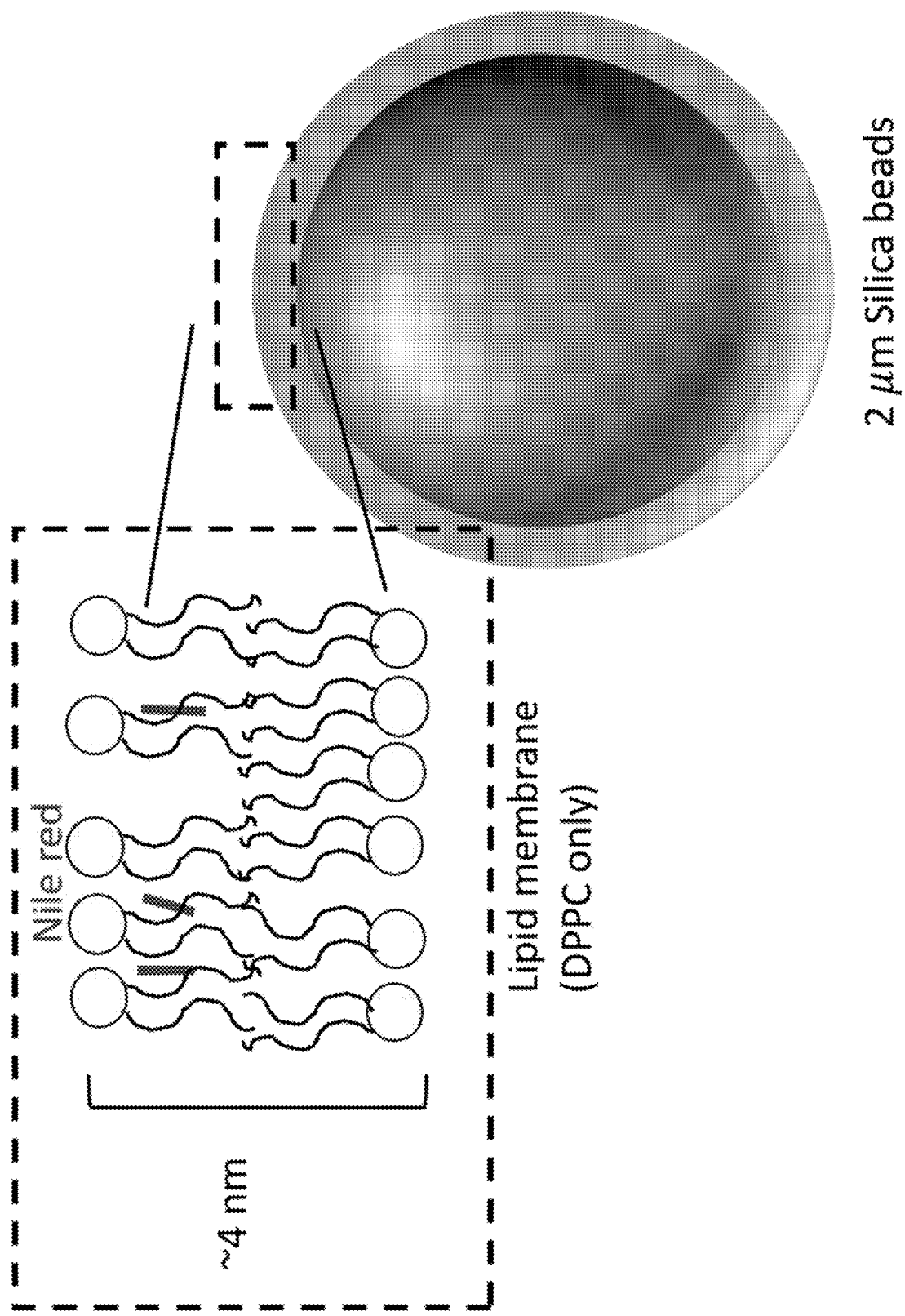
FIG. 20 is a schematic of a fluorescent contrast agent used in pixOL experiments composed of a 2 μm diameter silica bead core with a lipid bilayer coating containing Nile red.
Figure 21:
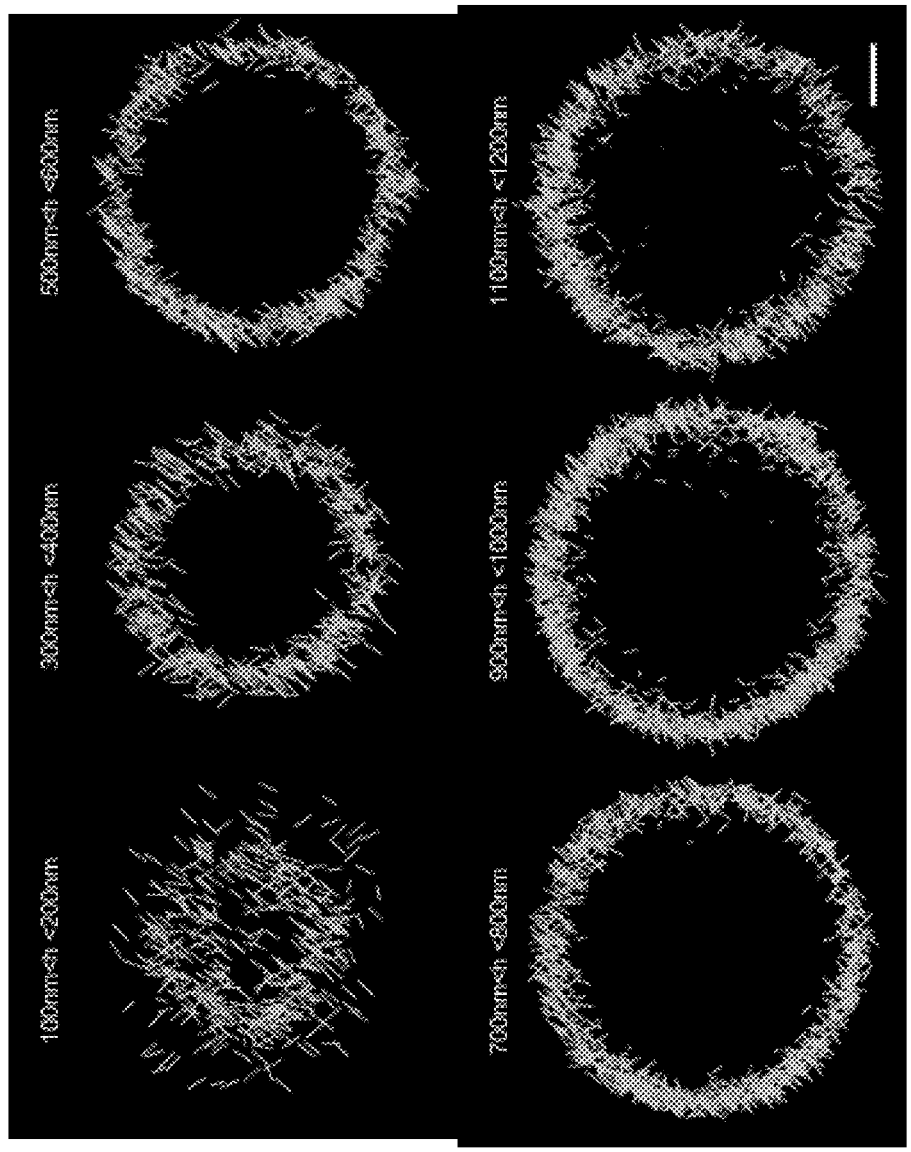
FIG. 21 is a set of pixOL images through an individual silica bead described in FIG. 20, wherein the Nile red is randomly oriented on the spherical surface.
Figure 22B:
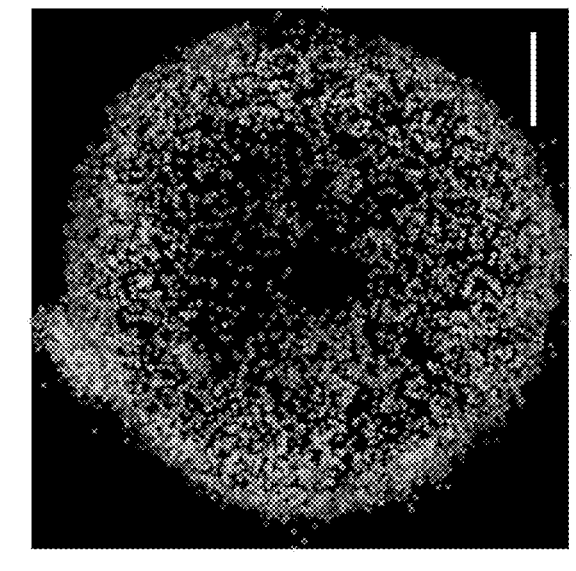
FIG. 22B is a reconstructed pixOL image of the bead described in FIG. 17 (with cholesterol) showing Nile red oriented perpendicular (θ) on the surface.
Figure 22A:
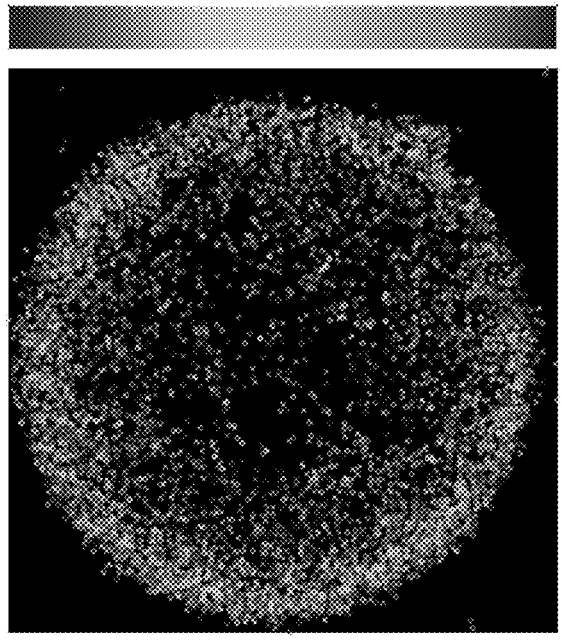
FIG. 22A is a reconstructed pixOL image of the bead described in FIG. 20 (no cholesterol) showing randomly oriented (θ) Nile red on the surface.
Figure 23:
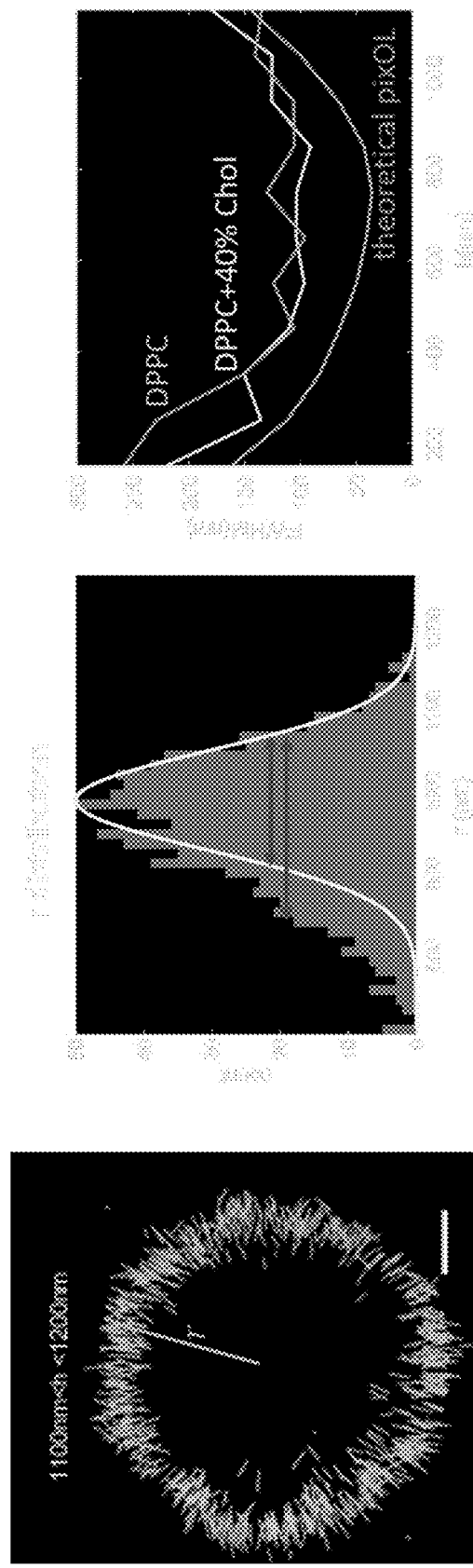
FIG. 23 is a pixOL image (left) and a comparison of the accuracy of the pixOL image compared to a theoretical pixOL model (middle and right). The experimental precision (FWHM=137 nm) for measuring lateral direction is very close to the theoretical precision (FWHM=82 nm) over an axial range of 1200 nm.
Figure 24:
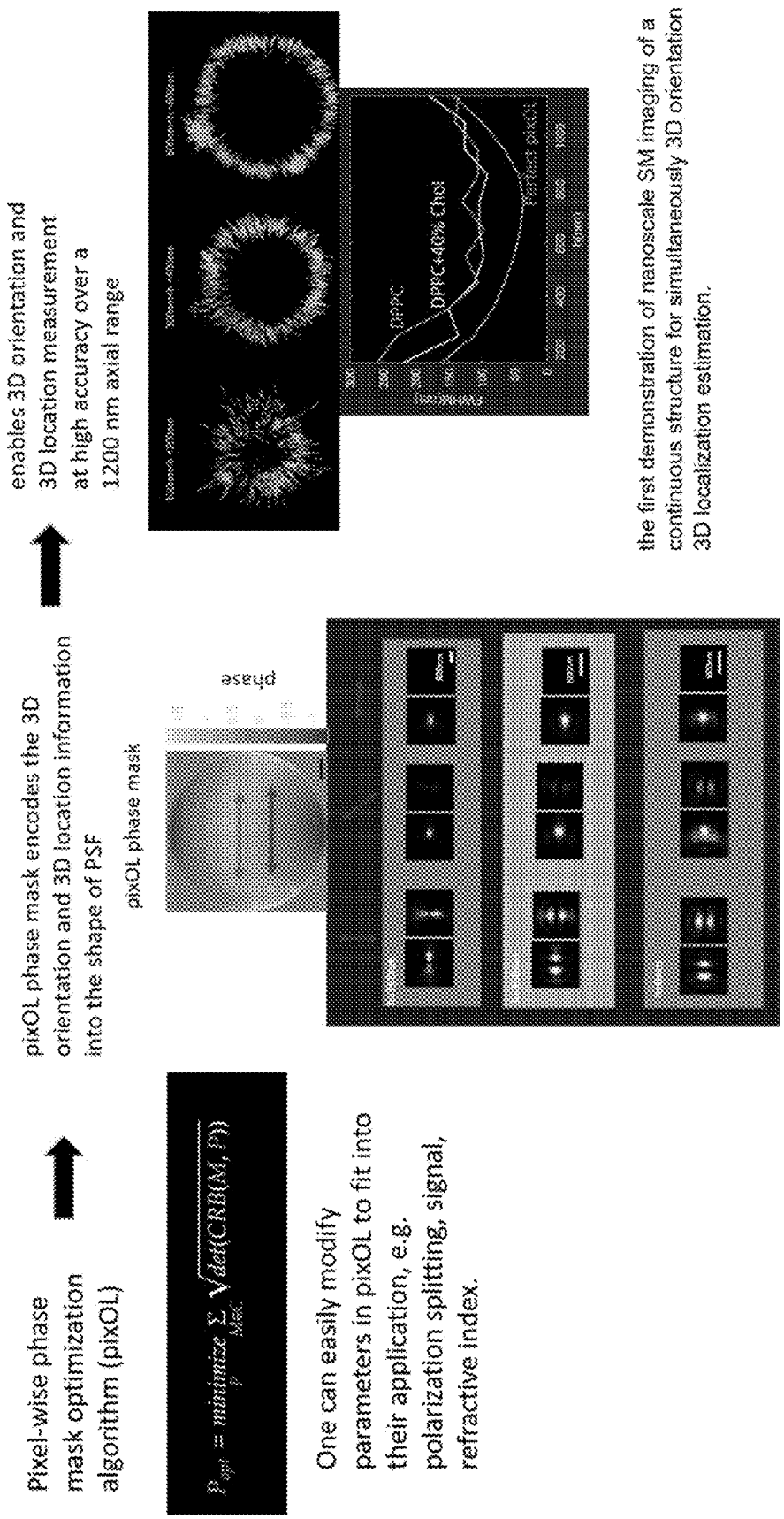
FIG. 24 is a summary schematic of the pixOL workflow.

With the pixOL phase mask Popt (FIG. 11 inset) inserted at the back focal plane of a microscope, emitters at different 3D orientations (FIGS. 25C and D, emitters 1-6) and at two axial locations (FIGS. 25C and D, h=0 nm and h=300 nm) are easily resolvable from one another in the image plane. Notably, these images are similar in size to the standard diffraction-limited DSF. Thus, the pixOL DSF is suitable for low SNR applications and densely labeled samples. For fixed emitters (Ω=0) at a glass-water interface, the average root-mean-square angular error $\sigma_k$ is calculated as a combined standard deviation of measuring θ and φ and the average standard deviation $\sigma_\Omega$ of Ω using the CRB (FIG. 13 two left graphs). Compared to other orientation-sensing DSFs, namely CHIDO, the polarized DSF defocused at 200 nm below the coverslip, and the tri-spot DSF, the pixOL DSF shows the best 3D orientation estimation precision. The lateral (x,y) localization precision $\sigma_r$ and the axial localization precision $\sigma_h$ for an isotropic emitter (FIG. 13, two right graphs) were also calculated. The pixOL DSF has the best axial localization precision and good lateral precision following CHIDO.

Figure 25C:
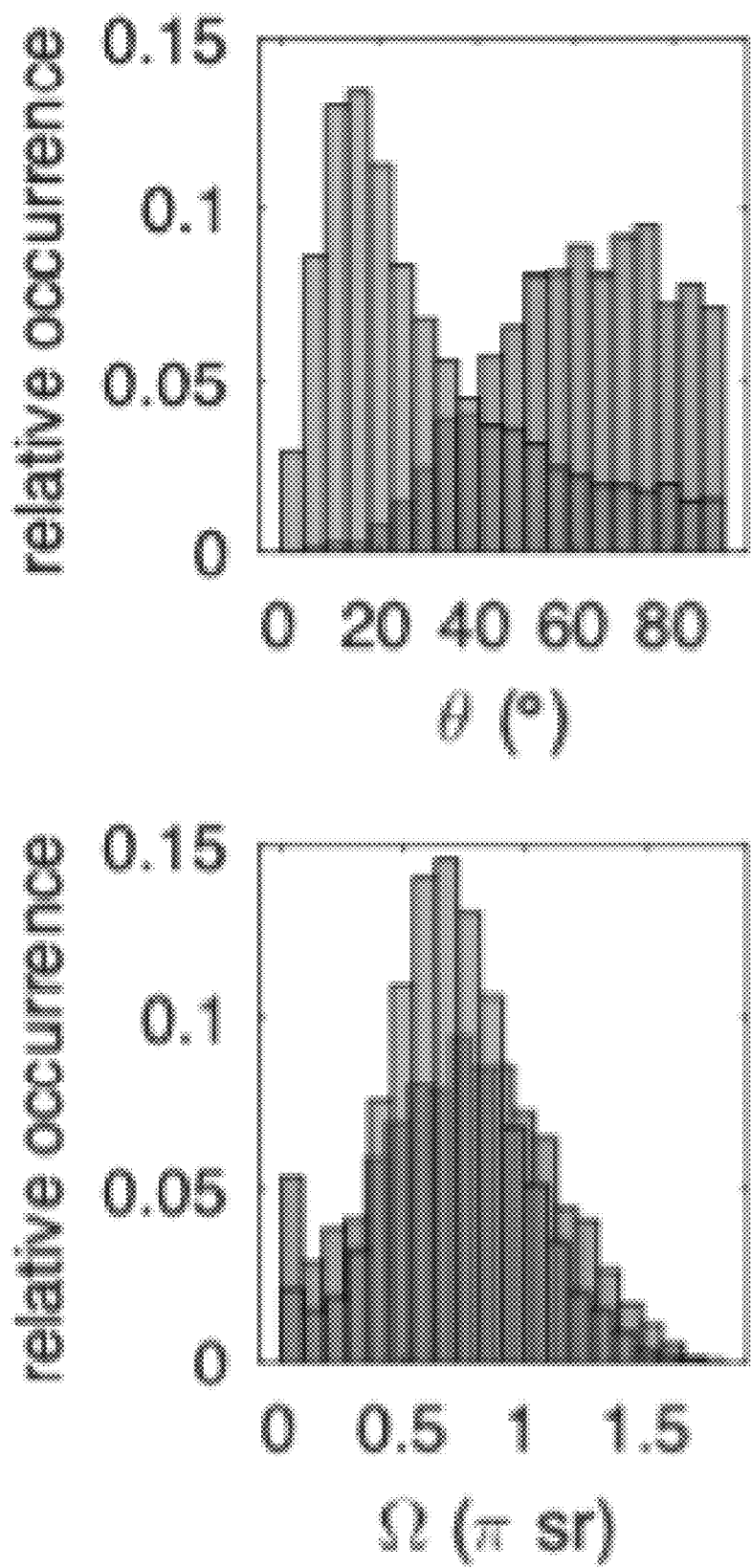
FIG. 25C is a set of histograms of measured 3D orientations (polar angle θ, wobbling solid angle Ω) of nile red (NR) contrast agent. Blue: DPPC; orange: DPPC with 40% cholesterol.
Figure 25D:
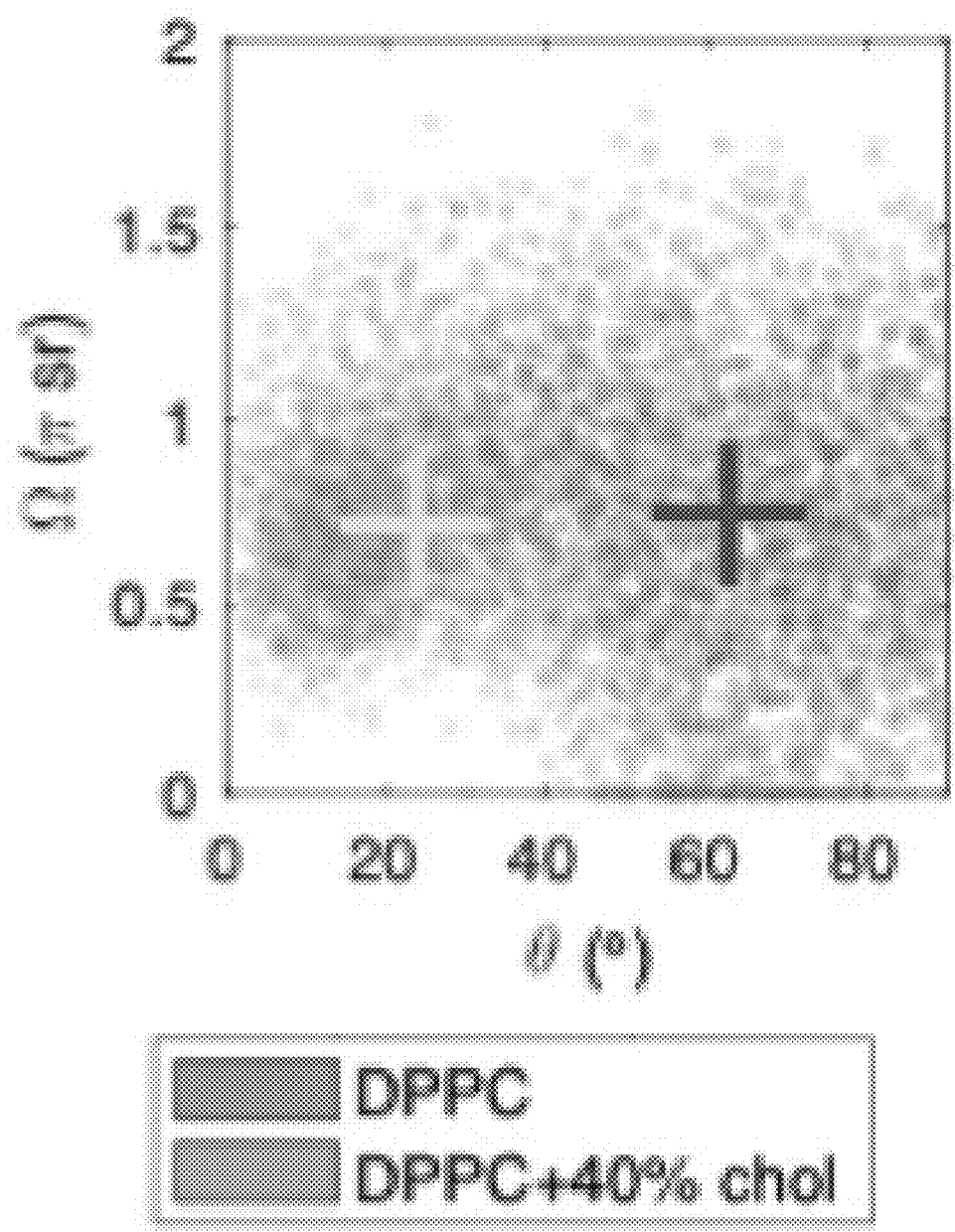
FIG. 25D is a scatter plot of the measured θ and Ω of NR in DPPC (blue) and DPPC with cholesterol (orange). Purple cross: median orientations of NR in DPPC; yellow cross: median orientations of NR in DPPC with 40% cholesterol.

Using the pixOL DSF, the orientations of Nile red (NR) emitters transiently attached to two SLBs: DPPC (di(16:0) PC) and DPPC with 40% cholesterol were measured (FIGS. 25A and B). Within SLBs, the orientation of NR is greatly influenced by its local environment. Added cholesterol (chol) condenses lipid acyl chains and stabilizes lipid membranes. A sparsity-promoting maximum-likelihood estimator was used to estimate the brightness, 2D position (x,y), and 3D orientation (θ, φ, Ω) of individual NR within each frame. The orientations of NRs in DPPC with chol are tilted further away from the coverslip plane than NRs in DPPC without chol (FIG. 25B). The orientations in DPPC with chol have a narrower distribution indicating a more stabilized lipid membrane environment (FIG. 25C).

Here, an algorithm (pixOL) that optimizes a phase mask pixel-by-pixel to efficiently encode the 3D orientation and 3D location of an emitter into the shape of the DSF is demonstrated. The resulting pixOL DSF, optimized for a microscope with two polarized detection channels, shows superior measurement precision for both 3D orientation and 3D position compared to existing methods. In addition, the pixOL DSF is similar in size to the diffraction-limited DSF, enabling it to be used with samples optimized for standard localization microscopy with minimal changes. The orientation measurements of NR confirm that pixOL can visualize the chemical compositions of lipid membranes.

Figure 26B:
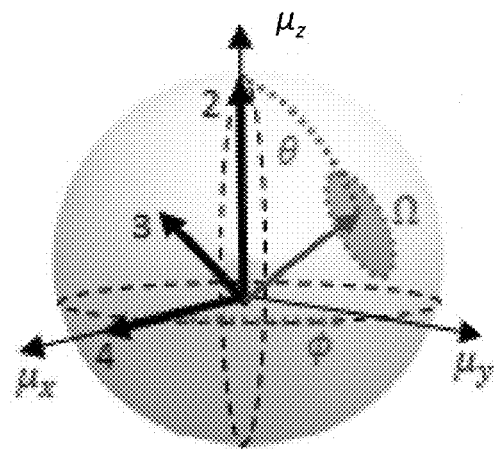
FIG. 26B is a schematic of parameterizing the orientation of an emitter using polar angle θϵ [0°, 90°], azimuthal angle ϕϵ (−180°, 180°], and wobbling solid angle Ωϵ [0, 2π] sr.

Example 2: Pixel-Wise Optimization for 3D Orientation and 3D Localization Estimation A fluorescent emitter is modeled as a dipole-like emitter with orientation characterized by the mean orientation direction (θ, φ) and the wobbling solid angle Ω (FIG. 26B). The image produced by the microscope is linearly proportional to a molecule's orientational second-moment vector $m = [\langle \mu_x^2 \rangle, \langle \mu_y^2 \rangle, \langle \mu_z^2 \rangle, \langle \mu_x \mu_y \rangle, \langle \mu_x \mu_z \rangle, \langle \mu_y \mu_z \rangle] \in R^6$ as $I = s[B_{xx}, B_{yy}, B_{zz}, B_{xy}, B_{xz}, B_{yz}]m + b \in \mathbb{R}^{N \times 1}$, where $\mathbb{R}^{N \times 1}$ is the captured intensity on a camera with N pixels, s is the number of signal photons detected from the emitter, and b is the background in each pixel. The matrices $B_j \in \mathbb{R}^{N \times 6}$, correspond to the imaging system's response to each orientational second moment and can be calculated with vectorial diffraction theory; these basis images comprise the 6 modes of any fluorescence microscope when imaging dipole-like emitters. The angle brackets ⟨•⟩ represent a temporal average over one camera frame A single-molecule microscope directly encodes an emitter's lateral location into the location of its DSF on the captured 2D image. The axial location h and 3D orientation (θ, φ, Ω) are hidden in the shape of the DSF. To achieve high estimation precision for 3D orientation and 3D location, the shape of the DSF should vary quickly with respect to changes in the orientation and the axial location of the emitter. This varying speed can be quantified using Fisher information matrix, which is only related to the microscope design and the imaging sample. Its inverse matrix, Cramér-Rao bound matrix (CRB), gives a lower bound on the estimation variance for any unbiased estimator.

The CRB matrix K is leveraged for estimating the second moment vector n to optimize the phase mask for a microscope that splits the light into x-polarization and y-polarization channel (FIG. 26A). We consider emitters that are located at the focal plane and water environment are considered. The refractive index interface creates intensity concentrated super-critical angles at the back focal plane. To best leverage this feature, all the pixels Pij of the phase mask are simultaneously optimized by minimizing the loss function 1 (Eqn. (11) above).

To avoid poor lateral estimation precision, The algorithm is forced to create DSFs smaller than 1.8 μm×1.8 μm by ignoring photons outside this range. The algorithm outputs a phase mask (pixOL phase mask) that efficiently encodes the orientational six moments m.

Figure 26C:
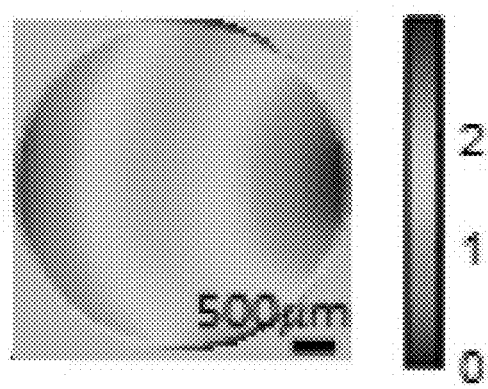
FIG. 26C is an image of an optimized pixOL phase mask. Colormap: phase (rad). Scalebar: 500 μm.
Figure 26D:
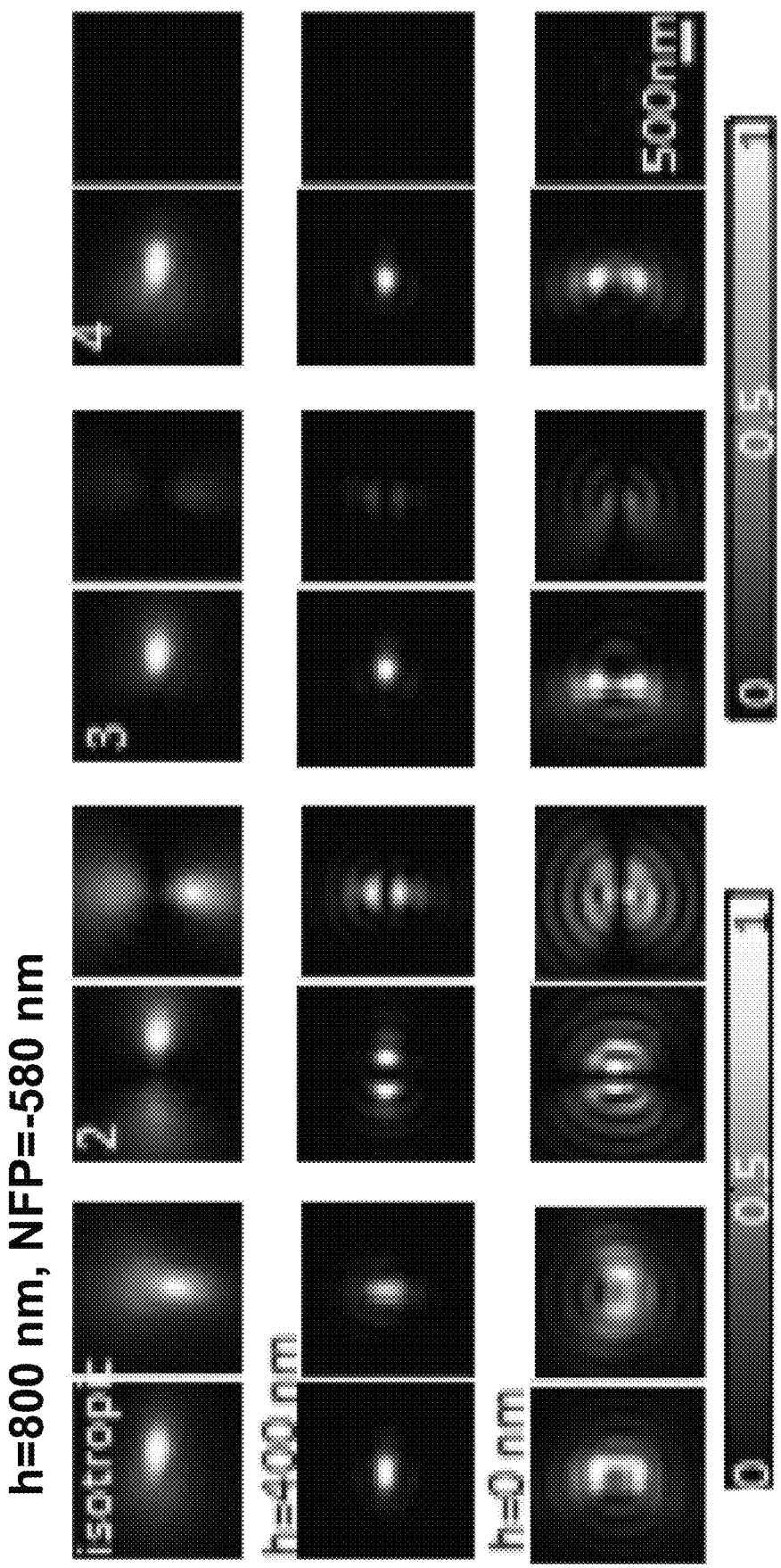
FIG. 26D is a set of simulated images of emitters located at h=800 nm, h=400 nm, and h=0 nm with orientations (θ, ϕ, Ω) shown in FIG. 26B (emitter 1: (−, −, 2π), emitter 2: (0°, 0°, 0), emitter 3: (45°, 0°, 0), emitter 4: (90°, 0°, 0)), captured in the two polarization channels shown in (a) with the objective lens focused at z=−580 nm. The intensities of each red-blue image pair are normalized. Scale bar: 500 nm.

With the pixOL phase mask (FIG. 26C) at the back focal plane, the microscope generates DSFs with various shapes and different intensity distribution across x/y channels for SMs with different orientations and axial locations (FIG. 26D). Interestingly, a 90° rotation of DSFs for SMs above the coverslip and below the coverslip were noticed, indicating high estimation precision for axial location.

Using CRB of three orientation parameters or location parameters, the pixOL DSF is compared to other engineered DSFs designed for 3D orientation namely the polarized DSF defocused at 200 nm below the coverslip, tri-spot DSF, and CHIDO DSF which is designed for 3D orientation and 3D localization. The mean square angular error a is calculated as a combined standard deviation of measuring θ, φ and the standard deviation $\sigma_\Omega$ of wobbling angle. For emitters at the focal plane (FIGS. 27A and B) or out of the focal plane, pixOL shows the best precision for measuring the three orientation parameters. The standard deviation a of measuring the lateral location and the standard deviation $\sigma_h$ of height for isotropic emitters across an axial range of 800 nm were also quantified (FIGS. 26C and D). The pixOL DSF has the best axial estimation precision and good lateral precision. Therefore, it is expected that pixOL DSF will be a good technique for simultaneously orientation and localization estimation.

In any experiment, optical aberrations will perturb the designed DSF and decrease estimation performance. When using a liquid-crystal spatial light modulator to create the piXOL DSF, the conjugate of the pixOL phase mask (pix-$OL_{cjg}$) preserves the features from the ideal DSF better than pixOL phase mask itself. Therefore, the conjugate phase mask was used in the experimental demonstrations. A custom algorithm based on negative log likelihood loss function is used for joint orientation and location estimation. To calibrate the algorithm, phase retrieval was used to model the experimental DSF calibrated using fluorescent beads.

Scanning these beads across an axial range of 1400 nm enables verification of the localization and orientation measurement precision experimentally. The estimated focal plane locations z resolve the 50 nm stage movements very well (FIG. 27E) with an axial precision $\sigma_z$ of 2.56 nm averaged over all steps (FIG. 27E). Orientation measurements of the bead confirm that its emission pattern is consistent with that of an isotropic emitter (FIG. 27E, average $\Omega=1.76\pi$, average $\sigma_\Omega=0.08$). Measurement for other beads confirms similar results. These observations confirm that the pixOL DSP's estimates of position and orientation are accurate and precise for bright emitters (average of XX photons detected).

Example 3: 3D Orientation and 3D Location Estimations Reveal Lipid Composition Optical Instrumentation and Alignment The pixOL DSF is implemented using a home-built epifluorescence microscope. Briefly, a polarization resolved 4f imaging system, consisting of relay lenses and a polarizing beamsplitter, is appended to a fluorescence microscope to project two polarized images onto separate regions of a camera (FIG. 30). A spatial light modulator (SLM, Meadowlark Optics, 256 XY Phase Series) is placed at the conjugate back focal plane (BFP) of the imaging system and loaded with the pixOL phase mask to modulate the x- and y-polarized fluorescence simultaneously (FIG. 30 inset(i)(ii)).

To properly align the SLM, we load a binary phase mask consisting of concentric rings of increasing radius (10-pixel interval) centered on the SLM. A dense layer of fluorescent beads (100-nm diameter red 580/605 FluoSpheres, Invitrogen F8801) on a coverslip is used to generate fluorescence for calibration. By using the flipping mirror in FIG. 30, a camera (camera 2 in FIG. 30) placed at a conjugate back focal plane is able to observe the pupil of the objective lens and the SLM ring pattern simultaneously in the y-polarization channel. The axial alignment of the SLM is adjusted until the pupil and rings are sharp simultaneously. The SLM is shifted laterally until the SLM's ring mask is centered with respect to the microscope pupil (FIG. 54). The alignment of the SLM within the x-polarization channel can be verified by adjusting the position of lens 4 and camera 2 in FIG. 30. In our experience, lateral deviations of the SLM up to ~0.1 mm are difficult to detect by observing the pixOL DSF itself.

Imaging System Calibration

We calibrate the imaging model in Section 2 to the DSF of our imaging system by using fluorescent beads (100-nm diameter red 580/605 FluoSpheres, Invitrogen F8801). Images are captured by scanning the objective's nominal focal plane from z=−790 nm to z=610 nm with a step size of 50 nm (FIGS. 55E, 56F, and 27E). At each plane, 11 images are taken.

A phase-retrieval algorithm is used to retrieve the experimental phase mask, calibrated pixOL ˜P. To accurately characterize the optical aberrations of our microscope, the phase masks of the two polarized channels are estimated independently (FIGS. 55B and C, FIGS. 56C and D). The simulated DSFs using the calibrated phase masks ˜P match the experimental DSFs very well (FIGS. 55F and 56G).

Phase retrieval for both the pixOL phase mask and its conjugate mask (pixOL*) was performed. The retrieval algorithm assumes that the polarized field from a dipole emitter is collected by an ideal objective lens and that the polarizing beam splitter splits x and y-polarized light with a perfect contrast ratio. Thus, the optical aberrations are assumed to be strictly phase-only. It is noticed that the pixOL phase mask's DSF has a large aberration when the objective is focused below the coverslip (z>0, FIG. 55E). While aberrations also exist in the pixOL* experimental DSF at the same locations, its mismatch relative to the ideal pixOL DSF is more modest and is similar to spherical aberration (FIG. 56F).

High frequency patterns in the calibrated phase masks near the edge of the aperture are also noticed (FIGS. 55B and C, FIGS. 56C and D). To test if these patterns meaningfully impact the shape of the DSF, smoothed versions of the calibrated phase masks are reconstructed by projecting it into a Zernike basis using the first 231 Zernike polynomials (FIGS. 57A and B). The negative-likelihood (NLL, Eqn. S15) is calculated between the DSF predicted by each mask and the experimental images of beads used for phase retrieval (FIG. 55D and FIG. 56E). The NLL ($NLL_{calibrated}$) for the calibrated phase masks is always smaller than the NLL ($NLL_{smoothed}$) for the smoothed phase masks (FIGS. 57C and D). These data indicate that the calibrated masks are more consistent with the experimentally observed DSFs than the smoothed masks.

Preparing 3D Spherical Supported Lipid Bilayers

Supported lipid bilayers (SLBs) were formed by fusing vesicles on silica beads. A lipid mixture containing 0.286 mg/mL DPPC (di(16:0) phosphatidylcholine, Avanti Polar Lipids 850355) and 0.1 mg/mL cholesterol (Sigma Aldrich C8667) within Tris buffer (100 mM NaCl, 3 mM Ca2+, 10 mM Tris, pH 7.4) is first incubated in a water bath at a temperature of 65° C. Simultaneously, 1 mg/mL silica beads (2.0 μm diameter, Bangs Laboratories SS04002) are also incubated in the water bath for ~10 minutes. After two solutions reach to thermal equilibrium, 30 μL of the lipid mixture and 90 μL of the silica beads are mixed together and stay in the water bath for another 30 minutes. During the 30 minutes, the mixture is vortexed every 5 minutes. The mixture is then moved outside the water bath together with around 200 mL of warm water to allow it to cool down to room temperature for about 1 hour. During this cooling process, the mixture is vortexed every 5 minutes to allow the lipid bilayer to coat the bead uniformly.

After the mixture cooled down to room temperature, the excess vesicles are removed using six successive 5-min centrifuge spins at 500 RPM. The supernatant is discarded and replaced with imaging buffer (100 mM NaCl, 10 mM Tris, pH 7.4) after each spin.

Imaging Spherical Lipid Bilayers Using Nile Red

Nile red (32 nM) is added to the imaging buffer to probe the morphology and composition of the spherical lipid bilayers. Circularly polarized illumination (1533 W/cm2 or 30 mW at 561 nm at the sample) is used to excite NR. Fluorescence is collected using an objective lens (OLYMPUS UPLSAPO100XOPSF, NA 1.4) and passes through a dichroic mirror (Di01-R488/561, Semrock) and bandpass filter (FF01-523/610, Semrock). The difference between the basis images of the pixOL DSF for fluorescence at the two edges of the filter (641 nm and 583 nm) is small (peak difference of 8.3%, FIG. 58). The chromatic aberration introduced by the nonzero fluorescence bandwidth is negligible.

20000 frames are captured with an exposure time of 110 ms. To compensate for axial drift of the microscope during long-term imaging, the objective is refocused every 2000 frames. Nominal focal plane (NFP) of z=−350 nm for the DPPC+chol bead and an NFP of z=−500 nm for the DPPC-only bead is used. The lateral drift of the microscope is corrected after imaging. The lateral centers of each sphere are aligned using SM position estimates averaged in groups of 2000 frames. With these experimental conditions, single molecule blinking are observed with properties shown in FIG. 60.

To quantify the localization precision for NRs, we plot the $NR_{lateral}$ positions r relative to the sphere's center within each h slice (FIGS. 61D and 62D). We compare the experimental distribution to a theoretical distribution $p_{theo}$ calculated by convolving the lateral positions $p_{sphere}$ representing the spherical surface with the expected lateral localization distribution $p_{pixOL}*$ of pixOL* based on the CRB when normal focal plane equals to −580 nm, i.e.

$$p_{theo}(r) = p_{sphere} \otimes p_{pixOL}* \quad (S27)$$

where $$p_{sphere}(r) = \frac{R}{\left(\sqrt{R^2 - r^2}\right)},$$

$$p_{pixOL*}(r) = \frac{1}{\sigma_L\left(\sqrt{R^2-r^2}\right)\sqrt{2\pi}} \times \exp\left[-\frac{1}{2}\left(\frac{r}{\sigma_L\left(\sqrt{R^2-r^2}\right)}\right)^2\right]$$

where R is the radius of the sphere, $\sigma_L(\sqrt{R^2-r^2})$ is the lateral precision of pixOL* for an emitter on the sphere's surface with $h=R-\sqrt{R^2-r^2}$, and $\otimes$ represents convolution operation.

Results

To validate the pixOL technique for simultaneous 3D orientation and 3D location estimation, supported lipid bilayers (SLBs) are adhered to 2 μm silica beads (FIG. 28A). In here, two kinds of SLBs are used, namely DPPC with 40% cholesterol and DPPC. Nile reds (NRs) are used to transiently attached to the SLBs and emit fluorescent light (FIG. 28A). A quarter waveplate (QWP) is added into the imaging pathway to generate circular polarized light so that both in-plane and out-of-plane emitters can be excited.

Figure 28F:
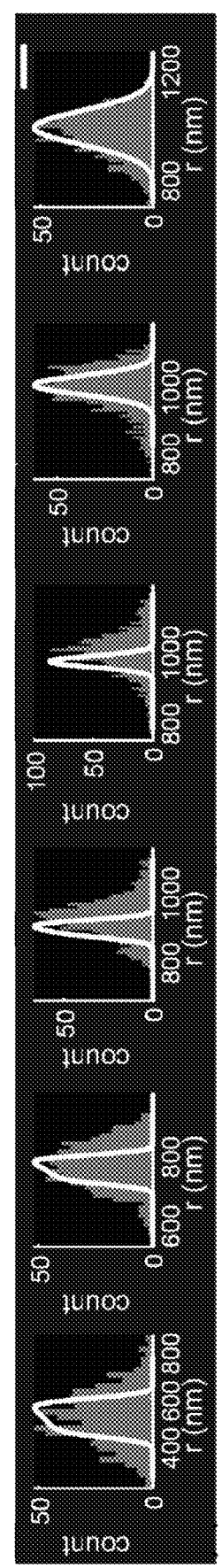
FIG. 28F is a set of histograms (f) Histograms of the measured r for SMs in each z slices of the images in FIG. 28E and are compared to the theoretical distribution (yellow lines) calculated using the spherical model and the lateral precision of pixOL$_{cjg}$.
Figure 28G:
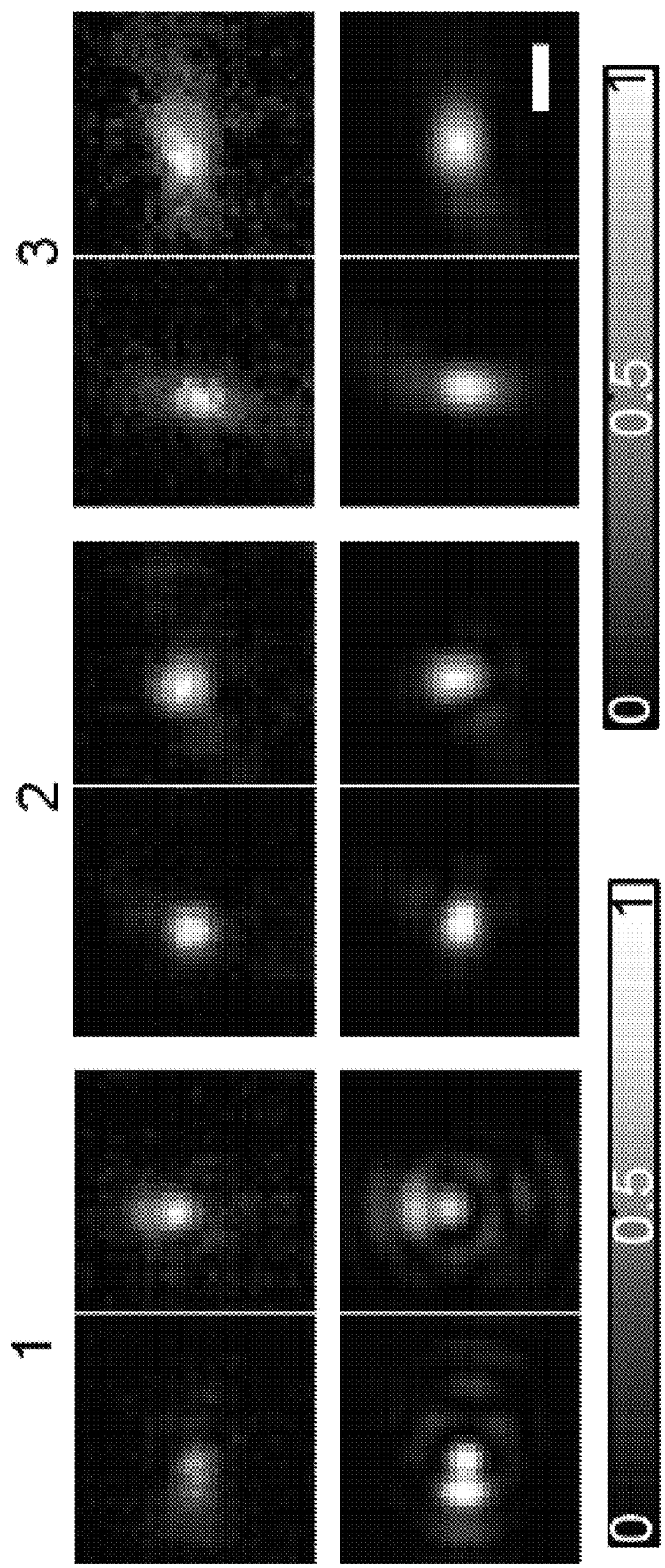
FIG. 28G is a sum of images of estimations located within a 50 nm×50 nm×100 nm box at three axial locations shown in FIG. 28E. ((1): h=150 nm; (2): h=550 nm; (3): h=950 nm). The centers of boxes are located at the spherical surface and at a direction with $\phi$ of −135°. Images at the bottom column are simulated images for emitters with perpendicular orientation to the spherical surface.
Figure 28H:
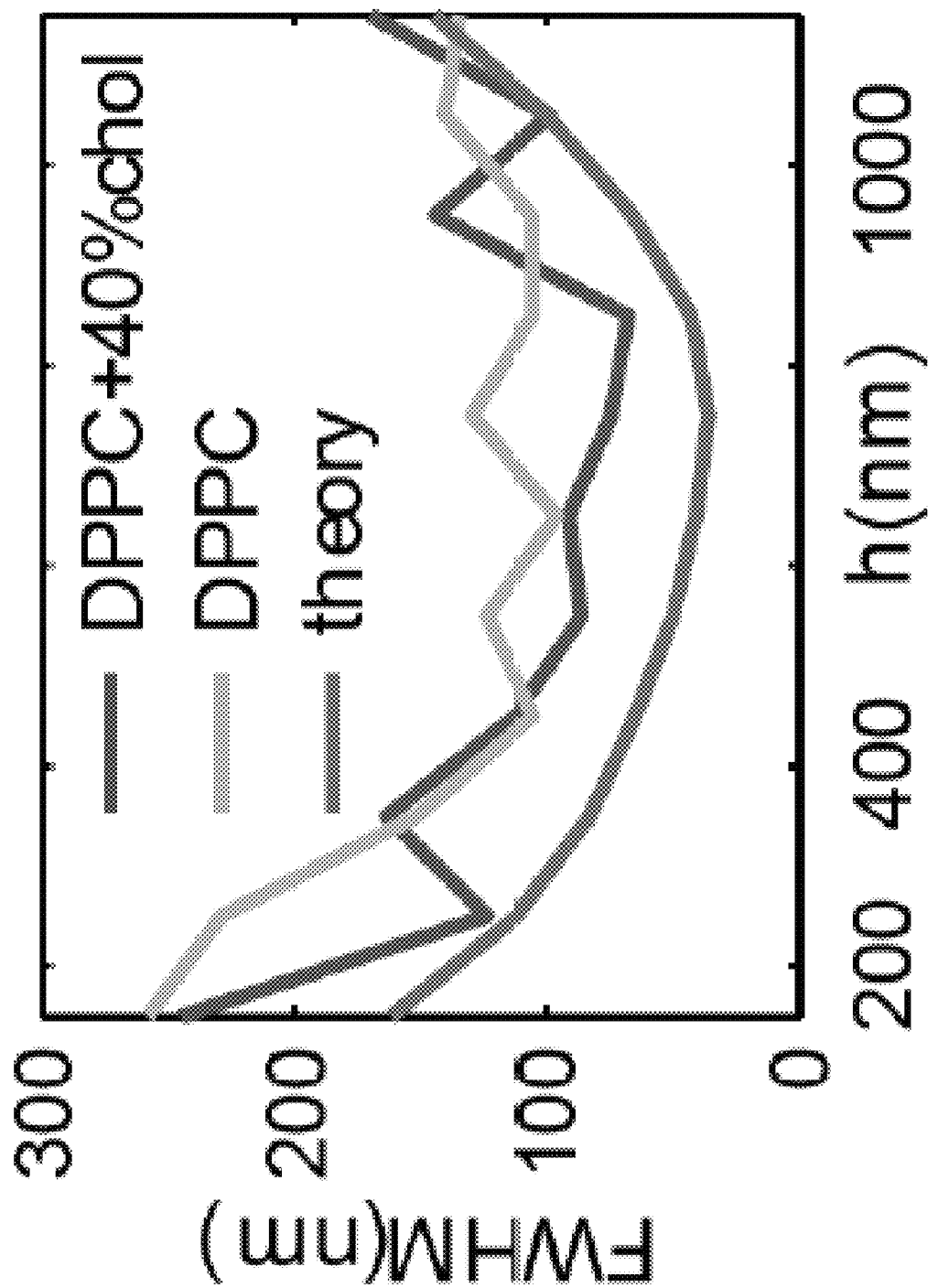
FIG. 28H is a graph of the full width half maximums (FWHMs) of r distribution in FIG. 28F at each z slices for the DPPC with cholesterol bead (blue) and the DPPC bead (yellow) and are compared to the theoretical FWHM (orange).

For beads coated with DPPC and cholesterol, the estimated orientation changes from out-of-plane orientations (small θ) at the bottom of the sphere to be in-plane orientations (θ closing to 90°) at the waist plane of the sphere (FIGS. 28B and C). The estimated φ changes radially along the circle at each z slices (FIG. 28E). For estimations below the waist plane of the sphere (h=1000 nm), the φ estimation matches to the opposite direction of the colormap; when SMs are close to the waist plane, the orientation overlapped for every pair of φ and φ-180° as they are identical when θ=90°; for SMs above the waist plane, the φ becomes matching to the colormap. The 3D orientation (θ, φ) indicates that the NRs are nearly perpendicular bounds to the spherical surface of beads, which is consistent to the orientation measurement for NRs that bound to SLBs coating on a 2D coverslip. The raw images also show large similarity to the simulated DSFs for SMs with perpendicular orientation to the spherical surface at three axial locations (FIG. 28G). To quantify the experimental 3D localization estimation precision, we plot the histograms of the distance r between the estimated location to the vertical diameter of the sphere for SMs at different z slices (FIG. 28F). The theoretical distribution using the convolution between the distribution of the spherical model and the precision of pixOLcjg was also calculated Based on the full width half maximum (FWHM), the lateral precision for DPPC and DPPC with cholesterol data are pretty close to the theoretical precision (FIG. 28H): the experimental estimations give a mean FWHM of 134 nm and the theoretical distribution gives a mean of 82 nm across a 1200 nm axial range.

Figure 28I:
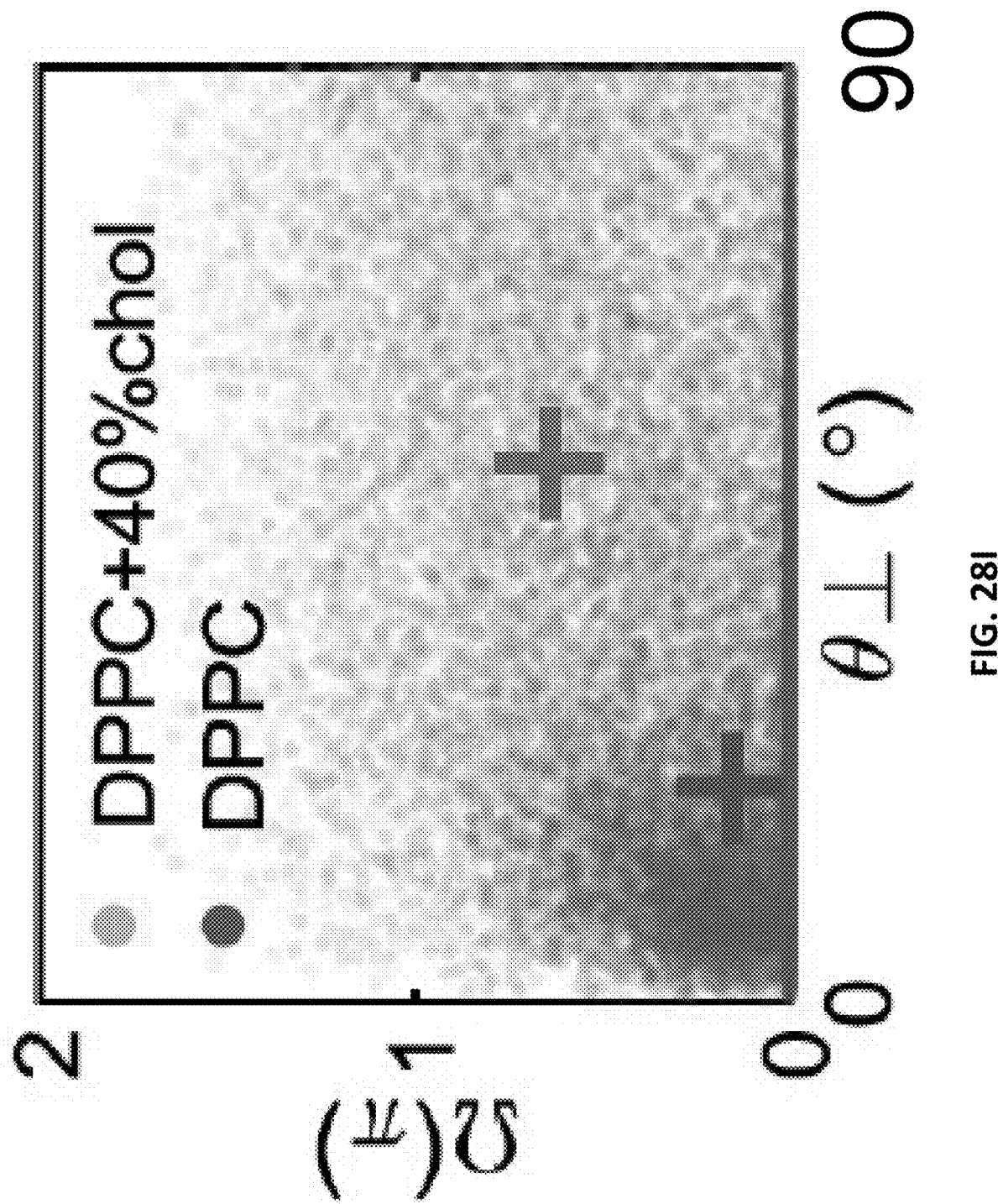
FIG. 28I is a plot of the orientation $(\theta_\perp)$ and wobble $(\Omega)$ measurements for DPPC with cholesterol (yellow) and DPPC. Crosses indicates the medians for DPPC with cholesterol (blue) and DPPC (Orange). Scale bars: 400 nm.

Without cholesterol, the SLBs on the sphere are less condensed. The orientation estimation for a bead coated with DPPC validated this as the orientation measurement (θ, φ) shows a more random distribution than the DPPC with cholesterol sample (FIG. 28D). Comparing the wobbling angle Ω and angle θ⊥, which is the angle between the estimated orientation and the vector perpendicular to the spherical surface (FIG. 28I), DPPC with cholesterol sample gives a relative small θ⊥ and Ω, indicating perpendicular orientation to the spherical surface and more fixed orientation, while DPPC sample gives a broader θ⊥ distribution and large wobbling Ω. Therefore, measuring the orientations of Nile reds with pixOL can easily tell the absence of cholesterol as the orientation senses the local environment difference.

What is claimed is:

1. A computer-implemented method for producing an optical mask for an SMOLM imaging system, the method comprising:
   a. providing, to a computing device, a baseline optical mask comprising a plurality of mask pixels distributed at a plurality of mask pixel positions within a mask plane, each mask pixel comprising at least one optical modulation element configured to modulate at least one optical parameter of a photon produced by an emitter propagating therethrough;
   b. providing, to the computing device, a plurality of emitter images indicative of dipole spread functions captured using the SMOLM imaging system provided with the baseline optical mask, each image comprising a plurality of image pixels indicative of a dipole spread function, each image pixel comprising a pixel position and a pixel intensity indicative of a number of photons detected at the pixel position, wherein each emitter image is obtained for a reference emitter positioned at a reference lateral position and at one sample orientation within an orientation space;
   c. determining, using the computing device, a loss function comprising a matrix quantifying variances in precision of emitter orientations estimated from the dipole spread functions from the plurality of images;
   d. iteratively modifying, using the computing device, at least one optical parameter of at least one mask pixel to minimize the loss function to produce the optical mask.

2. The method of claim 1, wherein the at least one optical parameter modulated by each mask pixel comprises a phase, a polarization, a birefringence, and any combination thereof.

3. The method of claim 2, wherein the optical parameter modulated by each mask pixel is the phase.

4. The method of claim 1, wherein the plurality of emitter images are obtained by:
   a. imaging an emitter at a plurality of orientations within the orientation space using the SMOLM imaging system provided with a baseline optical mask or a modified optical mask; or
   b. simulating each emitter image using a computational model of a SMOLM imaging system provided with a baseline optical mask or a modified optical mask.

5. The method of claim 4 wherein each emitter image is simulated using a dipole-dipole model.

6. The method of claim 1, wherein the matrix quantifying variances in precision of emitter orientations estimated from the dipole spread functions from the plurality of images comprises a Cramér-Rao bound matrix K, wherein the Cramér-Rao bound matrix quantifies a lower bound on a variance of estimated emitter orientations.

7. The method of claim 6, wherein the loss function l is given by:

$$l = \min_P \sum_{m \in \mathbb{C}} \sqrt{K(P, m)}$$

wherein m is a second-moment vector m of a dipole spread function obtained using the optical mask P, and $\mathbb{C}$ is a uniformly sampled emitter orientation space.

8. The method of claim 1, further including producing additional optical masks for images of an emitter positioned at different axial positions within the SMOLM imaging system, for images of an emitter comprising background photons, for images of emitters positioned out of the focal plane of the SMOLM imaging system.

9. The method in claim 1 wherein the loss function is quantified and minimized by a divergence statistical model.

10. The method of claim 1 wherein the each emitter image of the plurality of images is indicative of at least two dipole spread functions corresponding to at least two emitters within each image.

11. A computer-implemented method for producing a phase mask for an SMOLM imaging system, the method comprising:
   a. providing, to a computing device, a baseline phase mask comprising a plurality of mask pixels distributed at a plurality of mask pixel positions within a mask plane, each mask pixel comprising a phase modulation element configured to modulate the phase of a photon produced by an emitter propagating therethrough;
   b. providing, to the computing device, a plurality of emitter images indicative of dipole spread functions captured using the SMOLM imaging system provided with the baseline optical mask, each image comprising a plurality of image pixels indicative of a dipole spread function, each image pixel comprising a pixel position and a pixel intensity indicative of a number of photons detected at the pixel position, wherein each emitter image is obtained for a reference emitter positioned at a reference lateral position and at one sample orientation within an orientation space;
   c. determining, using the computing device, a loss function comprising a matrix quantifying variances in precision of emitter orientations estimated from the dipole spread functions from the plurality of images;
   d. iteratively modifying, using the computing device, at least one optical parameter of at least one mask pixel to minimize the loss function to produce the phase mask.

12. The method of claim 11, wherein the plurality of emitter images are obtained by:
   a. imaging an emitter at a plurality of orientations within the orientation space using the SMOLM imaging system provided with a baseline optical mask or a modified optical mask; or
   b. simulating each emitter image using a computational model of a SMOLM imaging system provided with a baseline optical mask or a modified optical mask.

13. The method of claim 12 wherein each emitter image is simulated using a dipole-dipole model.

14. The method of claim 11, wherein the matrix quantifying variances in precision of emitter orientations estimated from the dipole spread functions from the plurality of images comprises a Cramér-Rao bound matrix K, wherein the Cramér-Rao bound matrix quantifies a lower bound on a variance of estimated emitter orientations.

15. The method of claim 14, wherein the loss function l is given by:

$$l = \min_P \sum_{m \in \mathbb{C}} \sqrt{K(P, m)}$$

wherein m is a second-moment vector m of a dipole spread function obtained using the optical mask P, and $\mathbb{C}$ is a uniformly sampled emitter orientation space.

16. The method of claim 11, further including producing additional optical masks for images of an emitter positioned at different axial positions within the SMOLM imaging system, for images of an emitter comprising background photons, for images of emitters positioned out of the focal plane of the SMOLM imaging system.

17. The method in claim 11 wherein the loss function is quantified and minimized by a divergence statistical model.

18. The method of claim 11 wherein the each emitter image of the plurality of images is indicative of at least two dipole spread functions corresponding to at least two emitters within each image.

* * * * *